United States Patent
Pilley et al.

(12)

(10) Patent No.: US 6,195,609 B1
(45) Date of Patent: Feb. 27, 2001

(54) METHOD AND SYSTEM FOR THE CONTROL AND MANAGEMENT OF AN AIRPORT

(75) Inventors: Harold Robert Pilley, P.O. Box 439, Berkley Heights, NJ (US) 07922-0439; Lois V Pilley, Leominster, MA (US)

(73) Assignee: Harold Robert Pilley, Gillette, NJ (US)

( * ) Notice: Subject to any disclaimer, the term of this patent is extended or adjusted under 35 U.S.C. 154(b) by 0 days.

(21) Appl. No.: 09/032,313

(22) Filed: Feb. 27, 1998

Related U.S. Application Data

(63) Continuation-in-part of application No. 08/117,920, filed on Sep. 7, 1993, now Pat. No. 5,548,515, and a division of application No. 08/524,081, filed on Sep. 6, 1995, now Pat. No. 5,867,804.

(51) Int. Cl.[7] .................................................. G06F 163/00
(52) U.S. Cl. .......................... 701/120; 701/117; 701/301; 342/36
(58) Field of Search ................................ 701/15, 16, 117, 701/120, 121, 122, 300, 301, 213; 73/178 T; 340/903, 961, 435; 342/29, 36–38, 454, 455

(56) References Cited

U.S. PATENT DOCUMENTS

| 5,200,902 | * | 4/1993 | Pilley | 701/213 |
| 5,519,618 | * | 5/1996 | Kastner et al. | 701/120 |
| 5,548,515 | * | 8/1996 | Pilley et al. | 701/120 |
| 5,574,648 | * | 11/1996 | Pilley | 701/120 |
| 5,629,691 | * | 5/1997 | Jain | 340/961 |
| 5,714,948 | * | 2/1998 | Farmakis et al. | 701/120 |
| 5,740,047 | * | 4/1998 | Pilley et al. | 701/120 |
| 5,867,804 | * | 2/1999 | Pilley et al. | 701/120 |

* cited by examiner

Primary Examiner—Gary Chin

(57) ABSTRACT

A method and system providing a computer human interface for use by an air traffic controller supported by various GNSS compatible control and management commands. A data entry capability allows the controller to select various GNSS based commands such as arrival and departure clearances to effectively control and manage the flow of traffic using GNSS and its augmentations. GNSS is used as the primary air and surface position and navigation sensor. GNSS compatible travel paths are utilized in clearances, navigation and for conformance and traffic flow monitoring purposes. Two display views enable the controller to observe the traffic situation on one display view, while other display views are predominately utilized for the presentation of control and management system commands, warning alerts, messages and other functions. Controller to Pilot Data Link Capability (CPDLC) for clearances is utilized in conjunction with clearance acknowledgments being generated aboard the cleared aircraft. Automatic Dependent Surveillance using GNSS position reports as well as a subordinate radar surveillance and Mode S input may be utilized for graphic display presentations and other functions of the controller computer human interface. Incursion detection, collision detection, conformance monitoring, and lighting control are performed as a background automated processing function. In the event of an alert condition, warnings are presented to controller using text messages and using the multi-color situation display. Incursion conditions on runways activate airfield lighting systems to alert landing or departing aircraft of a compromised runway.

14 Claims, 24 Drawing Sheets

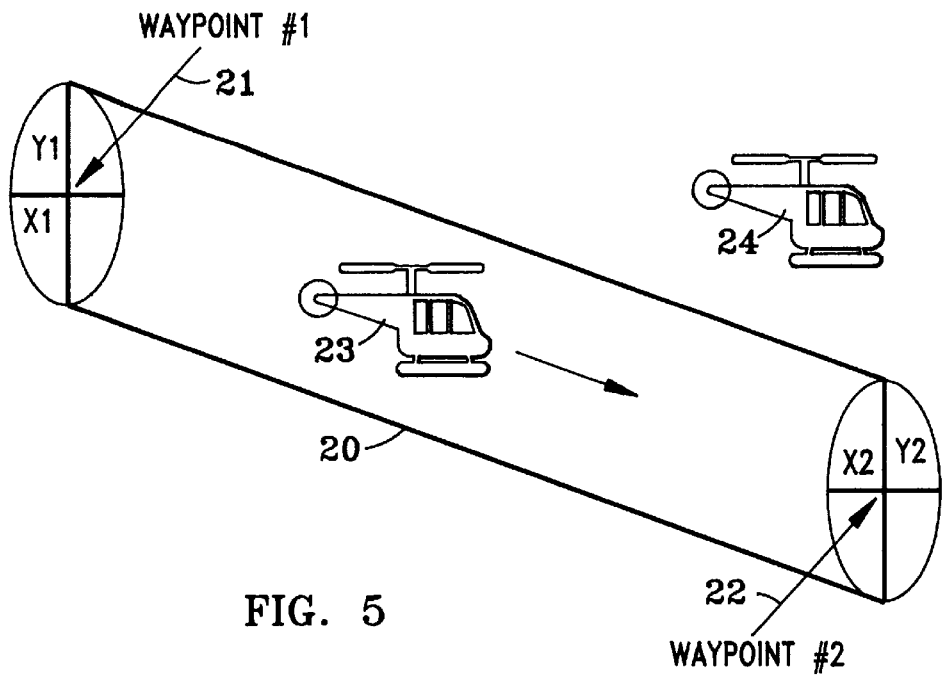
FIG. 5
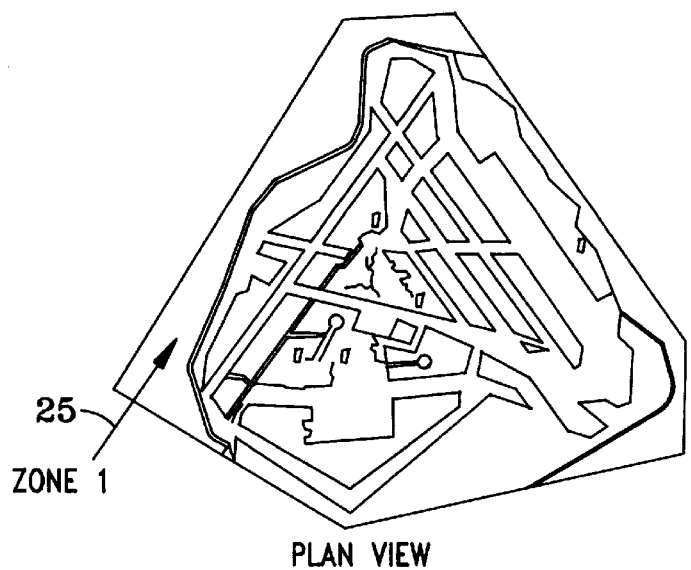
PLAN VIEW
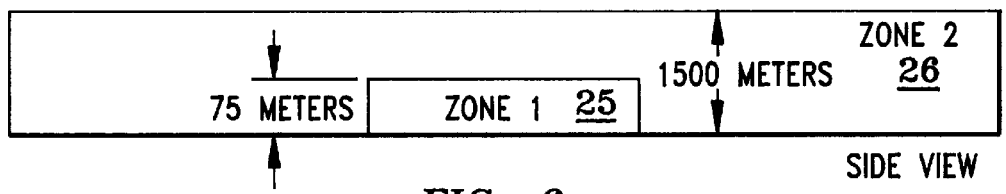
FIG. 6

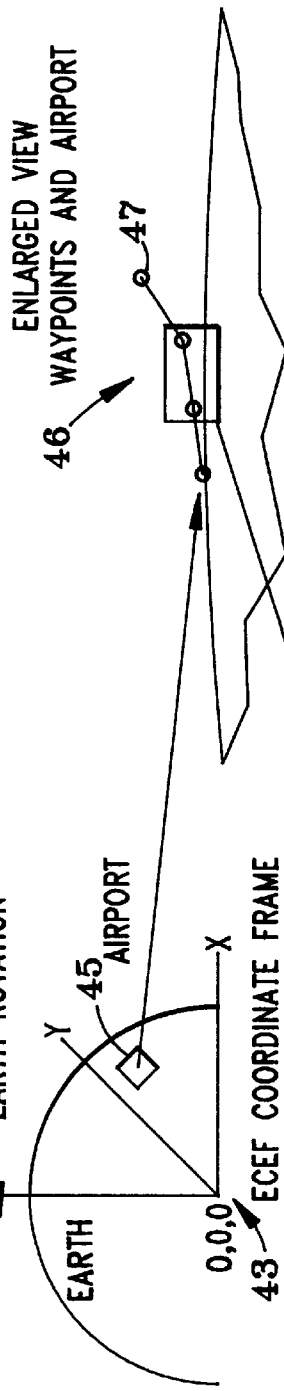
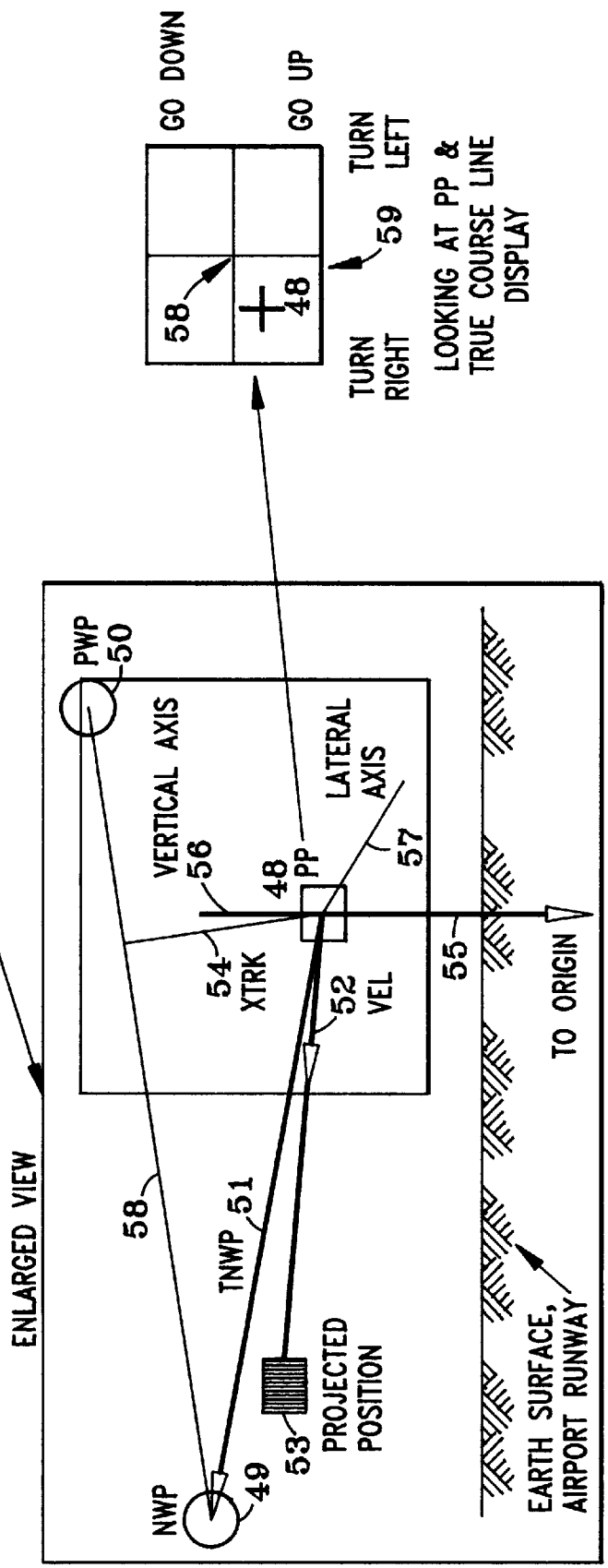
FIG. 11

ECEF TOUCH AND GO TRAJECTORY SHOWING WAYPOINTS EVERY 20 SECONDS

METERS
−4432000

$B_{WT}, Y_T$

−4436000

1487000            $A_{WT}, X_T$            1492000 METERS

ECEF PLAN VIEW OF TRAJECTORY AND WAYPOINTS EVERY 20 SECONDS

FIG. 14

METERS
4324000

$C_{WT}, Z_T$ 4319000
0                    WT, T                    300 SECONDS

ECEF Z AXIS VS TIME WITH WAYPOINTS ABOUT EVERY 20 SECONDS

FIG. 15

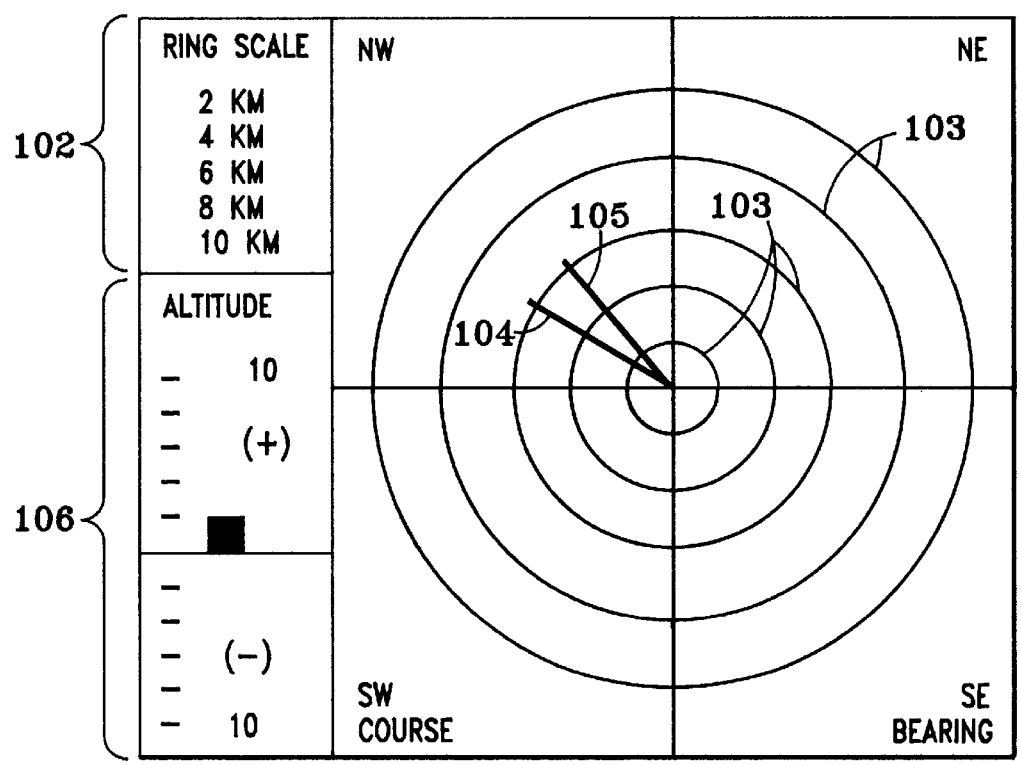
FIG. 19
FIG. 20
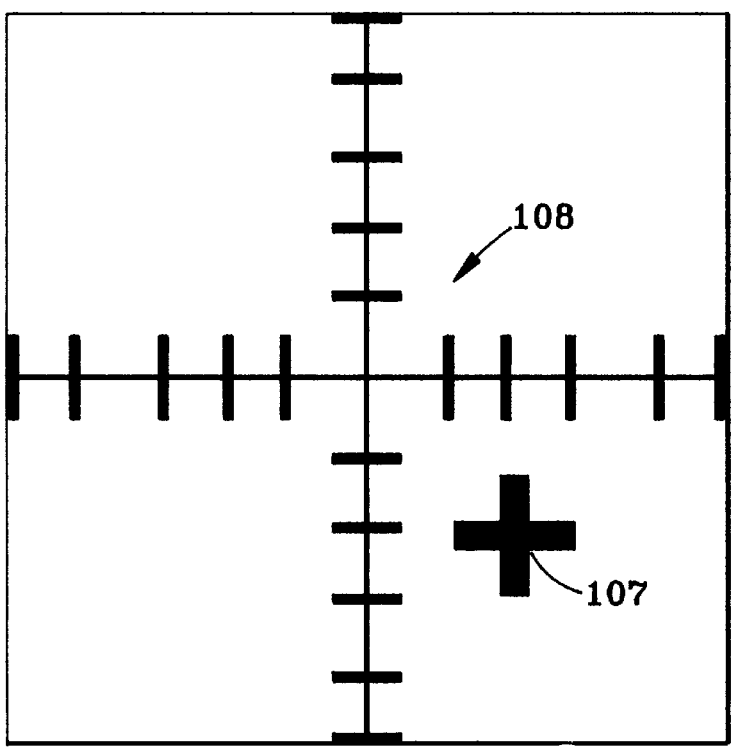

TOUCH SCREEN LAYOUT

METHOD AND SYSTEM FOR THE CONTROL AND MANAGEMENT OF AN AIRPORT

This invention is a Continuation In Part of parent application 08/117,920 filed Sep. 7, 1993 now U.S. Pat. No. 5,548,515 and divisional elements of application 08/524,081 filed Sep. 6, 1995 now U.S. Pat. No. 5,867,804 which support the control and management of surface and airborne vehicles using a computer human interface for a controller and vehicle operator supported by computer automation using Global Satellite Navigation System data, surveillance information, and seamless globally applicable computer automation processing techniques and compatible spatial and temporal databases.

BACKGROUND

Description of Prior Art

Today's airport terminal operations are complex and varied from airport to airport. Airports today are, in many cases, the limiting factor in aviation system capacity. Each airport has a unique set of capacity limiting factors which may include; limited tarmac, runways, suitable approaches, navigational or/and Air Traffic Control (ATC) facilities Furthermore, operational requirements in the terminal area involve all facets of aviation, communication, navigation and surveillance. The satisfaction of these requirements with technological/potential solutions should be based upon three underlying principles; improved safety, improved capacity and cost effectiveness.

Today airport air traffic control procedures and general airport aviation operations are based on procedures from the 1950's. These air traffic control procedures were initially developed to separate aircraft while in the air. The initial separation surveillance system was a radar system consisting of a rotating radar antenna. The antenna rotated typically about once every 4.8 seconds while transmitting a signal, another receiving antenna picks up a reflected signal from a target. The surveillance system then calculated a range (based on transit time) and an azimuth angle based on the physical orientation of the antenna. The 2-dimensional position was then usually plotted on a display with other detected targets, objects and clutter. Radar today relies on faster rotating antennas or electronically scanned antennas to provide more frequent updates and higher resolution. To further enhance the performance of the target returns, provide altitude information and an identifier, a transponder is used on the aircraft. The transponder is the key element in radar surveillance systems, since without it no identification and no altitude information is provided to the air traffic control system.

Surveillance data from multiple surveillance systems (radars) is then discretely mosaiced or "tiled" into a semi-continuous system. Controllers today separate traffic visually by the rule of "green in between" the target tracks. This is a highly manual method for separation of aircraft, placing stress on the controllers and limits any true automation assistance for the controller.

In the high density and high precision airport environment numerous single function airport systems have been developed over the years to support air traffic control and pilot needs. Precise landing navigation is currently provided by the Instrument Landing System (ILS), while airside navigation is provided by VOR/DME, LORAN and NDB's. Airport air traffic controller surveillance is provided thorough visual means, airport surface detection radar (ASDE), secondary surveillance radar, parallel runway monitoring radar and in some cases primary radar. Each of these systems is single function, local in nature and operation and provides accuracy which is a function of distance to the object being tracked. Merging these navigation and surveillance systems into a 4-dimensional seamless airport environment is technically difficult and expensive. MIT Lincoln Laboratories is attempting to provide an improved radar based Air Traffic Control environment and has received three U.S. Pat. Nos. 5,374,932, 5,519,618 and 5,570,095 reflecting those efforts. These patents relate to improvements of the current localized surveillance and navigation airport environment without the use of GNSS compatible seamless techniques as These localized systems have served the aviation system well for nearly 50 years and numerous mishaps have been prevented over this period through their use. With the advent of new multi-function technologies superior performance is available at a fraction of the cost of today's current single function systems. The technologies of Global Navigation Satellite Systems, digital communication and low cost commercial computers can support seamless 4-dimensional airport operations at smaller airports unable to justify the heavy financial investment in today's single function navigation and surveillance systems.

Others are also demonstrating and developing similar systems. Haken Lans (GP&C) of Sweden is demonstrating the use of Differential GPS with Self Organizing Time Division Multiple Access datalink communications. The invention of Haken Lans is described in World Intellectual Property Organization document #93/01576. The invention of Fraughton describes an airborne system for collision avoidance in U.S. Pat. No. 5,153,836. The inventions of Lans and Fraughton fail to provide the seamless 4 dimensional GNSS compatible operational and processing environment of Pilley.

BACKGROUND OF THE INVENTOR

The inventor having been involved with the FAA's Advanced Automation System became aware that airport program segments were not getting the attention they deserved, nor were advanced technologies being investigated. The inventor set out to demonstrate that new technologies could be used to support seamless airport navigation and surveillance. The multi-year efforts of the inventors are summarized in the book titled: GPS BASED AIRPORT OPERATIONS, Requirements, Analysis, Algorithms US copyright #TX 3 926 573, (Library of Congress #94-69078), (ISBN 0-9643568-0-5). This book provides much of the back ground for this patent application. In addition to the book the following publications and professional papers have been published by the inventor in efforts of due diligence to promote this life saving technology.

PUBLICATIONS

Institute of Navigation, ION GPS-91, Sep. 12, 1991, Technical Paper, "Airport Navigation and Surveillance Using GPS and ADS".

GPS WORLD Magazine, October 1991, Article, "GPS, Aviation and Airports the Integrated Solution".

71st Transportation Research Board, Annual Meeting, Jan. 14, 1992, Technical Paper, "Applications of Satellite CNS in the Terminal Area".

Institute of Navigation National Technical Meeting, Jan. 28, 1992, Technical Paper, "Terminal Area Surveillance Using GPS".

Institute of Navigation, ION GPS-92, Technical Paper, "Collision Prediction and Avoidance Using Enhanced GPS".

Institute of Navigation, 49th Annual Meeting, June 1993, Technical Paper, "Runway Incursion Avoidance Using GPS".

Airport Surface Traffic Automation Technical Information Group FAA & Industry Forum, Jul. 15, 1993, Presentation.

Commercial Aviation News, Jul. 19, 1993, "Airport Test to Look at Collision Avoidance".

IEEE Vehicle Navigation and Intelligent Vehicle (VNIS), Conference, Oct. 14, 1993, Technical Paper, "Demonstration Results of GPS for Airport Surface Control and Management". Institute of Navigation, ION GPS-93, Sep. 23, 1993, Technical Paper, "GPS for Airport Surface Guidance and Traffic Management". Avionics Magazine, October 1993, "Differential GPS Runway Navigation System Demonstrated".

IEEE PLANS '94, April 1994, Technical Paper, "GPS, 3-D Maps and ADS Provide A Seamless Airport Control and Management Environment".

Institute of Navigation, ION GPS-94, Sep. 22, 1994, Technical Paper, "DGPS for Seamless Airport Operations".

Presentation Seattle, Wash., May 9, 1995. International Civil Aviation Organization of the United Nations, Advanced Surface Movement guidance and Control (SMGCS) meeting, Presentation and demonstration "GPS based SMGCS".

As the list of presentations and publications shows the inventors have been active in getting the government and the aviation community to accept this life saving cost effective airport technology.

The United States alone currently contains some 17,000 airports, heliports and seabases. Presently only the largest of these can justify the investment in dedicated navigation and surveillance systems while the vast majority of smaller airports have neither. Clearly, a new approach is required to satisfy aviation user, airport operator, airline and ATC needs.

It would therefore be an advance in the art to provide a cost effective Airport Control and Management System which would provide navigation, surveillance, collision prediction, zone/runway incursion and automated airport lighting control based on the Global Navigation Satellite System (GNSS) as the primary position and velocity sensor on board participating vehicles. It would be still a further advance of the art if this system were capable of performing the navigation, surveillance, collision prediction, lighting control and zone/runway incursion both on board the aircraft/vehicles and at a remote ATC, or other monitoring site.

With the advent of new technologies such as the Global Positioning System, communication and computer technology, the application of new technologies to the management of our airports can provide improved efficiency, enhanced safety and lead to greater profitability for our aviation industry and airport operators.

On Aug. 12, 1993, Deering System Design Consultants, Inc. (DSDC) of Deering, N.H., successfully demonstrated their Airport control & Management System (AC&M) to the Federal Aviation Administration (FAA). After many years of development efforts, the methods and processes described herein were demonstrated to Mike Harrison of the FAA's Runway Incursion Office, officials from the FAA's Satellite Program Office, the FAA New England Regional Office, the Volpe National Transportation System Center, the New Hampshire Department of Transportation, the Office of U.S. Senator Judd Gregg and the Office of U.S. Representative Dick Swett. This was the first time such concepts were reduced to a working demonstrable system. The inventor has taken an active stand to promote the technology in a public manner and, as such, may have informed others to key elements of this application. The inventor has promoted this technology. The inventor's airports philosophy has been described in general terms to the aviation industry since it was felt industry and government awareness was necessary. The intent of this Continuation application to identify and protect through letters of Patent techniques, methods and improvements to the demonstrated system.

With these and other objects in view, as will be apparent to those skilled in the art, the improved airport control and management invention stated herein is unique, novel and promotes the public well being.

SUMMARY OF THE INVENTION

This invention most generally is a system and a method for the control of surface and airborne traffic within a defined space envelope. GNSS-based, or GPS based data is used to define and create a 3-dimensional map, define locations, to compute trajectories, speeds, velocities, static and dynamic regions and spaces or volumes (zones) including zones identified as forbidden zones. Databases are also created, which are compatible with the GNSS data. Some of these databases may contain, vehicle information such as type and shape, static zones including zones specific to vehicle type which are forbidden to the type of vehicle, notice to airmen (notams) characterized by the information or GNSS data. The GNSS data in combination with the databases is used, for example, by air traffic control, to control and manage the flow of traffic approaching and departing the airport and the control of the flow of surface vehicles and taxiing aircraft. All or a selected group of vehicles may have GNSS receivers. Additionally, all or a selected group may have bi-directional digital data and voice communications between vehicles and also with air traffic control. All of the data is made compatible for display on a screen or selected screens for use and observation including screens located on selected vehicles and aircraft. Vehicle/aircraft data may be compatibly superimposed with the 3-dimensional map data and the combination of data displayed or displayable may be manipulated to provide selecting viewing. The selected viewing may be in the form of choice of the line of observation, the viewing may be by layers based upon the data and the objective for the use of the data.

It is, therefore, an object of this invention to provide the following:

(1) A 4-D process logic flow which provides a "seamless" airport environment on the ground and in the air anywhere in the world with a common 3-D coordinate reference and time.

(2) An Airport Control and Management Method and System which utilizes GNSS, 3-D maps, precise waypoint navigation based on the ECEF reference frame, a digital full duplex communication link and a comprehensive array of processing logic methods implemented in developed operational software.

(3) An airport Control and Management Method and System where a vehicle based 4-D navigational computer and ATC computer utilize the same coordinate reference and precise time standard.

(4) A database management method compatible with 3-D waypoint storage and presentation in 3-D digital maps.

(5) A automated method utilizing the precise 3-D airport map for the definition and creation of airport routes and travel ways.

(6) A 4-D process logic flow which provides precise vehicle waypoint navigation in the air and on the ground. This process allows for monitoring of on or off course conditions for vehicles and aircraft operating within the airport space envelope on board the vehicle.

(7) A 4-D process logic flow which provides precise ATC waypoint navigation mirroring of actual vehicles in the air and on the ground at ATC. This process allows for monitoring of on or off course conditions for vehicles and aircraft operating within the airport space envelope at the ATC computer.

(8) A 4-D process logic flow performed on board the vehicle which provides for precise collision prediction based on 3-dimensional zones.

(9) A 4-D process logic flow performed at the ATC computer which provides for precise collision prediction based on 3-dimensional zones.

(10) A collision detection management method which utilizes the application of false alarm reducing methods.

(11) An ATC process logic flow which detects 3-D runway incursions. The process logic then generates message alerts and controls airport lights.

(12) An ATC zone management method which utilizes the application of false alarm reducing methods.

(13) A vehicle process logic flow which detects 3-D runway incursions. The process logic then generates message alerts and sounds tones within the vehicle or aircraft.

(14) A vehicle zone management method which utilizes the application of false alarm reducing methods.

(15) A 4-D ATC process logic flow which manages ground and air "Clearances" with precise waypoint navigation aboard the vehicle and at the ATC computer.

(16) A 4-D ATC process logic flow which manages ground and air "Clearances" incorporating an integrated system of controlling airport lights.

(17) A 4-D vehicle process logic flow which manages ground and air "Clearances" with an integrated system of waypoint navigation.

(18) A method of management for 3-D spatial constructs called zones.

(19) A method of management for 3-D graphical constructs called zones.

(20) A method of management for the automated generation of a zones database at any airport.

(21) A database management method for the storage of zones data. Zones database management methods are used aboard the vehicle and at ATC.

(22) A operational management method where the ATC computer provides navigational instructions to vehicles and aircraft. The instructions result in a travel path with clear paths defined being displayed in an airport map.

(23) A operational management method where the ATC computer provides navigational instructions to vehicles and aircraft. The instructions result in waypoints being entered into a 4-D navigation computer.

(24) A datalink message content which supports the above management methods and processes.

(25) A redundant system architecture which satisfies life critical airport operations.

(26) Methods for navigation within the airport environment using map displays, controller clearances and automation techniques in the cockpit and at ATC.

(27) An integrated airport controller automation interface which supports GNSS compatible processing.

(28) A method for managing GNSS travel path information, clearances and conformance monitoring using broadcast GNSS trajectory information and automatic dependent surveillance.

More specifically, the elements mentioned above form the process framework of the invention stated herein.

BRIEF DESCRIPTION OF DRAWINGS

The invention, may be best understood by reference to one of its structural forms, as illustrated by the accompanying drawings, in which:

FIG. 5 represents an example of a route zone which is defined by navigational waypoints and is used for on/off course processing and is used in the vehicles and at the ATC Processor.

FIG. 6 represents an example of a 3-D ATC zone, used to segregate tracked vehicles to particular ATC stations.

FIG. 11 depicts a waypoint processing diagram showing the earth and ECEF coordinate system, expanded view of airport waypoints, further expanded view of previous and next waypoint geometry with present position, the cross hair display presentation used in the developed GPS navigator.

FIG. 14 graphs ECEF X and Y presentation of missed approach followed by a touch and go with waypoints indicated about every 20 seconds.

FIG. 15 graphs ECEF Z versus time of missed approach followed by touch and go, with waypoints about every 20 seconds.

FIG. 19 shows the area navigation display with range rings, course and bearing radial lines, and altitude to true course indicators.

FIG. 20 depicts the GPS sliding cross hair landing display indicating too low (go up) and too far right (turn left).

DESCRIPTION OF PREFERRED EMBODIMENT
AC&M PROCESSING OVERVIEW

Figure 1:
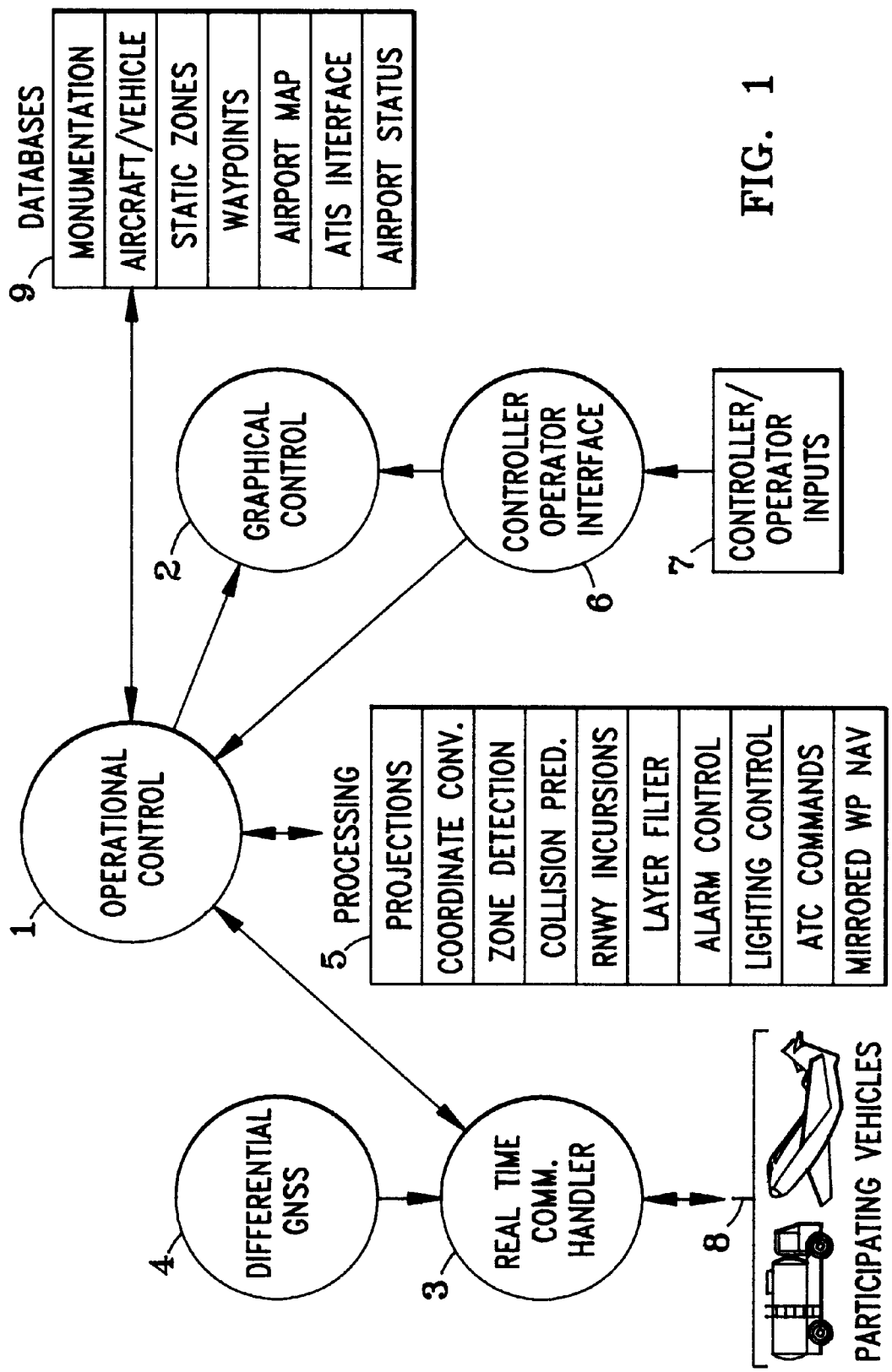
FIG. 1 depicts the high-level Airport Control and Management processing elements and flow.

The primary Airport Control and Management (AC&M) functions of the invention utilize a Cartesian ECEF X, Y, Z coordinate frame compatible with GNSS. FIG. 1 provides additional detail for the operational elements of the AC&M processing. The GNSS signals broadcast by the vehicles 8 are processed by the Real Time Communication Handler 3 and sent to AC&M Operational Control 1. The Operational Control 1 uses the GNSS data to perform the following processing functions 5: position projections, coordinate conversions, zone detection, collision prediction, runway incursion detection, layer filter, alarm control, and lighting control. If waypoints have been issued to the vehicle 8, mirrored waypoint navigation is also performed by the AC&M processing. The Operational Control 1 interfaces directly to the Graphical Control 2. Graphics messages, including GNSS data and coded information pertaining to zone incursions, possible collision conditions, or off course conditions detected by the AC&M Processing, are passed to the Graphical Control 2. The Graphical Control 2 interprets this data and updates the display presentation accordingly.

The Operational Control 1 function also receives inputs from the Controller/Operator Interface 6. The Controller/Operator Interface uses the data received by Controller/Operator Inputs 7 to compose ATC commands which are sent to the Operational Control 1 function for processing. Commands affecting the presentation on the computer display screen are sent by the Operational Control 1 function to the Graphical Control 2. ATC commands composed by the Controller/Operator Interface 6 processing that do not require further AC&M processing are forwarded directly to the Graphical Control 2 to update the display screen. Both the Operational Control 1 function and Graphical Control 2 processing have access to the Monumentation, Aircraft/Vehicle, Static Zones, Waypoints, Airport Map, ATIS Interface and Airport Status and other low level data bases 9 to process and manipulate the presentation of map and vehicle data on a computer display screen.

More specifically, each vehicle 8 supports the capability to transmit a minimum of an identifier, the GNSS referenced position of one or more antennas, velocity, optional acceleration and time reports. Since this data is broadcast, it is accessible to the airport control tower, other aircraft and vehicles in the local area, and various airline monitoring or emergency command centers which may perform similar processing functions. ATC commands, processed by the Controller/Operator Interface 6 and Operational Control 1 function are passed to the Real Time Communication Handler 3 for transmission to the aircraft/vehicle(s) 8. Upon receipt of ATC messages, the vehicle(s) 8 return an acknowledgment message which is received by the Real Time communication Handler 3 and passed to the Operational Control 1 function. Differential GNSS corrections are generated by the Differential GPS Processor 4 and passed to the Real Time Communication Handler 3 for broadcast to the vehicles. The Real Time Communication Handler 8 performs the following functions at a minimum:

a. Initialize ATC computer communication lines
   b. Initialize radio equipment
   c. Establish communication links
   d. Receive vehicle identifier, positions, velocity, time and other information
   e. Receive information from ATC Processor to transmit to vehicle(s)
   f. Receive ATC acknowledgment messages from vehicle(s)
   g. Transmit information to all vehicles or to selected vehicles by controlling frequency and/or identifier tags
   h. Monitor errors or new information being transmitted
   i. Receive and broadcast differential correction data The AC&M techniques and methods described herein provide for GNSS compatible 4-Dimensional Airport Control and Management

THE 3-D DIGITAL AIRPORT LAYOUT PLAN

The combination of ECEF navigation combined with NAD 83 (Lat. Lon, MSL and State Plane) and WGS 84 (X,Y,Z) based 3-D airport features are necessary in constructing an airport layout plan (ALP). The Airport Control and Management System (AC&M) requires that navigation and Automatic dependent Surveillance (ADS) information used in collision detection processing share the same coordinate frame. The processing methods described herein, require very accurate and properly monumented airport layout plans. Physical features surrounding the airport may be surveyed in a local coordinate frame and, as such, require accurate transformation into the airport map/processing coordinate frame. For these reasons, the use of multi-monumented coordinate references is mandatory for such map construction and survey. Clearly, highly accurate 3-D maps are required when using precise GNSS based navigation, collision avoidance and overall Airport Control and Management for life critical airport applications.

The 3-D ALP database and display presentation support the concept of zones. The display of zone information is managed using the Map Layer Filter. Zones are two and three dimensional shapes which are used to provide spatial cueing for a number of design constructs. Static zones may be defined around obstacles which may pose a hazard to navigation such as transmission towers, tall buildings, and terrain features. Zones may also be keyed to the airport's NOTAMS, identifying areas of the airport which have restricted usage. Dynamic zones are capable of movement. For example, a dynamic zone may be constructed around moving vehicles or hazardous weather areas. A Route zone is a 3-D zone formed along a travel path such as a glide slope. Zone processing techniques are also applied to the management of travel clearances and for the detection of runway incursions. Zones may also be associated with each aircraft or surface vehicle to provide collision prediction information.

OPERATIONAL PROJECTIONS

AC&M projection processing utilizes received GNSS ADS messages from a datalink. The complete received message is then checked for errors using CRC error detection techniques or a error correcting code. The message contains the following information, or a subset thereof, but not limited to:

| PVT ADS DATA | |
|---|---|
| ID # | 8 Characters |
| VEHICLE TYPE | 4 Characters |
| CURRENT POSITION: | |
| X= ECEF X Position (M) | 10 Characters |
| Y=ECEF Y Position (M) | 10 Characters |
| Z=ECEF Z Position (M) | 10 Characters |
| X2=ECEF X2 Position (M) | 2 Characters * |
| Y2=ECEF Y2 Position (M) | 2 Characters * |
| Z2=ECEF Z2 Position (M) | 2 Characters * |
| X3=ECEF X3 Position (M) | 2 Characters * |
| Y3=ECEF Y3 Position (M) | 2 Characters * |
| Z3=ECEF Z3 Position (M) | 2 Characters * |
| VX=ECEF X Velocity (M/S) | 4 Characters |
| VY=ECEF Y Velocity (M/S) | 4 Characters |
| VZ=ECEF Z Velocity (M/S) | 4 Characters |
| AX=ECEF X Acceleration (M/52) | 2 Characters # |
| AY=ECEF Y Acceleration (M/52) | 2 Characters # |
| AZ=ECEF Z Acceleration (M/52) | 2 Characters # |
| TIME | 8 Characters |
| TOTAL CHARACTERS/MESSAGE: | 80 Characters |

\* OPTIONAL FIELD, FOR DETERMINING VEHICLES ATTITUDE IN 3-D DIGITAL MAP DATA BASE
\# OPTIONAL ACCELERATION FIELD

A database is constructed using the ADS message reports. The AC&M processing converts the position and velocity information to the appropriate coordinate frame (if necessary, speed in knots and a true north heading). Simple first and second order time projections based upon position, velocity and acceleration computations are used. The ability to smooth and average the velocity information is also possible using time weighted averages.

ECEF POSITION PROJECTION TECHNIQUE $$PROJECTED\ X=X+(VX)(t)+(AX)(t^2)/2$$

$$PROJECTED\ Y=Y+(VY)(t)+(AY)(t^2)/2$$

$$PROJECTED\ Z=Z+(VZ)(t)+(AZ)(t^2)/2$$

This set of simple projection relationships is used in the collision prediction and zone incursion processing methods.

ZONE DATABASE

Zone areas may be defined in the initial map data base construction or may be added to the map database using a 2-D or 3-D data entry capability. The data entry device may be used to construct a zone using a digital map in the following manner:

Using the displayed map, the data entry device is used to enter the coordinates of a shape around the area to be designated as a zone. (An example may be a construction area closed to aircraft traffic listed in the current NOTAMS.)

The corners of the polygon are saved along with a zone type code after the last corner is entered. Circles and spheres are noted by the center point and a radius, cylinders are noted as a circle and additional height qualifying information. Other shapes are defined and entered in a similar fashion.

The zone is stored as a list of X, Y, Z coordinates. Lines connecting the points form a geometric shape corresponding to the physical zone in the selected color, line type and style in the proper layer of the base map.

Zone information may then be used by collision detection and boundary detection software contained in the AC&M system. This processing software is explained later in this specification.

Figure 2:
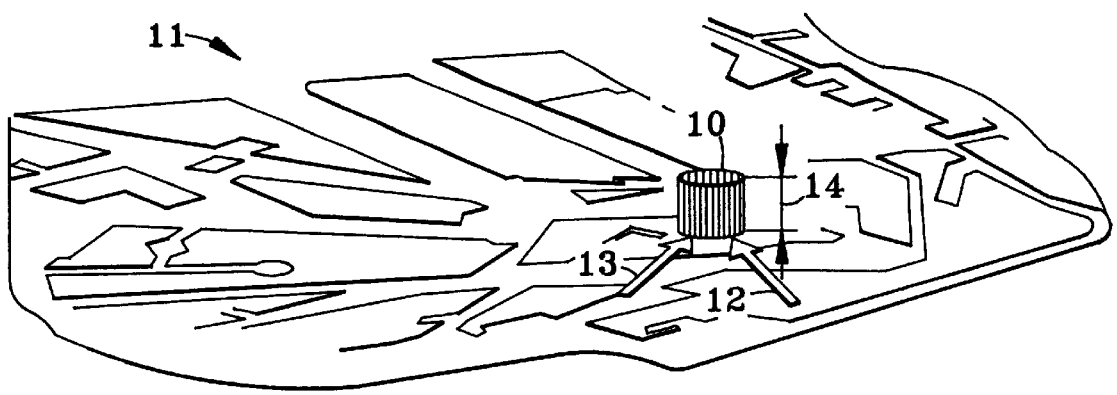
FIG. 2 represents an example of a cylindrical static zone in a 3-D ALP. This zone could be graphically displayed in a layer of the ALP.

FIG. 2 depicts a 3-D cylindrical static zone around a hypoethetical utility pole. This zone 10 is added into the airport map 11, while the specific coordinates (center point of base 12, radius of circular base 13, and the height 14) are saved to the zone file list in a convenient coordinate frame.

Below is an example of a zone which is stored in the zone database.

| IDENTIFIER | PARAMETER |
|---|---|
| Utility pole | Type of Zone |
| Center of base | X, Y, Z |
| Radius of base | R |
| Height of the cylinder | H |

The 3-D digital map 11 is then updated using a series of graphic instructions to draw the zone 10 into the map with specific graphic characteristics such as line type, line color, area fill and other characteristics.

A database of zone information containing zones in surface coordinates such as X & Y state plane coordinates and mean sea level, ECEF referenced X, Y, Z and others are accessible to the AC&M Processing. The database may consist of, but is not limited to the following type of zones.

OBJECT OF THE ZONE
TRANSMISSION TOWERS
AIRPORT CONSTRUCTION AREAS
CLOSED AREAS OF AIRPORT
MOUNTAINS
TALL BUILDINGS

AREAS OFF TAXIWAY AND RUNWAY
RESTRICTED AIRSPACE
INVISIBLE BOUNDARIES BETWEEN AIR TRAFFIC CONTROLLER AREAS
APPROACH ENVELOPE
DEPARTURE ENVELOPE
AREAS SURROUNDING THE AIRPORT
MOVING ZONES AROUND AIRCRAFT/VEHICLES
ZONE PROCESSING

The zone information is retrieved from a zone database. As the AC&M Processor receives current ADS reports, information on each position report is checked for zone incursion. Further processing utilizes velocity and acceleration information to determine projected position and potential collision hazards. If a current position or projected position enters a zone area or presents a collision hazard an alert is generated.

A zone is any shape which forms a 2-D or 3-D figure such as but not limited to a convex polygon (2-D or 3-D), or a circular (2-D), spherical (3-D), cylindrical (3-D) or conical shape represented as a mathematical formula or as a series of coordinate points. Zones are stored in numerous ways based upon the type of zone. The coordinate system of the map and the units of measure greatly affect the manner in which zones are constructed, stored and processed.

The invention described herein utilizes four primary types of 2-D and 3-D zones in the Airport Control and Management System.

FOUR PRIMARY ZONE TYPES

Figure 3:
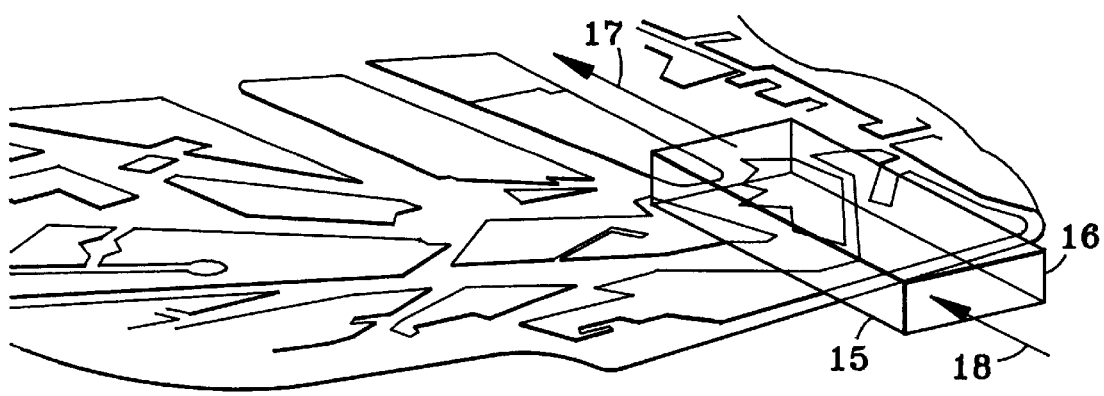
FIG. 3 represents an example of a static zone around a construction area of the airport and is used in zone incursion processing in the vehicles and at the ATC Processor.

The first type zone is a static zone as shown in FIG. 3. Static zones represent static non-moving objects, such as radio towers, construction areas, or forbidden areas off limits to particular vehicles. The zone 15 shown in the FIG. 3 represents a closed area of the airport which is under construction. The zone 15 is a 3-D zone with a height of 100 Meters 16, since it is desired not to have aircraft flying low over the construction site, but high altitude passes over the zone are permitted. An example of a permitted flyover path 17 and a forbidden fly through path 18 are shown in the figure. The fly through will produce a zone incursion, while the flyover will not.

Figure 4:
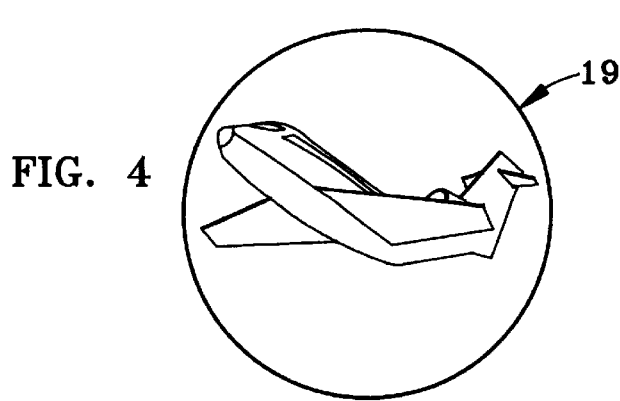
FIG. 4 represents an example of a dynamic zone which travels with a moving vehicle, in this case the zone represents the minimum safe clearance spacing which would be used in zone based collision detection processing in the vehicles and at the ATC processor.

A second zone type is shown in FIG. 4 and represents a dynamic zone 19 which moves with a moving vehicle or aircraft. Dynamic zones may be sized and shaped for rough check purposes or may be used to describe the minimum safe clearance distance. The dynamic zone is capable of changing size and shape as a function of velocity and or phase of flight and characterized by vehicle or aircraft type.

The third type zone is shown in FIG. 5 and is a route zone 20. Route zones are described though the use of travel waypoints 21 and 22. The waypoints 21 and 22 define the center line of a travel path, the zone has a specified allowable travel radius X1, Y1 at Waypoint 1 21 and X2, Y2 at Waypoint 2 22 for the determination of on or off course processing. For simplicity X1 may equal X2 and Y1 may equal Y2. On course 23 operations result in travel which is within the zone, while off course 24 operations result in travel which is outside the zone and result in an off course warning.

The fourth type zone(s) shown in FIG. 6 is a 3-D zone which is dynamic and used to sort ATC traffic by. This type zone is used to segregate information to various types of controller/operator positions, i.e. ground control, clearance delivery, Crash Fire and Rescue and others. Travel within a particular zone automatically defines which ATC position or station the traffic is managed by. For example travel within zone 1 25 is directed to ATC ground station, while travel within zone 2 26 is directed to ATC Clearance Delivery position. The ATC zone concept allows for automatic hand-off from one controllers position to the other as well as providing overall database the management automation.

The construct of zones is very important to the overall operation of the described invention herein. Further examples of zone processing methods and zone definition is provided below.

EXAMPLE 1

A cylindrical zone on the airport surface constructed using the state plane coordinate system would be represented as the following:

| | |
|---|---|
| Center point of circle | CXsp value, CYsp value |
| Elevation (MSL) | Elev = constant, or may be a range |
| Circle radius | CR value |

The detection of a zone incursion (meaning that the position is within the 2-D circle) is described below.

| Convert position to State Plane coordinates | |
|---|---|
| Current or projected position | Xsp, Ysp |
| Subtract circle center from current position | Xsp − CXsp = DXsp<br>Ysp − CYsp = DYsp |
| Determine distance from circle center | $DXsp^2 + Dysp^2 = Rsp^2$ |
| Test if position is in circle | Rsp <= CR<br>if true continue<br>  if not true exit not in zone |
| Test if position is within altitude range (a cylindrical zone) | Min Elev <= Elev <= Max Elev |

If the above conditions are met, the position is in the 3-D cylindrical zone. It can be seen that the basic methods used here are applicable to other grid or coordinate systems based on linear distances.

EXAMPLE #2

A cylindrical zone on the airport surface (normal with the airport surface) constructed using the Earth Centered Earth Fixed coordinate system is stored using the three axis (X, Y, Z).

| | |
|---|---|
| Convert current position to ECEF | X, Y, Z |
| Center point of circle | CX value, CY value, CZ value |
| Circle radius | CR value |
| Determine distance from current or projected position to center of circle | (X − CX) = DX<br>(Y − CY) = DY<br>(Z − CZ) = DZ |
| Determine radial distance to circle center point from current position | $DX^2 + DY^2 + DZ^2 = R^2$ |
| Test position to see if it is in sphere of radius R | R <= CR<br>If true continue<br>  if not true exit not in zone |
| Determine the vector between the center of the circle and the center of mass of the earth | VC = CXE + CYE + CZE |
| Calculate its magnitude | $VC^2 = CXE^2\ CYE^2 + CZE^2$ |

-continued

| | |
|---|---|
| Determine the vector between the center of mass of the earth and the current or projected position | V = VX + VY + VZ |
| Calculate its magnitude | $V^2 = VX^2 + VY^2 + VZ^2$ |
| Determine the difference between the two vectors, if result = 0 then in the 2-D zone, if the result is <0 then position is below if >0 then position is above the zone | V − VC = 0 |

To check for incursion into an ECEF cylindrical zone, the following is tested for.

| | |
|---|---|
| Test if position is within Vector range (a cylindrical zone) | Min VC <= V <= Max VC |
| Where | Min VC represents the bottom of the cylinder<br>Max VC represents the top of the cylinder |

The final two tests use an approximation which greatly simplifies the processing overhead associated with zone incursion detection. The assumption assumes that over the surface area of an airport, the vector between the center of mass of the earth circular zone center and the vector from the current position to the center of the circle are coincident. That is, the angle between the two vectors is negligible.

The second assumption based on the first approximation is that, rather than perform complex coordinate reference transformations for zone shapes not parallel with the earth's surface, projections normal to the surface of the earth will be used. Zones which are not parallel with the earth's surface are handled in a manner similar to that applied to on or off course waypoint processing using rotation about a point or center line.

EXAMPLE #3

A zone which is shaped like a polygon is initially defined as a series of points. The points may be entered using a data entry device and a software program with respect to the digital map or they may be part of the base digital map. The points are then ordered in a manner which facilitates processing of polygon zone incursion. The following examples indicate how a (4 sided) polygon is stored and how an airport surface zone incursion is performed using both the state plane coordinates and Earth Centered Earth Fixed X, Y, Z coordinates.

| | |
|---|---|
| Convert Position to SP State Plane Zone Vertices Order in a clockwise direction | Xsp, Ysp,<br>X1sp, Y1sp; X2sp, Y2sp;<br>X3sp, Y3sp; X4sp, Y4sp |
| Height of 3-D zone | min Elev max Elev |
| Determine min & max values for X & Y | Xspmax, Xspmin, Yspmax, Yspmin |
| Perform rough check of current position or projected position | Is Xspmin <= Xsp <= Xspmax<br>Is Yspmin <= Ysp <= Yspmax |
| If both true then continue with zone checking If not true exit, not in zone | |
| Calculate the slope of the line between points 1 & 2 | (Y2sp − Y1sp)/(X2sp − X1sp) = M |
| Calculate the slope of the line from the present position normal to the line between points 1 & 2 | $M^{-1}$ = −Mnor |
| Determine the equation between points 1 & 2 | Y1sp − M * X1sp = L |
| Determine the equation for the line normal to the line between points 1 & 2 and position | Ysp − Mnor * Xsp = LN |
| Determine the intersection of both lines | intXsp = (LN − L)/(M − Mnor)<br>intYsp = Mnor * intXsp + (Ysp − Mnor * Xsp) |
| Determine the offset from position to intersect point on the line between points 1 & 2 | Xsp − intXsp = DXsp<br>Ysp − intYsp = DYsp |
| Perform check to see which side of the line the position is on (note sign change as function of quadrant & direction in which points are entered in) | Check the sign of DXsp<br>Check the sign of Dysp |
| If the point is on the proper side continue and check the next line between points 2 & 3 and perform the same analysis If the line is on the wrong side of the line, then not in the zone hence exit If point is on the proper side of all (4) lines of polygon then in 2-D zone | Meaning the signs are o.k. |
| Note: If the zone vertices are entered in a counter clockwise direction the sign of DXsp and DYsp are swapped. | |
| Test if position is within altitude range (a 3-D polygon zone) | Min Elev <= Elev <= Max Elev |

EXAMPLE #4

Figure 7:
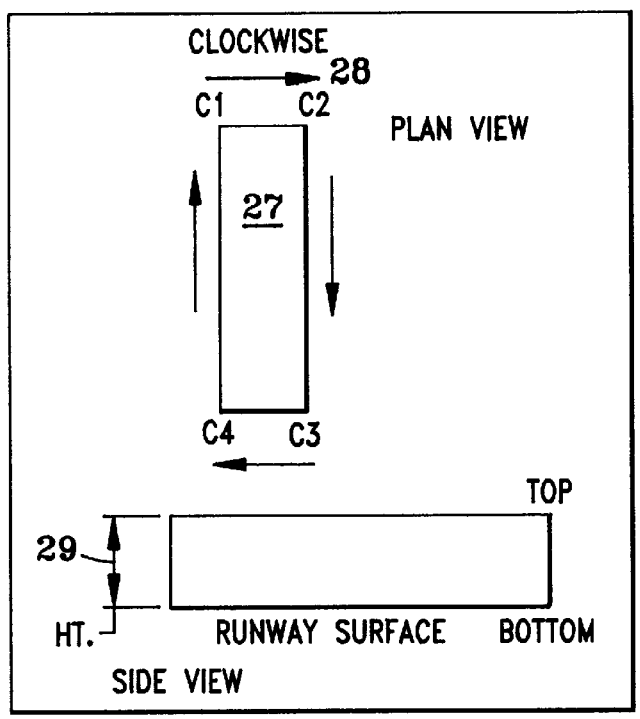
FIG. 7 illustrates the construction of a 3-D runway zone.

A further example is provided in the definition of a 3-D runway zone using ECEF X, Y, Z. A list of runway corners is constructed using the 3-D map and a data entry device and an automated software tool. The runway zone is shown in FIG. 7.

The horizontal outline the runway 27 by selected the four corners C1,C2,C3,C4 in a clockwise direction 28, starting anywhere on the closed convex polygon formed by the runway 27

Define the thickness of the zone (height above the runway) 29

The 4 corner 3-D coordinates and min and max altitudes are obtained through the use of a program using the ALP, then conversion are performed if necessary to convert from ALP coordinates to ECEF X, Y, Z values.

| | |
|---|---|
| C1 = X1, Y1, Z1 | C2 = X2, Y2, Z2 |
| C3 = X3, Y3, Z3 | C4 = X4, Y4, Z4 |

$MINALT = SQRT(XMIN^2 + YMIN^2 + ZMIN^2)$ $MAXALT = SQRT(XMAX^2 + YMAX^2 + ZMAX^2)$ $HEIGHT = MAXALT - MINALT$

Define the (4) planes formed by the vectors originating at the center of mass of the earth and terminating at the respective four runway corners. Represent the 4 planes by the vector cross product as indicated below:

$$XP1 = C1 \times C2 \quad\quad XP2 = C2 \times C3$$
$$XP3 = C3 \times C4 \quad\quad XP4 = C4 \times C1$$

Store the vector cross products in the polygon zones database, where the number of stored vector cross products equals the number of sides of the convex polygon Determine if the present position or projected position is within the zone (PP=position to be checked)

$$PP=PX1, PY1, PZ1$$

Determine the scalar Dot product between the current position and the previously calculated Cross Products $$DP1 = PP * XP1 \quad\quad DP2 = PP * XP2$$
$$DP3 = PP * XP3 \quad\quad DP4 = PP * XP4$$

If the products are negative then PP is within the volume defined by intersection planes, if it is positive then outside the volume defined by the intersecting planes.

Note: the signs reverse if one proceeds around the zone in a counter clockwise direction during the definition process Determine if PP is within the height confines of the zone
Determine the magnitude of the PP vector for an origin at center of mass of the earth.

$$PPM=SQRT[(PX1)^2+(PY1)^2+(PZ1)^2]$$

Compare PPM=(PP magnitude) to minimum altitude of zone and maximum altitude of zone $$MINALT<=PPM<=MAXALT$$

If the above relationship is true then in the zone.
If false then outside of the zone An alternate method of determining if the present position PP is within a zone which is not normal to the earth's surface is determined using a method similar to that above, except that all N sides of the zone are represented as normal cross products, the corresponding Dot products are calculated and their total products inspected for sign. Based upon the sign of the product PP is either out of or inside of the zone.

An example of actual Zone and Runway Incursion software code is contained shown below. The actual code includes interfaces to light control, clearance status, tones and other ATC functions.

```
ZONE CONSTRUCTION SOFTWARE EXAMPLE
/***********************************************************************
**
File Name:    gen_zone.c
Description:  gen_zone.c contains the procedures used to read the
              user specified zone file and convert the points to
              the normal vectors to the planes formed by the vector
              pairs. The normal vectors are then stored to a new
              data file along with the min and max radial height for
              the zone. This information is used by rt-track to
              determine if a vehicle is within the zone boundary.
Units:        read_zonefile,
              get_min_max,
              convert_zone,
              calc_normal_vectors
Link:         gen_zone.c cnvtcord.c
***********************************************************************
*/
#include <stdio.h>    /* standard input/output    */
#include <graph.h>    /* MSC graphics routines    */
#include <string.h>   /* MSC string routines      */
#include <stdlib.h>   /* MSC standard library     */
#include <math.h>     /* MSC math library         */
#include "sio.h"      /* serial input/output      */
#include "coord.h"    /* coordinate conversion factors */
#include "rtzones.h"  /* zone structure definition     */
/*-------------------------- external procedures --------------------------*/
extern POINT *cnvt_to_ecef(POINT *wp);
extern void read_coord_data(void);
/*-------------------------- global definitions --------------------------*/
short coord_type;    /* coordinate system for zone */
short no_zone;       /* flag indicating zones found in file */
char zone_file[15];  /* name of file containing zones      */
char coord_file[15]; /* name of coordinate conversion file */
int num_zones;       /* total number of zones entered      */
ZONE_AREA zone[MAX_ZONES];   /* zone data structure       */
FILE *zfile;         /* converted zone file — used by rt-track*/
/*--------------------------------------------------------------------------
UNIT: read_zonefile()
DESCRIPTION:  read_zonfile opens and reads the zone.dat file. As
              each zoned area is read, its values are stored in the
              zone record structure (see rtzone.h). The total number
```

-continued of zones is stored in the num_zones variable.
\*/
```
read_zonefile()
{
    FILE *zonefile;      /* file containting zoned area information */
    short i = 0;         /* index into array of zoned areas         */
    short j;             /* index into array of points              */
    short num_points;    /* number of points for a zoned area       */
    char *token;         /* field read in from file string          */
    char data_str[80];   /* line read from file                     */
if ((zonefile = fopen(zone_file,"r")) != NULL)
{
    while ((feof(zonefile) == 0) && (i < MAX_ZONES))
    {
        /* read next line in zone datafile, store data in data_str */
        if (fgets(data_str,MAX_STR-1,zonefile) != NULL)
        {
            zone[i].zone_id = atoi(data_str);        /* zone id */
            fgets(data_str,MAX_STR-1,zonefile); /* # of points in area */
            zone[i].num_lines = atoi(data_str);
            for (j = 0; j < zone[i].num_lines; j++)
            {
                fgets(data_str,MAX_STR-1,zonefile); /* point (x,y) */
                token = strtok(data_str," ");
                zone[i].p[j].x = atof(token);
                token = strtok(NULL," ");
                zone[i].p[j].y = atof(token);
                token = strtok(NULL," ");
                zone[i].p[j].z = atof(token);
            }
            fgets(data_str,MAX_STR-1,zonefile); /* zone type */
            zone[i].zone_type = atoi(data_str);
            i++;
        } /* if fgets */
    } /* while feof */
    num_zones = i;
}
else
{
    _clearscreen(_GCLEARSCREEN);
    _settextposition(10,10);
    printf("No zone datafile entered. Function not enabled. Press ENTER.");
    getch();
}
}
/*--------------------------------------------------------------------------
UNIT: get_min_max()
DESCRIPTION:  get_min_max determines the min and max values for the
              x,y and z coordinates of the zoned area. The values are determined
              by comparing each x, y and z value stored in the zone record
              structure. The min and max values are then stored in the zone record.
--------------------------------------------------------------------------*/
get_min_max()
{
    POINT_XYZ min;
    POINT_XYZ max;
    /* temporary storage values for min, max values */
    double max_x;
    double max_y;
    double max_z;
    double min_x;
    double min_y;
    double min_z;
    short j,i; /* counter */
    for (j = 0; j < num_zones; j++)
    {
        min_x = zone[j].p[0].x;
        max_x = zone[j].p[0].x;
        min_y = zone[j].p[0].y;
        max_y = zone[j].p[0].y;
        min_z = zone[j].p[0].z;
        max_z = zone[j].p[0].z;
        for (i = 1; i < zone[j].num_lines; i++)
        {
            if (zone[j].p[i].x > max_x)
                max_x = zone[j].p[i].x;
            if (zone[j].p[i].x < min_x)
                min_x = zone[j].p[i].x;
            if (zone[j].p[i].y > max_y)
```

```
                    max_y = zone[j].p[i].y;
                if (zone[j].p[i].y < min_y)
                    min_y = zone[j].p[i].y;
                if (zone[j].p[i].z > max_z)
                    max_z = zone[j].p[i].z;
                if (zone[j].p[i].z < min_z)
                    min_z = zone[j].p[i].z;
        } /* for i */
        max.x = max_x;
        max.y = max_y;
        max.z = max_z;
        min.x = min_x;
        min.y = min_y;
        min.z = min_z;
        /* calculate center point using min/max values */
        zone[j].center.x = (max.x - min.x)/2 + min.x;
        zone[j].center.y = (max.y - min.y)/2 + min.y;
        zone[j].center.z = (max.z - min.z)/2 + min.z;
    } /* for j */
}
/*-------------------------------------------------------------------------
UNIT:           convert_zone()
DESCRIPTION:    convert_zone converts the zone points from nhsp feet to
                decimal degrees (pp.lat, pp.lon) and ecef x,y,z. The
                ecef x,y,z values are stored back in the zone structure.
-------------------------------------------------------------------------*/
convert_zone()
{
    int j,i;                    /* counters */
    POINT_XYZ nhsp;             /* zone line endpoint in nhsp meters */
    POINT_XYZ nhsp_center;      /* center point of zone in nhsp meters */
    POINT pp, *pp_ptr;          /* current zone point, used in conversions */
        for (j = 0; j < num_zones; j++)
        {
            for (i = 0; i < zone[j].num_lines; i++)
            {
                    /* convert nhsp points to decimal degrees */
                if (coord_type == 3) /* convert to meters */
                {
                    nhsp.x = zone[j].p[i].x * FTTOM;
                    nhsp.y = zone[j].p[i].y * FTTOM;
                    nhsp.z = zone[j].p[i].z * FTTOM;
                    nhsp_center.x = zone[j].center.x * FTTOM;
                    nhsp_center.y = zone[j].center.y * FTTOM;
                    nhsp_center.z = zone[j].center.z * FTTOM;
                }
                /* store endpoint in pp structure for conversion to ecef */
                pp.lon = (ULLON - LRLON) * (nhsp.x - LRX) / (ULX - LRX) + LRLON;
                pp.lat = (ULLAT - LRLAT) * (nhsp.y - LRY) / (ULY - LRY) + LRLAT;
                pp.alt = nhsp.z;
                /* convert point to ecef coordinates */
                pp_ptr = cnvt_to_ecef(&pp);
                /* store ecef endpoints back in zone structure */
                zone[j].p[i].x = pp.x;
                zone[j].p[i].y = pp.y;
                zone[j].p[i].z = pp.z;
            } /* for each line (i) in zone */
            /* store centerpoint in pp structure for conversion to ecef */
            pp.lon = (ULLON - LRLON) * (nhsp.x - LRX) / (ULX - LRX) + LRLON;
            pp.lat = (ULLAT - LRLAT) * (nhsp.y - LRY) / (ULY - LRY) + LRLAT;
            pp.alt = nhsp_center.z;
            /* convert point to ecef coordinates */
            pp_ptr = cnvt_to_ecef(&pp);
            /* store ecef centerpoint back in zone structure */
            zone[j].center.x = pp.x;
            zone[j].center.y = pp.y;
            zone[j].center.z = pp.z;
        } /* for each zone (j) */
}
/*-------------------------------------------------------------------------
UNIT:           calc_normal_vectors
DESCRIPTION:    This routine calculates the radial height of the zone,
                the minimum and maximum values for the zone height and
                the normal vectors to the planes formed by the vector
                pairs. The normal vectors are calculated by taking the
                cross product of the current endpoint with the next
                endpoint, wrapping back to the first point when the
                current endpoint is the last endpoint.
-------------------------------------------------------------------------*/
```

-continued

```
calc_normal_vector()
{
int j,i;                                    /* counters */
double r;                                   /* radial height of zone, in ecef */
double min_zone_ht, max_zone_ht;            /* min and max values for zone ht */
POINT_XYZ normal_vec;                       /* normal vector for the current vector pair */
int next_point=0                            /* next point to check in zone     */
for (j = 0; j < num_zones; j++)
{
    /* calculate radial height for zone */
    r = sqrt((zone[j].center.x * zone[j].center.x) + 'continued next line'
        (zone[j].center.y * zone[j].center.y) + (zone[j].center.z * zone[j].center.z));
    /* determine min and max zone heights */
    min_zone_ht = r - ZONE_THICKNESS/2;
    max_zone_ht = r + ZONE_THICKNESS/2;
    /* store number of vectors, min/max hts and type in new file */
    fprintf(zfile,"%d\n",zone[j].zone_id);
    fprintf(zfile,"%d\n",zone[j].zone_type);
    fprintf(zfile,"%d\n",zone[j].num_lines);
    fprintf(zfile,"%.1f%.1f\n",min_zone_ht,max_zone_ht);
    /* determine normal vector to planes formed by vector pairs */
    for (i = 0; i < zone[j].num_lines; i++)
    {
        next_point = i + 1;
        if (next_point >= zone[j].num_lines)
            next_point = 0;
        /* calculate cross product */
        normal_vec.x = zone[j].p[i].y * zone[j].p[next_point].z - zone[j].p[i].z *
zone[j].p[next_point].y;
        normal_vec.y = zone[j].p[i].z * zone[j].p[next_point].x - zone[j].p[i].x *
zone[j].p[next_point].z;
        normal_vec.z = zone[j].p[i].x * zone[j].p[next_point].y - zone[j].p[i].y *
zone[j].p[next_point].x;
            /* save normal vectors to file */
            fprintf(zfile,"%.1f %.1f %.1f\n",normal_vec.x,normal_vec.y,normal_vec.z);
    } /* for each line in zone (i) */
} /* for each zone (j) */
}
double delta_lat; /* conversion error for lat ecef, required for cnvtcord*/
/*************************** MAIN ROUTINE ****************************/
main()
{
    char newzone_file[15];        /* name of file used to store converted zones */
    coord_type = 3;               /* hard coded to nhsp feet */
    strcpy(coord_file,"coord.dat");   /* name of file containing coord data*/
    _clearscreen(_GCLEARSCREEN);
    _settextposition(5,5);
    printf("Enter name of file containing NH state plane zone data : ");
    gets(zone_file);
    _settextposition(7,5);
    printf("Enter name of file used to store converted zone data : ");
    gets(newzone_file);
    if ((zfile = fopen(newzone_file,"w")) != NULL)
    {
        read_zonefile();
        get_min_max();
        read_coord_data();
        convert_zone();
        calc_normal_vectors();
    }
}
```

---

```
ZONE INCURSION SOFTWARE EXAMPLE
/******************************************************************
File Name:   chkzone.c
Description: chkzone.c contains the procedures used check the
             defined zones for incursions.
Units:       get_zones,
             chk_zones
******************************************************************/
#include <stdio.h>      /* standard input/output  */
#include <graph.h>      /* MSC graphics routines  */
#include <string.h>     /* MSC string routines    */
#include <stdlib.h>     /* MSC standard library   */
```

-continued

```
#include <math.h>              /* MSC math library      */
#include "sio.h"               /* serial input/output   */
#include "coord.h"             /* coordinate definitions    */
#include "veh.h"               /* vehicle parameters    */
#include "rtzones.h"           /* zone definitions      */
#include "lights.h"            /* airport light definitions  */
/*#include "txlib.h" */        /* tx library functions   */
#define START_FREQ 750         /* frequency of speaker tone 1 */
#define END_FREQ 1000          /* frequency of speaker tone 2 */
/*------------------------ external variables ----------------------------*/
extern short coord_type;            /* coordinate system for zone   */
extern char zone_file[15];          /* name of file containing zones  */
extern short veh_type;              /* type of vehicle       */
extern short gpsveh_type;           /* type of vehicle configuration  */
extern char veh_id[8];              /* id of current vehicle    */
extern short layer;                 /* layer id — for graphics display  */
extern short min_warning;           /* min secs prior to issuing zone alert*/
extern int rnwy_incursion;          /* indicates previous runway incursion */
extern int zone_incursion;          /* indicates previous zone incursion */
extern short current_clearance;     /* set if any vehicle is cleared */
extern char veh_cleared[8];         /* vehicle cleared for landing/takeoff*/
extern short veh_clear_status;      /* status for curr vehicle    */
extern short current_clearance;     /* set if any vehicle is cleared */
extern short veh_in_zone;           /* set if cleared veh in zone   */
extern double max_proj_time;        /* max number of secs in projection */
extern int prev_rnwyincur;          /* indicates previous runway incursion  */
/*------------------------ global definitions ----------------------------*/
short out_of_curr_zone=FALSE;  /* flag indicating pp is outside of zone */
short inside_zone=FALSE;       /* flag indicating pp is outside of zone */
int num_zones;                 /* total number of zones entered    */
short zone_id;                 /* if of zone being incurred    */
short zone_ok;                 /* indicates veh cleared for runway zone */
short zone_spkr_on;            /* flag indicating zone speaker on/off */
ZONE_AREA zone[MAX_ZONES];     /* zone data structure    */
/*-------------------------------------------------------------------------
UNIT: get_zones()
DESCRIPTION:   get_zones reads the file containing the converted zone
               data. As each zoned area is read, its values are stored
               in the zone record structure.
--------------------------------------------------------------------------*/
get_zones()
{
    FILE *zonefile;             /* file containing zoned area information */
    short i = 0;                /* index into array of zoned areas   */
    short j;                    /* index into array of points   */
    char *token;                /* field read in from file string   */
    char data_str[80];          /* line read from file   */
if ((zonefile = fopen(zone_file,"r")) != NULL)
{
    while ((feof(zonefile) == 0) && (i < MAX_ZONES))
    {
        if (fgets(data_str,MAX_STR-1,zonefile) != NULL)
        {
            zone[i].zone_id = atoi(data_str);        /* zone id   */
            fgets(data_str,MAX_STR-1,zonefile);  /* zone type   */
            zone[i].zone_type = atoi(data_str);
            fgets(data_str,MAX_STR-1,zonefile);  /* number of zone points */
            zone[i].num_lines = atoi(data_str);
            fgets(data_str,MAX_STR-1,zonefile);  /* min, max radial height */
            token = strtok(data_str," ");
            zone[i].ralt_min = atof(token);
            token = strtok(NULL," ");
            zone[i].ralt_max = atof(token);
            for (j = 0; j < zone[i].num_lines; j++)
            {
                fgets(data_str,MAX_STR-1,zonefile); /* point (x,y) */
                token = strtok(data_str," ");
                zone[i].p[j].x = atof(token);
                token = strtok(NULL," ");
                zone[i].p[j].y = atof(token);
                token = strtok(NULL," ");
                zone[i].p[j].z = atof(token);
            }
            i++;
        }
    } /* while feof */
    num_zones = i;
    fclose(zonefile);
}
```

```
        else
        {
            _clearscreen(_GCLEARSCREEN);
            _settextposition(10,10);
            printf("No zone datafile entered. Function not enabled. Press ENTER.");
            getch();
        }
    }
}
int rw_id; /* id of runway for cleared vehicle */
/*--------------------------------------------------------------------------------
UNIT:           chk_arr_dep_zone()
DESCRIPTION:    chk_arr_dep_zone checks the zone incurred
                to see if it is currently cleared for an arrival
                or departure. If it is and the vehicle has exited
                the runway, the arrival/departure lights are cleared.
INPUTS:         j — current zone
--------------------------------------------------------------------------------*/
chk_arr_dep_zone(short j)
{
    if (strcmpi(veh_cleared,veh_id) == 0)
    {
        switch (j)
        {
            case RNWY_35_ZONE:
                if ((veh_clear_status == TAKEOFF_35) ||
                    (veh_clear_status == LANDING_35) ||
                    (veh_clear_status == LANDING_17) ||
                    (veh_clear_status == TAKEOFF_17))
                {
                    current_clearance = current_clearance - veh_clear_status;
                    veh_clear_status = 0;
                    update_lights(NO_ACTIVITY,RNWY_35);
                }
                break;
            case RNWY_17_ZONE:
                if ((veh_clear_status == TAKEOFF_17) ||
                    (veh_clear_status == LANDING_17) ||
                    (veh_clear_status == LANDING_35) ||
                    (veh_clear_status == TAKEOFF_35))
                {
                    current_clearance = current_clearance - veh_clear_status;
                    veh_clear_status = 0;
                    update_lights(NO_ACTIVITY,RNWY_17);
                }
                break;
            case RNWY_24_ZONE:
                if ((veh_clear_status == TAKEOFF_24) ||
                    (veh_clear_status == LANDING_24) ||
                    (veh_clear_status == LANDING_06) ||
                    (veh_clear_status == TAKEOFF_06))
                {
                    current_clearance = current_clearance - veh_clear_status;
                    veh_clear_status = 0;
                    update_lights(NO_ACTIVITY,RNWY_24);
                }
                break;
            case RNWY_06_ZONE:
                if ((veh_clear_status == TAKEOFF_06) ||
                    (veh_clear_status == LANDING_06) ||
                    (veh_clear_status == LANDING_24) ||
                    (veh_clear_status == TAKEOFF_24))
                {
                    current_clearance = current_clearance - veh_clear_status;
                    veh_clear_status = 0;
                    update_lights(NO_ACTIVITY,RNWY_06);
                }
                break;
            case RNWY_INT_ZONE:
                if ((veh_clear_status == TAKEOFF_06) ||
                    (veh_clear_status == LANDING_06) ||
                    (veh_clear_status == TAKEOFF_17) ||
                    (veh_clear_status == LANDING_17) ||
                    (veh_clear_status == TAKEOFF_35) ||
                    (veh_clear_status == LANDING_35) ||
                    (veh_clear_status == LANDING_24) ||
                    (veh_clear_status == TAKEOFF_24))
                {
                    current_clearance = current_clearance - veh_clear_status;
                    veh_clear_status = 0;
```

-continued

```
                    update_lights(NO_ACTIVITY,RNWY_INT);
                }
            break;
            }
        }
    }
}
/*------------------------------------------------------------------------
UNIT:           chk_rnwy_zone()
DESCRIPTION:    chk_rnwy_zone checks the zone (about to be) incurred
                to see if it is a runway zone. If it is, a further
                check is performed to see if the vehicle is cleared
                for that zone.
INPUTS:         j — current zone
------------------------------------------------------------------------*/
chk_rnwy_zone(short j)
{
    /* if the current vehicle has been cleared for runway access */
    if (veh_clear_status != 0)
    {
        zone_ok = TRUE;
        inside_zone = FALSE;
        /* determine if cleared runway is the current zone */
        switch (j)
        {
        case RNWY_35_ZONE:
            if ((veh_clear_status == TAKEOFF_35))
            {
                veh_in_zone = TRUE;
                update_clearance_lights(veh_clear_status);
            }
            rw_id = RNWY_35_ZONE;
        break;
        case RNWY_17_ZONE:
            if ((veh_clear_status == TAKEOFF_17))
            {
                veh_in_zone = TRUE;
                update_clearance_lights(veh_clear_status);
            }
            rw_id = RNWY_17_ZONE;
        break,
        case RNWY_24_ZONE:
            if ((veh_clear_status == TAKEOFF_24))
            {
                veh_in_zone = TRUE;
                update_clearance_lights(veh_clear_status);
            }
            rw_id = RNWY_24_ZONE;
        break;
        case RNWY_06_ZONE:
            if ((veh_clear_status == TAKEOFF_06))
            {
                veh_in_zone = TRUE;
                update_clearance_lights(veh_clear_status);
            }
            rw_id = RNWY_06_ZONE;
        break;
        case RNWY_INT_ZONE:
            if (veh_clear_status != 0)
            {
                veh_in_zone = TRUE;
            }
            rw_id = RNWY_INT_ZONE;
        break;
        }
    }
    if (zone_ok == FALSE)
    {
        /* runway incursion condition */
        if (gpsveh_type == ATC)
        {
            switch (j)
            {
            case RNWY_35_ZONE : case RNWY_17_ZONE:
                rnwy_incursion = RNWY_35;
            break;
            case RNWY_24_ZONE : case RNWY_06_ZONE:
                rnwy_incursion = RNWY_24;
            break;
            case RNWY_INT_ZONE:
```

-continued

```
                    rnwy_incursion = RNWY_INT;
                    break;
                }
            }
        }
    }
}
/*-------------------------------------------------------------------------------
UNIT:           chk_zone()
DESCRIPTION:    chk_zone compares the current position (pp) with each stored zone.
INPUTS:         *pp — pointer to present position
                j — current zone
-------------------------------------------------------------------------------*/
chk_zone(POINT *npp, short j)
{
    double rpp;                     /* radial height of present position (npp) */
    double dotp[MAX_POINTS];        /* dot product of npp and normal vectors */
    short i=0;                      /* loop counter — normal vector in zone */
    /* check if zone is appropriate for the current vehicle type */
    if (zone[j].zone_type & veh_type)
    {
        /* calculate radial height of present position */
        rpp = sqrt((npp—>x * npp—>x) + (npp—>y * npp—>y) + (npp—>z * npp—>z));
    /* perform height check, if npp is within zone's min and max radial height, perform
further checks */
        if ((rpp >= zone[j].ralt_min) && (rpp <= zone[j].ralt_max))
        {
            i = 0;
            /* calculate dot product of normal vectors and npp */
            while ((i < zone[j].num_lines) && (out_of_curr_zone == FALSE))
            {
                dotp[i] = zone[j].p[i].x * npp—>x + zone[j].p[i].y * npp—>y + 'continued next line'
                          zone[j].p[i].z * npp—>z;
                if (dotp[i] / fabs(dotp[i]) > 0)
                    out_of_curr_zone = TRUE;
                            i++;
            }
            if ((i == zone[j].num_lines) && (out_of_curr_zone == FALSE))
                inside_zone = TRUE;
        } /* if rpp */
    } /* if zone_type & veh_type */
}
/*-------------------------------------------------------------------------------
UNIT:           chk_all_zones()
DESCRIPTION:    chk_all_zones compares the current position (pp) with each stored
zone.
INPUTS:         *pp — pointer to present position
-------------------------------------------------------------------------------*/
chk_all_zones(POINT *pp)
{
    POINT projp;                    /* projected position        */
    char msg_buf[80];               /* zone incursion message    */
    short sound_alarm=FALSE;        /* flag indicating zone speaker on/off */
    unsigned freq = START_FREQ;     /* frequency of tone used to sound alarm */
    short zone_incurs_time;         /* time (in secs) incursion will occur */
    short j=0;                      /* loop counter — current zone       */
    short i=0;
    inside_zone = FALSE;            /* flag indicating pp is outside of zone */
    zone_incurs_time = 99;
    zone_spkr_on = FALSE;
    while ((j < num_zones) && (inside_zone == FALSE))  /* check each zone */
    {
        i = 0;
        while ((i < max_proj_time) && (inside_zone == FALSE))
        {
        out_of_curr_zone = FALSE; /* flag indicating pp is outside of zone */
        /* project current position ahead from 0 to max_proj_time seconds */
            projp.x = pp—>x + pp—>x_vel * i;
            projp.y = pp—>y + pp—>y_vel * i;
            projp.z = pp—>z + pp—>z_vel * i;
            /* see if projected position is within zone */
            chk_zone(&projp,j);
            zone_id = j;
            i++;
        }
        j++;
} /* while j */
if (inside_zone == TRUE) /******************************************************/
{
    zone_ok = FALSE;
```

-continued

```
    /* check for valid/invalid entry onto runway */
    if ((j-1) < NO_RNWY)
        chk_rnwy_zone(j-1);
    else
        rnwy_incursion = NO_RNWY;
    if (zone_ok == FALSE) /* process zone/runway incursion */
    {
        zone_incursion = j;
        /* set layer */
        if (i <= min_warning)
        {
            layer = WARNING_LAYER;
            if (gpsveh_type == ATC)
            {
                sprintf(msg_buf,"ZONE INCURSION WARNING, VEHICLE %s",veh_id);
                ATC_Window(msg_buf,2);
            }
        }
        else
        {
            layer = WATCH_LAYER;
            if (gpsveh_type == ATC)
            {
                sprintf(msg_buf,"ZONE INCURSION WATCH, VEHICLE %s",veh_id);
                ATC_Window(msg_buf,2);
            }
        }
        /* sound tones only if processing on board vehicle, none for ATC */
        if (gpsveh_type != ATC)
        {
            /* pp is inside zone, sound tone and change layer */
            zone_spkr_on = TRUE;
            if (freq == START_FREQ)
                freq = END_FREQ;
            else
                freq = START_FREQ;
            spkr_on(freq);
        }
        if (rw_id != NO_RNWY)
        {
            chk_arr_dep_zone(rw_id);
            rw_id = NO_RNWY;
        }
    } /* if zone_ok */
    else /* inside zone but cleared */
    {
        layer = set_default_layer(); /* reset layer info */
        if ((gpsveh_type == ATC) && (zone_incursion != 0))
        {
sprintf(msg_buf,"                  'continued next line'
");
            ATC_Window(msg_buf,2);
            zone_incursion = 0;
        }
    }
} /* inside zone */
else /* not inside zone ******************************************/
{
    spkr_off(); /* turn off audible alarm */
    zone_spkr_on = FALSE;
    layer = set_default_layer(); /* reset layer info */
    if (gpsveh_type == ATC)
    {
        if (zone_incursion != 0)
        {
sprintf(msg_buf,"                  'continued next line'
");
            ATC_Window(msg_buf,2);
            zone_incursion = 0;
        }
        /* if a runway incursion was currently active */
        if (rnwy_incursion != NO_RNWY)
        {
            rnwy_incursion = NO_RNWY;
        }
/*          if (veh_in_zone == TRUE) */
        if (rw_id != NO_RNWY)
        {
            chk_arr_dep_zone(rw_id);
```

-continued

```
            rw_id = NO_RNWY;
         }
      }
   }
}
```

2-D GRID (STATEPLANE) ZONE INCURSION
SOFTWARE EXAMPLE:
The following is representative source code for State Plane coordinate
2-D zone processing with tone alerts when a zone is violated,
note: no projections are provided.

```
/***********************************************************
File Name :    zones.c
Description :  zones.c contains the procedures used to process the
               forbidden zones defined in the user specified file
               When a zone is entered, an audible tone is sounded
Units :        read_zonefile,
               get_min_max,
               check_line,
               check_actual_zone,
               check_rough_zone
***********************************************************
*/
#include <stdio.h>          /* standard input/output */
#include <graph.h>          /* MSC graphics routines */
#include <string.h>         /* MSC string routines */
#include <stdlib.h>         /* MSC standard library */
#include "coord.h"          /* coordinate conversion factors */
#include "sio.h"            /* serial input/output */
#include "zones.h"          /* zone structure definition */
/*------------------global definitions----------------------*/
#define IN_ZONE 1           /* current position is inside zone */
#define OUTSIDE_ZONE 0      /* current position is outside zone */
/*------------------external variables----------------------*/
extern SPCS sp_coord;       /* sp x,y coordinates */
extern short no_zones;      /* flag - no zone area processing */
extern char cmd_str[81];    /* string containing keyboard entries */
extern char zone_file[15];  /* name of file with stored zone data */
/*------------------global data----------------------------*/
int num_zones;              /* total number of zones
                               entered */
ZONE_AREA zone[MAX_ZONES];  /* zone definition data
                               structure */
short zone_spkr_on = FALSE; /* flag indicating speaker is
                               enabled */
short exit_zones = FALSE;   /* flag - zone checking should
                               continue */
/*---------------------------------------------------------*/
UNIT: read_zonefile( )
DESCRIPTION:   read_zonefile opens and reads the zone.dat file. As
               each zoned area is read, its values are stored in the
               zone record structure (see zone.h). The total number
               of zones is stored in the num_zones variable. If no
               zone.dat file is found, the no_zones global flag is set
               to TRUE to avoid the zone area processing.
----------------------------------------------------------*/
read_zonefile( )
{
FILE *zonefile;             /* file containing zoned area information */
short i = 0;                /* index into array of zoned areas */
short j;                    /* index into array of points */
short num_points;           /* number of points for a zoned area */
char *token;                /* field read in from file string */
char data_str[80];          /* line read from file */
if((zonefile = fopen(zone_file,"r")) != NULL)
{
   while ((feof(zonefile) == 0) && (i <MAX_ZONES))
   {
      /* read next line in zone datafile, store data in data_str */
      if (fgets(data_str,MAX_STR-1,zonefile) != NULL)
      {
         fgets(data_str,MAX_STR-1,zonefile); /* # of points in area */
         zone[i].num_lines = atoi(data_str);
         for (j = 0; j < zone[i].num_lines; j++)
         {
            fgets(data_str,MAX_STR-1,zonefile); /* point (x,y) */
            token = strtok(data_str," ");
            zone[i].p[j].x = atof(token);
            token = strtok(NULL," ");
            zone[i].p[j].y = atof(token);
         }
         fgets(data_str,MAX_STR-1,zonefile); /* type of zone, ignore */
         zone[i].zone_type = data_str[0];
         /* store 1st point again as last point to close the area */
         zone[i].num_lines++; /* increment by one to close the area */
         zone[i].p[j].x = zone[i].p[0].x;
         zone[i].p[j].y = zone[i].p[0].y;
         i++;
      } /* if fgets */
   } /* while feof */
   num_zones = i;
}
else
{
   _clearscreen(_GCLEARSCREEN);
   _settextposition(10,10);
   printf("No zone datafile entered. Function not enabled. Press ENTER.");
   getch( );
   no_zones = TRUE;
}
strcpy(cmd_str,'[0]');
}
/*---------------------------------------------
UNIT:          get_min_max( )
DESCRIPTION:   get_min_max determines the min and max values for
               the x and y coordinates of the zoned area. The values
               are determined by comparing each x and y value stored
               in the zone record structure. The min and max values
               are then stored in the zone record.
-----------------------------------------------*/
get_min_max( )
{
/* temporary storage values for min, max values */
double max_x;
double max_y;
double min_x;
double min_y;
short j,i; /* counter */
for (j = 0; j < num_zones, j++)
{
   min_x = zone[j].p[0].x;
   max_x = zone[j].p[0].x;
   min_y = zone[j].p[0].y;
   max_y = zone[j].p[0].y;
   for (i = 1; i < zone[j].num_lines; i++)
   {
      if(zone[j].p[i].x > max_x)
         max_x = zone[j].p[i].x;
      if(zone[j].p[i].x > min_x)
         min_x = zone[j].p[i].x;
      if(zone[j].p[i].x > max_y)
         max_y = zone[j].p[i].y;
      if(zone[j].p[i].x > min_y)
```

2-D GRID (STATEPLANE) ZONE INCURSION SOFTWARE EXAMPLE:
The following is representative source code for State Plane coordinate 2-D zone processing with tone alerts when a zone is violated, note: no projections are provided.

```
      min_y = zone[j].p[i].y;
   } /* for i */
   zone[j].max.x = max_x;
   zone[j].max.y = max_y;
   zone[j].min.x = min_x;
   zone[j].min.y = min_y;
  } /* for j */
}
double m;                /* slope of line p1 p2 */
double intx, inty;       /* intersection point of the 2 equations */
double offx, offy;       /* offset from pres posn to the line p1 p2 */
/*------------------------------------------------
UNIT:          check_line( )
DESCRIPTION:   check_line determines the offset from the present
               position to the line between p1 (x1,y1) and p2 (x2,y2).
INPUTS:        x1, y1, x2, y2 points for start and end of line
------------------------------------------------*/
check_line(double x1, double y1, double x2, double y2)
{
  double run;          /* used to determine slope of line */
  double beqn;         /* determine eqn for line p1 p2 */
  double mnormal;      /* slope of line from pres. posn to normal
                          point */
  double bnorm,bnormal; /* eqn of line from pres. posn to normal
                          point */
  double div_val;      /* used during division operation */
  /* calculate the slope of the line */
  run = x2 - x1;
  if(run == 0)
    run = 0.00000000000001;
  m = (y2 - y1) / run;
  if(m == 0)
    m = 0.000000000000000000001;
  /* calculate slope of line from present position to the normal point
     on line p1 p2 */
  mnormal = -(1/m);
  /* determine the equation for the line between p1 and p2 */
    beqn = y1 - m * x1;
  /* determine the equation for the line between the present position
     and the normal point on p1 p2 */
  bnorm = mnormal * sp_coord.longitude;
  bnormal = sp_coord.latitude - bnorm;
  /* determine the intersection of both lines */
  div_val = m - mnormal;
  if(div_val == 0)
    div_val = 0.00001;
  intx = (bnormal - beqn) / div_val;
  inty = mnormal * intx + bnormal;
  /* determine the offset from the present posn to the line between p1 p2 */
    offx = sp_coord.longitude - intx;
    offy = sp_coord.latitude - inty;
}
#define START_FREQ 750 /* frequency of speaker tone 1 */
#define END_FREQ 1000 /* frequency of speaker tone 2 */
/*------------------------------------------------
UNIT:          check_actual_zone
DESCRIPTION:   check_actual_zone uses the min and max values for
               the line points and the offset calculated by check_line
               to determine if the current point is inside or outside
               the line. If the point is inside the line, the next
               line is checked. If the point is inside all the lines,
               it is considered inside the zone and the audible tone
               is sounded.
------------------------------------------------*/
unsigned freq = START_FREQ;
/* frequency of tone used to sound alarm */
short check_actual_zone(short id)
{
double minx, maxx, miny, maxy; /* min & max values for line points */
short i = 0;                    /* index into point array */
while (i < zone[id].num_lines-1)
{
  check_line(zone[id].p[i].x,zone[id].p[i].y,zone[id].p[i+1].x,
     zone[id].p[i+1].y);
  minx = min(zone[id].p[i].x,zone[id].p[i+1].x);
  maxx = max(zone[id].p[i].x,zone[id].p[i+1].x);
  miny = min(zone[id].p[i].y,zone[id].p[i+1].y);
  maxy = max(zone[id].p[i].y,zone[id].p[i+1].y);
  switch (i)
  {
    case 0 :
      /* determine which side of the line the pres posn is on
         for first 2 line segments */
      if(m >= 0)
      {
        if((minx <= intx) && (intx <= maxx) &&
           (miny <= inty) && (inty <= maxy))
        {
          if((offx >= 0) && (offy <= 0))
            ;/* no action, fall thru loop and check next point */
          else
            return(OUTSIDE_ZONE);
        }/* if */
      }/* if */
      else /* m < 0 */
      {
        if((minx <= intx) && (intx <= maxx) &&
           (miny <= inty) && (inty <= maxy))
        {
          if((offx >= 0) && (offy >= 0))
            ;/* no action, fall thru loop and check next point */
          else
            return(OUTSIDE_ZONE);
        } /* if */
      }/* else */
      break;
    case 1 :
      /* determine which side of the line the pres posn
         is on for first 2 line segments */
      if(m >= 0)
      {
        if((minx <= intx) && (intx <= maxx) &&
           (miny <= inty) && (inty <= maxy))
        {
          if((offx >= 0) && (offy <= 0))
            ;/* no action, fall thru loop and check next point */
          else
            return(OUTSIDE_ZONE);
        } /* if */
      } /* if */
      else /* m < 0 */
      {
        if((minx <= intx) && (intx <= maxx) &&
           (miny <= inty) && (inty <= maxy))
        {
          if((offx <= 0) && (offy <= 0))
            ;/* no action, fall thru loop and check next point */
          else
            return(OUTSIDE_ZONE);
        } /* if */
      } /* else */
      break;
    case 2 :
      /* determine which side of the line the pres posn is
         on for third line segment */
      if(m >= 0)
      {
        if((minx <= intx) && (intx <= maxx) &&
           (miny <= inty) && (inty <= maxy))
        {
          if(offx <= 0) && (offy >= 0))
            ;/* no action, fall thru loop and check next point */
          else
            return(OUTSIDE_ZONE);
        } /* if */
      } /* if */
```

```
                 -continued

2-D GRID (STATEPLANE) ZONE INCURSION
                     SOFTWARE EXAMPLE:
  The following is representative source code for State Plane coordinate
     2-D zone processing with tone alerts when a zone is violated,
                  note: no projections are provided.

else /* m < 0 */
{
  if((minx <= intx) && (intx <= maxx) &&
    (miny <= inty) && (inty <= maxy))
  {
    if((offx <= 0) && (offy <= 0))
    ; /* no action, fall thru loop and check next point */
    else
      return(OUTSIDE_ZONE);
    } /* if */
  } /* else */
break;
case 3 :
  /* determine which side of the line the pres posn is
on for fourth line segment */
  if (m >= 0)
  {
    if((offx <= 0) && (offy >= 0))
    {
      zone_spkr_on = TRUE;
      if(freq == START_FREQ)
        freq = END_FREQ;
      else
        freq = START_FREQ;
      spkr_on(freq);
      return(IN_ZONE);
    }
    else
      return(OUTSIDE_ZONE);
  } /* if */
  else /* m < 0 */
  {
    if((offx >= 0) && (offy >= 0))
    {
      zone_spkr_on = TRUE
      if(freq == START_FREQ)
        freq = END_FREQ;
      else
        freq = START_FREQ;
          spkr_on(freq);
          return(IN_ZONE);
        }
        else
          return(OUTSIDE_ZONE);
      } /* else */
      break;
    } /* switch */
    i++; /* increment to test next line segment */
  } /* while */
}
```

Since the extension to polygons of N sides based upon the previous concepts are easily understood, the derivation has been omitted for the sake of brevity.

In summary two mathematical methods are identified for detecting zone incursions into convex polygons, one based on the equation and slope of the lines, the other is based on vector cross and dot product operators.

The concept of zones, regardless as to whether they are references to surface coordinates, local grid systems or ECEF coordinates, provide a powerful analytical method for use in the Airport Control and Management System.

ZONE BASED CLEARANCES

The airport control and management system manages overall taxi, departure and arrival clearances in a unique and novel manner through the use of zone processing. A departure ground taxi clearance is issued to the selected vehicle. The waypoints and travel path are drawn into the map aboard the selected vehicle. The vehicle(s) then use the presented taxi information to proceed to the final waypoint. AC&M processing uses this clearance information to mask runway zone incursions along the travel path. Since runway incursions are masked for only the selected vehicle and for zones traversed no runway incursion alert actions or warning lights are produced when following the proper course. Should the position represent movement outside of the established corridor, an alert is issued signifing an off course condition exist for that vehicle. Upon the vehicle exit from a particular "cleared" zone, the mask is reset for that zone. Once the last waypoint is reached the clearance is removed and the zone mask is reset. The description below details how such clearances are managed.

SURFACE DEPARTURE CLEARANCE MANAGEMENT METHOD

Figure 8:
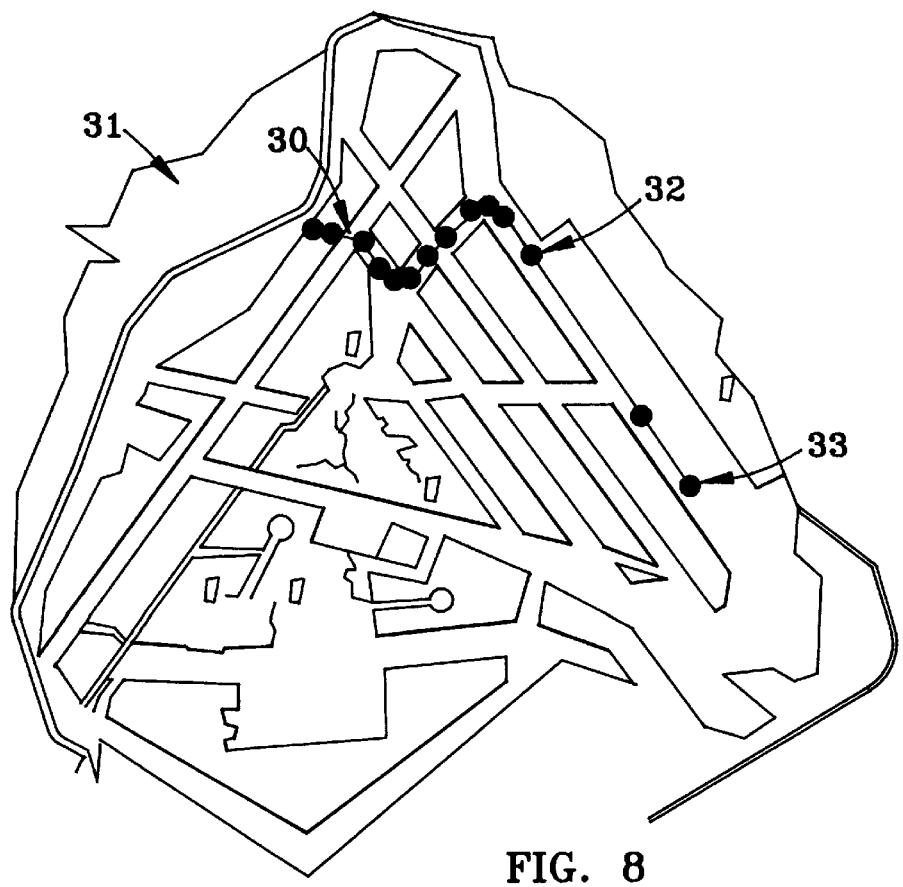
FIG. 8 shows a map display with surface waypoints and travel path.

1. The operator or controller wishes to issue a surface departure clearance to a specific vehicle
2. Through the use of a data entry device such as a touch screen or keyboard or mouse, issue waypoints command is selected for surface departure waypoints
3. The operator is asked to select a specific vehicle from a list of available aircraft and vehicles
4. The vehicle data window then displays a scrollable list of available vehicles contained in a database which are capable of performing operations of departure clearance
5. The operator then selects the specific vehicle using a data entry device such as a touch screen or other data entry device
6. A list is then displayed in a scrollable graphical window of available departure travel paths for the selected vehicle
7. The operator then selects from this list using a data entry device such as a touch screen or other data entry device
8. Upon selection of a particular departure path the waypoints and travel path are drawn into a 3-D ALP. The purpose of presentation is to show the controller or operator the actual path selected
9. The controller or operator is then asked to confirm the selected path. Is the selected path correct? Using a data entry device such as a touch screen or other data entry device a selection is made.
10. If the selected path was not correct, then the command is terminated and no further action is taken
11. If the selection was correct the following steps are taken automatically.
    a. AC&M processing sends to the selected vehicle using a radio duplex datalink, the clearance, 4-D waypoint and travel path information
    b. The selected vehicle upon receipt of the ATC command replies with an acknowledgement. The acknowledgment is sent over the full duplex radio datalink to the AC&M processing
    c. Should the AC&M processing not receive the acknowledgment in a specified amount of time from the selected vehicle, a re-transmission occurs up to a maximum of N re-transmissions
    d. The vehicle upon receiving the ATC command then "loads" the 4-D navigator with the 4-D waypoint information. A map display contained in the vehicle then draws into the 3-D ALP the departure travel path as shown in FIG. 8. This figure shows travel path as 30 in the digital ALP 31 while actual waypoints are shown as (14) spheres 32.

DEPARTURE CLEARANCE MANAGEMENT METHOD

Figure 9:
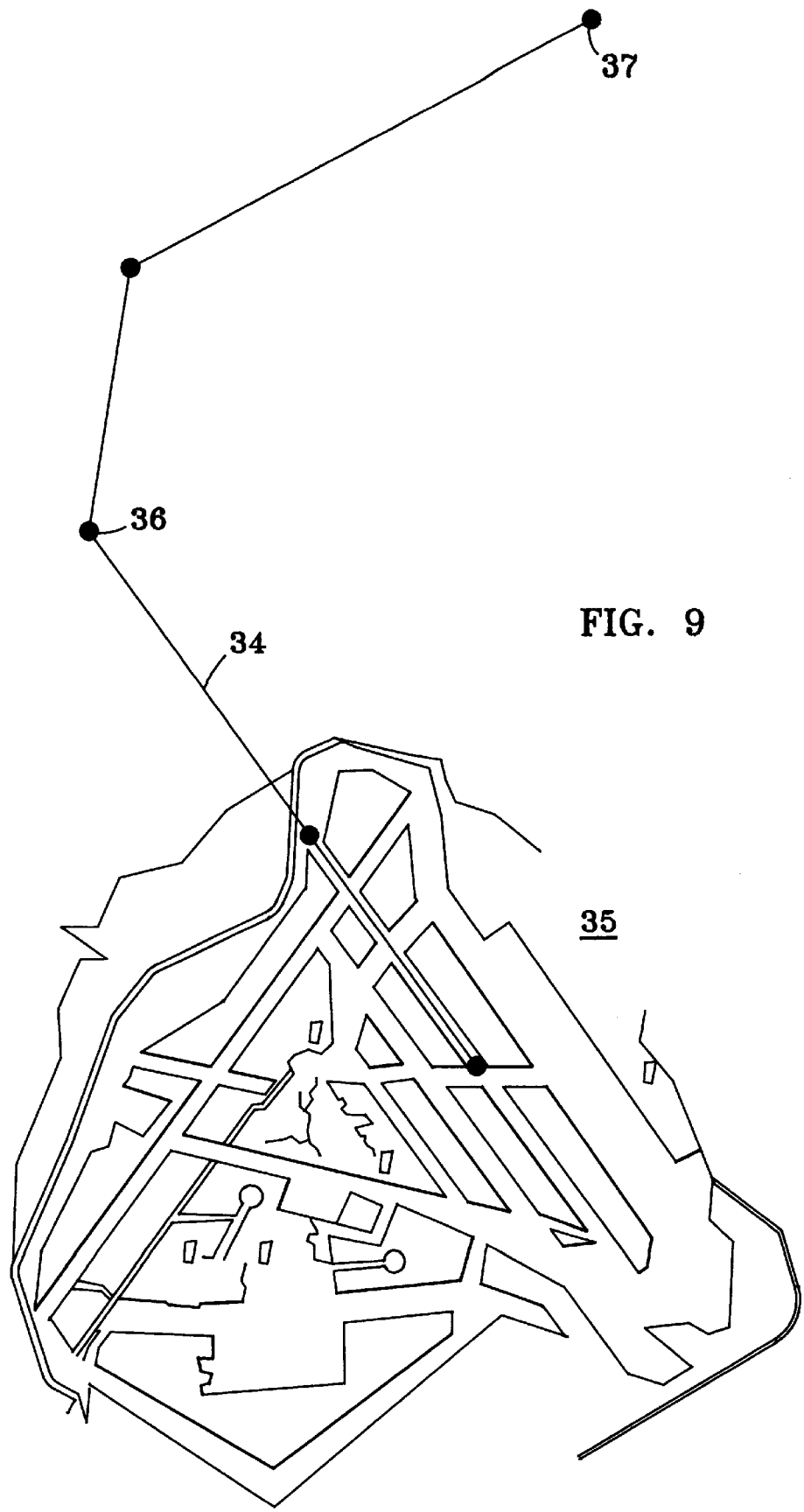
FIG. 9 shows a map display with departure waypoints and travel path.

1. The operator or controller wishes to issue a departure clearance to a specific aircraft
2. Through the use of a data entry device such as a touch screen or keyboard or mouse, issue waypoints command is selected for departure waypoints
3. The operator is asked to select a specific vehicle from a list of available aircraft
4. The vehicle data window then displays a scrollable list of available aircraft contained in a database which are capable of performing operations of departure clearance
5. The operator then selects the specific vehicle using a data entry device such as a touch screen or other data entry device
6. A list is then displayed in a scrollable graphical window of available departure travel paths for the selected vehicle
7. The operator then selects from this list using a data entry device such as a touch screen or other data entry device
8. Upon selection of a particular departure path the waypoints and travel path are drawn into a 3-D ALP. The purpose of presentation is to show the controller or operator the actual path selected
9. The controller or operator is then asked to confirm the selected path. Is the selected path correct? Using a data entry device such as a touch screen or other data entry device a selection is made.
10. If the selected path was not correct, then the command is terminated and no further action is taken
11. If the selection was correct the following steps are taken automatically.
    a. AC&M processing sends to the selected vehicle using a radio duplex datalink, the clearance, 4-D waypoint and travel path information
    b. The selected vehicle upon receipt of the ATC command replies with an acknowledgment. The acknowledgment is sent over the full duplex radio datalink to the AC&M processing
    c. Should the AC&M processing not receive the acknowledgment in a specified amount of time from the selected vehicle, a re-transmission occurs up to a maximum of N re-transmissions
    d. The vehicle upon receiving the ATC command then "loads" the 4-D navigator with the 4-D waypoint information. A map display contained in the vehicle then draws into the 3-D ALP the departure travel path as shown in FIG. 9. This figure shows travel path as 34 in the digital ALP 35 while actual waypoints are shown as (5) spheres 36.
12. Upon AC&M receiving the acknowledgment, the following is performed:
    a. the zone mask is updated indicating that the selected vehicle has a clearance to occupy runway(s) and taxiway(s) along the travel path. This mask suppresses zone runway incursion logic for this vehicle.
    b. the zone based lighting control processing then activates the appropriate set of airport lights for the issued clearance in this case Take Off Lights
13. The vehicle now has active navigation information and may start to move, sending out ADS message broadcasts over the datalink to other vehicles and the AC&M system
14. The selected vehicle ADS messages are received at the AC&M system and at other vehicles.
15. AC&M processing using information contained in the ADS message performs mirrored navigational processing, as outlined in a latter section.
16. Zone incursion checking is performed for every received ADS message using position projection techniques for zones contained in the zones database
17. Should a zone incursion be detected, the zone mask is used to determine if the incurred zone is one which the vehicle is allowed to be in. If the zone is not in the zone mask then a warning is issued. Should the zone be that of a Runway, a Runway Incursion Alert is Issued and the appropriate airport lights are activated.
18. The ADS position is used to determined when the vehicle leaves a zone. When the vehicle leaves the zone, the clearance mask is updated indicated travel though a particular zone is complete. When this occurs the following steps are initiated by the AC&M:
    a. the zones mask is updated
    b. airport light status is updated
    If the exited zone was a Runway, operations may now occur on the exited runway
19. The vehicle continues to travel towards the final waypoint
20. At the final waypoint the navigator and the map display are purged of active waypoint information, meaning the vehicle is where it is expected to be. New waypoints may be issued at any time with a waypoints command function.

AC&M zones based clearance function as presented here provides a unique and automated method for the controlling and managing airport surface and air clearances.

COLLISION DETECTION

Figure 10:
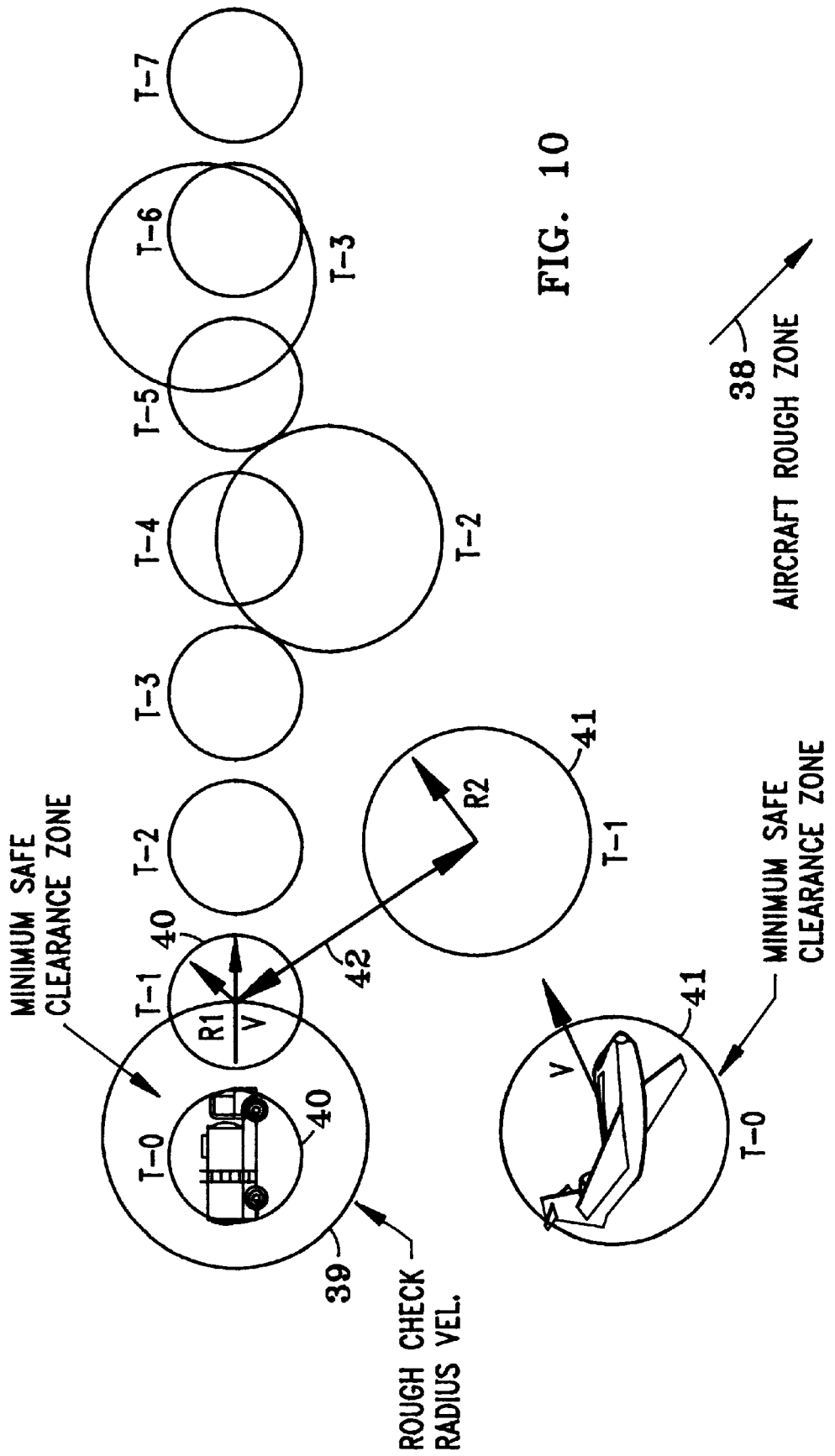
FIG. 10 illustrates the 4-D collision detection mechanism employed in the Airport Control and Management System.

Collision detection is performed through the zones management process. The basic steps for collision detection and avoidance are shown below in a general form. FIG. 10 shows graphically what the following text describes.

1. Vehicle Position, Velocity and Time (PVT) information are received for all tracked vehicles. The following processing is performed for each and every ADS vehicle report
2. PVT information is converted to the appropriate coordinate system if necessary and stored in the database
3. A rough check zone 38 and 39 is established based on the current velocity for each vehicle in the database
4. Every vehicle's rough check radius is compared with every other vehicle in the database. This is done simply by subtracting the current position of vehicle V from the position of vehicle V+1 in the database to determine the separation distance between each vehicle and every other vehicle in the database. This is performed in the ECEF coordinate frame.
5. For each pair of vehicles in the database that are within the sum of the two respective rough check radii values; continue further checking since a possible collision condition exists, if not within the sum of the rough check radii do no further processing until the next ADS message is received
6. For each set of vehicles which have intersecting rough check radii project the position ahead by an increment of Time (t) using the received vehicle velocity and optionally acceleration information. Projected positions at time=T1 are shown by two circles 40 and 41 the minimum safe clearance separation for the fuel truck R1 and aircraft R2 respectively.

7. Determine the new separation distance between all vehicles which initially required further checking. Compare this distance to the sum of minimum safe clearance distances R1 and R2 for those vehicles at the new incremented time. The minimum safe clearance distances R1 and R2 are contained in a database and is a function of vehicle velocity and type. Should the separation distance 42 between them be less than the sum of the minimal safe clearance distances R1+R2, then generate alert warning condition. Record the collision time values for each set of vehicles checked. If no minimum safe clearance distance is violated then continue checking the next set of vehicles in a similar fashion. When all vehicles pairs are checked then return to the start of the vehicle database.

8. Increment the projection time value (T+t) seconds and repeat step 7 if separation was greater than the sum of the minimal safe separation distance R1+R2. Continue to increment the time value to a maximum preset value, until the maximum projection time is reached, then process next pair of vehicles in a similar fashion, until the last vehicle is reached at that time start the process over. If minimum safe clearance (R1+R2) was violated compare the time of intersection to the previous time of intersection. If the previous intersection time is less than the new intersection time the vehicles are moving apart, no collision warning generated. In the event that the vehicles are moving together, meaning the intersection times are getting smaller, determine if a course change is expected based upon the current waypoints issued, and if the course change will eliminate the collision condition. If a course change is not expected or if the course change will not alleviate the collision situation then generate alert. If the projection time T is less than the maximum projection time for warning alerts, generate a warning. If the projection time T is greater than the maximum projection time for a warning alert and less than the maximum projection time for a watch alert, generate a watch alert. If the projection time T is greater than the maximum projection time for a watch alert generate no watch alert.

9. The warning condition generates a message on the ALERT display identifying which vehicles are in a collision warning state. It also elevates the layer identifier code for those vehicle(s) to an always displayed (non-maskable) warning layer in which all potentially colliding vehicles are displayed in RED.

10. The watch condition generates a message on the ALERT display identifying which vehicles are in a collision watch state. It also elevates the layer identifier coder for that vehicle(s) to an always displayed (non-maskable) watch layer in which all potentially colliding vehicles are displayed in YELLOW.

11. The process continually runs with each new ADS message report.

---

COLLISION PROCESSING SOFTWARE EXAMPLE
The sample code below performs the above collision processing, without the routine which checks for course changes to reduce false alarms

```
/****************************************************
File Name :     collpred.c
Description :   collpred.c contains the routines which update the vehicle
                database and perform collision prediction algorithms.
Units :         get_veh_index,
```

---

-continued

COLLISION PROCESSING SOFTWARE EXAMPLE
The sample code below performs the above collision processing, without the routine which checks for course changes to reduce false alarms

```
                store_remote_msg,
                chk_for_collisions,
                convert_veh
/*---------------------------------------*/
#include <stdio.h>
#include <string.h>
#include <stdlib.h>
#include <graph.h>
#include <math.h>
#include "veh.h"
#include "sio.h"
#include "coord.h"
#include "color.h"
#include "rtzones.h"
#include "lights.h"
/*#include "txlib.h" */ /* tx library functions */
#define DEF_SEP 100000
/*-----------------external procedures-------------------------*/
/*----coordinate convertion routines----*/
/*extern POINT *convert_ecef_to_dd(POINT *pp);*/
/*-----------------external variables---------------------*/
extern short num_vehs;          /* number of vehicles in database */
extern char veh_id[8];          /* id of current vehicle */
extern short veh_type;          /* type of vehicle */
extern short gpsveh_type;       /* type of vehicle */
extern short veh_clear_status;  /* clearance status for vehicle */
extern double cur_radius;       /* radius of present position for zones */
extern short min_warning;       /* min secs prior to collision alert */
extern short mid_warning;       /* mid range number of secs prior
                                   to alert */
extern double proj_time;        /* time used in projection of position */
extern short max_coll_count;    /* num coll detections prior to alert */
extern short layer;             /* graphics layer for vehicle */
extern int rnwy_incursion;      /* indicates previous runway
                                   incursion */
extern int zone_incursion;      /* * indicates previous zone incursion */
extern double max_proj_time;    /* maximum number of seconds
in projection */
extern short inside_zone;       /* flag indicating pp is in static zone */
extern short veh_update;        /* flag indicating new vehicle data */
extern short vehnum;            /* vehicle number (based on id) */
extern int total_wps            /* total waypoints in current wp list */
[MAX_VEHS];
extern short current_clearance; /* set if any vehicle is cleared */
extern short end_of_wps;        /* end ofwaypoint processing */
extern short off_course;        /* flag indicating veh is off course */
extern short wrong_way;         /* flag indicating veh is wrong way */
extern double xtrack;           /* cross track error */
extern double range              /* range value stored for each vehicle */
[MAX_VEHS];
extern char veh_cleared[8];     /* vehicle cleared for landing/takeoff */
extern FILE *colfile;
/*Short in_coll_zone;*/         /* flag indicating pp is outside of
                                   zone */
short curr_color;               /* current color */
short coll_condition;           /* flag indicating coll watch/warning */
int prev_rnwyincur;             /* indicates previous runway
                                   incursion */
short prev_layer;               /* graphics layer for vehicle
/*-------------------global data---------------------*/
short vindex;                   /* index into vehicle database */
VEHICLE_DATA veh[MAX_VEHS];     /* vehicle database */
/*-----------------------------------------------------
Unit Name:   store_remote_veh
Description: parses the veh_str and stores the data in the vehicle database.
The incoming veh_str has the following format
        veh_id veh_type ecefx ecefy ecefx velx vely velz course
        This function is called by the vehicle processing
        whenever a remote message is received. In the ATC
        processor, collision prediction is performed each
        time a remote message is received; After the
        collision prediction processing, store_remote_veh
        is called to update the vehicle database
-----------------------------------------------*/
store_remote_veh(char veh_str[VEH_STR])
```

COLLISION PROCESSING SOFTWARE EXAMPLE
The sample code below performs the above collision processing, without the routine which checks for course changes to reduce false alarms

```
{
char *token; /* parsed field */
/* extract veh_id from veh_str, get index into vehicle database */
token = strtok(veh_str, ",");
token = strtok(NULL, ",");
if(strcmpi(veh_id,token) != 0) /* for rt-track, atc veh_id = 99 */
{
vindex = get_veh_index(token);
if (vindex !=-1)
{
  strcpy(veh[vindex].veh_id, token);
  /* parse fields and store in vehicle database */
  token = strtok(NULL,",");
  veh[vindex].veh_type = atoi(token);
  if(veh[vindex].veh_type == 0)
  {
    if (strcmpi(veh[vindex].veh_id,"03") == 0)
      veh[vindex].veh_type = DEP_AIR;
    if (strcmpi(veh[vindex].veh_id,"04") == 0)
      veh[vindex].veh_type = FULL_GRND;
    if (strcmpi(veh[vindex].veh_id,"05") == 0)
      veh[vindex].veh_type = LIM_GRND;
  }
  /* set veh_type = to current vehicle's type for ATC */
  if (gpsveh_type == ATC)
    veh_type = veh[vindex].veh_type;
  token = strtok(NULL,",");
  veh[vindex].ecefx = atof(token);
  token = strtok(NULL,",");
  veh[vindex].ecefy -(atof(token);
  token = strtok(NULL,",");
  veh[vindex].ecefz = atof(token);
  token = strtok(NULL,",");
  veh[vindex].xvel = atof(token);
  token = strtok(NULL,",");
  veh[vindex].yvel = atof(token);
  token = strtok(NULL,",");
  veh[vindex].zvel = atof(token);
  /* project current position ahead by proj_time factor */
  veh[vindex].ecefx = veh[vindex].ecefx + veh[vindex].xvel * proj_time;
  veh[vindex].ecefy = veh[vindex].ecefy + veh[vindex].yvel * proj_time;
  veh[vindex].ecefz = veh[vindex].ecefz + veh[vindex].zvel * proj_time;
  veh[vindex].radius = set_default_radius( );
  /* if adding vehicle to database for first time (layer is 0), initialize
  changeable settings */
  if(veh[vindex].layer_id == 0)
  {
    veh[vindex].layer_id = set_default_layer( );
    veh[vindex].prev_layer = veh[vindex].layer_id;
    veh[vindex].color = curr_color;
    veh[vindex].clear_status = 0;
    veh[vindex].rnwy_incurs = NO_RNWY;
    veh[vindex].zone_incurs = 0;
    veh[vindex].coll_cond = 0;
    veh[vindex].wrong_way = 0;
    veh[vindex].pos_hold = 0;
    veh[vindex].coll_sep = DEF_SEP;
    veh[vindex].on_off_course = FALSE;
    veh[vindex].wpindex = NO_WP;
    veh[vindex].currwp = NO_WP;
    veh[vindex].xtrack = 0;
    veh[vindex].range = 0;
  }
}
}
}
/*----------------------------------------------
Unit Name:       chk_for_collisions
Description:     Compares the current vehicle's position and velocity
                 data with each vehicle in the database. Called by
                 vehicle processor each time a local QPS message is
                 received. Called by ATC processor when a remote
                 vehicle message is received. Requires global
                 variable veh_id.
Inputs:          curr_veh, current vehicle. Set to projected
                 position for vehicle processing, most recent remote
                 vehicle message for ATC processing.
Outputs:
-----------------------------------------------*/
chk_for_collisions(POINT *cur_veh)
{
POINT_XYZ projp;        /* projected current position */
POINT_XYZ projv;        /* projected vehicle position */
char msg_buf[60];       /* collision message */
short num_secs=1;       /* number of seconds into collision
                           checking */
short coll_watch = FALSE;  /* flag indicating collision watch
                              condition */
double dr;              /* distance between cur_veh & veh */
double cr,vr;           /* radius of rough collision spheres */
int i,k;                /* counter */
unsigned freq;          /* alarm tone frequency */
short coll_warning = FALSE; /* indicates collision warning condition */
short no_warning=TRUE;  /* no warnings pending */
short no_watch=TRUE;    /* no watches pending */
int veh1,veh2;          /* vehicle ids */
short clear_msg;
clear_msg = 0;
coll_condition = FALSE
/* project current position ahead max_proj_time seconds */
projp.x = cur_veh->x + cur_veh->x_vel * max_proj_time;
projp.y = cur_veh->y + cur_veh->y_vel * max_proj_time;
projp.z = cur_veh->z + cur_veh->z_vel * max_proj_time;
/* determine radius of sphere from cur_veh posn to projp */
cr = sqrt(pow((projp.x - cur_veh->x),2) + 'continued next line'
      pow((projp.y - cur_veh->y),2) + pow((projp.z - cur_veh->z),2));
/* if radius is < default radius, set it to the default value */
if(cr < cur_radius)
  cr = cur_radius;
for (i = 0; i < num_vehs; i++)
{
  coll_watch = FALSE;
  coll_warning = FALSE;
  /* do not compare vehicle to itself */
  if (strcmpi(veh_id,veh[i].veh_id) != 0)
  {
    veh1 atoi(veh_id);
    veh2 atoi(veh[i].veh_id);
    /* project vehicle position ahead max_proj_time seconds */
    projv.x = veh[i].ecefx + veh[i].xvel * max_proj_time;
    projv.y = veh[i].ecefy + veh[i].yvel * max_proj_time;
    projv.z = veh[i].ecefz + veh[i].zvel * max_proj_time;
    /* determine radius of sphere from veh posn to projp */
    vr = sqrt(pow((projv.x - veh[i].ecefx),2)+ 'continued next line'
        pow((projv.y - veh[i].ecefy),2)+ pow((projv.z - veh[i].ecefz),2));
    if(vr < veh[i].radius)
      vr = veh[i].radius;
    /* calcuate distance between cur_veh posn and veh posn */
    dr= sqrt(pow((cur_veh->x-veh[i].ecefx),2) + 'continued next line'
        pow((cur_veh->y - veh[i].ecefy),2) +
        pow((cur_veh->z - veh[i].ecefz),2));
    if(dr <= (cr + vr)) /* continue checking, potential collision */
    {
      /* perform next level of rough check, see if dr increases */
      if(dr <= veh[i].coll_sep)
      {
        veh[i].coll_sep = dr;
      while ((num_secs < max_proj_time) && (coll_watch == FALSE))
      {
        /* project current position ahead num_secs (num_secs-1 used
        to test current positions without projections while
        assigning a nonzero value to coll_time*/
        projp.x cur_veh->x + cur_veh->x_vel * (nu_secs-1);
        projp.y cur_veh->y + cur_veh->y_vel * (nu_secs-1);
        projp.z cur_veh->z + cur_veh->z_vel * (nu_secs-1);
        /* project vehicle position ahead num_secs*/
        projv.x veh[i].ecefx + veh[i].xvel * (num_secs-1);
        projv.y veh[i].ecefy + veh[i].yvel * (num_secs-1);
        projv.z veh[i].ecefz + veh[i].zvel * (num_secs-1);
        /* calculate distance btwn current proj pos & proj veh pos */
```

-continued

COLLISION PROCESSING SOFTWARE EXAMPLE
The sample code below performs the above collision processing,
without the routine which checks for course changes to reduce false alarms

```
dr = sqrt(pow((projp.x − projv.x),2) + 'continued next line'
    pow((projp.y − projv.y),2) + pow((projp.z − projv.z),2));
  if(dr <= (cur_radius + veh[i].radius))
  {
    /* if a collision was previously detected */
    if(veh[i].coll_count > 0)
    {
      if(num_secs <= veh[i].coll_time)
      {
        veh[i].coll_time = num_secs;
      veh[i].coll_count++;
      coll_watch = TRUE;
      no_watch = FALSE;
      layer = WATCH_LAYER;
      if (gpsveh_type == ATC)
      {
        veh[vindex].layer_id=
          get_ww_layer(veh[vindex].veh_id,WATCH_LAYER);
      }
      else
        layer = get_ww_layer(veh_id,layer);
      veh[i].prev_layer = veh[i].layer_id;
      veh[i].layer_id get_ww_layer(veh[i].veh_id, WATCH_LAYER);
      coll_condition = TRUE;
    }
    else
    {
      if(num_secs > min_warning)
      {
        veh[i].coll_time = 0;
        veh[i].coll_count = 0;
      }
    }
  }
  else
  {
    veh[i].coll_time = num secs;
    veh[i].coll_count++;
    coll_watch = TRUE;
    no_watch = FALSE;
    layer = WATCH_LAYER
    if (gpsveh_type == ATC)
    {
      veh[vindex].layer_id = get_ww_layer(veh[vindex].veh_id,
      WATCH_LAYER);
    }
    else
      layer = get_ww_layer(veh_id,layer);
    veh[i].prev_layer = veh[i].layer_id;
    veh[i].layer_id = get_ww_layer(veh[i].veh_id,WATCH_LAYER);
    Coll_condition = TRUE;
  }
  if(veh[i].coll_time > 0)
  {
    if((veh[i].coll_time < min_warning) ||
    (veh[i].coll_time < 'continued next line'
        mid_warning) && (veh[i].coll_count >= max_coll_count)))
    {
      coll_warning = TRUE;
      no_warning = FALSE;
      layer = WARNING_LAYER;
      if(gpsveh_type == ATC)
      {
        veh[vindex].layer_id = get_ww_layer(veh[vindex].veh_id,
    WARNING_LAYER);
      }
      else
        layer = get_ww_layer(veh_id,layer);
      veh[i].prev_layer = veh[i].layer_id;
      veh[i].layer_id = get_ww_layer(veh[i]. veh_id,
      WARNING_LAYER);
      coll_condition = TRUE;
    }
  }
  } /* if dr */
```

-continued

COLLISION PROCESSING SOFTWARE EXAMPLE
The sample code below performs the above collision processing,
without the routine which checks for course changes to reduce false alarms

```
      num_secs++;
    } /* while */
  } /* if */
  else /* vehs are getting further apart */
  {
    veh[i].coll_sep = dr;
    veh[i].coll_time = 0;
    veh[i].coll_count = 0;
  }
}
else /* rough test failed, no collision */
{
  veh[i].coll_time = 0;
  veh[i].coll_count = 0;
  veh[i].coll_sep = DEF_SEP;
}
if((coll_warning == TRUE) && (gpsveh_type == ATC))
{
  if(veh1 > veh2)
    sprintf(msg_buf,"COLLISION WARNING VEHICLES %s AND
%s",|eh_id,veh[i].veh_id);
    else
    sprintf(msg_buf,"COLLISION WARNING VEHICLES %s AND
%s",|eh[i].veh_id,veh_id);
    ATC_Window(msg_buf,1);
}
else
{
  if((coll_watch = TRUE) && (gpsveh_type == ATC))
  {
    if(veh1 > veh2)
      sprintf(msg_buf,"COLLISION WATCH VEHICLES %s AND %s
",|eh_id,veh[i].veh_id);
    else
      sprintf(msg_buf,"COLLISION WATCH VEHICLES %s AND %s
",|eh[i].veh_id,veh_id);
    ATC_Window(msg_buf,1);
  }
  if((coll_watch == FALSE) && (coll_warning == FALSE));
  else
    coll condition TRUE;
} /* if veh_id */
} /* for each vehicle */
/* determine if watch or warning message should be cleared */
if(gpsveh_type == ATC)
{
  for (k = 0;k < num_vehs; k++)
  {
    if(veh[k].coll_cond == TRUE)
      clear_msg++;
  }
  if((clear_msg == 0) && (coll_condition == FALSE))
  {
    sprintf(msg_buf,"            ");
    ATC_Window(msg_buf,1);
  }
}
```

ON OR OFF COURSE PROCESSING

The AC&M processing performs mirrored navigational processing using the same coordinate references and waypoints as those aboard the vehicles. In this manner the ATC system can quickly detect off course conditions anywhere in the 3-D airport space envelope and effectively perform zone incursion processing aboard the vehicles and at the AC&M.

The AC&M processing software converts the position and velocity information to the appropriate coordinate frame (zone & map compatible) using techniques described previously. Waypoints based upon the precise 3-dimensional map are used for surface and air navigation in the airport space envelope. The capability is provided to store waypoints in a variety of coordinate systems, such as conventional Latitude, Longitude, Mean Sea Level, State Plane Coordinates, ECEF X, Y, Z and others. The navigational waypoint and on course—off course determination are preferred to be performed in an ECEF X, Y, Z coordinate frame, but this is not mandatory.

The following mathematical example is provided to show how waypoints and trajectories are processed in Latitude, Longitude, Mean Sea Level and in ECEF X, Y, Z. An actual GNSS flight trajectory is used for this mathematical analysis. The flight trajectory has been previously converted to an ECEF X, Y, Z format as have the waypoints using the previously described techniques. FIGS. 11, 12, 13, 14, 15 are used in conjunction with the following description.

FIG. 11 depicts the ECEF waypoint processing used in the AC&M. The ECEF coordinate system 43 is shown as X,Y,Z, the origin of the coordinate system is shown as 0,0,0. The coordinate system rotates 44 with the earth on its polar axis. The airport 45 is shown as a square patch. An enlarged side view of the airport 46 is shown with (4) waypoints 47. A further enlargement shows the Present Position 48 (PP), the Next Waypoint 49 (NWP) the Previous Waypoint (PWP) 50. The True Course Line 58 is between the Next Waypoint 49 and Previous Waypoint 50. The vector from the Present Position 48 to the Next Waypoint 49 is vector TNWP 51. The Velocity Vector 52 and the Time Projected Position is shown as a solid black box 53. The Projected Position 53 is used in zone incursion processing. The 3-D distance to the true coarse is represented by the Cross Track Vector 54 XTRK. The vector normal to the earth surface at the present position and originating at the center of mass of the earth is shown at 55. This vector is assumed to be in the same direction of the vertical axis 56. The lateral axis 57 is perpendicular to the vertical axis and perpendicular to the true course line 58 between the Next Waypoint 49 and the Previous Waypoint 50. The Navigational Display 59 shows the Present Position 48 with respect to the True Coarse Line 58.

The following equations describe the processing performed in the AC&M while FIGS. 12, 13, 14, and 15 represent plots of the actual trajectory information.

| | Variable Definition |
|---|---|
| Ω = | the number of degrees per radian   57.295779513 |
| α = | semi major axis, equatorial radius   6378137 meters |
| e = | earth's eccentricity   0.0818182 |
| TALT = | ellipsoidal altitude of trajectory position (meters) |
| WALT = | ellipsoidal altitude of the waypoint positions (meters) |
| ρ = | earth's radius of curvature at the position or waypoint |
| r = | 2-d equatorial radius (meters) |
| R = | first estimate of the radius of curvature (meters) |
| sφ = | the ratio of ECEF Z value divided by R (meters) |
| RC = | radius of curvature at the present position (meters) |
| h = | altitude with respect to the reference ellipsoid (meters) |
| λ = | longitude of position in radians |
| φ = | latitude of position in radiams |
| ENU = | East, North, Up coordinate reference |
| XYZ = | East, North, Up vector distance (meters) to waypoint |
| VELENU = | East, North, Up velocity in (meters/sec) |
| DISTENU = | East, North, Up scalar distance to waypoint |
| VELEMUMAG = | East, North, Up Velocity magnitude (scalar) meters/sec |
| NBEAR = | True North Bearing |

T = Time in seconds
p = Earth's radius of curvature at the waypoint
$_{wT}$
   Waypoint indexes through a list of waypoints
   Waypoints are indexed as a function of position
p = Earth's radius of curvature at the GNSS position
$_T$
Position

| LA = Latitude $_T$ | LO = Longitude $_T$ | TALT = altitude $_T$ |
|---|---|---|

Waypoint

| WLA = Waypoint Lat. $_{wT}$ | WLO = Waypoint Lon. $_{wT}$ | WALT = altitude $_{wT}$ |
|---|---|---|

Position

| X = ECEF X $_T$ | Y = ECEF Y $_T$ | Z = ECEF Z $_T$ |
|---|---|---|

Waypoint

A = Waypoint ECEF X $_T$     B = Waypoint ECEF Y $_T$
C = Waypoint ECEF Z $_T$

EARTH RADIUS OF CURVATURE DETERMINATION $$\rho_{wT} := \sqrt{\frac{\alpha^2}{1-e^2 \cdot \sin(LA_{wT})^2}} \qquad \rho_T := \sqrt{\frac{\alpha^2}{1-e^2 \cdot \sin(LA_T)^2}},$$

AT WAYPOINT          AT GNSS POSITION

CONVERT TRAJECTORY TO ECEF COORDINATES $X_T = (TALT_T + \rho_T) \cdot \cos(LA_T) \cdot \cos(LO_T)$ $Y_T = (TALT_T + \rho_T) \cdot \cos(LA_T) \cdot \sin(LO_T)$ $Z_T = [TALT_T + \rho_T \cdot (1-e^2)] \cdot \sin(LA_T)$

CONVERT WAYPOINTS TO ECEF COORDINATES $A_{wT} = (WALT_{wT} + \rho_{wT}) \cdot \cos(WLA_{wT}) \cdot \cos(WLO_{wT})$ $B_{wT} = (WALT_{wT} + \rho_{wT}) \cdot \cos(WLA_{wT}) \cdot \sin(WLO_{wT})$ $C_{wT} = [WALT_{wT} + \rho_{wT} \cdot (1-e^2)] \cdot \sin(WLA_{wT})$

FIND VECTOR FROM PRESENT POSITION TO NEXT WAYPOINT

T=TIME OF TRAJECTORY DATA MATRIX INDEX
TIME INTO TRAJECTORY=61 SECONDS
CONSTRUCT ECEF WAYPOINT MATRIX Q $$Q := \begin{bmatrix} A_0 & B_0 & C_0 \\ A_N & B_N & C_N \\ A_{2 \cdot N} & B_{2 \cdot N} & C_{2 \cdot N} \\ A_{3 \cdot N} & B_{3 \cdot N} & C_{3 \cdot N} \\ A_{4 \cdot N} & B_{4 \cdot N} & C_{4 \cdot N} \\ A_{5 \cdot N} & B_{5 \cdot N} & C_{5 \cdot N} \\ A_{6 \cdot N} & B_{6 \cdot N} & C_{6 \cdot N} \\ A_{7 \cdot N} & B_{7 \cdot N} & C_{7 \cdot N} \end{bmatrix}$$

WAYPOINT SELECTION CRITERIA #1 TIME BASED
TIME BASED WAYPOINT SELECTION TECHNIQUE
   DETERMINE NEXT WAYPOINT FROM PRESENT POSITION $$G_n := \text{until}\left[\left[\frac{T}{N\cdot(1+n)}\right]-1, n+1\right]$$

WAYPOINT SELECTION CRITERIA #2 POSITION BASED UTILIZES THE CONCEPT OF ZONES, SEE ZONES $$Q = \begin{bmatrix} 1491356.373377693 & -4435534.380128561 & 4319696.328998308 \\ 1491105.506082756 & -4434843.777395391 & 4320510.100123271 \\ 1491191.231021753 & -4434078.221408217 & 4321279.195524782 \\ 1491403.123106249 & -4433316.762941022 & 4322016.015673301 \\ 1491013.940737782 & -4432855.368457528 & 4322641.896808126 \\ 1490386.073951513 & -4432652.821583812 & 4323015.562834505 \\ 1489735.707050711 & -4432541.026386314 & 4323262.840511303 \\ 1489205.896384193 & -4432860.450400459 & 4322985.406680132 \end{bmatrix}$$

DETERMINE VECTOR BETWEEN PREVIOUS AND THE NEXT WAYPOINT $Qa = (Q_{a+1,0} - Q_{a,0}\ Q_{a+1,1} - Q_{a,1}\ Q_{a+1,2} - Q_{a,2})$ $PP = (X_T\ Y_T\ Z_T)$ PRESENT POSITION $NWP = [A_{N(1+a)}\ B_{N(1+a)}\ C_{N(1+a)}]$ NEXT WAYPOINT

TNWP=NWP–PP VECTOR DISTANCE TO THE NEXT WAYPOINT
AT FLIGHT TIME T=61 SECONDS, THE NEXT WAYPOINT IS THE FOLLOWING X, Y, Z DISTANCE FROM THE CURRENT POSITION
TNWP=(–394.0104406164 424.5394341322 588.6638708804)
DETERMINE THE MAGNITUDE OF THE DISTANCE TO THE WAYPOINT $$DIST = \sqrt{(TNWP^{<0>})^2 + (TNWP^{<1>})^2 + (TNWP^{<2>})^2}$$

DIST=825.8347966318 METERS
NEXT DETERMINE IF THE SPEED SHOULD REMAIN THE SAME, OR CHANGE
TIME EXPECTED AT NEXT WAYPOINT IS 80 SECONDS INTO TRAJECTORY CURRENT VELOCITY IS BASED UPON GNSS RECEIVER DETERMINATION $$VX := \frac{TNWP^{<0>}}{80 - T}$$

VX=20.7373916114 M/S×ECEF VELOCITY TO REACH WAYPOINT ON TIME
COMPARE CURRENT X VELOCITY TO REQUIRED X VELOCITY, IF LESS INCREASE IN VELOCITY, IF GREATER THAN REQUIRED VELOCITY DECREASE VELOCITY $$VY := \frac{TNWP^{<1>}}{80 - T}$$

VY=22.3441807438 M/S Y ECEF VELOCITY TO REACH WAYPOINT ON TIME
COMPARE CURRENT Y VELOCITY TO REQUIRED Y VELOCITY, IF LESS INCREASE IN VELOCITY, IF GREATER THAN REQUIRED VELOCITY DECREASE VELOCITY $$VZ := \frac{TNWP^{<2>}}{80 - T}$$

VZ=30.9823089937 M/S Z ECEF VELOCITY TO REACH WAYPOINT ON TIME
COMPARE CURRENT Z VELOCITY TO REQUIRED Z VELOCITY, IF LESS INCREASE IN VELOCITY, IF GREATER THAN REQUIRED VELOCITY DECREASE VELOCITY

VELECEF=$\sqrt{(VX^2)+(VY^2)+(VZ^2)}$ VELOCITY MAGNITUDE
VELECEF=43.4649892964 M/S
VELECEF=(–20.737 22.344 30.982)
DETERMINE THE ON COURSE OFF COURSE NAVIGATIONAL DATA
UNIT VECTOR PERPENDICULAR TO PLANE OF QA AND TNWP $$NP := \frac{Qa^T \times TNWP^T}{|Qa^T \times TNWP^T|} \quad NP = \begin{pmatrix} 0.2375540749 \\ -0.7054483132 \\ 0.6677654819 \end{pmatrix}$$

UNIT VECTOR PERPENDICULAR TO PLANE OF QA AND NP $$UN := \frac{NP \times Qa^T}{|NP \times Qa^T|} \quad UN = \begin{pmatrix} -0.8621137731 \\ -0.4698689823 \\ -0.1896918074 \end{pmatrix}$$

CROSS TRACK ERROR
XTRK=UN·TNWP$^T$
XTRK=28.5392020973
CALCULATE CROSS TRACK VECTOR $$VXTRK := XTRK \cdot UN \quad VXTRK = \begin{pmatrix} -24.6040392 \\ -13.4096858447 \\ -5.4136528281 \end{pmatrix}$$

UNIT VECTOR FROM PRESENT POSITION TO NEXT WAYPOINT $$UTNWP := \frac{TNWP^T}{|TNWP^T|} \quad UTNWP = \begin{pmatrix} -0.4771056417 \\ 0.514073076 \\ 0.7128106896 \end{pmatrix}$$

UNIT VECTOR OF PRESENT POSITION $$UPP := \frac{PP^T}{|PP^T|} \quad UPP = \begin{pmatrix} 0.2341833314 \\ -0.6961209085 \\ 0.6786559129 \end{pmatrix}$$

UNIT VECTOR OF NEXT WAYPOINT $$UNWP := \left(\frac{NWP^T}{|NWP^T|}\right) \quad UNWP = \begin{pmatrix} 0.2341210312 \\ -0.6960529621 \\ 0.6787470933 \end{pmatrix}$$

CHECK AGAINST GREAT CIRCLE TECHNIQUE
GREAT CIRCLE ANGLE β=acos(UNWP·UPP)
β·Ω=0.0074290102 DEGREES DETERMINE RANGE TO NEXT WAYPOINT FROM PRESENT POSITION h=0 SHOULD BE THE SAME AS DIST WHEN ALT IS NEARLY AT ELLIPSOID $$R3 := (|NWP^T| + |PP^T|) \cdot \frac{\beta}{2} \text{ METERS}$$

$$R3 = 825.7511698494$$
$$R3 - DIST = -0.0836267824 \text{ METERS}$$

THE ECEF ANALYSIS COMPARES TO GREAT CIRCLE ANALYSIS VERY CLOSELY

CONVERTING BACK TO LAT. LON AND MSL

DETERMINE GEODETIC PARAMETERS (LAT, LON & EL)

$$r := \sqrt{(PP^{(0)})^2 + (PP^{(1)})^2} \quad R := \sqrt{(1-e^2)^2 \cdot r^2 + (PP^{(2)})^2}$$

$$s\phi := \sqrt{\frac{(PP^{(2)})^2}{R^2}}$$

$$RC := \sqrt{\frac{a^2}{1 - e^2 \cdot s\phi^2}} \quad h := \frac{R - (1-e^2) \cdot RC}{1 - e^2 + e^2 \cdot s\phi^2} \quad h = 287.6967718417$$

$$\lambda := \operatorname{atan}\left[\frac{(PP^T)_1}{(PP^T)_0}\right] \quad \phi := \operatorname{atan}\left[\frac{(PP^T)_2}{r \cdot (1-e^2)}\right] \quad \begin{array}{l} \lambda \cdot \Omega = -71.40645 \\ \phi \cdot \Omega = 42.930575339 \end{array}$$

CONVERT TO ENU COORDINATES $$ENU := \begin{bmatrix} -\sin(\lambda) & \cos(\lambda) & 0 \\ -\sin(\phi)\cdot\cos(\lambda) & -\sin(\phi)\cdot\sin(\lambda) & \cos(\phi) \\ \cos(\phi)\cdot\cos(\lambda) & \cos(\phi)\cdot\sin(\lambda) & \sin(\phi) \end{bmatrix}$$

FIND ENU VECTOR FROM PRESENT POSITION TO NEXT WAYPOINT

EAST DISTANCE

NORTH DISTANCE

UP DISTANCE $$XYZ := ENU \cdot (TNWP^T) \quad XYZ = \begin{pmatrix} -238.0792858938 \\ 790.6424859464 \\ 14.3465805212 \end{pmatrix}$$

EAST VEL.

NORTH VEL.

UP VEL.

$$VELENU := ENU \cdot (VELECEF^T) M/S \quad VELENU = \begin{pmatrix} -12.5301751909 \\ 41.6123344504 \\ 0.7550895802 \end{pmatrix}$$

THE ECEF APPROACH AND THE ENU APPROACH PRODUCE THE SAME RESULTS SO IT IS POSSIBLE TO USE EITHER COORDINATE REFERENCE TO CONTROL THE NECESSARY SPEED TO THE WAYPOINT

FIND TRUE NORTH BEARING ANGLE TO NEXT WAYPOINT USING TANGENT $$NBEAR := \operatorname{atan}\left(\frac{XYZ_0}{XYZ_1}\right) \cdot \Omega \quad NBEAR = -16.7581666051 \text{ DEGREES}$$

ADJUST FOR TRIGONOMETRIC QUADRANTS AND YOU HAVE THE TRUE BEARING

Should the Range to the Waypoint become larger than the previous range of the waypoint a waypoint may not have automatically indexed. This situation could occur if the vehicle did not get close enough to the waypoint to index automatically or an ADS message may have been garbled and the waypoint did not index, due to a lost ADS message. In this case the following analysis is performed:

a) temporarily increment the waypoint index b) find the vector between the vehicles present position (PP) and the next waypoint (NWP)

Vector to the next waypoint, TNWP=NWP(X,Y,Z)−PP (X,Y,Z)

c) Determine the current vehicle velocity vector VEL=(VX,VY,VZ)

d) Determine the Dot Product between the Velocity Vector and Vector TNWP

COS θ=TNWP dot VEL e) If A<COS θ<B then keep current waypoint index

Where A and B are between 0 and 1 and represent an adjustable value based on the allowable vehicle velocity angular deviation from the true course If −1<COS θ<=0 then return to previous waypoint index and generate wrong way alert The above technique can be expanded to include curved approach, using cubic splines to smooth the transitions between waypoints. A curved trajectory requires changes to the above set of equations. Using the technique of cubic splines, one can calculate three cubic equations which describe smooth (continuous first and second derivatives) curves through the three dimensional ECEF waypoints. The four dimensional capability is possible when the set of cubic equations is converted into a set of parametric equations in time. The table below depicts an ECEF waypoint matrix which is used in cubic spline determinations.

TYPICAL WAYPOINT ECEF MATRIX

Figure 16:
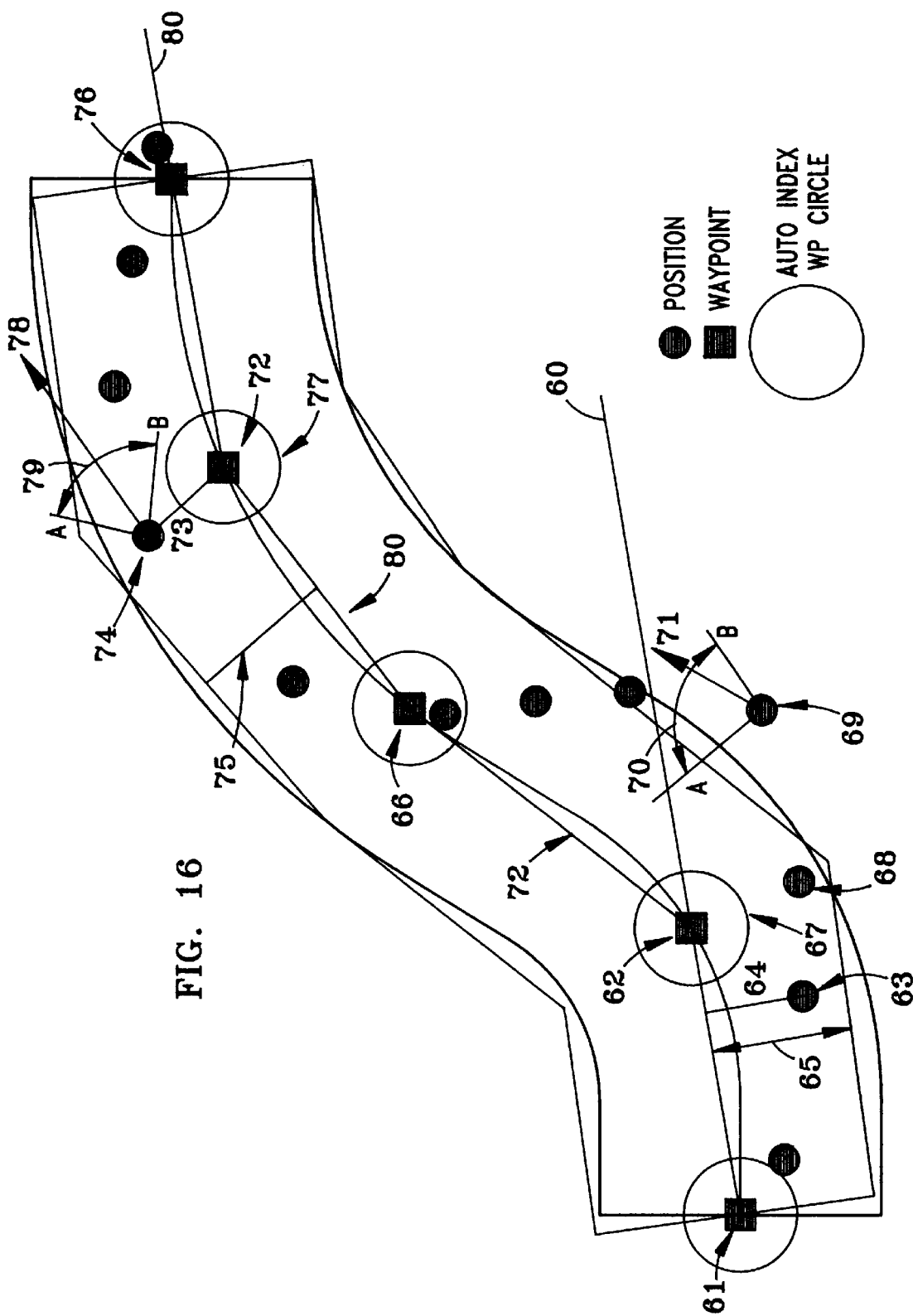
FIG. 16 shows a block diagram of on/off course processing.

The AC&M processing utilizes the combination of precise ECEF X, Y, Z navigation and waypoints. Waypoints may be stored in a data file for a particular runway approach, taxi path or departure path. Waypoints may be entered manually, through the use of a data entry device. A list of waypoints describing a flight and taxi trajectory is then assigned to a particular vehicle. To further supplement waypoint processing expected arrival time may be added to each waypoint as well as velocity ranges for each phase of flight. In this manner, 4 dimensional airport control and management is provided utilizing a GNSS based system. Mathematical processing is used in conjunction with precise waypoints to define flight trajectories. The mathematics typically uses cylindrical shapes but is not limited to cylinders, cones may also be used, and are defined between adjacent waypoints. Typical on or off course processing is outlined below and is shown in FIG. 16.

EXAMPLE 1

Missed Waypoint, With Off Course Condition a. Construct the True Course line between the previous waypoint 61 and the next waypoint 62 b. Determine the shortest distance (cross track error 64) from the current position 63 to the line 60 between the previous waypoint 61 and next waypoint 62
c. Determine the magnitude of cross track error
d. Compare the magnitude of the cross track error to a predefined limit for total off course error shown as 65 in the figure.
e. Construct an mathematical cylindrical zone centered on the line between the previous 61 and next waypoint 62 with radius equal to the off course threshold 65.
f. If the magnitude of the cross track error 64 is greater than the off course threshold 65 then raise flag and generate alert (off course).
g. Determine the necessary velocity to reach next waypoint on schedule, as shown previously
h. Is necessary velocity within preset limits or guidelines?
i. Check actual current velocity against preset limits and necessary velocity, If above preset limits, raise flag and issue alert to slow down. If below preset limits, raise flag and issue alert to speed up
j. Automatically index to the following waypoint 66 when the position is within the index waypoint circle 67
k. Should wrong way be detected (positions 68 and 69), index ahead to the next to waypoint pair 66 and 62 and check direction of travel 71 (Velocity) against the line 72 between the waypoints 66 and 62, if the direction of travel is within a preset angular range 70 (A to B degrees) and not off course. If the check is true meaning not off course and headed towards next waypoint then index permanently to waypoint set 66 and 62, no alert generated
l. In the event that an off course condition and wrong way occur (position 69) a message is formatted which updates the layer filter for the target which is off course, an alert is generated, the waypoints are returned to the initial settings and action is taken to bring vehicle back on course possibly using a set of new waypoints
m. In the event of a velocity check which indicates that the speed up or slow down velocity is outside of an approved range, generate a warning the speed for vehicle is out of established limits, Preset speed over ground limits are adjusted for current air wind speed.
n. The controller reviews the situation displayed and if necessary invokes a navigational correction message to be sent to the Real Time Communication Handler, and then broadcast by radio to the aircraft off course or flying at the wrong speed. The controller at this time may change the expected arrival time at the next waypoint if so necessary

EXAMPLE 2

Missed Waypoint, With On Course Processing a. Construct the True Course line between the previous waypoint 66 and the next waypoint 72
b. Determine the shortest distance (cross track error 73) from the current position 74 to the line between the previous waypoint 66 and next waypoint 72
c. Determine the magnitude of cross track error
d. Compare the magnitude of the cross track error to a predefined limit for total off course error shown as 75 in the figure.
e. Construct an mathematical cylindrical zone centered on the line between the previous waypoint 66 and next waypoint 72 with radius equal to the off course threshold 75
f. If the magnitude of the cross track error 73 is greater than the off course threshold 75 then raise flag and generate alert (off course).
g. Determine the necessary velocity to reach next waypoint on schedule, as shown previously
h. Is necessary velocity within preset limits or guidelines?
i. Check actual current velocity against preset limits and necessary velocity, If above preset limits, raise flag and issue alert to slow down. If below preset limits, raise flag and issue alert to speed up
j. Automatically index to the following waypoint 76 when the position is within the index waypoint circle 77
k. Should wrong way be detected (position 74), index ahead to the next to waypoint pair 76 and 72 and check direction of travel 78 (Velocity) against the the line 80 between the waypoints 76 and 72, if the direction of travel is within a preset angular range 79 (A to B degrees) and not off course. If the check is true meaning not off course and headed towards next waypoint then index permanently to waypoint set 76 and 72, no alert generated
l. In the event of a velocity check which indicates that the speed up or slow down velocity is outside of an approved range, generate a warning the speed for vehicle is out of established limits, Preset speed over ground limits are adjusted for current air wind speed.
m. The controller reviews the situation displayed and if necessary invokes a navigational correction message to be sent to the Real Time Communication Handler, and then broadcast by radio to the aircraft off course or flying at the wrong speed. The controller at this time may change the expected arrival time at the next waypoint if so necessary The AC&M processing performs all on or off course processing determinations and the displays information related to on or off course or late or early arrival conditions.

ALERT DISPLAY FUNCTION

Within the AC&M system collision alerts, zone, off course and improper speed warnings are handled somewhat differently than normal position updates. When the AC&M processing recognizes a warning condition, the aircraft(s)/vehicle(s) involved are moved to a special ALP layer. The layer filter controls what graphic parameters a particular vehicle or aircraft is displayed with. The change in the layer from the default vehicle layer signifies that the target has been classified as a potential collision, zone intrusion risk, off course condition or improper speed.

AC&M CONTROL ZONES

ATC Control Zones are used to sort and manage air and surface traffic within the airport space envelope. The AC&M Control Area is divided in AC&M Control Zones. Typically the outer most airport control zone interfaces with an en route zone. Aircraft within the 3-D AC&M zone transmit their GNSS derived positions via an on board datalink. The GNSS data is received by the airport AC&M equipment. The AC&M Processing determines the ECEF AC&M Control Zone assignment based on the aircraft's current position and assigns the aircraft to the map layer associated with that Control Zone. Mathematical computations as defined previously, are used to determine when a vehicle is in a particular control zone.

As an aircraft enters the AC&M or transitions to another ATC Control Zone, a handoff is performed between the controllers passing and receiving control of that aircraft. Surface traffic is handled in the same manner. With this AC&M scenario, each controller receives all target information but suppresses those layers that are not under his control. In this manner the controller or operator views on those vehicles or aircraft in his respective control zone. Should there be a collision condition across an ATC zone boundary the conflicting vehicles will be displayed in a non-surpressable layer.

All targets within an AC&M Control Zone would be placed in the appropriate map layer for tracking and display purposes. Layer coding for each tracked target can be used to control graphic display parameters such as line type, color, line width as well as be used as a key into the underlying database for that object.

Additional AC&M Control Zones may be defined for other surface areas of the airport, such as construction areas, areas limited to specific type of traffic, weight limited areas and others. These areas may be handled through ATC but will most or be controlled by airline or airport maintenance departments. The concept of a zone based AC&M system integrated with 3-D map information provides a valuable management and navigational capability to all vehicles and aircraft within the airport space envelope.

ENTERING WAYPOINTS

The AC&M processing defined herein allows the user to enter waypoints using the digital map as a guide. To enter a series of waypoints the controller simply uses the map which may provide plan and side views of the airport space envelope. The cursor is moved to the appropriate point and a selection is made by pressing a key. The position is then stored in a list with other waypoints entered at the same time. The user is then prompted to enter a name for the waypoint list and an optional destination. Lastly, the waypoints converted the appropriate coordinate frame and are then saved to a file or transmitted to a particular vehicle. In this manner the user may add and define waypoints.

DEFINING ZONES

The user may define zones using the digital map as a guide. To enter a series of zones the controller simply uses the map which may provide plan and side views of the airport space envelope. The cursor is moved to the appropriate point and a selection is made by pressing a key. The position is then stored in a list with other zone definition points. The controller is then prompted to enter a name for the zone (pole, tower, construction area, etc.) and type of zone (circle, sphere, box, cylinder, etc.). Lastly, the zones are converted to the appropriate coordinate frame and saved to a file or transmitted to a particular vehicle. In this manner the user may define additional zones.

The ability to quickly and accurately define zones is key to the implementation of a zones based AC&M capability.

ADS MESSAGE FORMAT CONSIDERATIONS

The definition and standardization of a 'seamless' aviation system datalink format(s) is critical to the implementation of a GNSS-based aviation system.

SAMPLE ADS MESSAGE FORMAT

Perhaps the most basic issue which must be resolved in the determination of the datalink format, is the selection of the coordinate system and units for the GNSS-derived position and velocity data. Compatibility with digital and paper maps, navigation system and overall mathematical processing efficiency play major roles in the selection of the coordinate reference. Below is a list of criteria which are used in this determination.

| ADS MESSAGE FORMAT CRITERIA DEFINITIONS | |
|---|---|
| WORLD WIDE USE | The coordinate reference system is recognized throughout the world. Scale does not change as a function of where you are on the earth. |
| SIMPLE NAVIGATION MATHEMATICS | The coordinate system lends itself to simple vector navigational mathematics. |
| COMPATIBLE WITH COMPLEX 4-D CURVED PATH 4-D NAVIGATION FUNCTIONS | The coordinate reference can support curved trajectory mathematics. |
| COMPATIBLE WITH MANAGEMENT SYSTEM | Is compatible with management operations at ATC and aboard A/Vs. |
| COMPATIBLE WITH SPACE OPERATIONS | The coordinate system is compatible with low earth orbit or space-based operations. |
| NAD83 AND WGS84 REF. | The reference system is compatible with NAD 83 and WGS 84 |
| SINGLE ORIGIN | The system has one single point origin. |
| LINEAR SYSTEM | The system is a linear coordinate system and does not change scale as a function of location. |
| UNITS OF DISTANCE | The coordinate system is based on units of distance rather than angle |
| NO DISCONTINUITIES | The coordinate reference system is continous world wide. |

The ECEF X, Y, Z Cartesian coordinate system satisfies all of the above criteria. Other systems may be used such as, Universal Transverse Mercator, Latitude, Longitude and Mean Sea Level and other grid systems but additional processing overhead and complexities are involved. A representative ADS message structure is provided below:

| SAMPLE AIRPORT ECEF MESSAGE CONTENT | |
|---|---|
| ID # | 8 Characters |
| VEHICLE TYPE | 4 Characters |
| CURRENT POSITION: | |
| ECEF X Position (M) | 10 Characters |
| ECEF Y Position (M) | 10 Characters |
| ECEF Z Position (M) | 10 Characters |
| ECEF X2 Position (M) | 4 Characters * |
| ECEF Y2 Position (M) | 4 Characters * |
| ECEF Z2 Position (M) | 4 Characters * |
| ECEF X3 Position (M) | 4 Characters * |
| ECEF Y3 Position (M) | 4 Characters * |
| ECEF Z3 Position (M) | 4 Characters * |
| ECEF X Velocity (M/S) | 5 Characters |
| ECEF Y Velocity (M/S) | 5 Characters |
| ECEF Z Velocity (M/S) | 5 Characters |
| NEXT WAYPOINT (WHERE HEADED INFORMATION): | |
| ECEF X | 10 Characters |
| ECEF Y | 10 Characters |
| ECEF Z | 10 Characters |
| TIME | 8 Characters |

A bit oriented protocol, representing the same type of information, may be used to streamline operations and potential error correction processing. (The asterisks denote optional fields which may be used to determine the attitude of an aircraft.)

The individual fields of the ADS message are described below:

ID (8 CHARACTER WORD, ALPHA-NUMERIC)

The ID field is used to identify the particular vehicle or aircraft. For aircraft this is typically the flight number or, in the case of GA or private aircraft, the tail number. For airport surface vehicles it is the vehicle's callsign.

TYPE OF VEHICLE (4 CHARACTER WORD, ALPHA-NUMERIC)

The vehicle type is used to identify the A/V's type classification. Numerous type classifications may be defined to categorize and identify various aircraft and surface vehicles.

CURRENT ECEF X,Y,Z POSITION (10 CHARACTERS BY 3 WORDS)

The ECEF X,Y,Z position fields provide the vehicle's position at the time of the ADS transmission in ECEF X,Y,Z coordinates. The position is calculated by the GPS receiver. Based on the system design, these values may or may not be smoothed to compensate for system latencies. The message length of 10 characters provides a sign bit in the most significant digit and 9 digits of positional accuracy. The least significant digit represents 0.1 meter resolution. This provides a maximum ADS distance of +999999.9 which translates to an altitude of about 3600 KM above the earth's surface, providing sufficient coverage to support low earth orbiting satellites and spacecraft.

DELTA POSITIONS (RELATIVE POSITIONS, 4 CHARACTERS BY 6 WORDS)

Delta positions are used to represent the positional offset of two other GPS antenna locations. These locations can be used to determine the attitude of the aircraft or its orientation when it is not moving. All delta distances are calculated with respect to the current ECEF position. Straight forward ECEF vector processing may then be used to determine the attitude and orientation of the aircraft with respect to the ECEF coordinate frame. An ECEF-to-local on board coordinate system (ie. North, East, Up) conversion may be performed if necessary. Accurate cross wind information can be determined on the ground and on board the aircraft from delta position information. Delta positions may also be used as 3-D graphical handles for map display presentations.

The message length of 4 characters provides a sign bit in the most significant digit and 3 digits of delta position accuracy. The least significant digit represents 0.1 meter resolution.

ECEF X,Y,Z VELOCITY (5 CHARACTERS BY 3 WORDS)

The fields represent the A/V's ECEF X,Y,Z velocity in meters per second. Tenth of a meter/second resolution is required during the ground phase of GPS based movement detection, latency compensation, zone and collision detection processing.

The message length of 5 characters provides a sign bit in the most significant digit and 4 digits of velocity accuracy.

NEXT WAYPOINT (10 CHARACTERS BY 3 WORDS)

These fields describe where the A/V is currently headed, in terms of the ECEF X,Y,Z coordinates of the next waypoint. This provides intent information which is vital to the collision avoidance functions.

TIME (UNIVERSAL COORDINATED TIME) 8 CHARACTERS

This field identifies the Universal Coordinated Time at the time of the ADS transmission. This time is the GPS derived UTC time (in seconds) plus any latency due to processing delays (optional).

The ADS message format provides a very valuable set of information that simplifies mathematical processing. Since the ECEF cartesian coordinate frame is native to every GPS receiver, no additional GPS burden is incurred. This type of ADS broadcast message information is more than adequate for precision ground and air operations as well as for general ATC/airport control and management functions.

OVERVIEW OF CANDIDATE ADS ARCHITECTURES

Many communication technologies are available which can provide ADS capability. Many of the systems already exist in some form today, but may require modification to meet the requirements of ADS in the terminal area. In evaluating datalink candidates, it is important that future airport standards are not compromised by forcing compatibility with the past. Systems should develop independently in a manner designed to achieve the systems' maximum operational benefits. Transitional elements and issues of compatibility with current systems are better handled through the implementation of translators which do not detract from a future system's true potential.

MODE S INTERROGATION

The Mode S system is in use today and is compatible with today's en route radar and Terminal Radar Approach Control (TRACON)-based air traffic control systems. Current Mode S 1030 MHZ interrogation is performed using Mode S radars which scan at the 4.8 second rate. The scan rate represents the rotational period of the scanning antenna. When a target is interrogated by the radar pulse, the aircraft or vehicle broadcasts its GPS-based information to air traffic control at 1090 MHZ. In this manner, ADS information is received by ATC and by other interrogating sources.

Numerous problems exist with any interrogation technique which has multiple interrogators. For radar systems to provide seamless coverage, surface, parallel runway and airport surveillance radars are required. Aircraft and surface vehicles would require the use of a transponder which broadcasts a response at 1090 MHZ when interrogated at 1030 MHZ. In an environment where multiple interrogations are required, system complexities increase dramatically. Early ATCRBS, Mode A and Mode C systems were troubled with too many unsynchronized interrogation requests. This resulted in cross talk, garble and loss of transmission bandwidth. Further complicating the airport environment is the possibility of reflected signals which interrogate areas of the airport outside the view of the surveillance radar. This clogs the 1090 channel and further complicates surveillance processing. Airborne Mode S transponder operation requires that squitter messages be broadcast when in the air and turned off on the ground. A Mode S squitter is a periodic repetitive broadcast of ADS information. This, by definition, will interfere with airport interrogation broadcasts and essentially create a self jamming system.

Any airport ADS system utilizing a Mode S interrogation capability would require almost a ground up development effort encompassing the myriad of necessary surveillance systems.

MODE S SQUITTER (GPS SQUITTER)

Similarly, the Mode S squitter utilizes the Mode S frequencies. A squitter is a randomly timed broadcast which is rebroadcast periodically. The Mode S squitter broadcasts GPS information at a periodic rate at 1090 MHZ with a bit rate of 1 MBPS. Current thinking requires that the ADS system be compatible with the Traffic Collision Avoidance System (TCAS). The TCAS system currently uses a 56 bit squitter message that must be turned off in the low altitude airport environment since it will interfere with other radar processing activities performed on the ground. Turning TCAS off inside the terminal area (where most midair problems and airport surface collisions occur) defeats the system's operational benefits where they are needed most. Operationally this is unacceptable.

A modified 112 bit squitter message has been proposed by MIT Lincoln Laboratories. With this approach, the GPS data is squittered twice per second to support ground and low altitude operations. The proposed Mode S squitter operation has distinct advantages over the Mode S interrogation method. Broadcasts are generated from all aircraft and (potentially) surface vehicles. Message collisions are possible, especially when the number of users is increased. If a collision occurs, the current message is lost and one must wait for the next message to be transmitted. At a two hertz transmission rate, this is not a significant problem. Analysis performed by MIT Lincoln Laboratories indicates that an enhanced Mode S squitter has potential to support operations at major airports.

The integration of the Mode S Squitter, as currently defined, is not without risk. This implementation requires a fleet update to convert to the 112 bit fixed format. Procedural issues of the switch-over between the 56 and 112 bit operation remain problematic. Operation in metroplex areas such as New York may create operationally dangerous conditions. Airside TCAS and ASR 56 bit transponder responses would be turned off based on phase of flight to be compatible with 112 bit squitter messages used at low altitudes and on the ground. In metroplex areas, confusion is almost certain for both the pilot and air traffic controller when systems are turned off and on. Further modifications may be required to ground and vehicular equipment should these issues be a significant problem.

The 112 bit fixed squitter length message, as defined in May 1994, fails to take advantage of precise GNSS velocity information. This is a significant limiting factor in the proposed squitter message format. The current squitter message is designed to be compatible with today's radar processing software and is not designed to fully capitalize on GNSS and ADS capabilities.

AVIATION PACKET RADIO (AVPAC)

AVPAC radio is currently in use with services provided by ARINC and may be a viable candidate to provide ADS services. Again, a GPS-based squitter or an interrogator-initiated broadcast is utilized at aeronautical VHF frequencies. Work is underway to adapt AVPAC to support both voice and data transmission. A Carrier Sense Multiple Access (CSMA) protocol is utilized on multiple VHF frequencies.

AIRCRAFT COMMUNICATIONS ADDRESSING & REPORTING SYSTEM

Another communication system currently in use by the aviation industry is ACARS. ACARS is a character oriented protocol and currently transmits at 2400 baud. Work is underway to increase the baud rate to support more complex message formats.

VHF/UHF TIME DIVISION MULTIPLE ACCESS (TDMA)

An interesting communication scheme currently under test and development in Sweden utilizes TDMA operation. TDMA is similar to communication technologies used by the United States military and others. In this system, each user is assigned a slot time in which to broadcast the ADS message. A single or multiple frequency system may be utilized based upon total traffic in the area. Upon entering an airport area, the user equipment listens to all slot traffic. The user equipment then selects an unused broadcast time slot. Precise GPS time is used to determine the precise slot. ADS broadcasts are then transmitted at a periodic rate. Broadcasts typically repeat at one second intervals. Should a collision be detected upon entering a new location, the system then transmits on another clear time slot. Since all time slots are continuously received and monitored, all necessary information for situational awareness and collision avoidance is available.

This system maximizes the efficiency of the broadcast link since, in a steady state environment, no transmission collisions can occur. A time guard band is required to assure that starting and ending transmissions do not overlap. The size of the guard band is a function of GPS time accuracy and propagation delay effects between various users of the system. Another feature of this system is an auto-ranging function to the received broadcasts. This is possible due to the fact that the ADS slot transmissions are defined to occur at precise time intervals. It is then possible, using a GNSS synchronized precise time source, to determine the transit time of the ADS broadcast. By multiplying the speed of light by the transit time, one may calculate the 1-dimensional range to the transmitting object. In reality, a more precise direction, distance and predicted future location is obtainable from the ADS message information itself.

CODE DIVISION MULTIPLE ACCESS (CDMA) SPREAD SPECTRUM

CDMA spread spectrum ADS broadcasts utilize a transmission format similar to that used in the GPS satellites. PRN codes are utilized to uniquely identify the sending message from other messages. The number of users able to simultaneously utilize an existing channel depends upon the PRN codes used and the resulting cross correlation function between the codes. This implementation is being utilized commercially in wireless computer systems with data rates exceeding 256 KPBS. In a frequency agile environment, this implementation may be able to provide secure ADS services.

CELLULAR TELEPHONE

Cellular technology is rapidly changing to support the large potential markets of mobile offices and personal communication systems. CCITT and ISDN standards will provide both voice, video and data capability. Cellular communication may be used by surface vehicles and aircraft for full duplex data link operations. ADS broadcast message formats receivable by ATC and other users will require changes to commercially available services. Cellular telephone has the mass market advantage of cost effective large scale integration and millions of users to amortize development costs over. This particular technology holds promise, and bears watching.

As the above examples show, a number of datalinks exist or may be modified to provide ADS services. It is not the intent of this specification to rigidly define a particular datalink.

ADS OPERATIONAL CONSIDERATIONS

To fully exploit the ADS concepts presented in this specification, a new set of operational procedures and processing techniques are necessary. The ADS concept will provide the controller and the Aircraft/Vehicle (A/V) operator with the best possible view of the airport environment. With highly accurate 3-D position and velocity information, many new operational capabilities are possible which will provide increased efficiency and safety improvements. The following sections show how precise ADS information is used in seamless airport control and management.

DEFINITION OF COMPATIBLE WAYPOINTS

Waypoints based upon the precise 3-D map and standard surface, approach and departure paths are used for surface and air navigation in the 3-D airport space envelope. Waypoints may be stored in a variety of coordinate systems, such as conventional Latitude, Longitude, Mean Sea Level; State Plane Coordinates; ECEF X, Y, Z; and others. The navigational waypoint and on/off course determinations are preferred to be performed in an ECEF X, Y, Z coordinate frame, but this is not mandatory.

Waypoints and navigation processing should be defined and designed for compatibility with air and ground operations, including precision approach capability. The same information and processing techniques should be in place on board the A/V's and at the AC&M. The AC&M performs mirrored navigational processing using the same coordinate references and waypoints as those on board the A/Vs. In this manner, the AC&M system can quickly detect off course and 'wrong way' conditions anywhere in the 3-D airport space envelope at the same time these conditions are detected on board the A/V's.

WAYPOINT NAVIGATION MATHEMATICS

The following mathematical example is provided to show how waypoints and trajectories are processed in the ECEF X, Y, Z coordinate reference frame. An actual DGPS flight trajectory is used for this mathematical analysis. The flight trajectory and waypoints have been previously converted to an ECEF X, Y, Z format.

FIG. 11 presented in the earilier ON Or Off Course Processing section depicts the major ECEF waypoint elements which are used throughout the following navigation mathematical processing example.

The following example utilizes an ECEF Waypoint Matrix. In this example, the next waypoint (NWP) is element 5 in the matrix and the previous waypoint (PWP) is element 4. The values for the waypoints are shown in the examples. The range to the waypoint is determined from the current position. The range is compared to the previous range for possible off course or wrong way conditions. If the range is increasing, the waypoint auto-indexing distance may have been exceeded even though the vehicle is on course. In this situation, the waypoint index is temporarily indexed and checking is performed to determine whether the velocity vector is pointing within X degrees of the next waypoint (in this example it is set to +/− 90 degrees). Based upon the outcome, a wrong way signal is generated or the waypoints are indexed. The ECEF cross track vector (XTRK) is determined and projected on to the vertical axis, local lateral axis and the plane tangent with the earth's surface at the current position.

CONSTRUCT TRAJECTORY VECTOR OF PRESENT POSITION (PP)

$$PP^{<1>} := \begin{bmatrix} x_1 \\ y_1 \\ z_1 \end{bmatrix}$$

INDEX TO NEXT WAYPOINT $$i = 1$$

PRESENT POSITION $$PP^{<t>} = \begin{pmatrix} 1490699.03159201 \\ -4432742.69262449 \\ 4322846.19931227 \end{pmatrix}$$

WAYPOINT INDEX $$wpin := \text{floor}\left(\frac{t}{n}\right)$$

$$\begin{array}{ccc} \text{ECEF X} & \text{ECEF X} & \text{ECEF Z} \end{array}$$

$$WP = \begin{bmatrix} 1491356.37337769 & -4435534.38012856 & 4319696.32899831 \\ 1491105.50608276 & -4434843.77739539 & 4320510.10012327 \\ 1491191.23102175 & -4434078.22140822 & 4321279.19552478 \\ 1491403.12310625 & -4433316.76294102 & 4322016.0156733 \\ 1491013.94073778 & -4432855.36845753 & 4322641.89680813 \\ 1490386.07395151 & -4432652.82158381 & 4323015.56283451 \\ 1489735.70705071 & -4432541.02638631 & 4323262.8405113 \\ 1489205.89638419 & -4432860.45040046 & 4322985.40668013 \\ 1488862.17692919 & -4433298.26186174 & 4322564.11714943 \\ 1488577.40869804 & -4433715.22689756 & 4322248.17133335 \\ 1488250.73266894 & -4434298.26191826 & 4321864.00370927 \end{bmatrix}$$

WAYPOINT MATRIX Q

WAYPOINT INDICES

PREVIOUS  
$pwp := wpin_1$  
$pwp = 4$

NEXT  
$nwp := wpin_1 + 1$  
$nwp = 5$

PREVIOUS WAYPOINT $$PWP := (WP_{pwp,0} \; WP_{pwp,1} \; WP_{pwp,2})$$

$$PWP^T = \begin{pmatrix} 1491013.94073778 \\ -4432855.36845753 \\ 4322641.89680813 \end{pmatrix}$$

NEXT WAYPOINT

-continued $NWP := (WP_{nwp.0} \; WP_{nwp.1} \; WP_{nwp.2})$ $$NWP^T = \begin{pmatrix} 1490386.07395151 \\ -4432652.82158381 \\ 4323015.56283451 \end{pmatrix}$$

DEFINE VECTOR BETWEEN WAYPOINTS FOR CURRENT TRAJECTORY TIME $BWP := NWP^T - PWP^T$ $$BWP = \begin{pmatrix} -627.8667862699 \\ 202.5468737194 \\ 373.6660263799 \end{pmatrix}$$

DISTANCE BETWEEN THE WAYPOINTS
$|BWP| = 758.2006572307$
DEFINE VECTOR BETWEEN PRESENT POSITION & NEXT WAYPOINT $TNWP := NWP^T - PP^{<t>}$ $$TNWP = \begin{pmatrix} -312.9576405 \\ 89.8710406795 \\ 169.36352224 \end{pmatrix}$$

DISTANCE TO THE WAYPOINT (RANGE)
$|TNWP| = 367.019470009$
CHECK RANGE TO SEE IF A WAYPOINT HAS BEEN MISSED
IF VEH. N RANGE > PREVIOUS VEH. N RANGE THEN
PERFORM TEST:
INCREMENT WAY POINT INDEX
FIIND THE VECTOR LINE BETWEEN THE CURRENT POSITION AND
NEXT WAYPOINT
TNWP = NWP(X, Y, Z) − PP(X, UY, Z)
CALCULATE ECEF CURRENT POSITIONS VELOCITY VECTOR
VEL = (VX, VY, VZ)
CALCULATE DOT PRODUCT BETWEEN THE VELOCITY VECTOR AND TNWP
COS θ = TNWP(X, Y, Z) dot VEL(VX, VY, VZ)
|TNWP| = SRT[(X*X) + (Y*Y) + (Z*Z)]
|VEL| = SRT[(VX*VX) + (VY*VY) + (VZ*VZ)]
COS θ = [(X*VX) + (Y*VY) + (Z*VZ)]/(|NWP|*|VEL|)
IF 0 < COS θ < 1 THEN KEEP CURRENT WAYPT INDEX,
MISSED AUTO WAYPOINT INDEX DISTANCE
IF −1 <COS θ <= 0 THEN GO BACK TO PREVIOUS WAYPOINT
FLASH WRONG WAY

PRESENT POSITION                    NEXT WAYPOINT $$PP^{<1>} = \begin{pmatrix} 1490699.03159201 \\ -4432742.69262449 \\ 4322846.19931227 \end{pmatrix} \qquad NWP^T = \begin{pmatrix} 1490386.07395151 \\ -4432652.82158381 \\ 4323015.56283451 \end{pmatrix}$$

UNIT VECTOR PERPENDICULAR          UNIT NORMAL FROM DESIRED
TO PLANE CONTAINING INTER-         TRACK TO THE PRESENT
SECTING LINES TNWP & LINE          POSITION POINT
BETWEEN WAYPOINTS $$NP := \frac{BWP \times TNWP}{|BWP \times TNWP|} \qquad UN := \frac{NP \times BWP}{|NP \times BWP|}$$

$$NP = \begin{pmatrix} 0.0568495318 \\ -0.8345970318 \\ 0.547919634 \end{pmatrix} \qquad UN = \begin{pmatrix} -0.557688735 \\ -0.4817501474 \\ -0.6759438367 \end{pmatrix}$$

CROSS TRACK ERROR CALCULATIONS
CROSS TRACK MAGNITUDE DETERMINATION
$XTRK := UN \cdot TNWP \qquad XTRK = 16.7573345255$
CROSS TRACK VECTOR DETERMINATION
$VXTRK := UN \; XTRK \qquad VXTRK = -8.0728483774$
DETERMINE THE ADJUSTED POSITION
The adjusted position is the point, on the line between the previous and next waypoint
which is normal to the present position.

$ADJ^{<t>} := PP^{<t>} + VXTRK$ $$ADJ^{<1>} = \begin{pmatrix} 1490689.686215317 \\ -4432750.765472868 \\ 4322834.872295278 \end{pmatrix}$$

DETERMINE THE UNIT VECTOR IN THE DIRECTION FROM CENTER OF MASS

-continued

OF THE EARTH TO ADJUSTED POSITION
This vector is in the local vertical direction and for all practical purposes in the vertical direction at the actual user position, since the separations are very small compared to the length of the vector.

$$UVADJ = \frac{ADJ^{<1>}}{|ADJ^{<1>}|} \qquad UVADJ = \begin{pmatrix} 0.234070768 \\ -0.696038475 \\ 0.6787792844 \end{pmatrix}$$

FIND THE PROJECTION OF THE XTRACK VECTOR ON TO THE UNIT VECTOR
This distance represents the vertical distance to true course
VERTDIST := VXTRK . UVADJ            VERTDIST = −4.2570109135
FIND THE LATERAL AXIS OF XTRK INFORMATION
The lateral axis represents horizontal distance to true course from the current position.
A number of steps are necessary in this determination and are outlined below.
FIRST FIND THE VECTOR PERPENDICULAR TO THE PLANE FORMED
BY THE XTRK AND THE UVADJ VECTOR $$UVPER = \frac{VXTRK \times ADJ^{<1>}}{|VXTRK \times ADJ^{<1>}|} \qquad UVPER = \begin{pmatrix} -0.8245345664 \\ 0.2278021297 \\ 0.5179275418 \end{pmatrix}$$

FIND THE VECTOR (VLAT) WHICH LIES IN THE PLANE FORMED BY
UVADJ AND VXTRK WHICH IS PERPENDICULAR TO THE UVADJ VECTOR
IT IS KNOWN THAT VLAT DOT UVADJ = 0 AND UVPER DOT VLAT = 0
SOLVE FOR VLAT BY USING SIMULTANEOUS EQUATIONS
EQUATION #1
UVADJ VLAT + UVADJ VLAT + LVADJ VLAT = 0
    0       0       1       1       2       2
EQUATION #2
UVPER VLAT + UVPER VLAT + UVPER VLAT = 0
    0       0       1       1       2       2
SUBSTITUTE AND SOLVE IN TERMS OF VLAT $$\frac{UVADJ_0}{UVPER_0} = -0.2838822986 \qquad \frac{UVADJ_1}{UVPER_1} = -3.0554520095$$

DEFINE VARIABLES FOR EQUATION SUBSTITUTION $$VLATX := \frac{\left(\frac{-UVADJ_1}{UVPER_1}\right) \cdot UVPER_2 + UVADJ_2}{\left(\frac{UVADJ_1}{UVPER_1}\right) \cdot UVPER_0 - UVADJ_0}$$

$$VLATY = \frac{\left(\frac{-UVADJ_0}{UVPER_0}\right) \cdot UVPER_2 + UVADJ_2}{\left(\frac{UVADJ_0}{UVPER_0}\right) \cdot UVPER_1 - UVADJ_1}$$

DEFINE VLAT VECTOR
NOTE: VLAT(Z) TERM WILL CANCEL OUT WHEN FINDING UNIT VECTOR
VLAT := (VLATX VLATY 1)            VLAT = (0.989509706 1.3079658867 1 )
DETERMINE THE LOCAL LATERAL AXIS UNIT VECTOR $$UVLAT := \frac{VLAT}{\sqrt{VLATX^2 + VLATY^2 + 1^2}} \qquad UVLAT^T = \begin{pmatrix} 0.5151248629 \\ 0.6809086804 \\ 0.5205859627 \end{pmatrix}$$

PERFORM CHECK TO SEE IF UVLAT IS PERPENDICULAR TO UVADJ
UVADJ × UVLAT$^T$ = 5.5511151231 · 10$^{-17}$
CLOSE ENOUGH TO ZERO
IS PERPENDICULAR
PERFORM CHECK TO SEE IF UVLAT IS PERPENDICULAR TO UVPER
UVPER · UVLAT$^T$ = 0
IT IS PERPENDICULAR
PROJECT THE CROSS TRACK TO THE LATERAL AXIS
LATDIST = VXTRK · UVLAT$^T$
LATDIST = −16.2075944693            VERTDIST = −4.2570109135

The sign of the lateral distance (LATDIST) and vertical distance (VERTDIST) determine whether one turns right or left or goes up or down to true course From a simplicity standpoint, the ECEF coordinate frame provides direct GPS compatibility with minimal processing overhead. The system is based upon the ECEF world wide coordinate frame and provides for 4-D gate-to-gate navigation without local coordinate reference complications. Furthermore, it is directly compatible with zone processing functions as described in earlier sections.

The above techniques can also be expanded to include curved approaches using cubic splines to smooth the transitions between waypoints. A curved trajectory requires changes to the above set of equations. Using cubic splines, one can calculate three cubic equations which describe smooth (continuous first and second derivatives) curves through the 3-D ECEF waypoints. Additional information on the use of splines may be found in mathematical and numerical programming text books. Four dimensional capability is possible when the set of cubic equations is converted into a set of parametric equations in time.

DISPLAY GRAPHICS AND COORDINATED REFERENCES

Three dimensional display graphics, merged with GPS sensor inputs, provide exciting new tools for airport navigation, control and management. Today's airport users operate in a 4-dimensional environment as precisely scheduled operations become increasingly important in an expansion-constrained aviation system. The 4-D capability of GPS integrated with precise 3-D airport maps and computer graphics, provide seamless airport safety and capacity enhancements. The merger of these technologies provides precise, real-time, 3-D situational awareness capability to both the A/V operators and the air traffic controller.

Figure 17:
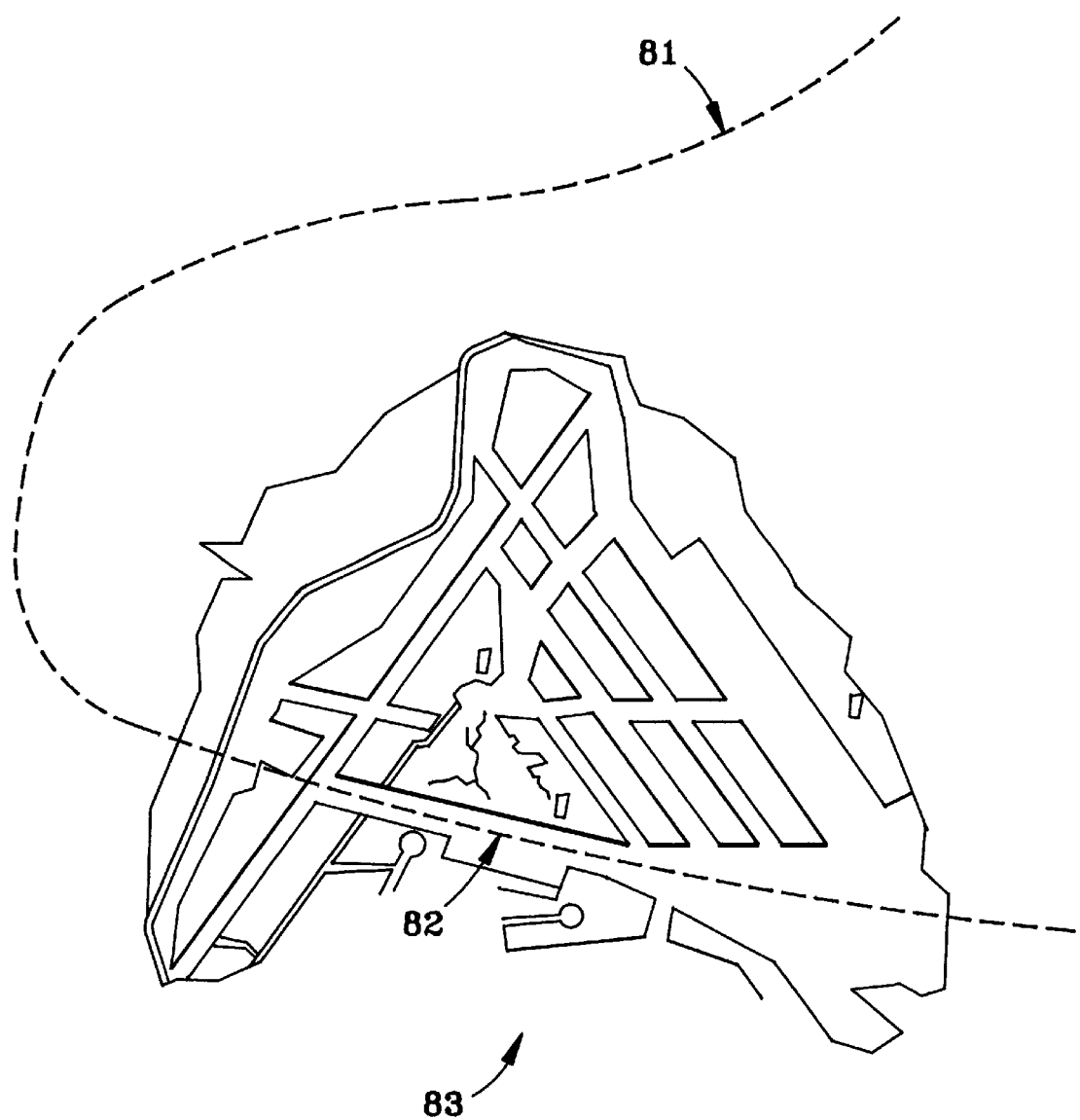
FIG. 17 shows a missed approach followed by a touch and go GPS trajectory displayed in a 3-D airport map.

The FIG. 17 shows a missed approach 81 on runway 35 followed by a touch and go 82 on runway 24 at the Manchester Airport. The power of such a situation display 83 presentation for the air traffic controller can be instantly recognized. Upon closer inspection, it becomes increasingly clear the GPS and precise graphical maps can be a valuable asset in air and ground navigation.

For the air traffic controller, 3-D situational awareness displays, supplemented with navigation status information, are sufficient. For the pilot navigating in a 3-D world, a 3-D terrain or airport map superimposed with graphical navigational information would be extremely valuable, particularly in adverse weather conditions.

Figure 18:
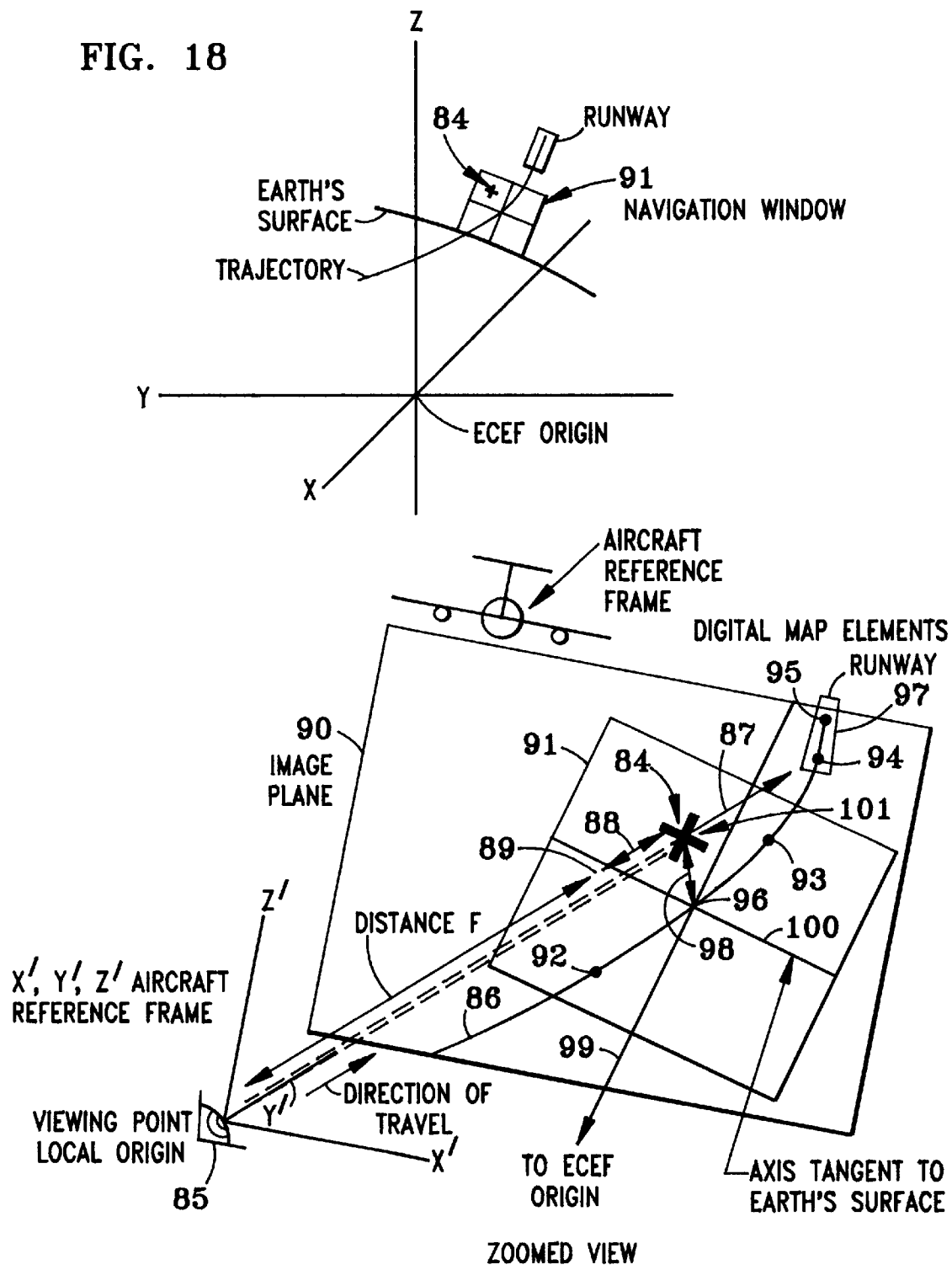
FIG. 18 shows an ECEF navigation screen with navigational window insert and 3-D digital map elements.

The FIG. 18 combines the elements of precise ECEF navigational information with a 3-D airport map. The key element in the construction of the map is compatibility with the navigation display, where the selection of map and navigation coordinate frames is of paramount importance. Upon inspection of computer graphical rotation and translational matrices, it becomes clear that, for processing speed and mathematical efficiency, the Cartesian coordinate system is preferred for the map database. A 3-D X,Y,Z digital map presentation provides the most efficient path to 2-D screen coordinates through the use of projection transformations.

The integration of GPS-based navigation information with digital maps suggests that new methods of navigation processing should be considered. In the past, aircraft typically relied on a signal in space for instrument-based navigation. The instrument landing system (ILS) consists of a localized directed signal of azimuth and elevation. The VOR-DME navigation system uses a signal in space which radiates from an antenna located at a particular latitude and longitude. Altitude is determined from pressure altitude. Current, 2-D radar surveillance systems are also based upon a localized coordinate reference, usually to the center of the radar antenna. Again, altitude information is from barometric pressure readings which vary with weather. The integration of localized navigation and surveillance systems and 3-D ATC and navigational display presentations require an excessive number of coordinate conversions, making the process overly difficult and inaccurate.

To minimize navigational and display overhead, a Cartesian X,Y,Z coordinate system is used for the navigation computations, map database and display presentations. Many X,Y,Z map database formats are in use today, but many are generated as a 2-D projection with altitude measured above mean sea level. Two examples of this type of system are Universal Transverse Mercator (UTM) and State Plane Coordinate System (SPCS). Neither one of these systems is continuous around the world, each suffer from discontinuities and scale deformity. Furthermore, neither of these systems is directly compatible with GPS and also requires coordinate conversions. If the map, travel path waypoints, navigational processing, navigational screen graphics and airport control and management functions are in the Cartesian coordinate frame, the overall processing is greatly simplified.

In the graphical navigation display FIG. 18, the perspective is that of a pilot from behind his current GPS position 84. From this vantage point 85, the pilot can view his current position 84 and his planned travel path 86. As the aircraft moves, its precise ECEF X,Y,Z velocity 87 components are used to determine how far back 88 and in what direction the observation is conducted from. This is determined by taking the current ECEF velocity 87, negating it and multiplying it by a programmable time value (step-back time). When applied to the aircraft's current position 84, this results in an observation point 89 which is always looking at the current position 84 and ahead in the direction of travel 87.

Once the observation 89 is established in the 3-D Cartesian coordinate system, an imaginary mathematical focal plane 90 is established containing the current position 84. The focal plane 90 is orthogonal to the GPS-derived ECEF velocity vector 87. The mathematical focal plane 90 represents the imaginary surface where the navigation insert 91 will be presented. The focal plane is always, by definition, orthogonal to the viewing point 85. The travel path 86 composed of ECEF X,Y,Z waypoints (92–95) is drawn into the 3-dimensional map. The point on the true travel path 86 which is perpendicular to the current position 84 represents the center 96 of the navigational insert screen 91. The orientation of the navigational insert with respect to the horizontal axis is determined by the roll of the aircraft. The roll may be determined through the use of multiple GPS antennas located at known points on the aircraft or may be determined by inertial sensors and then converted to the ECEF coordinate frame. Vector mathematics performed in the ECEF coordinate frame are then used to determine the new rotated coordinates of the navigation screen insert 91. The rotated coordinates are then translated through the use of the graphical translation matrix and drawn into the 3-D map 97.

The final step is the placement of the current position 'cross-hair' symbol 84 with respect to travel path 86. The aircraft's GPS position, previous and next waypoints are used to determine the ECEF cross track vector 98. The cross track vector 98 is then broken down into its local vertical 99 and local lateral 100 (horizontal) components. (Local components must be used here since the vertical and lateral vectors change as a function of location on the earth.) The cross-hair symbol 101 is then drawn on to the focal (image) plane 90 surface at the proper offset from the true course position indicated by the center of the navigation screen insert 96. Thus, this display provides precise navigation information (lateral and vertical distance to true course) with respect to true course, provides information on 3-D airport features and shows the planned 3-D travel path. The element of time may also be presented in this display format as an arrow (drawn in the direction of travel) of variable length where the length indicates speed up or slow down information.

The construction of this type of display in other than ECEF coordinates entails substantial coordinate conversion and additional processing. Again, for simplicity and compatibility with proven 3-dimensional graphic techniques, an ECEF Cartesian X,Y,Z coordinate framework is desired.

GPS NAVIGATOR DISPLAY

Various display formats are used to provide the GPS navigational information to the pilot. The area navigation display shown in FIG. 19 features auto-scaling range 102 rings 103 which provide course, 104 bearing 105 and range distance to the waypoint. The length of the course 104 and bearing lines 105 superimposed on the ring scale 103 are proportional to the distance from the waypoint. The compass orientation of the bearing line 105 provide the course to travel from the current position to the waypoint. The course line 104 indicates the compass direction of current travel. The display also provides altitude information as a auto-scaling bar chart display 106 with indicated to go up or down information.

In this manner the area navigation display provides the following:

1. Range to the waypoint based on length of the line and an autoranging scale
2. Compass heading to travel to the waypoint
3. Compass heading of current travel
4. Autoranging altitude navigation bar graph display The GPS landing display is shown in FIG. 20. This display is activated when the first GPS waypoint at the top of the glide slope is reached. The precision landing display is composed of a simple heavy cross 107 which moved about on an X Y graticuled cross hair display 108. Textual TURN LEFT/TURN RIGHT and GO UP/GO DOWN messages are presented to the pilot when the aircraft is more than a predetermined amount eg. 10.0 meters off of true course.

Figure 21:
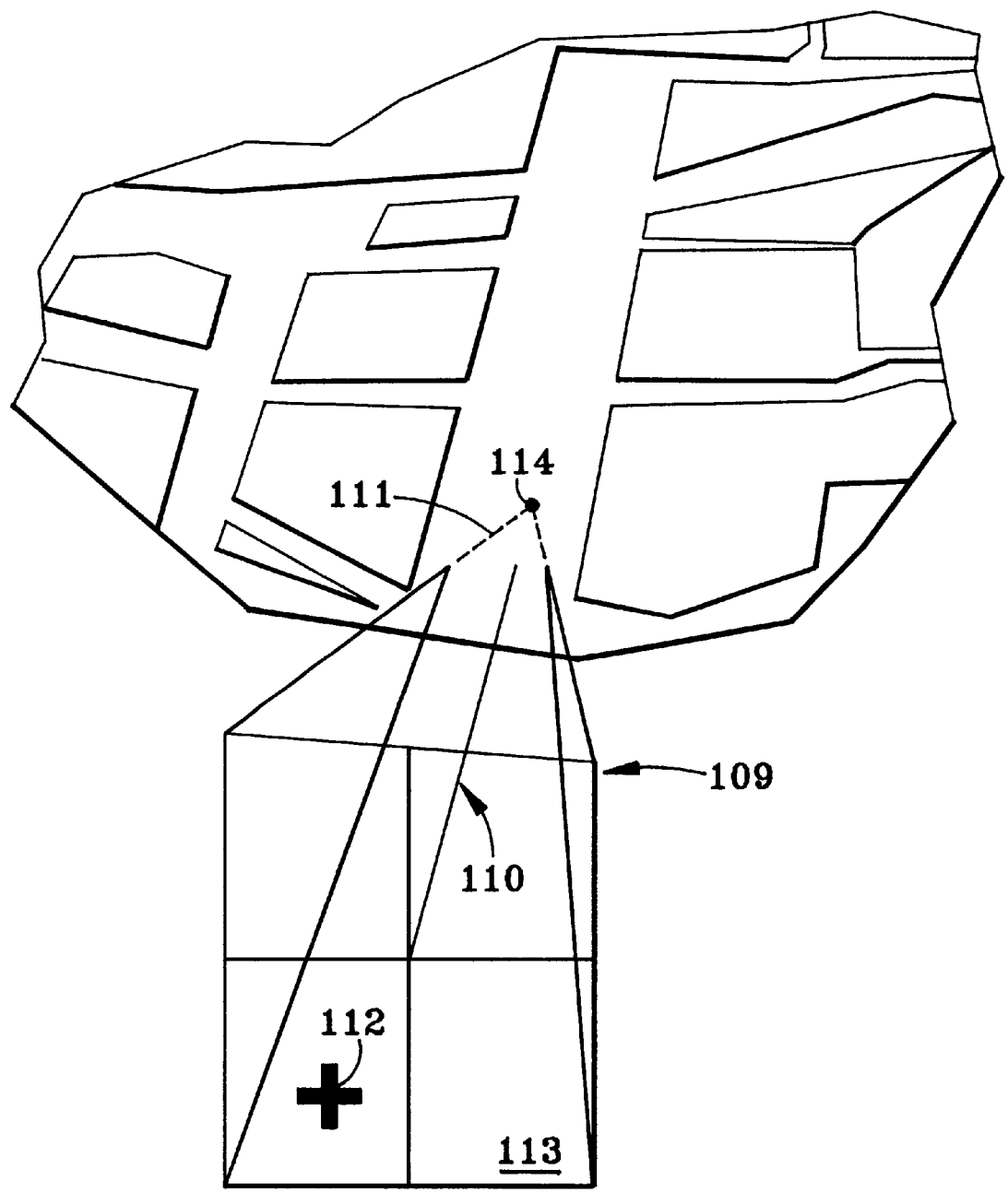
FIG. 21 illustrates the GPS approach cone with digital map elements showing current position with respect to true coarse line.

Another display format utilizing a 3-D map is provided in FIG. 21. This display technique provides a 3-D view of the approaching airport as viewed from the aircraft's position. The techniques described above for the cross hair navigation screen are identical to those used in the 3-D approach presentation. In the 3-D approach presentation, a conical zone 109 is constructed around the line 110 between the landing approach waypoints. The apex of the cone is at the touch down point 111 and the base of the cone is at the top of the glide slope waypoint. This 3-D object is viewed normal to the line between the current and previous waypoint as shown in FIG. 21.

The cone is sliced at the point on the line (formed by the current and previous waypoint) perpendicular to the present position 112. The resulting cross section then effectively represents the cross hair symbology implemented in the graphical GPS landing display. The current position is then displayed within the conical cross section 113 of the glide slope zone 109. A position not in the center of the display means the aircraft is not on true course. For example, a position report in the upper right of the display cross section means the aircraft is too high and too far to the right. In this case the pilot should turn left and go down. As the aircraft gets closer to the touch down point, the conical cross section scale gets smaller. Once the touchdown waypoint 114 is reached, the display reverts to a plan view of the airport similar to that shown in FIG. 8 which is then used for surface navigation. The graphical nature of this display format is useful in the air and on the ground, but requires very fast graphical and computational performance. The advantage of this system is that it minimizes many of the navigational calculations such as cross track errors, but requires moderate spatial graphical computations and fast display performance.

```
WAYPOINT DATABASE DEFINITION SOFTWARE EXAMPLE
WAYPOINTS
/************************************************
File Name       : way.c
Description : Way.c contains the routines used to enter and save the waypoint data.
Units           : Store_wps.
                  calc_navdata,
*************************************************/
#include <stdio.h>    /* standard input/output             */
#include <math.h>     /* MSC math library                  */
#include <string.h>   /* MSC string routines               */
#include <graph.h>    /* MSC graphics routines             */
#include <stdlib.h>   /* MSC standard library routines     */
#include <bios.h>     /* MSC bios routines                 */
#include "coord.h"    /* coordinate definitions            */
#include "sio.h"      /* CAD/NAV global declarations       */
#include "veh.h"      /* vehicle data                      */
#include "lights.h"   /* lighting definitions              */
#define NEXTWP_FACTOR 2.5   /* conversion for air/ground*/
/*------------------external functions--------------------*/
extern convert_lat_lon(POINT *coord);
extern cnvt_to_ecef(POINT *wp);
extern double calc_range(POINT *wp POINT *pp, short dmode);
extern calc_xtrack(POINT *pwp, POINT *awp, POINT *ppos);
/*------------------external variables---------------*/
extern int wp_num; /* current waypoint number, index into array   */
extern short wp_on; /* indicates waypoint processing is on         */
extern int coord_type; /* coordinate system selected              */
extern double xtrk_parm; /* xtrack factor, for on/off course      */
extern int nextwpal; /* value used to transition to next wp        */
extern short end_of_wps /* end of waypoints reached                */
extern POINT_XYZ q; /* vector between previous aid active wypts    */
```

-continued

```
extern POINT_XYZ tnwp;  /* distance (vector) to the next wypoint  */
extern VEHICLE_DATA veh[MAX_3VEHS]; /* vehicle database           */
extern short current_clearance; /* set if any vehicle is cleared  */
extern char veh_cleared[8]; /* veh cleared for landing/takeoff    */
extern FILE *navfile;
/*-----------------global variable-----------------------*/
POINT wayp[MAX_VEHS][MAX_WP];   /* array of waypoints  */
double range[MAX_VEHS]; /* range value (stored for each vehicle) */
double xtrack;       /* cross track error                        */
short off_course;       /* flag indicating pp is off course      */
short wrong_way;        /* flag indicating pp is wrong way       */
int total_wps[MAX_VEHS]; /* total wypnts in current wypnt list   */
POINT prevwp[MAX_VEHS]; /* previous waypoint                     */
short increm_wps = FALSE; /* flag - increment wps based on angle */
/*--------------------------------------------------------*/
Unit Name     : store_wps
    Description                : This routine reads the waypoint file, converts the waypoint data to ECEF
coordinates and stores it in the global waypoint data structure
Input Parameters :   wpid - id of waypoint list
                     wpi - index, used to specify vehicle's
                     wp list
-----------------------------------------*/
store_wps(char wpid[12],int wpi)
{
/--local variables--/
FILE *wpfile;              /* file containing waypoint information   */
char data_str[MAX_STR];    /* string read from waypoint file         */
char *token;               /* field in data string                   */
char tmp_str[10];          /* temporary string variable              */
double latitude, longitude, lon, lat, llon, llat: /* lat/lon         */
double intpart;            /* integer part of lat/lon value          */
double deg;                /* degrees                                */
short i=0;                 /* counter                                */
short wpnum = 0;           /* waypoint number                        */
short found;               /* flag - waypoint id found in file       */
short numwps;              /* number of waypoints in wp list         */
/* open appropriate waypoint file */
if(strstr(wpid,'ARR") != NULL)
{
if ((wpfile = fopen("arrwps.dat"."r")) == NULL)
{
printf("Error opening waypoint file. Press any key.");
getch( );
}
}/* ARR */
else
{
if (strstr(wpid. "DEP") != NULL)
{
if((wpfile = fopen("depwps.dat","r")) == NULL)
{
printf("Error opening waypoint file. Press any key.");
getch( );
}
}     /* DEP */
else
{
if ((wpfile = fopen("surwps.dat","r")) == NULL)
{
 printf("Error opening waypoint file. Press any key.");
 getch( );
}
} /* Surface */
}
/* while not at end of GPS datafile */
found = FALSE:
while ((feof(wpfile) == 0) && (found != TRUE))
{
/* read next line in GPS datafile, store data in data_str */
if ((fgets(data_str MAX_STR-1, wpfile) != NULL) &&
      (strlen(data_str) > 1))
{
if(strstr(data_str,wpid) != NULL)
{
found = TRUE;
fgets(data_str,120-1, wpfile);
      numwps = atoi(data_str); /* number of waypoints */
/* for each waypoint in list, convert point to ECEF */
for (i = 0; i < numwps; i++)
```

-continued

```
    {
     if(fgets(data_str, 120-1, wpfile) != NULL)
     {
      switch (coord_type)
      {
      case DECDFG : /* Latitude/Longitude */
        token = strtok(data_str,","); /* text */
        token = strtok(NULL,",");
        lon = atof(token);
        token = strtok(NULL,",");
        lat = atof(token);
        token = strtok(NULL,",");
        wavp[wpi][wpnum].alt = atof(token);
        token = strtok(NULL," ");
        break;
      case NHSPM: case NHSPF :  /* NTI SPCS m or ft */
        /* get state plane x value */
        token = strtok(data_str,".");   /* text */
        token = strtok(NULL,",");
        longitude = atof(token);
        if (coord_type == NHSPF)     /* convert to meters */
         longitude = longitude * FTTOM;
        /* convert to longitude dec degrees */
        lon = (ULLON - LRLON) * (longitude - LRX)/
           (ULX - LRX) + LRLON:
        /* get state plane y value, convert to latitude */
        token = strtok(NULL,",");
        latitude = atof(token);
        if(coord_type == NHSPF) /* convert to meters */
         latitude = latitude * FTTOM:
        /* convert to latitude dec degrees */
        lat = (ULLAT - LRLAT) * (latitude - LRY)/
           (ULY - LRY) + LRLAT;
        /* get altitude value */
        token = strtok(NULL,",");
        if(coord_type == NHSPM)
         wayp[wpi][wpnum].alt = atof(token);
        else
         wayp [wpi][wpnum].alt = atof(token) * FTTOM:
        break;
      }/* end switch */
    /* convert to longitude degrees, minutes, dec seconds */
    deg = modf(fabs(lon), &intpart);
    llon = (fabs(lon) - intpart) * 60 + (intpart * 100);
    if(llon >= 10000)
     sprintf(wayp[wpi][wpnum].lon_str, "%.4f",llon);
    else
    {
     strcpy(wayp[wpi][wpnum].lon_str,"0");
     sprintf(tmp_str,"%.4f",llon);
     strcat(wayp [wpi][wpnum].lon_str,tmp_str);
    }
    wayp[wpi][wpnum].lon = llon;
    if(lon < 0)
     strcpy(wayp [wpi][wpnum].lon_dir,"W"):
    else
     strcpy(wayp[wpi][wpnum].lon_dir,"E");
    deg = modf(fabs(lat), &intpart);
    llat = (fabs(lat) - intpart) * 60 + (intpart * 100);
    sprintf(wayp[wpi][wpnum].lat_str, "%.4f",llat);
    wayp[wpi][wpnum].lat = llat;
    if(lat < 0)
     strcp)(wayp[wpi][wpnum].lat_dir,"S");
    else
     strcpy(wayp[wpi][wpnum].lat_dir,"N");
    wpnum++;
    } /* if gets */
   } /* for */
   } /* ifstrstr */
  } /* ifgets */
 } /* while */
 fclose(wpfile);
 /* convert waypoints to ecef and store */
 if(wpnum != 0)
 {
  wp_on = TRUE;
  for (i = 0; i < wpnum; i++)
  {
   convert_lat_lon(waypa[wpi][i]);
```

```
  cnvt_to_ecef(&wayp[wpi][i]);
 }
 total_wps[wpi] = wpnum;
 }
}
}
/*----------------------------------------------------
Unit Name    : calc_navdata
Description : This routine is called to calculate the navigational parameters used by ATC.
----------------------------------------------------*/
calc_navdata(int wpindex, int curwvp, POINT *pp)
{
/**-local variables-*/
 double rpp;            /* radial vector for present position  */
 double xtrk_limit;     /* cross track limit                   */
 double range3D;        /* 3D range to waypoint                */
 double ppnextwpval;    /* param used to start wp tones        */
 double vdotr,denm;     /* calculation values for wpangle      */
 double wpangle;        /* angle used to determine wp indexing */
 double velm;           /* magnitude of velocity               */
 short first_time;      /* flag indicating 1st time wp         */
/* initializations */
first_time = FALSE;
wrong_way = FALSE;
/* initialize prev waypoint. if no waypoints set, prev waypoint
 is set to the 1st waypoint in the waypoint file */
if (currwp == NO_WP)
{
 prevwp[wpindex].x = pp->x;
 prevwp[wpindex].y = pp->y;
 prevwp[wpindex].z = pp->z;
 currwp = 0;
 range[wpindex] = 0;
 first_time = TRUE;
}
if(currwp != 0)
 prevwp[wpindex] = wayp[wpindex][currwp-1];
/* calculate 3D range to waypoint and display on screen */
range3D = calc_range(&wayp[wpindex][currwp],pp,D3);
/* calculate radial vector for current position */
rpp = sqrt((pp->x * pp->x) + (pp->y * pp->y) + (pp->z));
/* determine if pp is near the ground set xtrk_limit */
if((rpp - RA_MHT) < 50)
{
xtrk_limit = xtrk_parm / 7; /* ground navigation */
ppnextwpval = nextwpval / NEXTWP_FACTOR.
}
else
{
xtrk_limit = xtrk_parm; /* airborne navigation */
ppnext_val = nextwpval;
}
if (range3D < ppnextwpval)
 increm_wps = TRUE;
else /* check for wrong way automatic indexing of waypoint */
{
if ((range3D > range[wpindex]) && (increm_wps == FALSE) &&
   (first_time == FALSE))
{
/* calculate magnitude of velocity */
velm = sqrt(pp->x_vel*pp->x_vel + pp->y_vel + pp->z_vel + pp->z_vel);
if(velm > MINVEL)
{
 /* calculate 3D range to next waypoint and display
   on screen */
 if (currwp < total_wps[wpindex]-1)
  range3D = calc_range(&wayp[wpindex][currwp+1], pp,D3);
 /* calculate dot product between velocity and
   range components */
 vdotr = tnwp.x*pp->x_vel + tnwp.y*pp->v_vel + tnwp.z*pp->z_vel;
 denm = range3D * velm;
 wpangle = vdotr / denm
 if((wpangle > 0) && (wpangle < 1))
 {
 'if(currwp < total_wps[wpindex]-1)
  {
  currwp++;
  prewp[wpindex] = wayp[wpindex][curwp-1];
  }
  if (range3D < ppnext_val)
```

-continued

```
   increm_wps = TRUE;
  }
  else
  {
   wrong_way = TRUE;
   range3D = calc_range(&wayp[wpindex][currwp],pp,D3);
  }
 }
}
}
else
 increm_wps = FALSE;
}
wayp[wpindex][currwp].y,wayp[wpindex][currwp].z);
/* calculate 3-D cross track error and display */
calc_xtrack(&prevwp[wpindex],&wayp[wpindex][currwp],pp);
if(xtrack > xtrk_limit)
 off_course = TRUE;
else
 off_course = FALSE
/* store range for next position update */
range[wpindex] = range3D;
if (increm_wps == TRUE)
{
 if (currwp < total_wps[wpindex]-1)
  currwp++;
 else /* at end of waypoint processing */
  end_of_wps = TRUE;
}
return(currwp);
}
/*-------------------------------------------
Unit Name    : clear_veh_wps
Description  : clear_veh_wps clears the waypoints and reinitializes and resets all flags
               related to the processing of waypoints.
Inputs       : char veh_in - id of vehicle
---------------------------------------------*/
clear_veh_wps(char veh_in[5])
{
/--local variables--/
short vindex; /* index into vehicle database */
/* find vehicle in vehicle database */
vindex = find_veh_index(veh_in):
/* update global clearance status (remove vehicle's clearance) */
current_clearance = current_clearance - veh[vindex].clear_status;
/* reinitialize all flags and waypoint variables */
strcpy(veh_cleared,'[0]');
veh[vindex].clear_status = 0;
veh[vindex].on_off_course = FALSE:
veh[vindex].wpindex = NO_WP:
veh[vindex].currwp = NO_WP;
veh[vindex].xtrack = 0;
veh[vindex]. range = 0/
}
```

---

NAVIGATION CALCULATION SOFTWARE EXAMPLE
```
/***************************************************************
File Name : CALC.C
Description : calc.c contains the routines used to calculate the navigational parameters including
the 3D range to waypoint, 2D range to waypoint, 3D cross track error, bearing to waypoint, turn
information, and distance from true course
Units           : get_next_way,
                  calc_range,
                  calc_bearing,
                  calc_xtrack,
                  calc_deltas
***************************************************************/
/*-----------------------global include files--------------------------
#include <stdio.h>   /* standard input/output            */
#include <graph.h>   /* MSC graphics routines            */
#include <string.h>  /* MSC string routines              */
#include <stdlib.h>  /* MSC standard library             */
#include <math.h>    /* MSC math library                 */
#include "sio.h"     /* global definitions               */
#include "coord.h"   /* coordinate conversion factors    */
```

```
/*---------------external variables-----------------*/
extern double xtrack;      /* cross track error                          */
extern double dir:         /* direction to turn for correction           */
extern double updwnproj;   /* up/down distance from true course          */
extern double latdist;     /* n/s distance from true course              */
extern double prev_range;  /* previous 3D range value                    */
extern double range_3D;    /* current 3D range value                     */
extern int curr_way;       /* current waypoint index                     */
extern int wp_num;         /* number of waypoints                        */
extern short wrong_way;    /* wrong way indicator                        */
extern int nav_mode;       /* navigating mode                            */
extern double turn;        /* turn information                           */
extern int ppnextwpval;    /* value used to select next waypoint         */
/*---------------global variables-------------------*/
POINT___XYZ tnwp;          /* distance (vector) to the next waypoint     */
POINT_XYZ un;              /* unit normal                                */
POINT_XYZ q;               /* vector between previous and active wypnts  */
double ewcircum;           /* east/west circumference                    */
double nscircum;           /* north/south circumference                  */
double nsdist;             /* north/south distance                       */
double ewdist;             /* east/west distance                         */
int range_trend;           /* counter for # times range descreased       */
double tn_bearing;         /* true north bearing                         */
/*------------------------------------------
Unit Name    : get_next_way
Description  : This routine determines whether the waypoint should be automatically
               advanced to the next waypoint. The waypoint is advanced if the
               3D range to the waypoint is less than the distance threshold.
--------------------------------------------*/
get_next_way( )
{
/* if 3D range to the current waypoint is less than the predetermined threshold for automatic
advancement */
if (range_3D < ppnext_val)
{
/* if the current waypoint index is less than the total number of waypoints, then advance
   to the next */
if (curr_way < wp_num)
  curr_way++;
 }
}
/*---------------------------------------------
Unit Name    : calc_range
Description :   This routine calculates the 3D and 2D range from the present position to
                the waypoint.
Inputs       : wp - current waypoint
               pp - present position
               dmode - 2D or 3D
---------------------------------------------*/
double calc_range(POINT *wp, POINT *pp, short dmode)
{
/-local variables-/
double newrange;      /* calculated range */
if(dmode == D3) /* if 3D range */
{
tnwp.x = wp->x - pp->x;
tnwp.y = wp->y - pp->y;
tnwp.z = wp->z - pp->z;
newrange = sqrt((tnwp.x*tnwp.x) + (tnwp.y*tnwp.y) +
    (tnwp.z*tnwp.z));
return(newrange);
}
else /* 2D range */
 return(sqrt((nsdist*nsdist) + (ewdist*ewdist)));
}
/*-------------------------------------------------
Unit Name    : calc_bearing
Description : This routine calculates the bearing to the waypoint
Inputs       : pp - present position
               wp - current waypoint
Notes        : include exception handling for division by zero.
------------------------------------------------*/
double calc_bearing(POINT *pp, POINT *wp)
{
/-local variables-/
double r,rr,s0;            /* used in calculations              */
double denom:              /* denominator                       */
double pp_rc;              /* present position radius of curvature */
double wp_rc;              /* waypoint radius of curvature      */
```

```
double rcave;              /* average radius of curvature    */
double m_bearing:          /* magnetic north bearing         */
double pprad_lon, pprad_lat:  /* present pos lat / lon radians  */
double wprad_lon, wprad_lat:  /* waypoint lat / lon radians     */
/--present position calculations--/
r = sqrt(pow(pp->x,2) + pow(pp->y,2));
rr = sqrt(pow((1 - (pow(ec,2))),2) * r * r + pow(pp->z,2));
s0 = sqrt((pow(pp->z,2)) / (rr * rr));
denom = 1 - ec*ec * s0*s0;
pp_rc = sqrt((pow(eq,2)) / denom);
/--next way point calculations--/
r = sqrt(pow(wp->x,2) + pow(wp->y,2));
rr = sqrt(pow((1 - (pow(ec,2))),2) * r * r + pow(wp->z,2));
s0 = sqrt((pow(wp->z,2)) / (rr * rr));
denom = 1 - ec*ec * s0*s0;
wp_rc = sqrt(pow(eq,2) / denom);
/--calculate average radius of curvature--/
rcave = (pp_rc + wp_rc) / 2;
/* convert to radians */
pprad_lat = PI * pp->lat / 180;
pprad_lon = PI * pp->lon / 180;
wprad_lat = PI * wp->lat / 180;
wprad_lon = PI * wp->lon / 180;
/--calculate east/west circumference--/
ewcircum = rcave * cos(pprad_lat) * 2 * PI;
/--calculate north/south circumference--/
nscircum = b * 2 * PI;
/--calculate north/south distance--/
nsdist = nscircum * (wprad_lat - pprad_lat) / (2 * PI);
/--calculate east/west distance--/
ewdist = ewcircum * (wprad_lon - pprad_lon) / (2 * PI);
/* calculate true north bearing --**/
tn_bearing = (atan(ewdist/nsdist)) * 180 / PI:
/* adjust for true North course */
if ((ewdist > 0) && (nsdist > 0))
 tn_bearing = tn_bearing;
if((ewdist < 0) && (nsdist > 0))
 tn_bearing = tn_bearing + 360;
if (nsdist < 0)
tn_bearing = tn_bearing + 180;
/--calculate magnetic north bearing--/
m_bearing = tn_bearing + DECLINATION
return(m_bearing);
}
POINT_XYZ xtrk;     /* cross track vector (x,y,z) */
/*---------------------------------------------
Unit Name      : calc_xtrack
Description : This routine calculates the 3D cross track error.
Inputs         : pwvp - previous waypoint
                 awp - current waypoint
                 pp - present position
Notes          : include exception handling for division by zero.
-------------------------------------------*/
calc_xtrack(POINT *psp, POINT *awp, POINT *ppos)
{
/-local variables-/
POINT_XYZ qXtnwp;   /* cross product of q and tnwvp    */
POINT_XYZ npXq;     /* cross product of np and q       */
double magnitude;   /* magnitude of cross product      */
POINT_XYZ np;  /* unit vector perpendicular to plane formed by q and tnwp */
/* get distance (vector) between previous and active waypoints*/
q.x = awp->x - pwp->x;
q.y = awp->y - pwp->y;
q.z = awp->z - pwp->z;
/* get cross product of distance to next waypoint from current position (tnwp) and from previous
  waypoint (q) */
qXtnwp.x = q.y * tnwp.z - q.z * tnwp.y;
qXtnwp.y = q.z * tnwp.x - q.x * tnwp.z;
qXtnwp.z = q.x * tnwp.y - q.y * tnwp.x;
magnitude = sqrt(qXtnwp x*qXtnwp.x + qXtnwp).y*qXtnywp.y + qXtnwp.z*qXtnwp.z);
/* calculate unit vector perpendicular to the plane formed by q and tnwp */
np.x = qXtnwp.x / magnitude;
np.y = qXtnwp.y / magnitude;
np.z = qXtnwp.z / magnitude;
/* get cross product of np and q */
npXq.x = np.y * q.z - np.z * q.y;
npXq.y = np.z * q.x - np.x * q.z;
npXq.z = np.x * q.y - np.y * q.x;
magnitude = sqrt(npXq.x*npXq.x + npXq.y*npXq.y + npXq.z*npXq.z);
```

-continued

```
un.x = npXq.x / magnitude;
un.y = npXq.y / magnitude;
un.z = npXq.z / magnitude;
xtrack = un.x * tnwp.x + un.y * tnwp.y + un.z * tnwp.z;
/* calculate xtrack vector */
xtrk.x = un.x * xtrack;
xtrk.y = un.y * xtrack;
xtrk.z = un.z * xtrack;
dir = ppos->x * np.x + ppos->y * np.y + ppos->z * np.z;
}
double dp_lr; /* dot product of npv and ppos used in + display */
/*----------------------------------------------
Unit Name    : calc_deltas
Description  : This routine calculates the distance from the true course
Inputs       : pwp - previous waypoint
               awp - current waypoint
               ppos - present position
Notes        : include exception handling for division by zero
------------------------------------------*/
calc_deltas(POINT *pwp, POINT *awp, POINT *ppos)
{
/-local variables-/
POINT_XYZ vtrack adj;      /* adjusted position (normal to pp)            */
double mag_adj;            /* magnitude of adjusted position              */
POINT_XYZ uvadj;           /* vector from ctr of earth to adj             */
POINT_XYZ xtrkXadj;        /* cross product of xtrk and adj               */
double Xmag;               /* magnitude of cross product                  */
POINT_XYZ uvper;           /* vector perpendicular to plane formed by xtrk and uvadj */
POINT_XYZ npv;             /* cross product between previous and next waypoint */
double vlatxden, vlatyden; /* vector which lies in the plane              */
double vlatx, vlaty, vlatz; /* formed by uvadj and xtrk which             */
POINT_XYZ uvlat;           /* is perpend to the uvadj vector              */
double magvlat;            /* magnitude of vector                         */
/* determine the adjusted position (normal to pp) */
vtrack.x = un.x * xtrack;
vtrack.y = un.y * xtrack;
vtrack.z = un.z * xtrack;
adj.x = ppos->x + vtrack.x;
adj.y = ppos->y + vtrack.y;
adj.z = ppos->z + vtrack.z;
/* calculate magnitude of adjusted position */
mag_adj = sqrt(adj.x*adj.x + adj.y*adj.y + adj.z*adj.z);
/* determine the limit vector from center of mass of earth to adj point */
uvadj.x = adj.x/ mag_adj;
uvadj.y = adj.y/ mag_adj;
uvadj.z = adj.z/ mag_adj;
/* find the projection of the xtrack vector onto the limit vector this is the up/down offset
   from true course */
updwnproj = uvadj.x * xtrk.x + uvadj.y * xtrk.y + uvadj.z * xtrk.z.
/* calculate the cross product of xtrk and adj */
xtrkXadj.x = (xtrk.y * adj.z) - (xtrk.z * adj.y);
xtrkXadj.y = (xtrk.z * adj.x) - (xtrk.x * adj.z);
xtrkXadj.z = (xtrk.x * adj.y) - (xtrk.y * adj.x);
/* calculate the magnitude of the cross product */
Xmag = sqrt(xtrkXadj.x*xtrkXadj.x + xtrkXadj.y*xtrkXadj.y + xtrkXadj.z*xtrkXadj.z);
/* determine the vector perpendicular to the plane formed by the xtrk and uvadj vector (radial
   vector from earth's center to adj.) */
uvper.x = xtrkXadj.x / Xmag;
uvper.y = xtrkXadj.y / Xmag;
uvper.z = xtrkXadj.z / Xmag;
/* find the vector which lies in the plane formed by uvadj and xtrk which is perpendicular
   to the uvadj vector */
vlatxden = (( uvadj.y / uvper.y) * uvper.x - uvadj.x);
vlatx = ((-uvadj.y / uvper.y) * uvper.z + uvadj.z) /vlatxden;
vlatyden = (( uvadj.x / uvper.x) * uvper.y - uvadj.y);
vlaty = ((-uvadj.x / uvper.x) * uvper.z + uvadj.z) /vlatyden;
vlatz = 1;
magvlat = sqrt(vlatx*vlatx + vlaty*vlaty + vlatz*vlatz);
uvlat.x = vlatx / magvlat;
uvlat.y = vlaty / magvlat;
uvlat.z = vlatz / magvlat;
/* finally, calculate lat offset */
latdist = (xtrk.x * uvlat.x) + (xtrk.y * uvlat.y) + (xtrk.z * uvlat.z);
/* calculate cross product between previous and next waypoint */
npv.x = (pwp->y * awp->z) - (pwp->z * awp->y);
npv.y = (pwp->z * awp->x) - (pwp->x * awp->z);
```

-continued

```
npv.z = (pwp->x * awp->y) - (pwp->y * awp->x);
/* calculate dot product of npv with present position */
dp_lr = npv.x * ppos->x + npv.y * ppos->y + npv.z * ppos->z:
}
```

VEHICLE NAVIGATION DISPLAY SOFTWARE EXAMPLE

VEHICLE SCREEN
```
/*********************************************************
File Name :dispmsgs.c
Description :dispmsgs.c contains the routines used to display the data on the vehicle display
Units  : adj_lat
         calc_proj_pos
         extract_raw_v_msg
         disp_navdata
         display_sphd,
         display_stat
         display_time
         display_outline
         clear_wp_data
**********************************************************/
/*--------------global include files-------------------
#include <stdio.h>    /* standard input/output       */
#include <graph.h>    /* MSC graphics routines       */
#include <string.h>   /* MSC string routines         */
#include <stdlib.h>   /* MSC standard library        */
#include <math.h>     /* MSC math library            */
#include "sio.h"      /* global definitions          */
#include "coord.h"    /* coordinate definitions      */
#include "color.h"    /* color definitions           */
#include "veh.h"      /* vehicle definitions         */
/*-------------global definitions----------------------
#define GEOID 28.236         /* added to altitude value from raw 8 msg */
#define TONE_FACTOR 4        /* conversion for air/ground calculations */
#define NEXTWP_FACTOR 2.5    /* conv for air/ground calculations       */
/* constants identifying placement of data */
#define ST_LINE1 5
#define LINE1 2
#define LINE2 4
#define LINE2A 5
#define LINE2B 6
#define LINE2C 7
#define LINE3 11
#define LINE4 13
#define ST_3LINE 14
#define LINE5 15
#define LINE6 19
#define LINE7 20
#define LINEW 21
#define LINEW1 22
#define LINE8 23
#define LINE9 24
#define LINE10 25
#define FIELD1 17
#define FIELD2 40
#define FIELD3 67
#define HORZ 205 /* char used to separate screen areas */
/*--------------external procedures---------------------------*/
/*----coordinate convertion routines----*/
extern convert_lat_lon(POINT *coord);
extern cnvt_to_ecef(POINT *wp);
extern convert_ecef_to_dd(POINT *pp);
extern cnvt_neu_to_ecef(POINT *pp);
/*----waypoint calculation routines----*/
extern double calc_range(POINT *wp) POINT *pp, short dmode);
extern double calc_bearing(POINT *pp, POINT *wp)):
extern calc_xtrack(POINT *pwp, POINT *awp, POINT *pp);
extern calc_deltas(POINT *pwp, POINT *awp, POINT *pp):
extern get_next_wav(void);
extern clear_wp_data(void):
/*----graphics/audio routines----*/
extern spkr_off(void);              /* turns speaker off     */
extern spkr_on(unsigned freq);      /* turns speaker on      */
extern disp_graphics_screen(void);  /* displays graphics area */
```

-continued

VEHICLE NAVIGATION DISPLAY SOFTWARE EXAMPLE

```
extern draw_line(double range, double bearing, double course);
extern draw_cross(void);           /* draws cross hairs          */
extern display_all_vehs(void);     /* displays vehicles in map   */
extern short set_default_layer(void): /* sets map layer for veh  */
/*----processing functions---*/
extern chk_all_zones(POINT *pp):
extern chk_for_collisions(POINT *pp);
extern format_remote_msg(POINT *corr);
extern format_graphics_msg(POINT *corr);
extern send_msg(char *cmd_ptr);
/*----------------external variables-----------------------
extern VEHICLE_DATA veh[MAX_VEHS]:   /* vehicle database              */
extern POINT way_p[MAX_WP];          /* array of waypoints            */
extern short wp_on:                  /* flag - wp processing on       */
extern int curr_wav:                 /* current waypoint              */
extern int nextwpval;                /* param used to start wp tones  */
extern double proj_time:             /* time used in posn projection  */
extern int wp_num;                   /* current wp,index into array   */
extern char veh_id[8];               /* id of current vehicle         */
extern short veh_type;               /* type of vehicle               */
extern short gpsveh_type;            /* type of vehicle               */
extern short layer;                  /* graphics layer for vehicle    */
extern char gps_veh[8];              /* id of current gps vehicle     */
extern POINT_XYZ tnwp:               /* distance (vector) to next wp  */
extern double xtrk_parm:             /* xtrack factor                 */
extern short end_of_wps:             /* end of waypoints reached      */
extern short num___vehs:             /* num vehicles in database      */
extern char clear_msg[15]:           /* ATC clear waypoint message */
extern unsigned sport_addr:          /* address of port sending data  */
extern unsigned grarport;            /* id of port sending ack msg    */
extern short veh_clear_status        /* clearance status for vehicle  */
extern double dp_lr;                 /* crosshair left/right disp)    */
/*-------------------global variables----------------------*/
POINT prev_wp:                       /* previous waypoint             */
double xtrack;                       /* cross track error             */
double updwnproj:                    /* up/down distance to true course */
double latdist:                      /* lateral distance to true course */
POINT pp;                            /* present position              */
POINT raw;                           /* gps position prior to corrections */
double pp_course=0.0;                /* present position course       */
double range =0.0;                   /* 2d range to waypoint          */
double range_3D;                     /* range computed using 3 dims   */
double spd;                          /* speed                         */
double dir;                          /* direction                     */
short wrong_way;                     /* wrong way indication          */
char nav_mode[5];                    /* receiver mode                 */
double curr_course;                  /* current course                */
double delta_lat;                    /* conversion error for lat ecef */
short increm_wps=FALSE;              /* flag - increment wps based on angle */
short off_course;                    /* flag indicating pp is off course */
double ppnext|pval;                  /* param used to start wp tones  */
double xtrk_limit=200;               /* cross track limit             */
/*-----------------------------------------------------------------
Unit Name    : adj_lat
Description :This routine is called to determine the latitude adjustment factor. This is required to
offset the errors in the conversion from ecef back to latitude degrees minutes decimal minutes.
-------------------------------------------------------------------*/
adjust_lat( )
{
/--local variables--/
double orig_lat, uns_lat, new_lat;   /* latitude values   */
double r;
/* convert pp to decimal degrees */
convert_lat_lon(&pp);
/* convert present position to ecef */
cnvt_to_ecef(&pp);
/* save GPS position data before applying any corrections */
raw.lat = pp.lat;
raw.lon = pp.lon;
raw.alt = pp.alt;
raw.x = pp.x;
raw.y = pp.y;
raw.z = pp.z;
strcpy(raw.lat_strpp.lat_str);
strcpy(raw.lat_dir,pp.lat_dir);
strcpy(raw.lon_str,pp.lon_str)
strcpy(raw.lon_dir,pp.lon_dir);
```

-continued

VEHICLE NAVIGATION DISPLAY SOFTWARE EXAMPLE

```
/* convert updated ecef position (0 decimal degrees */
r = sqrt((pp.x * pp.x) + (pp.y * pp.y));
new_lat = atan(pp.z/(r * (1 − (ec * ec)))) * RADIANS.
/* calculate delta_lat to compensate for conversion errors */
delta_lat = pp.lat − new_lat;
/* convert neu velocities to ecef */
cnvt_neu_to_ecef(&pp);
}
/*----------------------------------------------
Unit Name   : calc_proj_pos
Description : This routine is called from display_correction to calculate a new position
              using the velocity and projection factors
----------------------------------------------*/
calc_proj_pos( )
{
/---local variables---/
POINT corr:                     /* corrected position    */
double uns___lat,newlat;        /* latitude values       */
double uns__lon,newlon;         /* longitude values      */
double r;                       /* calculation factor    */
int i;
/* calculate projected position using projection time store as new pp */
pp.x = pp.x + pp.x_vel * proj_time;
pp.y = pp.y + pp.v_vel * proj_time;
pp.z = pp.z + pp.z_vel * proj_time;
/* convert updated ecef position to decimal degrees */
convert_ecef_to_dd(&pp);
/* convert adjusted position to degrees, minutes, seconds */
uns_lat = fabs(pp.lat);
uns_lon = fabs(pp.lon);
newlat = (60*(uns_lat − floor(uns_lat))) + floor(uns_lat) * 100;
newlon = (60*(uns_lon − floor(uns_Ion))) + floor(uns_lon) * 100;
/* display projected (ie. corrected) position */
_settextposition(LINE7,24);
printf("%.4f N 0%.4f W %. 1f".fabs(newlat),fabs(newlon),pp.alt);
printf("(%. 1fFEET) ",pp.alt*MTOFT);
}
/*----------------------------------------------
Unit Name   : disp_navdata
Description : This routine is called by display_pos to calculate and display the
              navigational parameters shown in the bottom half of the vehicle screen.
----------------------------------------------*/
disp_navdata( )
{
/--local variables--/
double bearing;                 /* bearing to waypoint                  */
double corr_course = 0.0;       /* corrected course                     */
double check_course;            /* course used for comparison           */
double on_course;               /* on course                            */
double range_2D;                /* range computed using 3 dims          */
double vdotr,denm;              /* calculation values for wpangle       */
double wpangle;                 /* angle used to determine wp indexing  */
double velm;                    /* magnitude of velocity                */
double rpp;                     /* radial vector - present position     */
unsigned freq;                  /* frequency for speaker tones          */
short first_time;               /* flag indicating 1st time wp          */
spkr_off( );                    /* turn off speaker                     */
first_time = FALSE;
off_course = FALSE;
wrong_way = FALSE;
/* initialize prev waypoint. if no waypoints set., prev waypoint
   is set to the 1st waypoint in the waypoint file */
if (curr_3way == NO_WP)
{
  prev_wp = pp;
  curr_way = 0;
  range = 0;
  first_time = TRUE;
}
if(curr_way != 0)
  prev_wp = way_p[curr_way-1];
/* display waypoint on screen */
_settextposition(LINEW,24);
printf("%s %s %s %s %.1f ", way_p[curr_way].lat_str,
                            way_p[curr_way].lat_dir,
                            way_p[curr_way].lon_str,
                            way_p[curr_way].lon_dir,
```

VEHICLE NAVIGATION DISPLAY SOFTWARE EXAMPLE -continued

```
                    way_p[curr_way].alt);
/* display waypoint index */
_settextposition(LINEW,70);
printf("%d ",curr_way+1);
/* display previous waypoint on screen
_settextposition(LINEW1,24);
printf("%s %s %s %s %.1f  ", prev_wp.lat_str,
                             prev_wp.lat_dir,
                             prev_wp.lon_str,
                             prev_wp.lon_dir,
                             prev_wp.alt);
/* calculate 3D range to waypoint and display on screen */
range_3D = calc_range(&way_p[curr_way]&pp,D3);
_settextposition(LINE8,20);
printf("%.1f ",range_3D);
/* calculate radial vector for current position */
rpp = sqrt((pp.x * pp.x) + (pp.y * pp.y) + (pp.z * pp.z)):
/* if pp is near the ground, set xtrk_limit */
if((RA_MHT - rpp) < xtrk_limit)
{
   xtrk_limit = xtrk_parm/5; /* ground navigation */
   ppnextwpval = nextwpval/NEXTWP_FACTOR;
}
else
{
   xtrk_limit = xtrk_parm;    /* airborne navigation */
   ppnextwpval = nextwpval;
}
/* if within waypoint range increment to next waypoint */
if (range_3D < ppnextwpval)
increm_wps = TRUE;
else /* check for wrong way, automatic indexing of waypoint */
{
   if((range_3D > range) && (increm_wps == FALSE) &&
     (first_time == FALSE))
{
/* calculate magnitude of velocity */
velm = sqrt(pp.x_vel*pp.x_vet + pp.y_vel*pp.y_vel +
     pp.z_vel*pp.z_vel);
if(velm > MTNVEL)
{
/* calculate 3D range to next waypoint */
if (curr_way < wp_num)
range_3D = calc_range(&way_p[curr_way+1],&pp,D3);
/* calculate dot product between velocity and range */
vdotr = tnwp.x*pp.x_vel+tnwp.y*pp.y._3vel+tnwp,z*pp.z_vel;
denm = range_3D * velm;
wpangle = vdotr/denm;
if((wpangle > 0) && (wpangle < 1))
{
if (curr_way < wp_num)
  {
  curr way++;
  prev_wp = way_p[curr_way-1];
}
if (range_3D < ppnextwpval)
   increm_wps = TRUE;
}
else
{
   wrong_way = TRUE;
   range_3D = calc_range(&way_p[curr_way],&pp,D3);
   }
  }
 }
else
  increm_wps = FALSE;
}
/* calculate 3-D cross track error and display */
calc_xtrack(&prev_wp, &way_p[curr_way].pp);
_settextposition(LINE8,56);
printf("%.1f ",xtrack);
if(xtrack > xtrk_limit)
{
off_course = TRUE
printf("OFF COURSE  ")
}
```

-continued

VEHICLE NAVIGATION DISPLAY SOFTWARE EXAMPLE

```
else
 printf(" ");
/* calculate bearing to waypoint and display */
bearing = calc_bearing(&pp_,&way_p[curr_way]);
_settextposition(LINE9,66);
printf("%.0f ",bearing);
/* determine and draw range lines on range ring display */
draw_line(range_3D,bearing,curr_course);
/* calculate deviation from true course line */
calc_deltas(&prev_wp,&way_p[curr_way],&pp);
/* display direction comments */
_settextposition(LINE10,24);
printf("%.1f ",fabs(latdist));
if (dp_lr > 0)
  printf("RIGHT    ");
else
  printf("LEFT    ");
_settextposition(LINE10,44);
printf("%.1f ",fabs(updwnproj));
if(updwnproj < 0)
  printf("DOWN ");
else
  printf("UP ");
draw_alt(-updwnproj);
_settextposition(LINE10,60);
if (wrong_way)
  printf("WRONG WAY ")
else
  printf("    ")
if (curr_way > 0)
  draw_cross( );
range = range_3D;
if (increm_wps == TRUE)
{
if (curr_way < wp_num)
  curr_way++;
else /* at end of waypoint processing */
  end_of_wps = TRUE;
  veh_clear_status = 0;
  wp_on = FALSE;
  curr_way = NO_WP.
  wp_num = NO_WP.
  sport_addr = grarport;
  send_msg(clear_msg);
  clear_wp_data( );
 }
 }
}
/*--------------------------------------------------------
Unit Name:  extract_raw_msg
Description: This routine extracts the position and velocity information from the raw
             8 message and stores it in the pp structure.
Note: The raw 8 and other message types refer to a specific message string outputs from a
      Magnavox/Leica GPS Reciever used in reduction to practice prototype efforts.
Inputs:   pos_data; raw 8 message string
----------------------------------------------------*/
extract_raw_msg(char pos_data[MAX_3STR])
{
/--local variables--/
char *token;        /* field within file data line       */
short i;            /* loop counter                      */
short strlength;    /* calculated length of token        */
double degrees;     /* lat or lon degree value           */
short error;        /* indicates bad characters in msg field */
error = FALSE
token = strtok(pos_data," ");
if(token[0] == '8')
{
 /* UTC time */
 token = strtok(NULL," ");
 /* latitude */
 token = strtok(NULL, " ")
 degrees = atof(token);
 if(degrees == 0)
  error = TRUE
 if(degrees < 0)
 {
```

-continued

VEHICLE NAVIGATION DISPLAY SOFTWARE EXAMPLE

```
/* get rid of "-" sign */
 strlength = strlen(token) - 1;
 for (i = 0; i < strlength; i++)
  token[i] = token[i+1];
 token[strlength] = '[0]';
 }
 else
  strlength = strlen(token);
 switch (strlength)
 {
 case 1:
 strcpy(pp.lat_str,"0");
 strcat(pp.lat_str,token);
 break;
 case 2:
 strcpy(pp.lat_str,token);
 break;
 default:
 error = TRUE:
 } /* end switch */
 token = strtok(NULL," ");
 if (atof(token) == 0)
  error = TRUE;
 if(token[1]== '.')
  strcat(pp.lat str,"0");
 strcat(pp.lat_str,token);
 /* perform error check on lat string */
 if(strlen(pp.lat_str) == 9)
 {
 for (i=0; i < strlen(pp.lat.3str); i++)
 {
  if ((pp.lat_str[i] < '0') || (pp.lat_str[i] > '9'))
  {
  /* potential bad character - check for '.'*/
  if((i == 4) && (pp.lat_str[4]!='.'))
   error = TRUE;
  }
 }
 }
 else
  error = TRUE;
 if(degrees < 0)
  strcpy(pp.lat dir,"S");
 else
  strcpy(pp.lat dir,"N");
 /* longitude */
 token = strtok(NULL," ");
 degrees = atof(token);
 if (degrees == 0)
  error = TRUE;
 if(degrees < 0)
 {
  /* get rid of '-' sign */
  strlength = strlen(token) - 1;
  for (i = 0; i < strlength; i++)
   token[i] = token[i+1];
  token[strlength] = '[0]';
 }
 else
  strlength = strlen(token);
 switch (strlength)
 {
 case 1:
  strcpy(pp.lon_str,"00");
  strcat(pp.lon_str,token);
  break;
 case 2:
  strcpy(pp.lon_str,"0");
  strcat(pp.lon_str,token);
  break;
 case 3:
  strcpy(pp.lon_str,token);
  break;
 default:
  error = TRUE;
 }    /* end switch */
 token = strtok(NULL,"");
```

| VEHICLE NAVIGATION DISPLAY SOFTWARE EXAMPLE |
|---|

```
if (atof(token) == 0)
  error = TRUE;
if(token[1] == '.')
  strcat(pp.lon_str,"0");
strcat(pp.lon_str,token);
/* perform error check on lon string */
if (strlen(pp.lon_str) == 10)
{
  for (i=0; i < strlen(pp.lon_str); i++)
  {
    if ((pp.lon_str[i] < '0') || (pp.lon_str[i] > '9'))
    {
      /* potential bad character - check for '.'*/
      if((i == 5) && (pp.lon_str[5] !='.'))
        error = TRUE;
    }
  }
}
else
  error = TRUE;
if(degrees < 0)
  strcpy(pp_lon_dir,"W")
else
  strcpy(pp.lon_dir,"E");
/* altitude */
token = strtok(NULL,"");
for (i=0; i < strlen(token); i++)
{
  if ((token[i] < '0') || (token[i] > '9'))
  {
    /* potential bad character - check for '.'*/
    if ((token[i] != '.') && (token[i] != '-'))
      error = TRUE;
  }
}
pp.alt = atof(token) + GEOID;
/* north vel */
token = strtok(NULL,"");
for (i=0; i < strlen(token); i++)
{
  if ((token[i] < '0') || (token[i] > '9'))
  {
    /* potential bad character - check for '.'*/
    if ((token[i] != '.') && (token[i] != '-'))
      error = TRUE;
  }
}
pp.n_vel = atof(token);
/* east vel */
token = strtok(NULL, "");
for (i=0; i < strlen(token); i++)
{
  if ((token[i] < '0') || (token[i] > '9'))
  {
    /* potential bad character - check for '.'*/
    if ((token[i] != '.') && (token[i] != '-'))
      error = TRUE;
  }
}
pp.e_vel = atof(token);
/* up vel */
token = strtok(NULL,"");
for (i=0; i < strlen(token); i++)
{
  if((token[i] < '0') || (token[i] > '9'))
  {
    /* potential bad character - check for '.'*/
    if ((token[i] != '.') && (token[i] != '-'))
      error = TRUE;
  }
}
pp.u_vel = atof(token);
if(error == FALSE)
{
  adjust_lat( );      /* calculate lat adjustment factor */
  calc_proj_pos( );   /* calculate projected position */
  /* display position information */
```

-continued

VEHICLE NAVIGATION DISPLAY SOFTWARE EXAMPLE

```
 __settextposition(LINE6.24);
  printf("%s %s %s %s %,.1f",raw.lat__str.raw.lat__dir.
         raw.lon___str.raw.lon___dir.raw.alt);
strcpy(veh__id,gps__veh);       /* restore gps vehicle id        */
veh__type = gpsveh__type;       /* restore gps vehicle type      */
layer = set__default__layer( ); /* restore vehicle map layer     */
format__remote__msg(&pp);       /* send pos to remote vehicles   */
chk__all__zones(&pp);           /* check for incursion into zone */
/* if current vehicle has full access and there are other vehicles in its vicinity */
if((gpsveh__type == FULL__GRND) && (num__vehs > 0))
{
for (i = 0; i < num__vehs; i++)
 {
 /* reset each vehicle's layer to default color */
 veh__type = veh[i].veh__type;
 veh[i].layer__id = set__default__layer( );
 }
/* reset current vehicle type */
veh__type = gpsveh__type;
/* perform collision prediction */
chk__for__collisions(&pp);
 display__all__vehs( );     /* display remaining vehicles */
}
/* if current vehicle has a display screen */
if(gpsveh__type != LIM__GRND)
format__graphics__msg(&pp);/* send pos to map display */
/* if waypoint processing enabled, perform wp processing */
if (wp__on == TRUE)
 disp__navdata();
  }/* if error */
}/* if"8" */
}
/*--------------------------------------------------
Unit Name    :display__sphd
Description  : This routine displays the speed and heading data (derived from the 011 message) on
the vehicle screen.
Inputs       : msg__in – 011 GPS message
--------------------------------------------------*/
display__sphd(char msg__in[MAX__STR])
{
/--local variables--/
char *token;      /* character field      */
char speed[6];    /* speed over ground    */
char course[6];   /* course over ground   */
token = strtok(msg__in,",");  /* get 1st field - $PMVXG  */
token = strtok(NULL, ",");    /* get 2nd field - msg code */
token = strtok(NULL, ",");    /* get 3rd field - COG      */
if (strlen(token) == 5)
 strcpy(course,token);
else
 strcpy(course, "000.0")
token = strtok(NULL, ",");    /* get 4th field - SOG      */
__settextposition(LINE9,37);
if(strlen(token) == 5)
 strcpy(speed,token);
else
 strcpy(speed,"000.0");
printf("%s",speed);
/* if speed is less than 1, display 0 course */
spd = atof(speed);
__settextposition(LINE9,51);
if(spd < 1)
 strcpy(course,"000.0");
printf("%s",course);
curr__course = atof(course);
pp__course = atof(course);
}
/*--------------------------------------------------
Unit Name   : display__stat
Description : This routine displays the number of svs tracked (derived from the 00 message) on
the vehicle screen.
Inputs      : msg__in – 000 GPS message
--------------------------------------------------*/
display__stat(char msg__in [MAX__STR])
{
/--local variables--/
char *token;     /* character field    */
```

-continued

VEHICLE NAVIGATION DISPLAY SOFTWARE EXAMPLE

```
char *svs;        /* svs visible     */
int svs_trk;      /* svs tracked     */
short i;
/* initialize nav_mode string */
for (i = 0; i < 5; i++)
nav_mode[i] = '[0]';
token = strtok(msg_in,",");   /* get 1st field - $PMVXG  */
token = strtok(NULL, ",");    /* get 2nd field - msg code */
token = strtok(NULL, ",");    /* get 3rd field - status   */
strncpy(nav_mode,token,3);
nav_mode[3] = '[0]';
/* display nav_mode */
_settextposition(LINE9,9);
printf("%s",nav_mode);
token = strtok(NULL, ",");    /* get 4th field - svs visible */
svs_trk = atof(token);
_settextposition(LINE9,18);
printf("%d",svs_trk);
svs = strtok(NULL, ",");      /* get 5th field - svs tracked */
_settextposition(LINE9,26);
svs_trk = atof(svs);
printf("%d ",svs_trk):
}
/*------------------------------------------------
Unit Name     : display_time
Description   : This routine displays the time field (derived from the 001 message)
                on the vehicle screen.
Inputs    : msg_in - 001 GPS message
--------------------------------------------------*/
display_time(char msg_in[MAX_STR])
{
/--local variables--/
char *token;                /* character field          */
char gps_time[1];           /* gps message time         */
token = strtok(msg_in,",")  /* get 1st field - $PMVXG   */
token = strtok(NULL,",")    /* get 2nd field - msg code */
token = strtok(NULL,",");   /* get 3rd field - gps time */
/* check validation of time field */
if (strlen(token) == 6)
 strcpy(gps_time,token);
else
 strcpy(gps_time, "000000"):
/* display time */
_settextposition(LINE6,66);
printf("%s",gps_time);
}
/*------------------------------------------------------
Unit Name     : display_outline
Description   : This routine displays the outline (field labels and screen lines) for the vehicle screen.
--------------------------------------------------------*/
display_outline( )
{
_settextposition(LINE6,3):
_outtext("GPS POSITION:");
_settextposition(LINE6,60);
_outtext("TIME:");
_settextposition(LINE7,3);
_outtext("CORRECTED POSITION:");
_settextposition(LINEW,3);
_outtext("CURRENT WAYPOINT:");
_settextposition(LINEW,60);
_outtext("WP INDEX:");
_settextposition(LINEW1,3);
_outtext("PREVIOUS WAYPOINT:");
_settextposition(LINE8,3);
_outtext("3-D RANGE TO WP:");
_settextposition(LINE8,38);
_outtext("3-D XTRACK ERROR:");
_settextposition(LINE9,3);
_outtext("MODE:");
_settextposition(LINE9,13),
_outtext("VIS:");
_settextposition(LINE9,21);
_outtext("TRK:");
_settextposition(LINE9,30)
_outtext("SPEED:");
_settextposition(LINE9,43)
```

VEHICLE NAVIGATION DISPLAY SOFTWARE EXAMPLE

```
_outtext("COURSE:");
_settextposition(LINE9,57);
_outtext("BEARING:");
_settextposition(LINE10,3);
_outtext("DIST TO TRUE COURSE:");
disp_graphics_screen( );
disp_cross_screen( );
}
/*------------------------------------------
Unit Name    : clear_wp_data
Description  : This routine clears the currently displayed waypoint data.
---------------------------------------------*/
clear_wp_data( )
{
disable_disp( );
_clearscreen(_GCLEARSCREEN);
display_outline( );
re_enable_disp( );
}
```

COMPASS DISPLAY SOFTWARE EXAMPLE

```
/*********************************************************
File Name    :compass.c
Description : compass.c contains the routines used to display the compass rose presentation on the
vehicle screen.
Units        : draw_range_rings,
               disp_graphics_screen,
               calc_angle,
               draw_legend,
               draw_line,
               draw_alt
**********************************************************/
/*--------------------global include files----------------------*/
#include <stdio.h>   /* standard input/output     */
#include <graph.h>   /* MSC graphics routines     */
#include <string.h>  /* MSC string routines       */
#include <math.h>    /* MSC math library          */
#include "sio.h"     /* global definitions        */
#include "color.h"   /* color definitions         */
#include "coord.h"   /* coordinate definitions    */
/*----------------global definitions--------------*/
#define MAX_LINE 110.0 /* maximum line length in pixels */
#define CENTERX 519    /* x coord for circle center     */
#define CENTERY 119    /* y coord for circle center     */
#define RING_COLM 43   /* starting column               */
#define RING_ROW       /* starting mw                   */
/*----------------global variables---------------*/
int prev_ht;                    /* previous height to draw altitude box */
int brg_dx, brg_dy;             /* endpoint of previous bearing line    */
int maxbrg_dx, maxbrg_dy;       /* endpoint of previous bearing line    */
int crse_dx, crse_dy;           /* endpoint of previous course line     */
int maxcrse_dx, maxcrse_dy:     /* endpoint of previous course line     */
short prev_lines;               /* previous value entered for lines     */
short prev_alt;                 /* previous value entered for altitude  */
/*--------------------------------------------------
Unit Name    : draw_range_rings
Description  : This routine is draws the range rings.
-------------------------------------------------*/
draw_range_rings( )
{
_setcolor(LIGHT_GREEN):
_ellipse(_GBORDER,497,97,541,141);
_setcolor(YELLOW);
_ellipse(_GBORDER,475,75,563,163);
_setcolor(LIGHT_RED);
_ellipse(_GBORDER,453,53,585,185);
_setcolor(LIGHT_BLUE);
_ellipse(_GBORDER,431,31,607,207):
_setcolor(BRIGHT_WHITE);
_ellipse(_GBORDER,409,9,629,229);
_setcolor(GREEN):
```

-continued

COMPASS DISPLAY SOFTWARE EXAMPLE

```
/********************************************************
_moveto(519,0);
_lineto(519,239);
_moveto(399,119);
_lineto(639,119);
}
/* row and column values for altitude area */
#define ALT_STARTX 324
#define ALT_STOPX 334
#define ALT_Y 129
/*-----------------------------------------------
Unit Name    : disp_graphics_screen
Description : This routine is called by draw_outline to display the outline of the graphical range
ring presentation. It calls draw_range_rings to display the rings.
-------------------------------------------------------------------*/
disp_graphics_screen( )
{
/--local variables--/
short i;            /* loop counter */
prev_ht = 0;
brg_dx = 0;
brg_dy = 0;
crse_dx = 0;
crse_dy = 0;
prev_alt = FALSE;
prev_lines = FALSE;
_setcolor(GREEN);
_rectangle(_GBORDER,319,0,639,240);
_rectangle(_GBORDER,0,0,240,240);
_settextposition(RING_ROW,RING_COLM-2);
_settextcolor(BRIGHT_WHITE);
_outtext("RING SCALE");
_settextposition(2,77);
_outtext("NE");
_settextposition(14,77);
_outtext("SE");
_settextposition(2,53);
_outtext("NW");
_settextposition(14,53);
_outtext("SW");
_settextposition(15,52);
_settextcolor(BRIGHT_WHITE):
_outtext("COURSE");
_settextposition(15,73),
_settextcolor(LIGHT_RED);
_outtext("BEARING");
/* draw line to separate rings from up/down area */
_moveto(400,0);
_lineto(400,240);
_moveto(319,109);
_lineto(399,109);
draw_range_rings( );
/* draw in altitude scale area */
_settextposition(RING_ROW+7,RING_COLM-2);
_settextcolor(BRIGHT_WHITE);
_outtext("ALTITUDE"):
_settextposition(RING_ROW+9,RING_COLM+4);
_outtext(" ");
_settextposition(RING_ROW+3,RING COLM+4);
___outtext(" ");
/* draw scale lines */
_setcolor(BRIGHT_WRITE):
for(i=0;i< 11;i++)
{
_moveto(ALT_STARTX,ALT_Y + 10 * i);
_lineto(ALT_STOPX, ALT_Y + 10 * i);
}
_moveto(ALT_STOPX, 179);
_lineto(399,179);
}
int dx, dy;
double d, dr;
/*----------------------------------------
Unit Name    : calc_angle
Description : This routine calculates the endpoints for the course or bearing lines.
Inputs       : double angle - current course or bearing
-----------------------------------------*/
```

-continued

COMPASS DISPLAY SOFTWARE EXAMPLE

```
/*********************************************************
calc_angle(double angle)
{
angle = angle/RADIANS:
if((0 <= angle) && (angle <90))
{
dx = dr * sin(angle);
dy =- (dr * cos(angle));
}
if ((90 <= angle) && (angle < 180))
{
dx = dr * cos(angle - 90);
dy = dr * sin(angle - 90);
}
if((180 <= angle) && (angle < 270))
{
dx =- (dr * sin(angle - 180));
dy = dr * cos(angle - 180);
}
if((270 <= angle) && (angle < 360))
{
dx =- (dr * sin(angle - 270));
dy =- (dr * cos(angle - 270));
}
}
/*----------------------------------------
Unit Name    : draw_legend
Description : This routine is displays the legend corresponding to the range rings.
Input       : short range_scale - current scale
----------------------------------------*/
draw_legend(short range_scale)
{
_settextposition(RING_ROW+1, RING_COLM);
_settextcolor(LIGHT_GREEN);
switch (range_scale)
{
case 1:
_outtext("100 KM")
_settextposition(RING_ROW+2,RING_COLM);
_settextcolor(YELLOW);
_outtext("200 KM");
_settextposition(RING_ROW+3,RING_COLM);
_settextcolor(LIGHT_RED);
_outtext("300 KM");
_settextposition(RING_ROW+4,RING_COLM);
_settextcolor(LIGHT_BLUE);
_outtext("400 KM");
_settextposition(RING_ROW+5,RING_COLM);
_settextcolor(BRIGHT_WHITE);
_outtext("500 KM");
break;
case 2:
_outtext("20 KM");
_settextposition(RING_ROW+2,RING_COLM);
_settextcolor(YELLOW);
_outtext("40 KM");
_settextposition(RING_ROW+3,RING_COLM);
_settextcolor(LIGHT_RED);
_outtext("60 KM"):
_settextposition(RING_ROW+4,RING_COLM);
_settextcolor(LIGHT_BLUE);
_outtext("80 KM"):
_settextposition(RING_ROW+5,RING_COLM);
_settextcolor(BRIGHT_WHITE);
_outtext("100 KM");
break;
case 3:
_outtext("2 KM ");
_settextposition(RING_ROW+2,RING_COLM);
_settextcolor(YELLOW);
_outtext("4 KM"):
_settextposition(RING_ROW+3,RING_COLM);
_settextcolor(LIGHT_RED);
_outtext("6 KM ");
_settextposition(RING_ROW+4,RING_COLM);
_settextcolor(LIGHT_BLUE);
_outtext("8 KM ");
```

-continued

COMPASS DISPLAY SOFTWARE EXAMPLE

```
/*********************************************************
_settextposition(RING_ROW+5,RING_COLM);
_settextcolor(BRIGHT_WHITE);
_outtext("10 KM ");
break;
case 4:
_outtext("200 M ");
_settextposition(RING_ROW+2,RING_COLM);
_settextcolor(YELLOW);
_outtext("400 M ");
_settextposition(RING_ROW+3,RING_COLM);
_settextcolor(LIGHT_RED);
_outtext("600 M ");
_settextposition(RING_ROW+4,RING_COLM);
_settextcolor(LIGHT_BLUE);
_outtext("800 M ");
_settextposition(RING_ROW+5,RING_COLM);
_settextcolor(BRIGHT_WHITE);
_outtext("1000 M");
break;
case 5
_outtext("20 M ");
_settextposition(RING_ROW+2,RING_COLM);
_settextcolor(YELLOW);
_outtext("40 M ")
_settextposition(RING_ROW+3,RING_COLM);
_settextcolor(LIGHT_RED);
_outtext("60 M ");
_settextposition(RING_ROW+4,RING_COLM);
_settextcolor(LIGHT_BLUE);
_outtext("80 M ");
_settextposition(RING_ROW+5,RING_COLM);
_settextcolor(BRIGHT_WHITE);
_outtext("100 M ");
break;
case 6
_outtext("5 M ");
_settextposition(RING_ROW+2,RING_COLM);
_settextcolor(YELLOW);
_outtext("10 M ");
_settextposition(RING_ROW+3,RING_COLM);
_settextcolor(LIGHT_RED);
_outtext("15 M ");
_settextposition(RING_ROW+4,RING_COLM);
_settextcolor(LIGHT_BLUE).
_outtext("20 M ");
_settextposition(RING_ROW+5,RING_COLM);
_settextcolor(BRIGHT_WHITE);
_outtext("25 M ");
break;
}
}
/*--------------------------------------------------
Unit Name      : draw_line
Description : This routine draws the course and bearing lines on the range ring display. The
endpoints of the lines are determined by calc_angle. The range rings are redrawn every time the
lines are redrawn.
Inputs         : range, bearing course - current values
--------------------------------------------------*/
draw_line(double range double bearing double course)
{
/--local variables--/
double max_range;
if(range > 100000)
{
draw_legend(1);
d = 500000.0/MAX_LINE;
max_range = 500000;
}
if((10000 < range) && (range <= 100000))
{
draw_legend(2);
d = 100000.0/MAX_LINE;
max_range = 100000;
}
if((1000 < range) && (range <= 100000))
{
```

-continued

COMPASS DISPLAY SOFTWARE EXAMPLE

```
/********************************************************
draw_legend(3);
d = 10000.0/MAX_LINE;
max_range = 100000;
}
if((100 < range) && (range <= 1000))
{
draw_legend(4);
d = 1000.0/MAX_LINE;
max_range = 10000;
}
if((25 < range) && (range <= 100))
{
draw_legend(5);
d = 1000/MAX_LINE;
max_range = 100;
}
if((0 <= range) && (range <= 25))
{
draw_legend(6);
d = 25.0/MAX_LINE:
max_range = 25:
/* erase previous bearing and course lines */
if(prev_lines == TRUE)
{
_setcolor(BLACK);
_moveto(CENTERX,CENTERY);
_lineto(CENTERX + brg_dx, CENTERY + brg_dy);
_moveto(CENTERX,CENTERY);
_lineto(CENTERX + crse_dx, CENTERY + crse_dy);
/* erase max range lines */
_setcolor(BLACK);
_moveto(CENTERX,CENTERY);
_lineto(CENTERX + maxbrg_dx, CENTERY + maxbrg_dy);
_moveto(CENTERX,CENTERY);
_lineto(CENTERX + maxcrse_dx, CENTERY + maxcrse_dy);
}
draw_range_rings( );
prev_lines = TRUE;
/* draw max bearing line */
_setcolor(LIGHT_RED);
if(range > 500000)
 dr = 500000/d; /* maximum line length */
else
 dr = max_range/d;
calc_angle(bearing);
maxbrg_dx = dx;
maxbrg_dy = dy;
_moveto(CENTERX,CENTERY);
_lineto(CENTERX + dx, CENTERY + dy);
if(range > 500000)
 dr = 500000/d;/* maximum line length */
else
 dr = range/d;
calc_angle(bearing);
brg_dx = dx;
brg_dy = dy;
_setcolor_YELLOW);
_moveto(CENTERX,CENTERY);
_lineto(CENTERX + dx, CENTERY + dy);
/* draw max course line */
_setcolor(BRIGHT_WHITE);
if(range > 500000)
 dr = 500000/d; /* maximum line length */
else
 dr = max_range/d;
calc_angle(course);
maxcrse dx = dx;
maxcrse_dy = dy;
_moveto(CENTERX,CENTERY);
_lineto(CENTERX + dx, CENTERY + dy);
if(range > 500000)
 dr = 500000/d; /* maximum line length */
else
 dr = range/d;
calc_angle(course);
crse_dx = dx;
```

COMPASS DISPLAY SOFTWARE EXAMPLE

```
/********************************************************
crse_dy = dy;
_setcolor(CYAN);
_moveto(CENTERX,CENTERY);
_lineto(CENTERX + dx, CENTERY + dy);
}
/*----------------------------------------------
Unit Name     : draw_alt
Description : This routine draws the altitude representation on the graphic display.
Inputs        : alt - current altitude
----------------------------------------------*/
draw_alt(double alt)
{
/--local variables--/
int full_scale;       /* scale factor       */
double vert_offset;   /* vertical offset    */
int ht;               /* height             */
_settextcolor(BRIGHT_WHITE);
if(fabs(alt) > 1000)
 full_scale = 10000;
if((fabs(alt) <= 1000) && (fabs(alt) > 100))
 full_scale = 1000;
if((fabs(alt) <= 100) && (fabs(alt) > 10))
 full_scale = 100;
if (fabs(alt) <= 10)
 full_scale = 10;
_settextposition(RING_ROW+8,RING_COLM+2);
printf("%d ",full_scale);
settextposition(RING_ROW+14,RING_COLM+2);
printf("%d ",full_scale);
/* erase previous altitude box */
if(prev_alt == TRUE)
{
_setcolor(BLACK);
_rectangle(_GFILLINTERIOR,339,179 + prev_ht,346,179);
}
vert_offset =- (alt/full_scale);
if(fabs(alt) >= 10000)
{
if(alt < 0)
  vert_offset = 1;
else
  vert_offset = -1;
}
ht = vert_offset * 50;
prev_ht = ht;
prev_alt = TRUE;
/* draw box */
_setcolor(LIGHT_GREEN);
_rectangle_GFILLINTERIOR,339,179 + ht,346,179);
}
```

PRECISION APPROACH CROSSHAIR DISPLAY SOFTWARE EXAMPLE

```
/********************************************************
File Name    : fltnav.c
Description  : fltnav.c contains the routines used to display the precision navigation cross
               hairs display on the vehicle screen.
Units        :draw_cross_scale,
              disp_cross_graphics,
              disp_scale,
              det_axis_scale.
              erase_prev_cross,
              draw_cross
********************************************/
/*----------------global include files-------------*/
#include <stdio.h>    /*standard input/output   */
#include <graph.h>    /* MSC graphics routines  */
#include <string.h>   /* MSC string routines    */
#include <math.h>     /* MSC math library       */
#include "sio.h"      /* global definitions     */
#include "color.h"    /* color definitions      */
#include "coord.h"    /* coordinate definitions */
```

-continued

```
/*-------------external variables--------------------*/
extern double latdist;       /* lateral distance to true course   */
extern double updwnproj; /* up/down distance to true course */
extern int prevx, prevy, /* previous cross center point       */
extern double dp_lr;         /* used in crosshair left/right disp */
/* constants for graphics display */
#define LEFT_LINE 114
#define RIGHT_LINE 124
#define SCALE_OFFSET 24
#define CENTER   120
char vertstr[15]; /* vertical string */
/*-------------------------------
     Unit Name  : draw_cross_rings
     Description : This routine is draws the range scale for the cross hair display.
---------------------------------*/
draw_cross_scale()
{
    /-- local variables --/
    short line=0;
    short i;
    _setcolor(BLACK);
    /* draw black rectangles to clean any cross marks outside graph */
    _rectangle(_GFILLINTERIOR,241,0,258,241);
    _rectangle(_GFILLINTERIOR,0,241,258,258);
    /* draw vertical axis tic marks */
    for (i = 0; i < 10; i++)
    {
       line = line + SCALE_OFFSET;
       _moveto(LEFT_LINE,line);
       _lineto(RIGHT_LINE,line);
    }
    /* draw horizontal axis tic marks */
    line = 0;
    for (i = 0; i < 10; i++)
    {
       line = line + SCALE_OFFSET;
       _moveto(line, LEFT_LINE);
       _lineto(line, RIGHT_LINE);
    }
    _moveto(120,0);
    _lineto(119,240);
    _moveto(0,120);
    _lineto(240,120);
}
/*-------------------------------
     Unit Name :disp_cross_graphics
     Description : This routine is draws and fills the rectangular area used for the cross hair display.
----------------------------------------------*/
disp_cross_graphics()
{
    _setcolor(BRIGHT_WHITE);
    _rectangle(_GFILLINTERIOR,0,0,240,240);
}
int vert_scale: /* vertical scale */
int horz_scale; /* horizontal scale */
/*-----------------------------
     Unit Name  : disp_scale
     Description : This routine is draws the vertical string displayed to the right of the cross hair
                   display.
-------------------------------------------*/
disp_scale()
{
    /-- local variables --/
    int startline=3;
    int i;
    for (i = 0; i < strlen(vertstr); i++)
    {
       _settextposition(startline+i,34);
       printf("%c",vertstr[i]);
    }
}
/*--------------------------------------
     Unit Name  : det_axis_scale
     Description : This routine is determines the axis scale for the cross hair display.
----------------------------------------*/
int det_axis_scale(double distval)
{
    /--local variables--/
    double u;
```

```
        int scale;
        u = fabs(distval);
        scale = 50;
        return(scale);
}
#define WIDTH 5
#define HEIGHT 18
        Unit Name  : erase_prev_cross
        Description : This routine erases the cross symbol previously displayed on the
                      cross hair display.
--------------------------------------*/
erase_prev_cross()
{
        /* erase vertical cross line */
        _setcolor(BRIGHT_WHITE);
        _rectangle(_GFILLINTERIOR,prevx-WIDTH,prevy-HEIGHT,
            prevx+WIDTH,prevy+HEIGHT):
/* erase horizontal cross line */
_rectangle(_GFILLINTERIOR,prevx-HEIGHT,prevy-WIDTH,
            prevx+HEIGHT,prevy+WIDTH);
}
/*----------------------------------
        Unit Name  : draw_cross
        Description : This routine draws the cross symbol on the cross hair display.
----------------------------------*/
draw_cross()
{
        /-- local variables --/
        double mag;
        int centerx,centery;
        erase_prev_cross();
        draw_cross_scale();
        mag = fabs(latdist);
        if(mag > 50)
        mag = 50;
horz_scale = det_axis_scale(mag);
if (dp_lr > 0) /* TURN RIGHT */
{
        _settextposition(17,11);
        centerx = CENTER - (mag/horz_scale) * CENTER:
        if(fabs(latdist) > 2)
            _outtext("TURN RIGHT");
        else
            _outtext("      ");
}
else /* TURN LEFT */
{
        _settextposition(17,11);
        centerx = CENTER + (mag/horz_scale) * CENTER:
        if(fabs(latdist) > 2)
            _outtext("TURN LEFT");
        else
            _outtext("      ");
}
vert_scale = det_axis_scale(updwnproj);
if (updwnproj > 50)
        updwnproj = 50;
if (updwnproj < -50)
        updwnproj = -50;
if (updwnproj >= 0)
{
        centery = CENTER + (fabs(updwnproj)/vert_scale) * CENTER:
        if (fabs(updwnproj) > 2)
            strcpy(vertstr,"GO UP");
        else
            strcpy(vertstr,"      ");
}
else
{
        centery = CENTER - (fabs(updwnproj)/vert_scale) * CENTER;
        if (fabs(updwnproj) > 2)
            strcpy(vertstr,"GO DOWN ");
        else
            strcpy(vertstr,"      ");
}
disp_scale();
/* draw vertical cross line */
_rectangle(_GFILLINTERIOR,centerx-WIDTH,centery-HEIGHT,
        centerx+WIDTH,centery+HEIGHT);
```

-continued

```
/* draw horizontai cross line */
_rectangle(_GFILLINTERIOR,centerx-HEIGHT,centery-WIDTH,
        centerx+HEIGHT,centery+WIDTH);
    prevx = centerx;
    prevy = centery;
}
/*-----------------------------
    Unit Name  : disp_cross_screen
    Description : This routine draws the cross display graphics template on the vehicle display.
    --------------------------------------------*/
    disp_cross_screen()
    {
    disp_cross_graphics();
    draw_cross_scale();
}
```

AC&M SUBSYSTEMS
COMMUNICATIONS PROCESSOR AND COMMUNICATION FLOW

Figure 22:
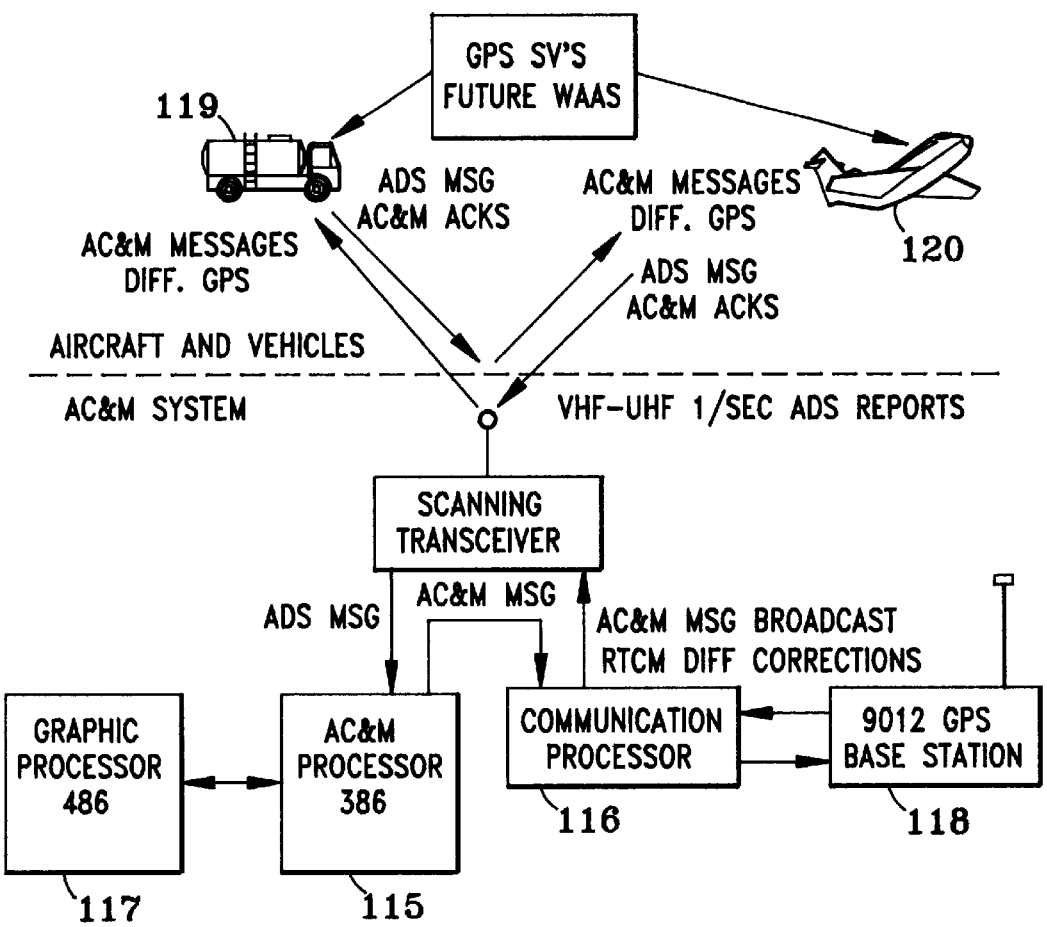
FIG. 22 depicts the demonstration system airport communications diagram showing processor, DGPS base station, radio elements and message flows.

The processing of data communications within the airport is a key element of any GPS-based airport control and management system. A minimum of three types of messages must be addressed:

(1) the broadcast of Differential GPS correction messages to the vehicles (2) the transmission and receipt of Automatic Dependent Surveillance (ADS) messages (3) the transmission of control messages from the AC&M to the vehicle and vice versa A high level block diagram of the Airport Communications System and its interfaces to other major elements of the AC&M subsystem is provided in FIG. 22.

In this design, all ADS and A/V messages are received by the AC&M Processor 115 and are forwarded to the COMM Processor 116 for re-transmission to the vehicles. The AC&M Processor is also used to compose ATC messages which are also forwarded to the vehicles through the COMM interface or passed to the local Graphics Processor 117 to control the situation display presentation. The COMM processor 116 also transmits the differential correction messages generated by the reference station 118 directly to the vehicles.

DIFFERENTIAL GPS OVERVIEW

Real time differential correction techniques compensate for a number of error sources inherent to GPS. The ideal is simple in concept and basically incorporates two or more GPS receivers, one acting as a stationary base station 118 and the other(s) acting as roving receiver(s) 119, 120. The differential base station is "anchored" at a known point on the earth's surface. The base station receives the satellite signals, determines the errors in the signals and then calculates corrections to remove the errors. The corrections are then broadcast to the roving receivers.

Real time differential processing provides accuracy of 10.0 meters or better (typically 1.0–5.0 meters for local differential corrections). The corrections broadcast by the base station are accurate over an area of about 1500 km or more. Typical positional degradation is approximately a few millimeters of position error per kilometer of base station and roving receiver separation.

Through the implementation of local differential GPS techniques. SA errors are reduced significantly while the atmospheric error are almost completely removed. Ephemeris and clock errors are virtually removed as well.

ANTENNA PLACEMENT

A site survey of potential differential base station sites should be performed to determine a suitable location for the GPS antenna. The location should have a clear view of the sky and should not be located near potentially reflective surfaces (within about 300 meters). The antenna site should be away from potentially interfering radiation sources such as radio, television, radar and communications transmitters. After a suitable site is determined, a GPS survey should be conducted to determine the precise location of the GPS antenna—preferably to centimeter level accuracy. This should be performed using survey grade GPS equipment.

Survey grade GPS equipment makes use of the 19 and 21 centimeter wavelength of the L1 and L2 GPS transmissions. Real time kinematic or post processings GPS surveys may be conducted. Real time kinematic utilizes a base station located at a precise location which broadcasts carrier phase correction and processing data to a radio receiver and processing computer. Code, carrier integral cycles and carrier phase information are used at the survey site to calculate the WGS 84 antenna position. In the post processing survey mode, subframe information, time, code, carrier, and carrier phase data are collected for a period time. This data is later post processed using precise ephemerides which are available from a network of international GPS sites. The collected information is then post processed with post-fit precise orbital information.

BASE STATION OPERATIONAL ELEMENTS

The precisely surveyed location of the GPS antenna is programmed into the reference station as part of its initial installation and set up procedures. Industry standard reference stations determine pseudo range and delta range based on carrier smoothed measurements for all satellites in view. Since the exact ECEF position of the antenna is known, corrections may be generated for the pseudo range and delta range measurements and precise time can be calculated.

Naturally occurring errors are, for the most part, slow changing and monotonic over the typical periods of concern. When SA is not invoked, delta range corrections provide a valid method of improving positional accuracy at the roving receivers using less frequent correction broadcasts. With the advent of SA and its random, quick changing non-monotonic characteristics, delta range corrections become somewhat meaningless and may actually degrade the system performance under some conditions.

As shown previously in FIG. 22 the DGPS correction messages are broadcast by the reference station and received by the roving receivers. The corrections are applied directly to the differential GPS receiver. The DGPS receiver calculates the pseudo range and the delta range measurements for each satellite in the usual manner. Prior to performing the navigation solution, the received pseudo range and delta range corrections are applied to the internal measurements. The receiver then calculates corrected position, velocity and time data.

Since differential GPS eliminates most GPS errors, it provides significant improvements in system reliability for life critical airport operations. Short term and long term drift of the satellite orbits, clocks and naturally occurring phenomenon are compensated for by differential GPS as are other potential GPS satellite failures. Differential GPS is mandatory in the airport environment from a reliability, accuracy and fault compensating perspective.

As with autonomous GPS receiver operation, multipath is a potential problem. The differential reference station cannot correct for multipath errors at the roving receiver(s). Antenna design and placement considerations, and receiver design characteristics remain the best solutions to date in the minimization of multipath effects.

ADS MESSAGES

ADS messages are generated on board each vehicle and broadcast to the AC&M System. The message format is shown below:

MSG HEADER, VEHICLE ID, VEHICLE TYPE, ECEF X, ECEF Y, ECEF Z, ECEF X VEL, ECEF Y VEL, ECEF Z VEL <CR><LF<

On board each vehicle, the GPS-based position and velocity data is converted to Earth Centered Earth Fixed (ECEF) coordinates for use in the navigation and zone processing algorithms if necessary. For simplicity, this format is used in the ADS transmission as well. Upon receipt of an ADS message, the AC&M Processor 115 forwards the message to the COMM Processor 116 then stores the data in the vehicle database. The stored ECEF position and velocity data is used to perform collision prediction, zone incursion, lighting control and navigation processing at the AC&M station.

ATC MESSAGES

Air Traffic Control (ATC) messages are composed using the AC&M station. The ATC messages are used locally to control the AC&M graphics display 117 or present current status information to the user. ATC message are also broadcast to the vehicles 119 and 120 through the COMM Processor 116. All ATC messages utilize an explicit acknowledgment message. If an acknowledgment is not received within a defined time interval, the message is automatically retransmitted. The standard format is shown below.

$ATC, MESSAGE TYPE, VEHICLE ID, MESSAGE DATA <CR><LF>

ERROR DETECTION AND CORRECTION

In the demonstration prototype system, Cyclical Redundancy Checking (CRC) is performed on all messages, with the exception of the [RTCM-104] differential correction messages generated in the Base Station 118. In this scheme, ADS messages are discarded if an error is detected in the received message. This has not been a significant problem for the prototype system since the next message is received in one (1.0) second. The ATC messages directed to specific vehicles also support CRC error detection. ATC messages are "addressed" to a specific A/V and expect an explicit acknowledgment. Upon receipt of an ATC message, the A/V sends back a valid "message received" acknowledgment. The ATC message is discarded by the A/V if an error is detected. In this case, no message received acknowledgment is generated. If no "message received" acknowledgment is received by the AC&M 115 within a preset time interval, the original message is immediately retransmitted. ATC messages require a corresponding acknowledgment since they may represent critical controller instructions and airport and safety operations could be compromised if the message fails to reach its destination.

The CRC system operated effectively in the demonstration prototype system, but a more robust communication error detection and correction capability may be required for end state deployment Forward error correction and Viterbi-Trellis techniques provide a cost effective forward error correction capability. These techniques are widely used in commercial modem technology and are available in Application Specific Integrated Circuits (ASIC). Wide spread use of the technology makes it very cost effective for use in future airport communication systems.

AC&M PROCESSOR AND AC&M PROCESSING FLOW

Figure 23:
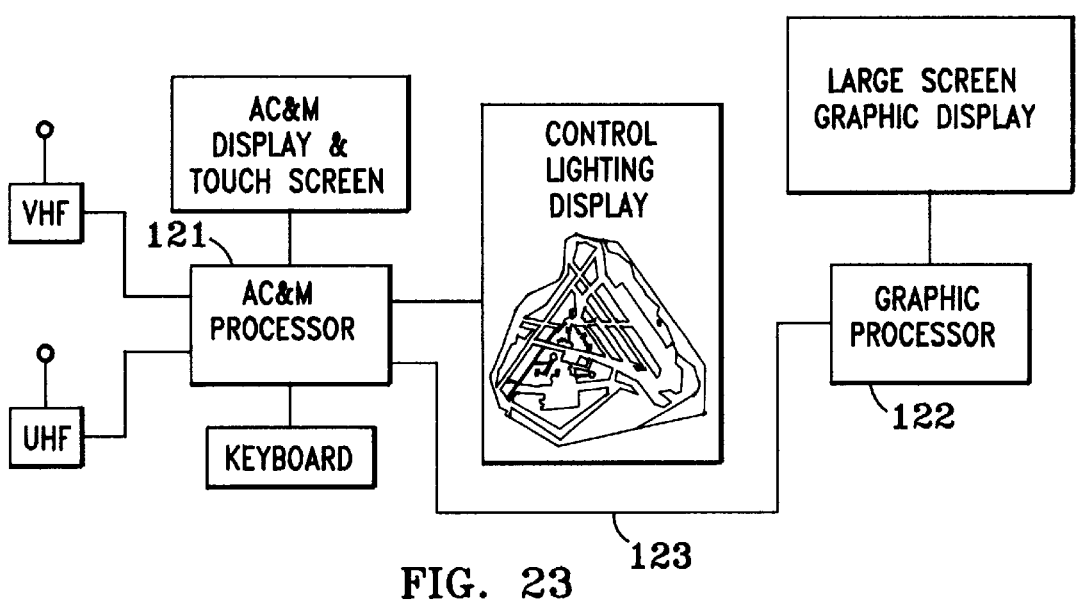
FIG. 23 depicts the demonstration system AC&M hardware block diagram showing various elements of the system.

A block diagram of the AC&M Processor is provided in FIG. 23.

The AC&M Processor 121 is based on a 33 MHz 386 processor with a 387 math co-processor. This processor performs the following functions:

Interfaces to communication digital datalinks
    Receives ADS vehicle broadcasts
    Receives acknowledgment messages from vehicles
    Generates and transmits messages to vehicles Performs collision prediction processing for each vehicle Monitors zone and runway incursion conditions Controls runway intersections and runway clearance lights Maintains and controls vehicle, waypoint and zone databases Performs navigational processing for on-off course checking Performs map layer control and assignment Sends vehicle reports and commands to Graphic Processor for situation display Provides a touch screen and keyboard command interface Representative command functions are described in the following section.

AIRPORT LIGHTS: The system also demonstrates the capability to control airport lights based on GPS inputs and current clearance status.

| ACTIVITY DESCRIPTION | RUNWAY 35 LIGHT STATUS | | |
|---|---|---|---|
| | LANDING LIGHTS | INTERSECTION LIGHTS | TAKEOFF LIGHTS |
| NO ACTIVITY STATE | | | |
| (RUNWAY 35) (RUNWAY 17) TAKE OFF CLEARANCE GIVEN - 35 | RED RED | OFF OFF | RED RED |
| (35 - TAKEOFF END) (17 - OPPOSITE END) AIRCRAFT ENTERS RNWY 35 ZONE | RED RED | OFF OFF | RED RED |
| (35 - TAKEOFF END) (17 - OPPOSITE END) TAKE OFF COMPLETED | RED RED | RED RED | GREEN RED |
| (35 - TAKEOFF END) (17 - OPPOSITE END) LANDING CLEARANCE | RED RED | OFF OFF | RED RED |

-continued

| RUNWAY 35 LIGHT STATUS | | | |
|---|---|---|---|
| ACTIVITY DESCRIPTION | LANDING LIGHTS | INTERSECTION LIGHTS | TAKEOFF LIGHTS |
| ISSUED - 35 | | | |
| (35 - APPROACH END) | GREEN | RED | RED |
| (17 - OPPOSITE END) ARRIVAL AIRCRAFT EXITS RUNWAY | RED | RED | RED |
| (RUNWAY 35) | RED | OFF | RED |
| (RUNWAY 17) RUNWAY INCURSION OCCURRED | RED | OFF | RED |
| (RUNWAY 35) | FLASH RED/ GREEN | FLASH RED/OFF | FLASH RED/ GREEN |
| (RUNWAY 17) RUNWAY INCURSION ENDS | FLASH RED/ GREEN | FLASH RED/OFF | FLASH RED/ GREEN |
| (RUNWAY 35) | RED | OFF | RED |
| (RUNWAY 17) | RED | OFF | RED |

Airport lighting control techniques are provided as a demonstration mechanism and are not intended to dictate a specific lighting scheme for airports.

SITUATION DISPLAY

A vehicle database is maintained by the AC&M and on board 'fully equipped' vehicles to provide a situational awareness capability to the controller and/or vehicle operator. GPS-based situational awareness requires the integration of a datalink between the aircraft, surface vehicles and AC&M system. In the demonstration prototype system, the position and velocity information determined on board each vehicle is broadcast over an experimental VHF datalink and received by the AC&M. At the AC&M, the message is assembled into a dynamic vehicle database. As each ADS message is received, the following fields in the vehicle database are updated:

Vehicle 1
Vehicle Type
Position (ECEF X,Y,Z)
Velocity (ECEF X,Y,Z)

In order to present the vehicle position data graphically, the following information is also maintained in the vehicle database:

Layer ID
Vehicle Color

Each vehicle is assigned a map layer based on vehicle type. The digital airport map features numerous object oriented layers which are used to segregate various types of graphical information. By assigning vehicles to specific map layers, spatial filtering may be performed on a layer by layer basis. Color may be assigned by layer or by individual vehicle.

Position reporting functions operating on a moving platform potentially suffer from a positional error introduced by processing time. To compensate for this factor, the precise DGPS derived ECEF velocity components are used to project the position ahead. As each ADS message is received, a latency compensation time projection factor is applied in an ECEF Velocity×Time relationship. The new, projected ECEF position is then considered the current position, is stored in the vehicle database and is used throughout the navigation and collision prediction algorithms.

Once the dynamic vehicle database is constructed, a sequential scanning of the database is performed as new ADS position reports are received. Vehicles outside of the defined range are filtered out. Vehicles within range are displayed in the 3-D airport map. In this manner, graphical situational awareness is provided at the AC&M and on board the vehicles/aircraft.

COLLISION PREDICTION PROCESSING

As ADS messages are received, collision prediction processing is performed using the current GPS data and the information stored in the vehicle database. The following database fields are used in the collision prediction processing:

| | |
|---|---|
| Collision Time | Time (secs) when a collision may occur |
| Collision Count | Number of potential collisions detected |
| Collision Condition | Warning or watch state detected |
| Collision Separation | Current collision separation |
| Radius | Vehicle's minimum separation radius |

A 'rough check' is performed to determine if there are any vehicles in the immediate vicinity of the current vehicle. The current vehicle's position is projected ahead using a defined MAXIMUM_PROJECTION_FACTOR. The vehicle database is sequentially scanned. The position of the first vehicle in the database is projected ahead in the same manner. If the projected positions intersect, further collision checking is performed.

When further collision checking is warranted, the current vehicle's position is projected ahead by incrementing time in one second intervals. At each interval, an imaginary sphere is drawn around the vehicle using a predefined radius based on the vehicle's minimum safe separation. Similarly, the position of the next vehicle in the database is projected ahead. If the two imaginary spheres intersect and the time interval of the intersection is less than or equal to the MINIMUM_WARNING_TIME factor, a collision warning condition is generated. If the two imaginary spheres intersect at a time interval greater than the MINIMUM_WARNING_TIME but less than the MINIMUM_WARNING_TIME, a collision watch condition is generated.

If a collision watch condition is generated, the vehicles in the watch condition are displayed in YELLOW on the AC&M map display. A warning message is displayed to the operator in the Alerts window of the touchscreen. If a warning condition is detected, the vehicle's symbol is displayed in RED on the graphics screen and a warning message is displayed in the ALERT window.

During any collision condition, the vehicle's symbol is moved to a dedicated watch or warning map layer. These layers are reserved for critical operations and cannot be suppressed by the user.

The following collision data was generated from actual collision tests and represents two surface vehicles driving towards each other. During this test scenario, the following factors were used:

| | |
|---|---|
| MINIMUM_WARNING_TIME | 3 seconds |
| MINIMUM_WATCH_TIME | 7 seconds |
| RADIUS, VEHICLE 03 | 7 meters |
| RADIUS, VEHICLE 04 | 7 meters |

Note that a COLLISION WATCH is detected when the distance between two vehicles is less than the sum of its radii. A COLLISION WARNING is detected when the intersection occurs within the MINIMUM_WARNING_TIME of 3 seconds or less. Also note that as soon as the vehicles pass one another and the distance between them begins to increase, no WATCH or WARNING condition is detected.

VEH=03 DIST=74.9 PROJ TIME=1 SECONDS
VEH=03 DIST=64.7 PROJ TIME=2 SECONDS
VEH=03 DIST=54.5 PROJ TIME=3 SECONDS
VEH=03 DIST=44.3 PROJ TIME=4 SECONDS
VEH=03 DIST=34.2 PROJ TIME=5 SECONDS
VEH=03 DIST=24.0 PROJ TIME=6 SECONDS
VEH=03 DIST=14.0 PROJ TIME=7 SECONDS COLLISION WATCH
VEH=04 DIST=70.0 PROJ TIME=1 SECONDS
VEH=04 DIST=59.7 PROJ TIME=2 SECONDS
VEH=04 DIST=49.5 PROJ TIME=3 SECONDS
VEH=04 DIST=39.2 PROJ TIME=4 SECONDS
VEH=04 DIST=29.0 PROJ TIME=5 SECONDS
VEH=04 DIST=18.8 PROJ TIME=6 SECONDS
VEH=04 DIST=8.9 PROJ TIME=7 SECONDS COLLISION WATCH
VEH=03 DIST=64.1 PROJ TIME=1 SECONDS
VEH=03 DIST=53.7 PROJ TIME=2 SECONDS
VEH=03 DIST=43.4 PROJ TIME=3 SECONDS
VEH=03 DIST=33.1 PROJ TIME=4 SECONDS
VEH=03 DIST=22.8 PROJ TIME=5 SECONDS
VEH=03 DIST=12.7 PROJ TIME=6 SECONDS COLLISION WATCH
VEH=04 DIST=59.1 PROJ TIME=1 SECONDS
VEH=04 DIST=48.6 PROJ TIME=2 SECONDS
VEH=04 DIST=38.1 PROJ TIME=3 SECONDS
VEH=04 DIST=27.6 PROJ TIME=4 SECONDS
VEH=04 DIST=17.1 PROJ TIME=5 SECONDS
VEH=04 DIST=7.0 PROJ TIME=6 SECONDS COLLISION WATCH
VEH=03 DIST=53.3 PROJ TIME=1 SECONDS
VEH=03 DIST=42.7 PROJ TIME=2 SECONDS
VEH=03 DIST=32.3 PROJ TIME=3 SECONDS
VEH=03 DIST=21.8 PROJ TIME=4 SECONDS
VEH=03 DIST=11.4 PROJ TIME=5 SECONDS COLLISION WATCH
VEH=04 DIST=47.8 PROJ TIME=1 SECONDS
VEH=04 DIST=37.1 PROJ TIME=2 SECONDS
VEH=04 DIST=26.4 PROJ TIME=3 SECONDS
VEH=04 DIST=15.8 PROJ TIME=4 SECONDS
VEH=04 DIST=5.4 PROJ TIME=5 SECONDS COLLISION WATCH
VEH=03 DIST=41.9 PROJ TIME=1 SECONDS
VEH=03 DIST=31.2 PROJ TIME=2 SECONDS
VEH=03 DIST=20.5 PROJ TIME=3 SECONDS
EH=03 DIST=9.9 PROJ TIME=4 SECONDS COLLISION WATCH
VEH=04 DIST=36.6 PROJ TIME=1 SECONDS
VEH=04 DIST=25.9 PROJ TIME=2 SECONDS
VEH=04 DIST=15.3 PROJ TIME=3 SECONDS
VEH=04 DIST=5.4 PROJ TIME=4 SECONDS COLLISION WATCH
VEH=03 DIST=31.9 PROJ TIME=1 SECONDS
VEH=03 DIST=21.2 PROJ TIME=2 SECONDS
VEH=03 DIST=10.6 PROJ TIME=3 SECONDS COLLISION WARNING
VEH=04 DIST=26.6 PROJ TIME=1 SECONDS
VEH=04 DIST=15.9 PROJ TIME=2 SECONDS
VEH=04 DIST=5.6 PROJ TIME=3 SECONDS COLLISION WARNING
VEH=03 DIST=14.4 PROJ TIME=1 SECONDS
VEH=03 DIST=4.6 PROJ TIME=2 SECONDS COLLISION WARNING
VEH=04 DIST=10.6 PROJ TIME=1 SECONDS COLLISION WARNING
VEH=03 DIST=5.9 PROJ TIME=1 SECONDS COLLISION WARNING
VEH=04 DIST=2.9 PROJ TIME=1 SECONDS COLLISION WARNING
DIST=5.4, VEHICLE SEPARATION IS INCREASING, STOP PROCESSING

ZONE INCURSION PROCESSING

A 3-D map database and ECEF mathematical processing algorithms support the concept of zones. Zones are three dimensional shapes which are used to provide spatial cueing for a number of constructs unique to DSDC's demonstration system. Zones may be defined around obstacles which may pose a hazard to navigation, such as transmission towers, tall buildings, and terrain features. Zones may also be keyed to the airport's NOTAMS, identifying areas of the airport which have restricted usage.

Zones are represented graphically on the map display and mathematically the DSDC's zone processing algorithms. Multi-sided zones are stored in a zone database as a series of points. Each zone is assigned a zone id and type. The zone type is used to determined whether a particular zone is off-limits for a specific vehicle type.

Zone information is maintained in the zone database. A zone incursion status field is also maintained for the vehicle in the vehicle database. If the vehicle is currently inside a zone, this field is used to store the zone's id. If the vehicle is not inside a zone, this field is zero (0).

At the AC&M, zone incursion processing is performed in a manner similar to the collision processing described previously. As each vehicle report is received, it is projected ahead by incrementing time up to a MAX_ZONE_PROJECTION_FACTOR. At each interval, the vehicle's projected position is compared to each line of the zone as defined by its endpoints. If the vehicle's position is inside all of the lines comprising the zone and the current projection time is less than the MIN_ZONE_WARNING factor, a zone incursion warning is generated. If the vehicle's position is inside the zone and the current projection time is less than the MIN_ZONE_WATCH factor but greater than the MIN_ZONE_WARNING factor, a zone incursion watch is generated. As in the collision processing, a zone incursion watch or warning will result in a message displaced to the operator and a change in layer assignment for the affected vehicle.

A zone incursion condition is automatically cleared when the vehicle exits the zone. All zones are defined as 3-dimensional entities and may be exited laterally or vertically. Heights may be assigned to 'surface' zones individually or collectively. The concepts of 3-dimensional zones is critical to an airport environment to prevent passing aircraft from triggering ground-based zones.

RUNWAY INCURSION PROCESSING

If a zone incursion is detected, a further check is performed to determine if the vehicle is entering or inside a runway zone. For Manchester Airport, five (5) runway zones have been defined:

RNWY_35_ZONE

RNWY_17_ZONE

RNWY_24_ZONE

RNWY_06_ZONE

RNWY_INT_ZONE "RUNWAY INTERSECTION VOLUME"

An additional field is maintained in the vehicle database to indicate whether a runway incursion state has been detected. As with the zone incursion field, the runway incursion value is set to the id of the zone (i.e., the runway) if an incursion is currently occurring and is set to zero (0) if there is no runway incursion.

If the vehicle is entering or inside a runway zone and is not cleared for that zone, a runway incursion condition is generated at the AC&M. As in any zone incursion situation, a watch or warning message is displayed in the AC&M Alerts window and the vehicle's symbol is moved to the dedicated watch or warning map layer, changing its color to YELLOW or RED. In addition, the runway incursion results in a status change in the runway's landing, takeoff and intersection lights forcing the lights to flash on the affected (and related) runway(s). The following table describes the lighting states for runway incursions in each of the five runway zones.

| RUNWAY INCURSION LIGHT STATES | | | | |
|---|---|---|---|---|
| ACTIVITY DESCRIPTION | RNWY 35 A D I | RNWY 17 A D I | RNWY 24 A D I | RNWY 06 A D I |
| INCURSION - RNWY 35 | FLASH | FLASH | NO CHANGE | NO CHANGE |
| INCURSION ENDS | DEFAULT | DEFAULT | NO CHANGE | NO CHANGE |
| INCURSION - RNWY 17 | FLASH | FLASH | NO CHANGE | NO CHANGE |
| INCURSION ENDS | DEFAULT | DEFAULT | NO CHANGE | NO CHANGE |
| INCURSION - RNWY 24 | NO CHANGE | NO CHANGE | FLASH | FLASH |
| INCURSION ENDS | NO CHANGE | NO CHANGE | DEFAULT | DEFAULT |
| INCURSION - RNWY 06 | NO CHANGE | NO CHANGE | FLASH | FLASH |
| INCURSION ENDS | NO CHANGE | NO CHANGE | DEFAULT | DEFAULT |
| INCUR. - INTERSECTION | FLASH | FLASH | FLASH | FLASH |
| INCURSION ENDS | DEFAULT | DEFAULT | DEFAULT | DEFAULT |

KEY:
A = APPROACH LIGHTS    FLASH = RED/GREEN    DEFAULT = RED
D = DEPARTURE LIGHTS    FLASH = RED/GREEN    DEFAULT = RED
I = INTERSECTION LIGHTS    FLASH = RED/OFF    DEFAULT = OFF

A runway incursion is automatically terminated when the incurring vehicle exits the runway. When the incursion condition is terminated, the lights on the affected runway return to their default state. As in all zone definitions, runway zones are 3-dimensional entities. Runway zones are assigned a height of approximately 100 meters above the surface of the runway in the prototype demonstration system. Therefor, a runway incursion occurs only when an uncleared vehicle enters the zone at the surface level. Demonstration prototype lighting software is provided below:

```
LIGHTING CONTROL SOFTWARE EXAMPLE
/*******************************
        LIGHTS.H
Description: lights.h contains the global constants and data structures for the airport lights.
*********************************/
#define LIGHT_ADDR 0x300 /* address of digital IO board   */
/*-light bit settings, digital I/O card-*/
#define LANDING_35 0x01
#define LANDING_17 0x02
#define LANDING_24 0x04
#define LANDING_06 0x08
#define TAKEOFF_17 0x10
#define TAKEOFF_06 0x20
#define TAKEOFF_35 0x40
#define TAKEOFF_24 0x80
/*----- light status states -----*/
#define NO_ACTIVITY       0
#define RUNWAY_INCURSION  1
#define LANDING           2
#define TAKEOFF           3
#define SURFACE           5
/*----- runway id -----*/
```

-continued

```
#define RNWY__35 35
#define RNWY__17 17
#define RNWY__24 24
#define RNWY__06 6
#define RNWY__INT 1
/****************************************
File Name  : LIGHTS.C
Description : lights.c contains the procedures used update the airport lights
Units     : initialize__lights,
            update lights,
            update__clearance__lights,
            get__runway__clear,
            process__clearance
****************************************/
#include <stdio.h>   /* standard input/output      */
#include <graph.h>   /* MSC graphics routines      */
#include <string.h>  /* MSC string routines        */
#include <stdlib.h>  /* MSC standard library       */
#include <math.h>    /* MSC math library           */
#include "sio.h"     /* serial input/output        */
#include "lights.h"  /* airport light definitions  */
#include "veh.h"     /* vehicle data               */
#include "coord.h"   /* coordinate data            */
/*-----------------external functions--------------------*/
void store__wps(char wp__id[12],int wpindex);
/*---------------------external variables-------------------*/
extern VEHICLE__DATA veh[MAX__VEHS]; /* vehicle database     */
extern unsigned curr__lights;        /* current light settings */
/*------------------global variables---------------------*/
short current__clearance; /* set if any vehicle is cleared   */
char veh__cleared[8];     /* vehicle cleared for landing/takeoff*/
short veh__clear__status; /* clearance status for curr vehicle */
short end__of__wps;       /* end of clearance/ wps             */
/*--------------------------------------
UNIT: initialize__lights()
DESCRIPTION: initialize__lights sets the airport lights to their default settings - RED for landing
and takeoff lights and OFF for runway intersection (i.e., stop) lights.
--------------------------------------*/
initialize__lights()
{
    update__lights(NO__ACTIVITY,RNWY__35);
    update__lights(NO__ACTIVITY,RNWY__17);
    update__lights(NO__ACTIVITY,RNWY__24);
    update__lights(NO__ACTIVITY,RNWY__06);
}
/*-----------------------------------
UNIT: update__lights
DESCRIPTION: this routine resets the lights on the specified runway based.
-----------------------------------*/
update__lights(int activity__type, int rnwy)
{
    switch (rnwy)
    {
      case RNWY__35 : case RNWY__17:
        switch (activity__type)
        {
          case NO__ACTIVITY :
            curr__lights = curr__lights & 0xAC;
          break;
        }
        break;
        case RNWY__24 : case RNWY__06 :
          switch (activity__type)
          {
            case NO__ACTIVITY
              curr__lights = curr__lights & 0x53;
            break;
          }
        break;
        case RNWY__INT:
        switch (activity__type)
          {
            case NO__ACTIVITY :
              curr__lights = 0;
            break;
          }
        break;
    }
    /* write new light settings to board */
```

-continued

```
    outp(LIGHT_ADDR,curr_lights);
}
/*-----------------------------------
UNIT: update_clearance_lights
DFSCRIPTION: this routine updates the specified clearance lights for a landing or takeoff
operation. The landing/takeoff light for the specified runway is enabled, then the remaining
landing/taxi lights for both runway ends are disabled.
INPUTS: curr clear - clearance issued by ATC
-----------------------------------------*/
update_clearance_lights(short curr_clear)
{
    /* based on current clearance affected runway and the current status of the runway's lights
update the lights */
    switch (curr_clear)
        {
        case LANDING_35 :
           if((curr_lights & LANDING_35) == 0)
              curr_lights = curr_lights + LANDING_35:
        break;
        case LANDING_17 :
           if ((curr_lights & LANDING_17) == 0)
              curr_lights = curr_lights + LANDING_17:
        break;
        case LANDING_24 :
           if ((curr_lights & LANDING_24) == 0)
              curr_lights = curr_lights + LANDING_24;
        break;
        case LANDING_06 :
           if ((curr_lights & LANDING_06) == 0)
              curr_lights = curr_lights + LANDING_06;
        break;
        case TAKEOFF_35 :
           if ((curr_lights & TAKEOFF_35) ==0)
              curr_lights = curr_lights + TAKEOFF_35;
        break;
        case TAKEOFF_17 :
           if ((curr_lights & TAKEOFF_17) == 0)
              curr_lights = curr_lights + TAKEOFF_17:
        break;
        case TAKEOFF_24 :
           if ((curr_lights & TAKEOFF_24) ==0)
              curr_lights = curr_lights + TAKEOFF_24;
        break;
        case TAKEOFF_06 :
           if (curr_lights & TAKEOFF_06) ==0)
              curr_lights = curr_lights + TAKEOFF_06:
        break;
        }
    /* write new light settings to board */
    outp(LIGHT_ADDR,curr_lights);
}
/*-----------------------------------
UNIT: get_runway_clear
DESCRIPTION: determines the landing or takeoff flag setting
INPUTS: int rw_id - id of runway
        char * msg_type - arrival of takeoff
-----------------------------------*/
int get_runway_clear(int rw_id, char *msg_type)
{
    /-local variables -/
    int clear_stat; /* clearance status */
    /* update current clearance (clear_stat) based on the designated runway (rw_id) and type of
clearance (ARRIVAL) or (TAKEOFF) */
    switch (rw_id)
        {
        case RNWY_35 :
           if (strstr(msg_type,"ARR") != NULL)
              clear_stat = LANDING_35;
           else
              clear_stat = TAKEOFF_35;
        break;
        case RNWY_17 :
           if (strstr(msg_type,"ARR") != NULL)
              clear_stat = LANDING_17;
           else
              clear_stat = TAKEOFF_17;
        break;
        case RNWY_24 :
           if (strstr(msg_type,"ARR") != NULL)
```

```
                    clear_stat = LANDING_24;
                else
                    clear_stat = TAKEOFF_24;
            break;
            case RNWY_06 :
                if (strstr(msg_type,"ARR") != NULL)
                    clear_stat = LANDING_06:
                else
                    clear_stat = TAKEOFF_06;
            break;
            default :
                clear_stat = SURFACE;
        }
        return(clear_stat);
}
/*--------------------------------------------------
UNIT: process_clearance
DESCRIPTION: process_clearance parses the clearance or departure message issued by the
controller via the touch screen. update_clearance_lights is then called to change the specified light
settings.
            The message format is: $ATC,002,veh id,waypoint id
            for arrival (landing) waypoints and
                    $ATC,004,veh id,waypoint id
            for departure (takeoff) waypoints
INPUTS: char clearance_msg[MAX_STR]
--------------------------------------*/
process_clearance(char clearance_msg[MAX_STR])
{
    /-local variables-/
    char wp_id[12];   /* waypoint id                         */
    char *token;      /* character field from ATC msg        */
    int rw_id;        /* id of runway cleared for operation  */
    int veh_index;    /* index into veh database for current veh */
    int slen;         /* string length                       */
    int i;    /* counter                  */
    /* parse clearance message */
    token = strtok(clearance_msg,",");  /* $ATC         */
    token = strtok(NULL,",");           /* message type */
    token = strtok(NULL,",");           /* vehicle id   */
    strcpy(veh_cleared,token);
    token = strtok(NULL,","); /* waypoint id */
    /* extract waypoint information */
    slen = strlen(token) - 2;
    for (i = 0; i < slen; i++)
        wp_id[i] = token[i];
    wp_id[i] = '\0';
/* get runway id from waypoint information */
if (strstr(wp_id,"35") != NULL)
    rw_id = RNWY_35;
else
    if (strstr(wp_id,"24") != NULL)
        rw_id = RNWY_24;
    else
        if (strstr(wp_id,"17") != NULL)
            rw_id = RNWY_17;
        else
            if (strstr(wp_,"06") != NULL)
                rw_id = RNWY_06;
            else
                rw_id = 0;
/* find vehicle in vehicle database */
veh_index = find_veh_index(veh_cleared);
if (veh_index != -1) /* if vehicle found in database */
{
    /* set clearance based on message type and selected runway */
    current_clearance = current_clearance -
            veh[veh_index].clear_status;
veh[veh_index].clear_status = get_runway_clear(rw_id,wp_id);
current_clearance = veh[veh_index].clear_status +
            current_clearance;
    /* extract and store waypoint data */
    store_wps(wp_id,veh[veh_index].wpindex);
    veh[veh_index].currwp = NO_WP;
    end_of_wps = FALSE;
```

-continued

```
    /* update lights immediately for arrival aircraft */
    if (strstr(wp_id,"ARR") != NULL)
        update_clearance_lights(current_clearance);
    }/* if vehicle in database */
}
```

CLEARANCE DELIVERY

If the vehicle is entering or inside a runway zone and the vehicle has a clearance, a runway incursion is not detected. A clearance is issued by the AC&M operator using the ARRIVAL WAYPOINTS, DEPARTURE WAYPOINTS or SURFACE WAYPOINTS functions.

When a clearance is issued, a global CURRENT_CLEARANCE flag is undated. The CURRENT_CLEARANCE flag is used to maintain the current airport light settings. A separate clearance status flag is also maintained in the vehicle database for each vehicle. As the vehicle approaches a runway zone, its clearance status flag is read to determine whether a runway incursion conditions should be generated. Clearances are terminated automatically when the vehicle reaches the last waypoint. Clearances may also be manually cleared by the AC&M operator through the CLEAR PATH WAYPOINTS function. When the clearances are terminated, the global CURRENT_CLEARANCE flag and individual vehicle clearance flags are updated.

ECEF WAYPOINTS NAVIGATION

After waypoints have been issued to a vehicle or vehicles, the AC&M performs a set of navigation functions, mirroring those performed on board the vehicle using the ADS position reports. A set of waypoints is maintained for each cleared vehicle. The vehicle's current 3-D range to the waypoint and cross track error is computed for each subsequent ADS report. A determination as to whether the vehicle is on or off course is also made. If an off course condition is detected, a warning message is displayed to the operator in the AC&M's Alerts window.

To support the AC&M's mirrored navigation processing, the following fields are maintained in the vehicle database:

Waypoint Index

Current Waypoint

Cross Track Error

3D Range to Waypoint

Wrong Way Indicator

The Waypoint Index is the ID of the waypoint list assigned to the vehicle and the Current Waypoint is the waypoint the pilot is navigating towards.

At any time after the assignment of waypoints to the vehicle, the vehicle's 3-D range to the waypoint, cross track error, current waypoint, speed and heading information may be displayed in the MC&R window using the VEHICLE DATA function.

GRAPHICS PROCESSOR AND AC&M INTERFACE

The Graphics Processor (GP) 122 interfaces to the AC&M Processor 121 via a dedicated communication link 123. The GP is currently based on a 66 mHz 486 processor with a VESA Video Local Bus. This processor performs the following functions:

Receives graphics commands from AC&M

Interprets graphics commands

Performs the graphic display functions

Provides situational awareness capability

Manages the view and content of the display presentation

Maintains local map-based waypoint, zone and map layer databases

Interface with large graphics display hardware

Two types of messages are received by the GP
  (1) vehicle position messages
  (2) display commands Upon receipt of an ADS report, the AC&M Processor converts the vehicle's ECEP X,Y,Z position to the map's coordinate system if required and determines the appropriate map layer for the vehicle based on the vehicle's type and any collision or zone incursion conditions. If the vehicle is moving, the newly formatted message is sent to the GP. Stationary vehicle's are not redisplayed in the map but remain displayed in their last reported position. The message format is shown below:

$TRK,vehicle id,map layer,map x, map y, mapz coordinates<CR><LF>

Display commands are also generated by the AC&M Processor 121 and sent to the GP 122. Numerous AC&M commands, including ARRIVAL WAYPOINTS, DEPARTURE WAYPOINTS, SURFACE WAYPOINTS, CLEAR PATH WAYPOINTS, DISPLAY VIEW, VEHICLE FILTER and LAYER FILTER affect the display presentation on the GP. An acknowledgment is returned to the AC&M Processor 121 when a display command message is received by the GP 122.

LAYER ASSIGNMENTS

The GP 122 supports up to 256 unique layers which are used for the display and segregation of graphic information. The layer assignments are provided below.

MAP LAYER ASSIGNMENTS

| LAYER # | DESCRIPTION | MODE |
|---|---|---|
| 0–2 | AIRPORT MAP RUNWAYS, TAXIWAYS, TRAVEL PATHS | ALWAYS |
| 3 | RANGE RINGS | ON DEMAND |
| 4 | EXPANSION | TBD |
| 5 | RANGE RINGS, 5 MILE INCREMENTS | ON DEMAND |
| 6–8 | EXPANSION | TBD |
| 9 | AIRPORT LIGHTING SYSTEMS (RNWY 35) | ON DEMAND |
| 10 | AIRPORT LIGHTING SYSTEMS (RNWY 24) | ON DEMAND |
| 11 | TRACKED SURFACE VEHICLES (LIMITED ACCESS) | ALWAYS |
| 12 | TRACKED SURFACE VEHICLES (FULL ACCESS) | ALWAYS |
| 13 | TRACKED DEPARTURE AIRCRAFT | ALWAYS |
| 14 | TRACKED ARRIVAL AIRCRAFT | ALWAYS |
| 15–19 | EXPANSION | TBD |
| 20 | ARRIVAL WAYPOINTS | ON DEMAND |
| 21 | DEPARTURE WAYPOINTS | ON DEMAND |
| 22 | SURFACE WAYPOINTS | ON DEMAND |

-continued

MAP LAYER ASSIGNMENTS

| LAYER # | DESCRIPTION | MODE |
| --- | --- | --- |
| 23 | CUSTOM WAYPOINTS DEFINITION | ON DEMAND |
| 24 | EXPANSION | TBD |
| 25 | AIRPORT SURFACE ZONES | ON DEMAND |
| 26 | WEIGHT LIMITED ZONES | ON DEMAND |
| 27 | RESTRICTED TRAVEL AREA (WINGSPAN, ETC.) | ON DEMAND |
| 28 | AIRSPACE HAZARD ZONES | ON DEMAND |
| 29 | OPEN CONSTRUCTION ZONES | ON DEMAND |
| 30 | CLOSED CONSTRUCTIONS ZONES | ON DEMAND |
| 31–60 | EXPANSION | TBD |
| 61 | WATCH LAYER (COLOR = YELLOW) | ALWAYS |
| 62 | WARNING LAYER (COLOR = RED) | ALWAYS |

VEHICLES
AC&M SYSTEM FUNCTIONAL MATRIX

Many of the functions performed at the AC&M Processor are also performed on board the vehicles. Three vehicles, equipped with varying configurations of hardware and software, have been used in a number of prototype demonstrations. The matrix below lists the major functions and the vehicles on which they are performed.

VEHICLE FUNCTIONAL MATRIX

| FUNCTION | AC&M | AIR-CRAFT | FULL ACCESS VEHICLE 1 | LIMITED ACCESS VEHICLE 2 |
| --- | --- | --- | --- | --- |
| Receive & process DGPS corrections | N | Y | Y | Y |
| Formats and transmits ADS posn & vel. data | N | Y | Y | Y |
| Receives remote ADS messages | Y | N | Y | N |
| Displays ADS positions in map display | Y | N | Y | N |
| Performs dynamic collision processing | Y | N | Y | N |
| Performs zone incursion processing | Y | Y | Y | Y |
| Performs runway incursion processing | Y | N | N | N |
| Controls airport lights | Y | N | N | N |
| Formats ATC commands | Y | N | N | N |
| Receives ATC commands | N | Y | Y | Y |
| Performs waypoint navigation | Y | Y | Y | N |
| Displays current position in moving map display | N | Y | Y | N |

Figure 24:
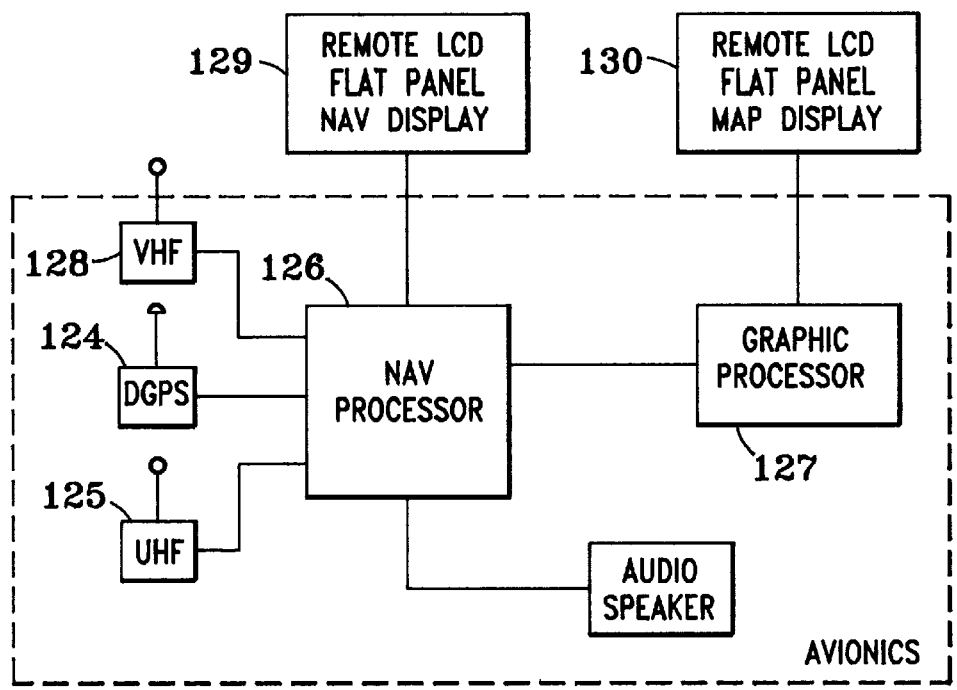
FIG. 24 depicts the demonstration system aircraft block diagram.

Hardware block diagrams for each of the three prototype vehicle types are provided in the figures which follow, starting with the Aircraft System FIG. 24.

Differential GPS data is provided by a GPS GOLD DGPS receiver 124 and a differential data link 125. GPS position, velocity, and time information is supplied to the dual 486 based processing unit. The first 486 processor, or Navigation (NAV) Processor 126, receives GPS Receiver 124 information and performs the following functions:

Coordinate conversions from Lat/Lon/MSL to ECEF X, Y, Z
Position projections
Zone and runway incursion checking
Map layer control
General ECEF waypoint navigation and on/off course processing
ECEF-based precision landing navigation
Access to waypoint and zone databases
Transmission of graphic instructions to second 486 processor 127
Broadcast of position and velocity data over ADS datalink 128
Control of communication digital datalinks
Support for monochrome flat panel display 129

The second 486 processor, the Aircraft Graphics Processor (AGP) 127, receives graphics instructions for the NAV processor 126 and performs the following functions:

Graphics command translations and interpretations
Graphic display functions
Display presentation view and content management
Support for monochrome flat panel display 130

The functions supported in the aircraft are actually a slightly modified version of those performed by the AC&M Subsystem. The use of common hardware and operational software elements simplified the prototype demonstration development efforts.

Figure 25:
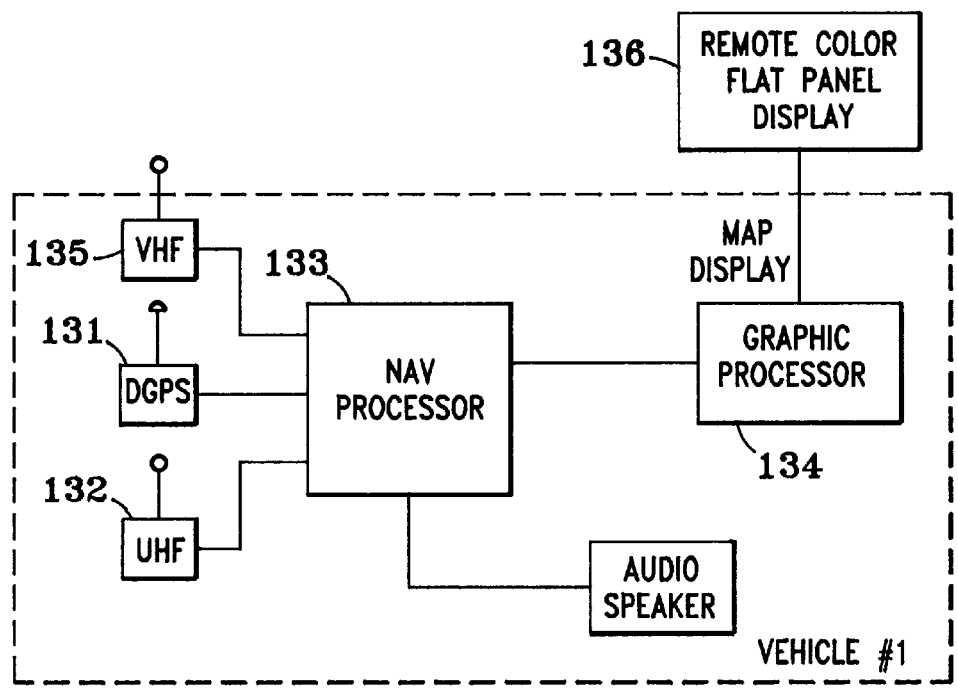
FIG. 25 depicts the demonstration system vehicle #1 hardware block diagram.

The full access surface vehicle (Vehicle #1) high level block diagram is provided in FIG. 25.

Again, differential GPS data is provided by a DGPS receiver 131 and a differential data link 132. GPS position, velocity, and time information are supplied to the dual 486 based processing unit. The first 486 processor, the Navigation Processor (NAV) 133, receives GPS information and performs the following functions:

Coordinate conversions from Lat/Lon/MSL to ECEF X, Y, Z
Position projections
Collision prediction processing
Zone and runway incursion checking
Layer control
General ECEF waypoint navigation (optional)
Access to vehicle, waypoint and zone databases
Transmission of graphic instructions to second 486 processor 134
Broadcast of position and velocity data over ADS datalink 135
Receipt of remote ADS messages from other vehicles
Control communication digital datalinks
Support for flat panel LCD display The second 486 processor, the Vehicle Graphics Processor (VGP) 134 receives graphics instructions from the NAV Processor 133 and performs the following functions:

Graphics command translations and interpretations
Graphic display functions
Situational awareness capability
Display presentation view and content management
Support for flat panel LCD display 136

The functions supported in the full access surface vehicle are identical to those performed in the aircraft with a couple of additions. The full access vehicle receives remote ADS messages from other vehicles operating within the airport space envelope. This information is used to provide a situational awareness capability on board the vehicle. Full collision detection processing is also implemented.

Figure 26:
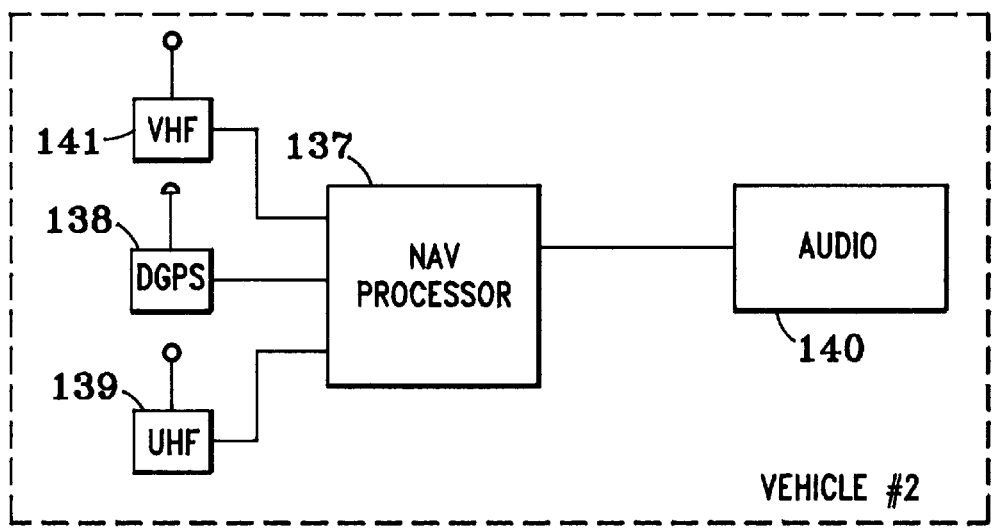
FIG. 26 depicts the demonstration system vehicle #2 hardware block diagram.

The limited access surface vehicle (Vehicle #2) is equipped with developed hardware and software as shown in FIG. 26.

Since no graphic display is provided on Vehicle #2, a single 386-based processor 137 is utilized. Again, differential GPS data is provided by an on board DGPS receiver 138 and a differential data link 139. GPS position, velocity, and time information is supplied to the 386 based processing unit 137 which performs the following functions:

- Coordinate conversions from Lat/Lon/MSL to ECEF X, Y, Z
- Position projections
- Zone and runway incursion checking
- Access to zone database
- Sounds audible warning when zone incursion is detected 140
- Broadcast of position and velocity data over ADS datalink 141

The functions supported in Vehicle #2 are actually a subset of those supported in the aircraft and Vehicle #1.

COMMUNICATIONS

Each vehicle is equipped with a VHF/UHF radio capable of full duplex communications. The radio interfaces to an integrated modem/GPS interface card. The radio modem is used to receive differential corrections, ADS messages, and ATC command messages forwarded by the COMM Processor. Local GPS messages are received by the vehicle's Navigation (NAV) processor. The GPS position and velocity data is converted to the ECEF coordinate frame, reformatted and transmitted to the AC&M Processor over the same radio.

NAVIGATION PROCESSOR AND NAVIGATION

Navigation functions are performed on board the vehicle when waypoints are received from the AC&M Processor via the VHF datalink. Two navigation screens are provided, a cross hairs display for airborne applications and a map-based display for ground operations.

Figure 27:
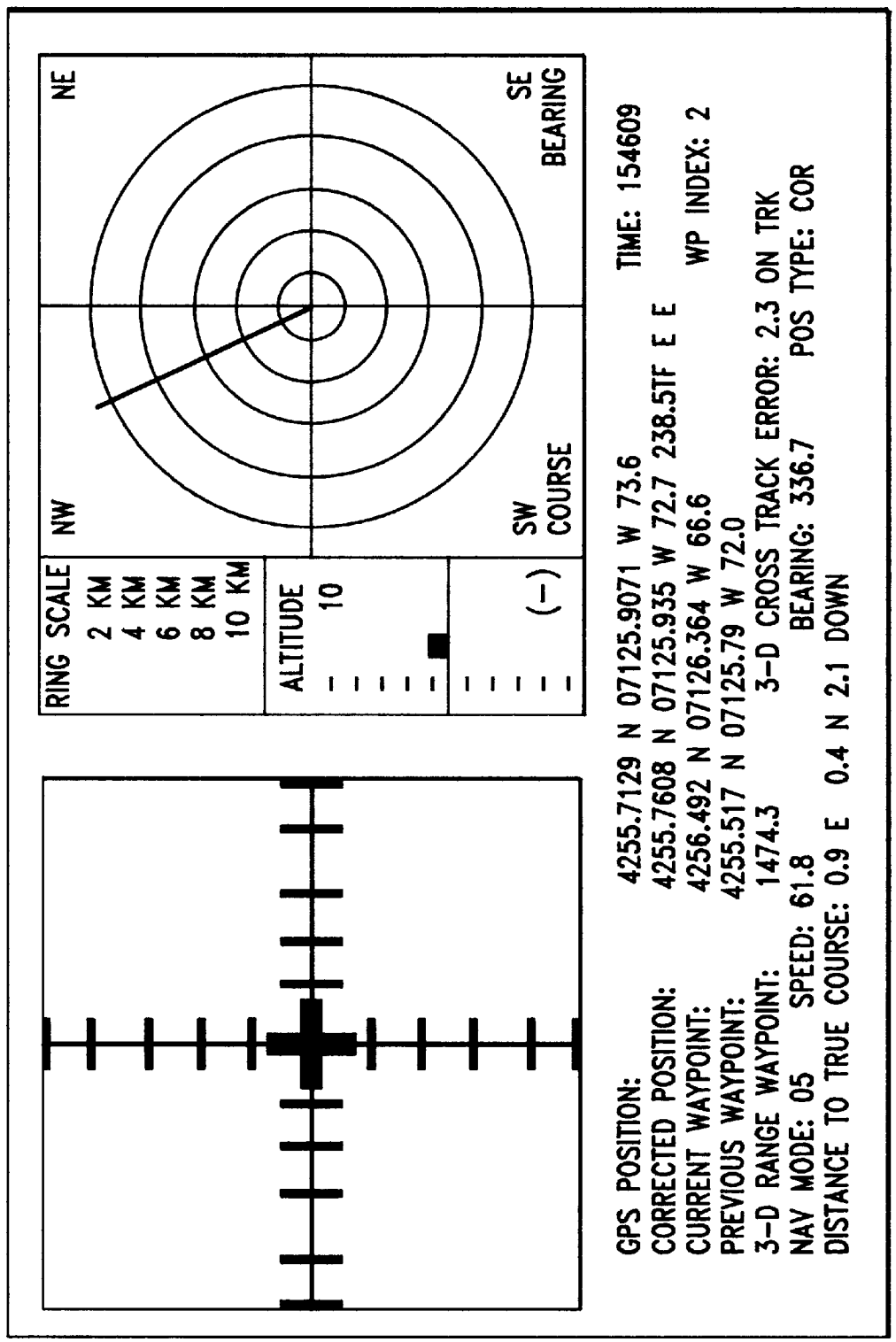
FIG. 27 shows the navigator display compass rose area navigator and cross hair sliding precision approach display in combination with waypoint information, position, velocity, range to the waypoint, cross track error, speed, heading and distance to true course.

Upon receipt of the waypoint message from the AC&M Processor, the waypoint id is extracted and used to identify the predefined waypoint path. The waypoints are automatically loaded into the vehicle's ECEF navigation system and drawn into the vehicle's map display. FIG. 27 shows the airborne navigation display produced with the previously listed software routines.

The navigator display format is unique since it provides conventional course, bearing and range information and actual position with respect to the true course. The display portion on the right side of the screen is driven by NEU surface parameters while the display at the left is driven directly of ECEF Z, Y, Z parameters. This display format may be used for all phases of flight.

The algorithms for 3-D range to the waypoint, transitioning to the next waypoint, cross track error, on/off course and wrong way determination are identical to those performed at the AC&M Processor.

For ground taxi operations, map-based waypoint navigation was found to be preferable. FIG. 8 shows a waypoint path from the Crash, Fire and Rescue (CFR) Station to the East Terminal Ramp drawn in the on board digital map display.

FIG. 9 depicts the predefined waypoint path for a departure on Runway 35.

ZONES PROCESSING

All surface vehicles are capable of performing static zone incursion processing. The zone processing algorithms are identical to those implemented at the AC&M system with the addition of an audible tone generated when an incursion occurs.

COLLISION DETECTION PROCESSING

The fully equipped vehicle (FEV) is capable of performing collision prediction processing based on the vehicle's current position (and velocity) and the remote vehicles' ADS messages.

As the ADS messages are received, they are parsed and stored in the local vehicle database. Collision processing is performed each second, upon receipt of the FEV's GPS position and velocity data. After each GPS update, projections are performed on the FEV's current position and compared to the projected positions for each vehicle stored in the local database. In the same manner as described for the AC&M Processor, potential collision watch and warning conditions are detected between the FEV and other vehicles. However, collisions between two remote vehicles are not detected. Collisions tests are only performed with respect to the FEV itself and those in its vicinity.

GRAPHIC PROCESSOR AND MOVING MAP DISPLAY

Both the FEV and the aircraft are capable of displaying their current position with respect to an on board moving map display. As the vehicle's position approaches the edge of the map display, the map is automatically panned and redrawn with the vehicle centered in the display. When the vehicle is on the airport surface, the map is drawn with a north orientation at a 0.25 mile plan view perspective. When the vehicle is more than one mile from the center of the map, the map is automatically redrawn at a ten (10) mile scale.

SITUATIONAL AWARENESS

The FEV is capable of displaying the positions of remote vehicle positions in the on board moving map display. As ADS messages are received from the COMM Processor, the remote vehicles' positions are checked to see if they would appear on the current display view. If the positions are outside of the current view, they are discarded. Positions within the current view are drawn into the map display.

LAYER-COLOR CONTROL

As at the AC&M processor, the FEV's situational awareness display uses color cues to indicate vehicles in a collision or zone incursion condition. As ADS and GPS messages are received and processed by the on board NAV Processor, graphics messages are formatted and sent to the local Graphics Processor (GP). These graphics messages are identical to those created at the AC&M Processor and include the vehicle id, layer id and map x,y,z position.

---

COORDINATE CONVERSIONS SOFTWARE EXAMPLE

```
/******************************************
File Name : COORD.H
Description: coord.h contains the global definitions and record structures for waypoint and
current position data. Waypoint lists are stored by type - arrival departure, missed
approach or surface.
******************************************/
#define GRND_ALT 92   /* indicates ground level, specific to Minchester Airport */
/* coordinate type (coord_type) definitions                                    */
```

```
#define DECDEG 1 /* lat/lon decimal degrees        */
#define NHSPM 2 /* NH state plane meters           */
#define NHSPF 3 /* NH state plane feet             */
/* conversion factors for map/decimal degree conversions */
double LRLON; /* lon for lower right corner of map  */
double LRLAT; /* lat for lower right corner of map  */
double ULLON; /* lon for upper left corner of map   */
double ULLAT; /* lat for upper left corner of map   */
double LRX;   /* map x coordinate - lower right     */
double LRY;   /* map y coordinate - lower right     */
double ULX;   /* map x coordinate - upper left      */
double ULY;   /* map y coordinate - upper left      */
/* global constants for coordinate conversions      */
#define PI 3.1415926536  /* PI                      */
#define ec 0.0818192     /* earth's eccentricity    */
#define ec2 0.006694381489  /* earth's eccentricity squared */
#define eq 6378137       /* earth's equatorial radius, semimajor axis */
#define b 6356752.3094502  /* polor axis, semiminor */
#define RADIANS 57.295779513 /* degrees per radian  */
#define DECLINATION 16.3  /* declination             */
#define RA_MHT 6368300.4  /* radial vector from 0,0,0 to
         MHT flagpole,
         sqrt(x*x + y*y + z*z),
         no geoid adjustment      */
#define MTOFT 3.2808399  /* conv factor for meters to feet*/
#define FTTOM 0.3048     /* conv from feet to meters       */
#define MTOMI 2.2369363 /* conv from m/sec to mph          */
#define MITOKN 0.86897624 /* conv from mph to knots        */
#define D3 3        /* 3-D */
#define D2 2        /* 2-D */
#define NO_WP -1        /* no waypoints              */
#define MAX_WP 25       /* maximum number of waypoints per list*/
#define MINVEL 0.25     /* min magnitude for velocity       */
/* The structure point_xyz defines a fixed point in terms of its x, y and z values.*/
typedef struct point_xyz
{
    double x;
    double y;
    double z;
} POINT_XYZ;
/* point defines the waypoint or current position in terms of its ECEF x,y,z; map x,y,z; or
latitude,longitude, altitude. */
typedef struct point
{
    double x;       /* ECEF */
    double y;       /* ECEF */
    double z;       /* ECEF */
    double x_vel;   /* ECEF */
    double y_vel;   /* ECEF */
    double z_vel;   /* ECEF */
    double n_vel;   /* north velocity, m/sec         */
    double e_vel;   /* east velocity, m/sec          */
    double u_vel;   /* up velocity, m/sec            */
    double lat;     /* degrees, minutes, decimal seconds */
    double lon;     /* degrees, minutes, decimal seconds */
    double alt;     /* feet or meters                */
    char lat_str[10]; /* latitude, in ascii          */
    char lon_str[11]; /* longitude, in ascii         */
    char lat_dir[2]; /* N or S                       */
    char lon_dir[2]; /* E or W                       */
} POINT;
------------------------------------------------------------
/**************************************************************
File Name  : CNVTCORD.C
Description : cnvtcord.c contains the routines to perform coordinate conversions
Units      :     convert_lat_lon,
                 cnvt_coord_type,
                 cnvt_to_ecef;
                 cnvt_neu_to_ecef;
                 calc_alt
                 read_coord_data
***************************************************************/
#include <stdio.h> /* standard input/output */
#include <graph.h> /* MSC graphics routines */
#include <string.h> /* MSC string routines */
#include <stdlib.h> /* MSC standard library */
#include <math.h> /* MSC math library   */
#include <bios.h> /* bios               */
#include "coord.h" /* coordinate conversion factors */
```

-continued

```
#include "sio.h"   /* cadnav global declarations */
/*------------------external variables------------------*/
extern int coord_type;   /* type of coordinate system used */
extern char coord_file[15];/* name of coordinate conversion file */
extern double delta_lat;  /* conversion error for lat ecef  */
/*-------------global variables-------------------------*/
double proj_alt;          /* projected altitude          */
/*--------------------------------------------------------------
Unit Name: convert_lat_lon
Description: convert_lat_lon converts the lat/lon string output by the GPS receiver to
decimal degrees. In this example, the GPS receiver output the lat/lon in the following
format:
           Latitude       DDMM.MMMM
           Hemisphere     N = North, S = South
           Longitude      DDDMM.MMMM
           Hemisphere     E = East, W = West
           Altitude       HHHHH.H (height above MSL, meters)
Input/Output: POINT *coord   lat/lon string to be converted
--------------------------------------------------------*/
convert_lat_lon(POINT *coord)
{
    /*-local variables-*/
    char latlon_deg[4];
    double r_latlon;   /* lat or lon string -> real number     */
    double r_degree; /* lat or lon minutes -> real number     */
/--convert latitude to decimal degrees--/
/* extract degrees from latitude string (first 2 characters) */
strncpy(latlon_deg,coord->lat_str,2);
latlon_deg[2] = '\0';
/* convert latitude degrees to real number */
r_lation = atof(coord->lat_str);
/* convert latitude minutes to real number */
r_degree = atof(latlon_deg);
coord->lat = ((r_latlon - (r_degree * 100)) / 60) + r_degree;
/* if point is in southern hemisphere, make it negative */
if(strcmpi(coord->lat_dir,"S") == 0)
     coord->lat = -coord->lat;
/-- convert longitude to decimal degrees --/
/* extract degrees from longitude string (first 3 characters) */
strncpy(latlon_deg,coord->lon_str,3);
latlon_deg[3] = '\0';
/* convert longitude degrees to real number */
r_latlon = atof(coord->lon_str);
/* convert longitude minutes to real number */
r_degree = atof(latlon_deg);
coord->lon = ((r_latlon - (r_degree * 100)) / 60) + r_degree;
/* if point is in western hemisphere, make it negative */
if(strcmpi(coord->lon_dir,"W") == 0)
     coord->lon = -coord->lon;
}
/*--------------------------------------------------
Unit Name: cnvt_coord_type
Description: cnvt_coord_type converts the latitude/longitude and altitude output by the
GPS receiver to the coord_type specified during setup. The valid coordinate types are:
           1    decimal degrees, MSL
           2    state plane (Meters)
           3    state plane (Feet)
For the coversion to state plane coordinates, 2 precisely monumented points are required.
These points are stored in a coordiante data file which read by the read_coord_data
function. The 2 points are stored in lat/lon and state plane coordinates.
Inputs:   POINT *pp        present position (decimal degrees)
Outputs:  POINT_XYZ     coordinate system x,y,z
--------------------------------------------------*/
cnvt_coord_type(POINT *pp, POINT_XYZ *ccoord)
}
    switch (coord_type)
    {
      case DECDEG : /* decimal degrees */
          ccoord->y = pp->lat;
          ccoord->x = pp->lon;
          ccoord->z = pp->alt;
      break;
      case NHSPM : case NHSPF : /* state plane meters & feet */
          ccoord->y = (pp->lat-LRLAT) * (ULY-LRY)/(ULLAT-LRLAT) + LRY;
          ccoord->x = (pp->lon-LRLON) * (ULX-LRX)/(ULLON-LRLON) + LRX;
          ccoord->z = pp->alt;
          if(coord_type == NHSPF) /* state plane feet */
          {
             /* convert from meters to feet */
```

-continued

```
            ccoord->y = ccoord->y * MTOFT;
            ccoord->x = ccoord->x * MTOFT;
            ccoord->z = pp->alt * MTOFT;
        }
    }
}
/*------------------------------------
Unit Name: cnvt_to_ecef
Description: cnvt_to_ecef converts the decimal degrees to ECEF
Inputs/Outputs:    POINT *wp - point to be converted
-----------------------------------------------------*/
cnvt_to_ecef(POINT *wp)
{
    /-local variables-/
    double rad_lat, rad_lon;    /* radian values for lat and lon  */
    double rad_curv;            /* radius of curvature            */
    double wrk;                 /* working variable               */
    /* convert latitude decimal degrees to radians */
    rad_lat = PI * wp->lat / 180;
    /* convert longitude decimal degrees to radians */
    rad_lon = PI * wp->lon / 180;
    /* calculate radius of curvature */
    wrk = 1 - pow(ec,2) * sin(rad_lat) * sin(rad_lat);
    rad_curv = sqrt(pow(eq,2) / wrk);
    /* calculate ECEF coordinates (x,y,z) */
    wp->y = (wp->alt + rad_curv) * cos(rad_lat) * sin(rad_lon);
    wp->x = (wp->alt + rad_curv) * cos(rad_lat) * cos(rad_lon);
    wp->z = (wp->alt + rad_curv * (1 - pow(ec,2))) * sin(rad_lat);
}
/*----------------------------------------
Unit Name: cnvt_neu_to_ecef
Description: cnvt_neu_to_ecef converts the north, east and up
        velocity components to ECEF.
Inputs/Outpus: POINT *pp present position
-----------------------------------------------------*/
cnvt_neu_to_ecef(POINT *pp)
{
    /-local variables-/
    double dec_lat, dec_lon; /* decimal values for lat and lon */
    double rad_lat, rad lon; /* radian values for lat and lon   */
    /* convert latitude decimal degrees to radians */
    rad_lat = PI * pp->lat / 180;
    /* convert longitude decimal degrees to radians */
    rad_lon = PI * pp->lon / 180;
    /* calculate ECEF coordinates (x,y,z) */
pp->x_vel = -(pp->n_vel * sin(rad_lat) * cos(rad_lon) +     continued next line
pp->e_vel * sin(rad_lon) + pp->u_vel * -(cos(rad_lat)) * cos(rad_lon));
pp->y_vel = pp->n_vel * -(sin(rad_lat)) * sin(rad_lon) +    continued next line
        pp->e_vel * cos(rad_lon) + pp->u_vel * cos(rad_lat) * sin(rad_lon);
    pp->z_vel = pp->n_vel * cos(rad_lat) + pp->u_vel * sin(rad_lat);
}
/*--------------------------------------------------
Unit Name: calc_alt()
Description: calculates the projected altitude.
Inputs/Outputs: POINT *proj    altitude of present position
---------------------------------------*/
calc_alt(POINT *proj)
{
    /-local variables-/
    /* working variables used in altitude calculatation */(/
    double r1;
    double rr;
    double s0;
    double pp_rc;
    double talt1,talt2;
        double ec1;
        double wrk;
    ec1 = ec * ec;
    r1 = sqrt(pow(proj->x,2) + pow(proj->y,2));
    rr = sqrt(pow((1 - (pow(ec,2))),2) * r1 * r1 + pow(proj->z,2));
    s0 = sqrt((pow(proj->z,2)) / (rr * rr));
    wrk = 1 - ec*ec * s0*s0;
    pp_rc = sqrt((pow(eq,2)) / wrk);
    talt1 = rr - (1 - ec1) * pp_rc;
    talt2 = 1 - (pow(ec,2)) + (pow(ec,2)) * (pow(s0,2));
    proj_alt = talt1 / talt2;
}
/*--------------------------------------------
Unit Name: cnvt_ecef_to_dd()
```

-continued

Description: converts the ecef x,y,z values to decimal degrees
Inputs/Outputs: POINT *pp present position
--------------------------------------------------*/

```
convert_ecef_to_dd(POINT *pp)
{
    /-local variables-/
    double r; /* working variable */
    /* convert updated ecef position to decimal degrees */
    r = sqrt((pp->x * pp->x) + (pp->y * pp->y));
    pp->lat = atan(pp->z / (r * (1 - (ec * ec)))) * RADIANS;
    pp->lat = pp->lat + delta_lat;
    pp->lon = atan((pp->y/pp->x)) * RADIANS;
    /* convert back to MSL altitude */
    calc_alt(pp);
    pp->alt = proj_alt;
}
/*----------------------------------
Unit Name: read_coord_data
Description: read_coord_data reads the data stored in the coordinate data file specified
during the setup function. The data file lists all the values needed to convert from lat/lon
decimal degrees to state plane coordinates and vice versa. Once the data is read, it is
stored in global variables.
        A sample coordinate data file is shown below:
            NH              state plane system M meters
            42.923628275    lower right latitude value
            -71.426691202   lower right longitude value
            42.933325800    upper left latitude value
            -71.439298894   upper left longitude value
            319590.12       lower right state plane x value
            47085.83        lower right state plane y value
            318557.91       upper left state place x value
            48160.244       upper left state plane y value
----------------------------------------------*/
read_coord_data()
{
    char coord_data[MAX_STR]; /* data read from coordinate file */
    FILE *coordfile;          /* pointer to coordinate file    */
    if ((coordfile = fopen(coord_file,"r")) != NULL)
    {
        fgets(coord_data,MAX_STR-1,coordfile); /* state plane code */
        fgets(coord_data,MAX_STR-1,coordfile); /* meters or feet   */
        if (fgets(coord_data,MAX_STR-1,coordfile) != NULL)
            LRLAT = atof(coord_data);
        if (fgets(coord_data,MAX_STR-1,coordfile) != NULL)
            LRLON = atof(coord_data);
        if (fgets(coord_data,MAX STR-1,coordfile) != NULL)
            ULLAT = atof(coord_data);
        if (fgets(coord_data,MAX_STR-1,coordfile) != NULL)
            ULLON = atof(coord_data);
        if (fgets(coord_data,MAX_STR-1,coordfile) != NULL)
            LRX = atof(coord_data);
        if (fgets(coord_data,MAX STR-1,coordfile) != NULL)
            LRY = atof(coord_data);
        if (fgets(coord_data, MAX STR-1,coordfile) != NULL)
            ULX = atof(coord_data);
        if (fgets(coord_data,MAX_STR-1,coordfile) != NULL)
            LLY = atof(coord_data);
        fclose(coordfile);
    }
}
```

ZONE SOFTWARE EXAMPLES
File Name : RTZONES.H
Description: rtzones.h contains the global definitions and record structure to support the
polygon-shaped, ECEF-based zone processing algorithms.
****************************************/
define MAX_ZONES 100        /* maximum number of identified zones */
define MAX_POINTS 17        /* maximum number of points per zone */
define ZONE_THICKNESS 100   /* default height of zone, in meters */
/* ruwnay zones, special zone types used to determine runway incursions */
define RNWY_35_ZONE 3   /* index into zone database for 35 */
define RNWY_17_ZONE 2   /* index into zone database for 17 */
define RNWY_INT_ZONE 0  /* index into zone database for inters*/
define RNWY_24_ZONE 4   /* index into zone database for 24 */

-continued

```
#define RNWY_06_ZONE 1  /* index into zone database for 06 */
#define NO_RNWY    5 /* NO_ACTIVITY state after incursion */
/* ZONE_AREA defines the non-permitted area(s) based on the start and stop points of a
series of line segments */
typedef struct zone_area
{
    short num_lines;            /* number of lines defining zone */
    POINT_XYZ p[MAX_POINTS];    /* x,y for line start/endpoint */
    POINT_XYZ center;           /* center point of zone        */
    double ralt_max;            /* maximum radial altitude      */
    double ralt_min;            /* minimum radial altitude      */
    short zone_id;              /* id of zone                  */
    short zone_type;            /* type of zone keyed to veh   */
} ZONE_AREA;
/* NOTE: POINT_XYZ is defined in the coord.h file    */
/***********************************************/
File Name : SPZONES.H
Description: spzones.h contains the global definitions and record structure to support the
polygon-shaped, state plane-based zone processing algorithms.
***********************************************/
#define MAX_ZONES 25 /* maximum number of identified zones  */
#define MAX_POINTS 5 /* maximum number of points per zone    */
/* ZONE_POINT defines the start and end points of a line segment*/
typedef struct zone_point
{
    double x;
    double y;
}ZONE_POINT;
/* ZONE_AREA defines the non-permitted area(s) based on the start and stop points of a
series of line segments */
typedef struct zone_area
{
    short num_lines;         /* number of lines defining zone */
    ZONE_POINT p[MAX_POINTS]; /* x,y for line start/endpoint */
    ZONE_POINT max;          /* max x,y */
    ZONE_POINT min;          /* min x,y */
    char zone_type;          /* type of zone */
}ZONE_AREA;
```

ATC AC&M WINDOW SOFTWARE EXAMPLE
```
/*-------------------------------------------
UNIT NAME : ATC_window
DESCRIPTION       : manages the ATC window on the AC&M display.
NOTES: included here as a program stub to link tstnzone to chkzone.
---------------------------------------------*/
ATC_Window()
{
    /* program stub */
}
/*------------------------------------
UNIT NAME   : set_default_layer
DESCRIPTION: determines the vehicles default layer based on the type of vehicle.
NOTES        : included here to link tstnzone to chkzone.
------------------------------------------*/
short set_default_layer()
{
    /-local variables-/
    short curr_layer;
    /* determine vehicle's layer based on vehicle type */
    switch (veh_type)
    {
        case LIM_GRND : /* limited access ground vehicle */
           curr_layer = LIM_GRND_LAYER;
           curr_color DARK_GRAY;
         break;
        case FULL_GRND : /* full access ground vehicle   */
           curr_layer = FULL_GRND_LAYER;
           curr_color = LIGHT_MAGENTA;
         break;
        case ARR_AIR : /* arrival aircraft        */
           curr_layer = ARR_AIR_LAYER;
           curr_color = LIGHT_CYAN;
         break;
        case DEP_AIR : /* departure aircraft          */
```

```
            curr_layer = DEP_AIR_LAYER;
            curr_color = LIGHT_GREEN;
         break;
      }
      return(curr_layer);
}
/*--------global data for speaker functions---------------------*/
#define TIMER_FREQ 1193180L
#define TIMER_COUNT 0x42
#define TIMER_MODE 0x43
#define TIMER_OSC 0xb6
#define OUT_8255 0x61
#define SPKRON 3
/*------------------------------------------------------------
UNIT NAME  : spkr_on
DESCRIPTION : This routine invokes the speaker at the defined frequency
INPUTS     : freq - audible frequency of output
-----------------------------*/
spkr_on(unsigned freq)
{
    unsigned status, ratio, part_ratio;
    /* determine speaker frequency */
    status = inp(OUT_8255);
    outp(TIMER_MODE, TIMER_OSC);
    ratio = (unsigned)(TIMER_FREQ/freq);
    part_ratio = ratio & 0xff;
    outp(TIMER_COUNT,part_ratio);
    part_ratio = (ratio >> 8) & 0xff
    outp(TIMER_COUNT, part_ratio);
    /* turn on speaker */
    outp(OUT_8255, (status | SPKRON));
}
/*----------------------------------
UNIT NAME  : spkr_off
DESCRIPTION : This routine turns off the speaker.
----------------------------------*/
spkr_off()
{
    unsigned status;
    status = inp(OUT_8255);
    outp(OUT_8255, (status & ~SPKRON)),
}
/****************************************************
            MAIN ROUTINE
INPUTS:    NHSP X, NHSP Y, ALT (MSL), VEHICLE TYPE, NORTH
       VELOCITY, EAST VELOCITY, UP VELOCITY
****************************************************/
main(int argc, char **argv)
{
    /* parse argv[1]..[7] for input arguments    */
    sp.x = atof(argv[1]);     /* NHSP X         */
    spy = atof(argv[2]);      /* NHSP Y         */
    sp.z = atof(argv[3]);     /* NHSP Z         */
    veh_type = atoi(argv[4]); /* vehicle type   */
    pp.n_vel = atof(argv[5]); /* north velocity */
    pp.e_vel = atof(argv[6]); /* east velocity  */
    pp.u_vel = atof(argv[7]); /* up velocity    */
    gpsveh_type = veh_type;
    /** prompt user for name of file containing NHSP zone data **/
    _clearscreen(_GCLEARSCREEN);
    _settextposition(5,5);
    printf("Enter name of file containing NH state plane zone \
       data : ");
    gets(zone_file);
    get_zones();
    /* initialize coord file and coord type for NHSP feet */
    coord_type = NHSPF;
    _settextposition(8,5);
    printf("Enter name of file containing coordinate conversion \    data : ");
    gets(coord_file);
    read_coord_data();
    /* convert to meters */
    sp.x = sp.x * FTTOM;
    sp.y = sp.y * FTTOM;
    sp.z = sp.z * FTTOM;
    /* convert to decimal degrees and store in pp */
    pp.lon = (ULLON - LRLON) * (sp.x - LRX) / (ULX - LRX) + LRLON;
    pp.lat (ULLAT - LRLAT) * (spy - LRY) / (ULY - LRY) + LRLAT;
    pp.alt = sp.z;
```

-continued

```
    /* convert point (pp) to ecef coordinates */
    pp_ptr = cnvt_to_ecef(&pp);
    /* convert north, east and up velocity to ecef */
    pp_ptr = cnvt_neu_to_ecef(&pp);
    /* if zone database exists */
    if(no_zones == FALSE)
    {
       chk_all_zones(&pp); /* check zones for incursion, enable
           speaker if point is inside    */
    }
    printf("Press return to exit");
    getch();
    spkr_off();
}
```

```
VEHICLE COLLISION DETECTION SOFTWARE PROCESSING EXAMPLE
VEHICLE DATA
/************************************************************
VEH.H
Description: veh.h contains the global constants and data structures for the vehicle
database.
************************************************************/
#define VEH_STR 80 /* maximum characters in veh ADS message    */
#define MAX_VEHS 50 /* maximum number of vehicles              */
#define MAX_PROJ 15 /* maximum projection value for collisions */
#define MIN_PROJ 1 /* minimum projection value for collisions  */
/* masks for suppress/display vehicles & layers               */
#define VON_MASK 0x2001FC /* all vehicle on mask               */
#define VOFF_MASK 0xDFFE03 /* all vehicle off mask             */
#define LON_MASK 0xFFFFFF /* all layers on mask                */
/* vehicle types                                              */
#define LIM_GRND 1 /* limited access ground vehicle            */
#define FULL_GRND 2 /* full access ground vehicle              */
#define ARR_AIR 4 /* arrival aircraft                          */
#define DEP_AIR 8 /* departure aircraft                        */
#define AIRCRAFT 16 /* aircraft — full air and ground access   */
#define ATC     32 /* ATC or remote display                    */
/* collision radius (based on vehicle type)                   */
#define LIM_GRND_RAD 7
#define FULL_GRND_RAD 7
#define AIRCRAFT_RAD 30
/*----------------------- layer status types -----------------------*/
#define RR_STATUS     1
#define RR_5MI_STATUS    2
/* vehicle layers */
#define LIM_GRND_STATUS     4
#define FULL_GRND_STATUS     8
#define DEP_AIR_STATUS     16
#define ARR_AIR_STATUS     32
#define WATCH_STATUS     64
#define WARNING_STATUS     128
#define EMERGENCY_STATUS     256
/* lighting layers */
#define LIGHTS_35_STATUS     512
#define LIGHTS_24_STATUS     1024
/* waypoint layers */
#define ARR_WAY_STATUS     2048
#define DEP_WAY_STATUS     4096
#define SURF_WAY_STATUS     8192
#define CUSTOM_WAY_STATUS     16384
/* zone layers */
#define SURF_ZONE_STATUS     32768
#define WT_LIM_ZONE_STATUS     65536
#define RESTR_ZONE_STATUS     131072
#define AIR_HAZARD_STATUS     262144
#define OPEN_CONST_STATUS     524288
#define CLOSED_CONST_STATUS     1048576
#define ALL_VSTATUS     2097152
#define ALL_LSTATUS     4194304
/*---------------------------map layer assignments -------------------------*/
/* range ring layers */
#define RR_LAYER     3
#define RR_5MI_LAYER     5
/* vehicle layers */
```

-continued

```
#define LIM_GRND_LAYER    11
#define FULL_GRND_LAYER   12
#define DEP_AIR_LAYER     13
#define ARR_AIR_LAYER     14
/* watch/warning layers */
#define WATCH_LAYER       63
#define WARNING_LAYER     64
/* lighting layers */
#define LIGHTS_35_LAYER 7
#define LIGHTS_24_LAYER 8
/* waypoint layers */
#define ARR_WAY_LAYER     20
#define DEP_WAY_LAYER     21
#define SURF_WAY_LAYER    22
#define CUSTOM_WAY_LAYER  23
/* zone layers */
#define SURF_ZONE_LAYER   25
#define WT_LIM_ZONE_LAYER 26
#define RESTR_ZONE_LAYER  27
#define AIR_HAZARD_LAYER  28
#define OPEN_CONST_LAYER  9
#define CLOSED_CONST_LAYER 10
#define ALL_VLAYER        98
#define ALL_LLAYER        99
/* The vehicles database is used to store the information for each remote vehicle being
tracked. As a remote vehicle message is received it is added/updated to the vehicles
database. This database is used by both the vehicle(s) and ATC. */
typedef struct vehicles
{
    char veh_id[8];         /* id of vehicle, chars and numbers  */
    short veh_type;         /* vehicle type                      */
    short layer_id;         /* map layer assignment              */
    short prev_layer;       /* map layer assignment              */
    short color;            /* color of vehicle in map display   */
    double ecefx;           /* ecef x coordinate for veh. posn   */
    double ecefy;           /* ecef y coordinate for veh. posn   */
    double ecefz;           /* ecef z coordinate for veh. posn   */
    double xvel;            /* x velocity (ecef)                 */
    double yvel;            /* y velocity (ecef)                 */
    double zvel;            /* z velocity (ecef)                 */
    short coll_time;        /* time (secs) collision may occur   */
    short coll_count;       /* number of collisions detected     */
    short coll_cond;        /* collision warning or watch state  */
    short on_off_course;    /* on off course indicator           */
    double radius;          /* zone radius for vehicle           */
    int clear_status;       /* clearance status                  */
    int rnwy_incurs;        /* runway incursion status           */
    int zone_incurs;        /* zone incursion status             */
    long pos_hold;          /* position drawn in map             */
    double coll_sep;        /* current coll separation           */
    int wpindex;            /* id of waypoint list               */
    int currwp;             /* index into waypoint list          */
    double xtrack;          /* cross track error                 */
    double range;           /* range to wp - 3D                  */
    short wrong_way;        /* wrong way indicator               */
} VEHICLE_DATA;
```

COLLISION PROCESSING SOFTWARE EXAMPLE
```
/*****************************************************************************
File Name: COLL.C
Description: coll.c contains the routines which update the vehicle database and perform
collision prediction algorithms.
Units:      get_veh_index,
            store_remote_msg,
            chk_for_collisions,
            convert_veh,
            set_default_layer,
            set_default_radius
*****************************************************************************/
/*-------------------------------- global include files -----------------------------------*/
#include <stdio.h>           /* standard input/output     */
#include <graph.h>           /* MSC graphics routines     */
#include <string.h>          /* MSC string routines       */
#include <stdlib.h>          /* MSC standard library      */
```

-continued

```
#include <math.h>            /* MSC math library            */
#include "sio.h"             /* global definitions          */
#include "coord.h"           /* coordinate definitions      */
#include "veh.h"             /* vehicle definitions         */
#include "color.h"           /* color definitions           */
#include "rtzones.h"         /* zone definitions            */
#include "lights.h"          /* lighting definitions        */
#define DEF_SEP 100000       /* default separation          */
/*------------------------------ external procedures ----------------------------------------*/
extern POINT *convert_ecef_to_dd(POINT *pp);
extern void ClearWpytMsg(void);
extern void ATC_window(char atcmsg[80], int line);
extern void format_graphics_msg(POINT *corr);
extern int calc_navdata(int wpindex, int currwp, POINT *pp);
/*------------------------------ external variables -----------------------------------------*/
extern short num_vehs;            /* number of vehicles in database   */
extern char veh_id[8];            /* id of current vehicle            */
extern short veh_type;            /* type of vehicle                  */
extern short gpsveh_type;         /* type of vehicle                  */
extern short veh_clear_status;    /* clearance status for vehicle     */
extern double cur_radius;         /* radius of pp for zones           */
extern short min_warning;         /* min sec prior to collision alert */
extern short mid_warning;         /* mid num of secs prior to alert   */
extern double proj_time;          /* time used in position projection */
extern short max_coll_count;      /* # coll detections prior to alert */
extern short layer;               /* graphics layer for vehicle       */
extern int rnwy_incursion;        /* previous rnwy incursion          */
extern int zone_incursion;        /* previous zone incursion          */
extern double max_proj_time;      /* max number of secs in projection */
extern short inside_zone;         /* flag — pp is in static zone      */
extern short vehnum;              /* vehicle number (based on id)     */
extern short current_clearance;   /* set if any vehicle is cleared    */
extern short end_of_wps;          /* end of waypoint processing       */
extern short off_course;          /* flag — veh is off course         */
extern short wrong_way;           /* flag — veh is wrong way          */
extern double xtrack;             /* cross track error                */
extern double range[MAX_VEHS];    /* range value stored for vehicle   */
extern char veh_cleared[8];       /* vehicle cleared                  */
/*------------------------------ global data ------------------------------------------------*/
short curr_color;                 /* current color                    */
short coll_condition;             /* flag indicating coll watch/warning */
int prev_rnwyincur;               /* indicates previous runway incursion */
short prev_layer;                 /* graphics layer for vehicle       */
short vindex;                     /* index into vehicle database      */
VEHICLE_DATA veh[MAX_VEHS];       /* vehicle database                 */
/*-------------------------------------------------------------------------------------------
Unit Name:    get_veh_index
Description: searches the vehicle database for the current vehicle id. If the vehicle is not
in the database, the next available location is assigned.
Inputs:    veh_id, id of vehicle (alphanumeric)
Outputs:   veh_index, index into vehicle database
-------------------------------------------------------------------------------------------*/
short get_veh_index(char *veh_id)
{
    /- local variables -/
    short veh_index = 0;      /* index into vehicle database */
    short veh_found = FALSE;  /* flag — vehicle located in db */
    /* while vehicle id has not been matched and still less than maximum number of vehicles
in database */
    while ((veh_found == FALSE) && (veh_index < MAX_VEHS))
    {
        /* if vehicle id found */
        if (strcmpi(veh_id,veh[veh_index].veh_id) == 0)
        {
            veh_found = TRUE;
            return(veh_index);
        }
        else
            veh_index++;
    }
    /* if vehicle not found, add it at next available location */
    if ((veh_index >= MAX_VEHS) && (veh_found == FALSE))
    {
        veh_index = num_vehs;
        num_vehs++;
        if (veh_index < MAX_VEHS)
            return(veh_index);
        else
            return(-1);
```

-continued

```
    } /* if not found */
}
/*----------------------------------------------------------------------
Unit Name: store_remote_veh
Description: parses the veh_str and stores the data in the vehicle database. The incoming
veh_str has the following format:
hdr veh_id veh_type ecefx ecefy ecefz velx vely velz course
This function is called whenever a remote message is received. In the ATC subsystem,
collision prediction is performed each time a remote message is received. After the
collision prediction processing, store_remote_veh is called to update the vehicle database.
Inputs:    char veh_str[VEH_STR] — ADS message string
Notes: The ecefx, ecefy and ecefz values transmitted as part of the ADS message are
abbreviated. When the message is parsed, the full ecef values are stored in the vehicle
database.
----------------------------------------------------------------------*/
store_remote_veh(char veh_str[VEH_STR])
{
    /- local variables -/
    char *token; /* parsed field */
    /* extract veh_id from veh_str */
    token = strtok(veh_str,",");
    token = strtok(NULL,",");
    if (strcmpi(veh_id,token) != 0)
    {
        /* get index into vehicle database */
        vindex = get_veh_index(token);
        if (vindex != -1) /* if vehicle index found */
        {
            /* parse fields and store in vehicle database */
            strcpy(veh[vindex].veh_id, token);
            token = strtok(NULL,",");
            veh[vindex].veh_type = atoi(token);
            veh_type = veh[vindex].veh_type;
            token = strtok(NULL,",");
            veh[vindex].ecefx = atof(token) + 1400000;
            token = strtok(NULL,",");
            veh[vindex].ecefy = -(atof(token) + 4400000);
            token = strtok(NULL,",");
            veh[vindex].ecefz = atof(token) + 4300000;
            token = strtok(NULL,",");
            veh[vindex].xvel = atof(token);
            token = strtok(NULL,",");
            veh[vindex].yvel = atof(token);
            token = strtok(NULL,",");
            veh[vindex].zvel = atof(token);
            /* project current position ahead by proj_time factor */
            veh[vindex].ecefx = veh[vindex].ecefx + veh[vindex].xvel *
                        proj_time;
            veh[vindex].ecefy = veh[vindex].ecefy + veh[vindex].yvel *
                        proj_time;
            veh[vindex].ecefz = veh[vindex].ecefz + veh[vindex].zvel *
                        proj_time;
            veh[vindex].radius = set_default_radius();
        /* if adding vehicle to database for first time (layer is 0), initialize changeable settings */
            if (veh[vindex].layer_id == 0)
            {
                veh[vindex].layer_id = set_default_layer();
                veh[vindex].prev_layer = veh[vindex].layer_id;
                veh[vindex].color = curr_color;
                veh[vindex].clear_status = 0;
                veh[vindex].rnwy_incurs = NO_RNWY;
                veh[vindex].zone_incurs = 0;
                veh[vindex].coll_cond = 0;
                veh[vindex].wrong_way = 0;
                veh[vindex].pos_hold = 0;
                veh[vindex].coll_sep = DEF_SEP;
                veh[vindex].on_off_course = FALSE;
                veh[vindex].wpindex = NO_WP;
                veh[vindex].currwp = NO_WP;
                veh[vindex].xtrack = 0;
                veh[vindex].range = 0;
            } /* if layer_id == 0 */
        } /* if vindex */
    } /* if veh_id */
}
/*----------------------------------------------------------------------
    Unit Name:    convert_vehicle()
                Description: convert_vehicle parses the vehicle data message and maintains the
                information as the present position. chk_all_zones() is called to test for an
```

-continued

```
                    incursion into a forbidden zone and chk_for_collision() is called to compare the
                    present position with that of the other vehicles stored in the vehicle database.
                    For AIRCRAFT (ARR or DEP) and ATC, convert_vehicle sets the global veh_id
                    to the current vehicle's id and the global veh_type to the current vehicle's type.
                    set_default_yer() is called to restore the vehicle's default layer prior to ATC's
                    checking for collisions and zone incursions.
                         convert_ecef_to_dd() and
                         format_graphics_msg() are called to
                         send the message to the graphics display.
        Inputs:     veh_data, remote vehicle message
----------------------------------------------------------------------------------------------------------------*/
convert_vehicle(char veh_data[MAXSTR])
{
    /- local variables -/
    char *token;       /* parsed field          */
    POINT curr_point;     /* current position, compared to each veh*/
    char tmp_id[8];       /* temporary storage for vehicle id     */
    short tmp_type;       /* temporary storage for vehicle type   */
    char msgbuff3[80]; /* buffer for ATC alert window, line 3    */
    int m;            /* loop counter */
    int off_count;     /* indicates # vehs off course         */
    int wrong_count;      /* indicates # vehs off course      */
    char orig_vehid[8]; /* original vehicle id          */
    /** parse the vehicle ADS message **/
    token = strtok(veh_data,",");     /* message header */
    token = strtok(NULL,",");         /* vehicle id    */
    strcpy(tmp_id,token);
    token = strtok(NULL,",");         /* vehicle type */
    tmp_type = atoi(token);
    token = strtok(NULL,",");         /* ecef x */
    curr_point.x = atof(token) + 1400000;
    token = strtok(NULL,",");         /* ecef y */
    curr_point.y = -(atof(token) + 4400000);
    token = strtok(NULL,",");         /* ecef z */
    curr_point.z = atof(token) + 4300000;
    token = strtok(NULL,",");         /* ecef x vel */
    curr_point.x_vel = atof(token);
    token = strtok(NULL,",");         /* ecef y vel */
    curr_point.y_vel = atof(token);
    token = strtok(NULL,",");         /* ecef z vel */
    curr_point.z_vel = atof(token);
    /* project current position ahead by proj_time factor */
    curr_point.x = curr_point.x + curr_point.x_vel * proj_time;
    curr_point.y = curr_point.y + curr_point.y_vel * proj_time;
    curr_point.z = curr_point.z + curr_point.z_vel * proj_time;
    /* overwrite current global settings with vehicle's current settings */
    strcpy(orig_vehid,veh_id); /* save current vehicle id */
    strcpy(veh_id,tmp_id);     /* copy in vehicle id      */
    rnwy_incursion = veh[vindex].rnwy_incurs;
    prev_rnwyincur = rnwy_incursion;
    veh_clear_status = veh[vindex].clear_status;
    zone_incursion = veh[vindex].zone_incurs;
    coll_condition = veh[vindex].coll_cond;
    cur_radius = veh[vindex].radius;
    prev_layer = veh[vindex].layer_id;
    chk_all_zones(&curr_point;        /* check for zone incursions */
    chk_for_collisions(&curr_point);/* check for collisions       */
    /* perform waypoint processing */
    if (veh[vindex].wpindex != NO_WP)
{
    veh[vindex].currwp = calc_navdata(veh[vindex].wpindex,
                            veh[vindex].currwp,
                            &curr_point);
    /* save vehicle cross track data */
    veh[vindex].xtrack = xtrack;
    /* save vehicle range to the waypoint */
    veh[vindex].range = range[veh[vindex].wpindex];
    /* save vehicle on/off course & wrong way data */
    if (off_course == TRUE)
        veh[vindex].on_off_course = 1;
    else
        veh[vindex].on_off_course = 0;
    if (wrong_way == TRUE)
        veh[vindex].wrong_way = 1;
    else
        veh[vindex].wrong_way = 0;
    /* if last waypoint has been reached, clear waypoint
       and clearance processing */
    if (end_of_wps == TRUE)
```

-continued

```
{
    current_clearance = current_clearance -
            veh[vindex].clear_status;
    veh_clear_status = 0;
    veh[vindex].clear_status = 0;
    veh[vindex].currwp = NO_WP;
    veh[vindex].wpindex = NO_WP;
    veh[vindex].on_off_course = FALSE;
    veh[vindex].wrong_way = FALSE;
    end_of_wps = FALSE;
    strcpy(veh_cleared,'\0');
    ClearWyptMsg(); /* clear waypoints from map */
} /* if end_of_wps */
}
/* store runway incursion state detected with vehicle */
veh[vindex].rnwy_incurs = rnwy_incursion;
/* if a runway incursion was previously detected on the runway intersections for this
vehicle but the vehicle is no longer in the runway intersection, update the runway's lights
*/
if ((prev_rnwyincur == RNWY_INT) &&
    (rnwy_incursion != RNWY_INT))
        update_lights(0,prev_rnwyincur);
    /* if a runway incursion was previously detected for this vehicle, but the vehicle is no
longer in the runway, update the runway's lights */
if ((rnwy_incursion == NO_RNWY) && (prev_rnwyincur != NO_RNWY))
        update_lights(0,prev_rnwyincur);
    /* store newly determined clearance, zone and collision status for vehicle */
veh[vindex].clear_status = veh_clear_status;
veh[vindex].zone_incurs = zone_incursion;
veh[vindex].coll_cond = coll_condition;
    /* if no zone incursion or collision condition is detected, use default map layer for
vehicle symbol */
if ((inside_zone == FALSE) && (coll_condition == FALSE))
        layer = set_default_layer();
veh[vindex].layer_id = layer; /* store layer with vehicle */
/* convert ecef position to decimal degrees */
convert_ecef_to_dd(&curr_point);
/* if vehicle is moving */
if (sqrt((curr_point.x_vel * curr_point.x_vel) +
        (curr_point.y_vel * curr_point.y_vel) +
        (curr_point.z_vel * curr_point.z_vel)) > MINVEL)
{
    /* format data for presentation on map display */
    format_graphics_msg(&curr_point);
    /* reset position display flag */
    veh[vindex].pos_hold = 0;
} /* if moving */
else /* vehicle is not moving */
{
    if ((veh[vindex].pos_hold < 3))
    {
        /* display vehicle if not moving but pos_hold
                flag is < 3 */
        format_graphics_msg(&curr_point);
        veh[vindex].pos_hold++;
    } /* if */
    else
    {
        /* display vehicle if not moving but layer
                assignment has changed */
        if (prev_layer != veh[vindex].layer_id)
        {
            format_graphics_msg(&curr_point);
            veh[vindex].pos_hold = 0;
        }
    } /* else pos_hold > 3 */
} /* not moving */
/* determine if on/off or wrong way alert messages must
        be displayed */
off_count = 0;
for (m = 0; m < num_vehs; m++)
{
    if (veh[m].on_off_course == 1)
    {
        sprintf(msgbuff3,"VEHICLE %s OFF COURSE ",veh[m].veh_id);
        ATC_Window(msgbuff3,3);
        off_count++;
    }
}
```

-continued

```
    if (off_count == 0)
        ATC_Window ("              ",3);
    wrong_count = 0;
    for (m = 0; m < num_vehs; m++)
    {
        if (veh[m].wrong_way == 1)
        {
            sprintf(msgbuff3,"VEHICLE %s WRONG WAY ",veh[m].veh_id);
            ATC_Window(msgbuff3,4);
            wrong_count++;
        }
    }
    if (wrong_count == 0)
        ATC_Window("              ",4);
    strcpy(veh_id,orig_vehid); /* save current vehicle id */
}
/*----------------------------------------------------------------------
    Unit Name: set_default_layer
    Description: determines the vehicle's default layer based on the type of vehicle
----------------------------------------------------------------------*/
short set_default_layer()
{
    /- local variables -/
    short curr_layer;
    /* determine vehicle's layer based on vehicle type */
    switch (veh_type)
    {
        case LIM_GRND:
            curr_layer = LIM_GRND_LAYER;
            curr_color = LIGHT_CYAN;
            break;
        case FULL_GRND:
            curr_layer = FULL_GRND_LAYER;
            curr_color = LIGHT_MAGENTA;
            break;
        case ARR_AIR:
            curr_layer = ARR_AIR_LAYER;
            curr_color = DARK_GRAY;
            break;
        case DEP_AIR:
            curr_layer = DEP_AIR_LAYER;
            curr_color = BRIGHT_WHITE;
            break;
    }
    return(curr_layer);
}
/*----------------------------------------------------------------------
    Unit Name: set_default_radius
    Description: determines the vehicle's default radius based on the type of vehicle.
----------------------------------------------------------------------*/
short set_default_radius()
{
    short cur_radius;
    /* determine vehicle's collision radius based on vehicle type*/
    switch (veh_type)
    {
                case LIM_GRND:
            cur_radius = LIM_GRND_RAD;
        break;
        case FULL_GRND:
            cur_radius = FULL_GRND_RAD;
        break;
        case ARR_AIR:
            cur_radius = AIRCRAFT_RAD;
        break;
        case DEP_AIR:
            cur_radius = AIRCRAFT_RAD;
        break;
        default:
            cur_radius = AIRCRAFT_RAD;
    }
    return(cur_radius);
}
/*----------------------------------------------------------------------
    Unit Name: chk_for_collisions
    Description: Uses the current vehicle's position and velocity data and compares it with
    each vehicle in the database. Called by vehicle processor each time a local GPS message
    is received. Called by ATC processor when a remote vehicle message is received.
    Requires global variable veh_id.
```

-continued

Inputs: curr_veh, current vehicle. Set to projected position for vehicle processing,
most recent remote vehicle message for ATC processing.
-----------------------------------------------------------------------------------------------------------*/
```
chk_for_collisions(POINT *cur_veh)
{
    /- local variables -/
    POINT_XYZ projp;        /* projected current position    */
    POINT_XYZ projv;        /* projected vehicle position    */
    char msg_buf[60];       /* collision message             */
    short num_secs=1;       /* # of seconds into coll checking */
    short coll_watch = FALSE; /* flag — collision watch condition */
    double dr;              /* distance between cur_veh & veh */
    double cr,vr;           /* radius of rough coll spheres  */
    int i,k;                /* counter                       */
    unsigned freq;          /* alarm tone frequency          */
    short coll_warning = FALSE; /* collision warning condition */
    short no_warning=TRUE;  /* no warnings pending           */
    short no_watch=TRUE;    /* no watches pending            */
    int veh1,veh2;          /* vehicle ids                   */
    short clear_msg;
    /* initializations */
    clear_msg = 0;
    coll_condition = FALSE;
    /* project current position ahead max_proj_time seconds */
    projp.x = cur_veh—>x + cur_veh—>x_vel * max_proj_time;
    projp.y = cur_veh—>y + cur_veh—>y_vel * max_proj_time;
    projp.z = cur_veh—>z + cur_veh—>z_vel * max_proj_time;
    /* determine radius of sphere from cur_veh posn to projp */
    cr = sqrt(pow((projp.x - cur_veh—>x),2) +           continued next line
              pow((projp.y - cur_veh—>y),2) +           continued next line
              pow((projp.z - cur_veh—>z),2));
    /* if radius is < default radius, set it to the default value */
    if (cr < cur_radius)
        cr = cur_radius;
    for (i = 0; i < num_vehs; i++)
    {
        /* reinitialize watch/warning states */
        coll_watch = FALSE;
        coll_warning = FALSE;
        /* do not compare vehicle to itself! */
        if (strcmpi(veh_id,veh[i].veh_id) != 0)
        {
            veh1 = atoi(veh_id);
            veh2 = atoi(veh[i].veh_id);
            /* project vehicle position ahead max_proj_time seconds */
            projv.x = veh[i].ecefx + veh[i].xvel * max_proj_time;
            projv.y = veh[i].ecefy + veh[i].yvel * max_proj_time;
            projv.z = veh[i].evefz + veh[i].zvel * max_proj_time;
            /* determine radius of sphere from veh posn to projp */
            vr = sqrt(pow((projv.x - veh[i].ecefx),2) +         continued next line
                      pow((projv.y - veh[i].ecefy),2) +         continued next line
                      pow((projv.z - veh[i].ecefz),2));
            if (vr < veh[i].radius)
                vr = veh[i].radius;
            /* calculate distance between cur_veh posn and veh posn */
            dr = sqrt(pow((cur_veh—>x - veh[i].ecefx),2) +       continued next line
                      pow((cur_veh—>y - veh[i].ecefy),2) +       continued next line
                      pow((cur_veh—>z - veh[i].ecefz),2));
            if (dr <= (cr + vr)) /* continue checking potential coll*/
            {
            /* perform next level of rough check,
                see if dr increases */
            if (dr <= veh[i].coll_sep)
            {
                veh[i].coll_sep = dr;
                while ((num_secs < max_proj_time) &&
                       (coll_watch == FALSE))
                {
                    /* project current position ahead num_secs */
                    projp.x = cur_veh—>x + cur_veh—>x_vel * (num_secs-1);
                    projp.y = cur_veh—>y + cur_veh—>y_vel * (num_secs-1);
                    projp.z = cur_veh—>z + cur_veh—>z_vel * (num_secs-1);
                    /* project vehicle position ahead num_secs */
                    projv.x = veh[i].ecefx + veh[i].xvel * (num_secs-1);
                    projv.y = veh[i].ecefy + veh[i].yvel * (num_secs-1);
                    projv.z = veh[i].ecefz + veh[i].zvel * (num_secs-1);
                    /* calculate distance btwn current proj pos &
                        proj veh pos */
                    dr = sqrt(pow((projp.x - projv.x),2) +       continued next line
```

```
                    pow((projp.y - projv.y),2) +           continued next line
                    pow((projp.z - projv.z),2));
        if (dr <= (cur_radius + veh[i].radius))
        {
            /* if a collision was previously detected */
            if (veh[i].coll_count > 0)
            {
                if (num_secs <= veh[i].coll_time)
                {
                        veh[i].coll_time = num_secs;
                    veh[i].coll_count++;
                    coll_watch = TRUE;
                    no_watch = FALSE;
                    layer = WATCH_LAYER;
                    veh[i].prev_layer = veh[i].layer_id;
                    coll_condition = TRUE;
            } /* if num_secs */
            else
            {
                if (num_secs > min_warning)
                {
                        veh[i].coll_time = 0;
                    veh[i].coll_count = 0;
                }
            }
        } /* if coll_count */
        else
        {
                veh[i].coll_time = num_secs;
            veh[i].coll_count++;
            coll_watch = TRUE;
            no_watch = FALSE;
            layer = WATCH_LAYER;
            veh[i].prev_layer = veh[i].layer_id;
            coll_condition = TRUE;
        } /* else */
        if (veh[i].coll_time > 0)
        {
            if ((veh[i].coll_time < min_warning) ||         continued next line
                ((veh[i].coll_time < mid_warning) &&        continued next line
                (veh[i].coll_count >= max_coll_count)))
            {
                coll_warning = TRUE;
                no_warning = FALSE;
                layer = WARNING_LAYER;
                veh[i].prev_layer = veh[i].layer_id;
                coll_condition = TRUE;
            } /* if */
        } /* if coll_time > 0 */
    } /* if dr */
        num_secs++;
    } /* while */
} /* if */
else /* vehs are getting further apart */
{
    veh[i].coll_sep = dr;
    veh[i].coll_time = 0;
    veh[i].coll_count = 0;
        }
} /* if */
else /* rough test failed, no collision */
{
    veh[i].coll_time = 0;
    veh[i].coll_count = 0;
    veh[i].coll_sep = DEF_SEP;
}
/* determine if warning message must be displayed */
if ((coll_warning == TRUE) && (gpsveh_type == ATC))
{
    if (veh1 > veh2)
            sprintf(msg_buf,"COLLISION WARNING VEHICLES \
                %s AND %s",veh_id,veh[i].veh_id);
    else
            sprintf(msg_buf,"COLLISION WARNING VEHICLES \
                %s AND %s", veh[i].veh_id,veh_id);
    ATC_Window(msg_buf,1);
}
else
{
```

-continued

```
        /* determine if watch msg must be displayed */
        if ((coll_watch == TRUE) && (gpsveh_type == ATC))
        {
            if (veh1 > veh2)
                sprintf(msg_buf,"COLLISION WATCH VEHICLES \
                    %s AND %s      ",veh_id,veh[i].veh_id);
            else
                sprintf(msg_buf,"COLLISION WATCH VEHICLES \
                    %s AND %s      ",veh[i].veh_id,veh_id);
                ATC_Window(msg_buf,1);
            }
        }
        if ((col_watch == FALSE) && (coll_warning == FALSE))
            ;
        else
            coll_condition = TRUE;
    } /* if veh_id */
} /* for each vehicle */
    /* determine if watch or warning message should be cleared */
    if (gpsveh_type == ATC)
    {
        for (k = 0; k < num_vehs; k++)
        {
            if (veh[k].coll_cond == TRUE)
                clear_msg++;
        }
        if ((clear_msg == 0) && (coll_condition == FALSE))
        {
            sprintf(msg_buf,"              \
                              ");
            ATC_Window(msg_buf,1);
        }
    }
}
```

OVER COMING ERROR SOURCES
MAP TEMPORAL DIFFERENTIAL CORRECTION

Figure 31:
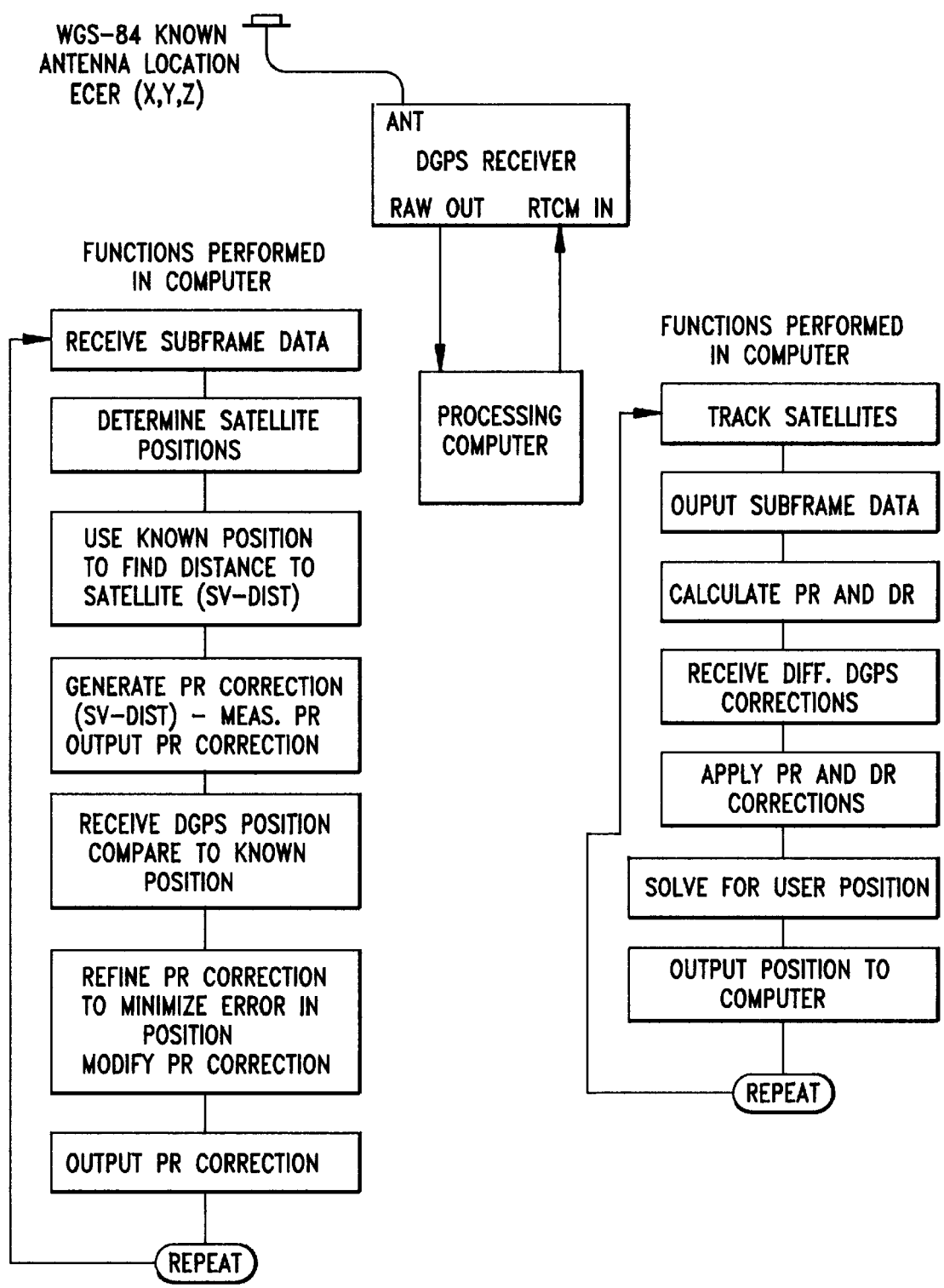
FIG. 31 depicts the map temporal differential correction system diagram.

Map temporal differential corrections are a simple and effective means of reducing error sources in GPS operation for short periods of time when Selective Availability is not active. FIG. 31 depicts the map temporal correction elements.

Map temporal corrections utilize at least one precisely surveyed location in the local area. The surveyed location may be determined from a monument marker or may be determined using a highly accurate digital or paper map. A GPS receiver and (optionally) a processing computer are co-located at the known location with the GPS antenna carefully positioned at the survey point. The receiver/computer remains at the known location for a period of time and, when enough data has been collected, determines pseudo range correction and pseudo range rate factors. These correction factors may then be applied to the differential GPS receiver to determined a corrected position. These factors are used in subsequent position determinations until another map temporal correction is applied.

Map temporal corrections are the simplest form of closed loop differential correction. As the name implies, temporal corrections degrade with time as the receiver moves within the local area. SA significantly reduces the benefits of a temporal differential correction approach. When SA is not active, the short term (30 minute) accuracy of this technique is very good (a meter or two), since all error sources are reduced. One additional limiting factor is that the same satellites must be used during roving operations as those used at the surveyed location. This may be accomplished through software control to ensure a 'selected' set of satellites are used for a given GPS session.

REGIONAL DIFFERENTIAL CORRECTIONS AND DIFFERENTIAL OVERVIEW

Real time differential correction techniques compensate for a number of error sources inherent to GPS. The idea is simple in concept and basically incorporates two or more GPS receivers, one acting as a stationary base station and the other(s) acting as roving receiver(s). The differential base station is "anchored" at a known point on the earth's surface. The base station receives the satellite signals, determines the errors in the signals and then calculates corrections to remove the errors. The corrections are then broadcast to the roving receivers.

Figure 32:
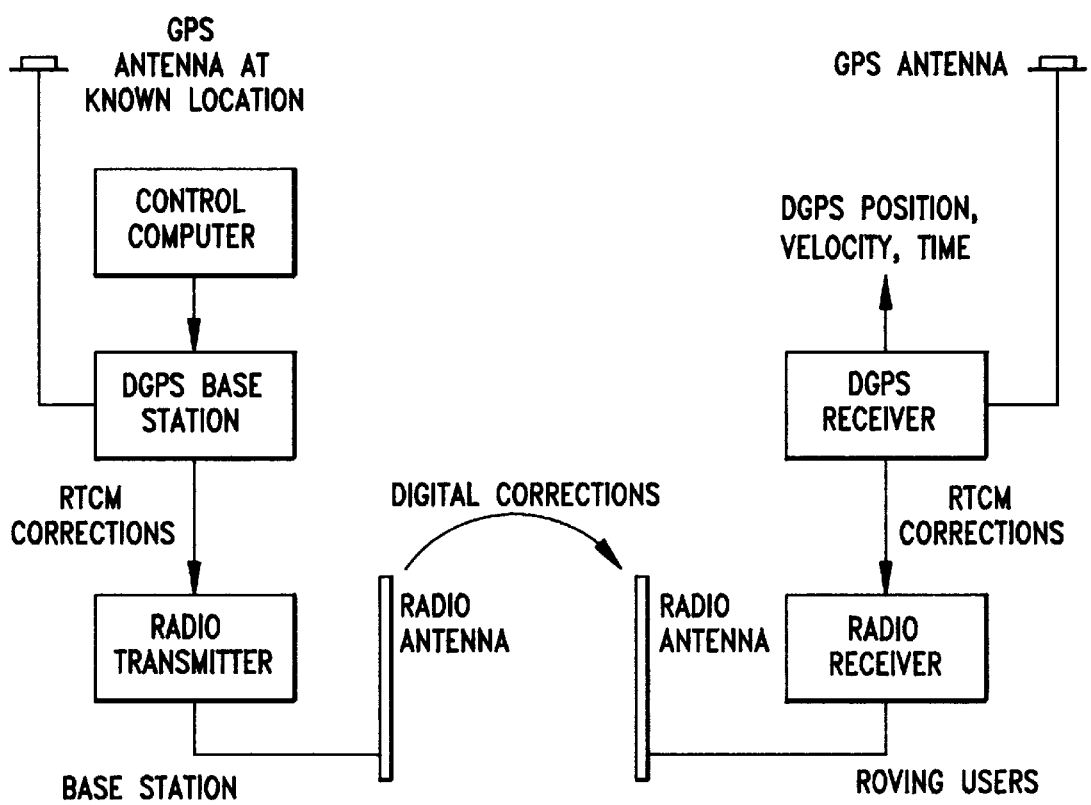
FIG. 32 depicts the differential GPS system diagram.

Real time differential processing provides accuracies of 10.0 meters or better (typically 1.0–5.0 meters for local differential corrections). The corrections broadcast by the base station are accurate over an area of about 1500 km or more. Typical positional degradation is approximately a few millimeters of position error per kilometer of base station and roving receiver separation. FIG. 32 shows the basic elements for real time differential GPS (DGPS) operations.

Through the implementation of local differential GPS techniques. SA errors are reduced significantly while the atmospheric errors are almost completely removed. Ephemeris and clock errors are virtually removed as well.

ERROR SOURCES CORRECTED OR REDUCED BY DGPS
  USER RANGE ERRORS (URE)
  1 SIGMA MAGNITUDES

|  | WITHOUT DGPS | WITH DGPS |
| --- | --- | --- |
| SATELLITE CLOCK & NAV. | 2.7 | 0 |
| EPHEMERIDES & PREDICTION | 2.7 | 0 |
| ATMOSPHERIC | 9.0 | 0 |

-continued

|  | WITHOUT DGPS | WITH DGPS |
|---|---|---|
| IONOSPHERIC |  |  |
| TROPOSPHERIC | 2.0 | .15* |
| SELECTIVE AVAILABILITY | 30.0# | 0 |
| TOTAL RSS | 31.6 | .15 |

*Tropospheric effects are a local phenomenon and are a function of the altitude difference from the base station to the roving receiver and the local elevation angle of the satellite.
To counteract the effects of SA, differential corrections must be generated, transmitted and utilized in the GPS receiver at a rate sufficient to compensate for the rate of change of SA.

Differential GPS can introduce an additional error, if not employed properly. The age of the differential correction must be monitored at the GPS receiver. As the differential correction ages, the error in the propagated value increases as well. This is particularly true for 'virulent' strains of SA where the errors introduced slew quickly over very short time intervals.

OPERATIONAL ELEMENTS

The precisely surveyed location of the GPS antenna is programmed into the reference station as part of its initial installation and set up procedures. Industry standard reference stations determine pseudo range and delta range based on carrier smoothed measurements for all satellites in view. Since the exact ECEF position of the antenna is known, corrections may be generated for the pseudo range and delta range measurements and precise time can be calculated.

Naturally occurring errors are, for the most part, slow changing and monotonic over the typical periods of concern. When SA is not invoked, delta range corrections provide a valid method of improving positional accuracy at the roving receivers using less frequent correction broadcasts. With the advent of SA and its random, quick changing non-monotonic characteristics, delta range corrections become somewhat meaningless and may actually degrade the system performance under some conditions.

As shown previously in FIG. 32, the DGPS correction messages are broadcast by the reference station and received by the roving receivers. The corrections are applied directly to the differential GPS receiver. The DGPS receiver calculates the pseudo range and the delta range measurements for each satellite in the usual manner. Prior to performing the navigation solution, the received pseudo range and delta range corrections are applied to the internal measurements. The receiver then calculates corrected position, velocity and time data. Typical DGPS position and velocity performance is presented in the table below.

COMPARISON OF TYPICAL GPS POSITION AND VELOCITY

MEASUREMENTS USING COMMERCIAL NAVIGATION TYPE RECEIVERS (ACCURACIES ARE A FUNCTION OF CORRECTION AGE)

THIS EXAMPLE USES CORRECTION AGE=5 SECONDS

|  | WITHOUT DGPS | | WITH DGPS | |
|---|---|---|---|---|
|  | CODE RCVR | CARRIER RCVR | CODE RCVR | CARRIER RCVR |
| 2-D POSITION | <100 M | <40 M | <10 M | <2 M |
| 3-D POSITION | <176 M | <80 M | <18 M | <4 M |
| VELOCITY knots | <10 KN | <5 KN | <.1 KN | <.1 KN |
| TIME* | <300 ns | <100 ns | <100 ns | <50 ns |

*The time accuracy is highly dependent upon the type of receiver. Specialized, precise time receivers provide accuracies in the 5 to 25 nanosecond range. Most navigational receivers do not provide this level of time accuracy since it is not required for general navigation.

Since differential GPS eliminates most GPS errors, it provides significant improvements in system reliability for life critical airport operations. Short term and long term drift of the satellite orbits, clocks and naturally occurring phenomenon are compensated for by differential GPS as are other potential GPS satellite failures. Differential GPS is mandatory in the airport environment from a reliability, accuracy and fault compensating perspective.

As with autonomous GPS receiver operation, multipath is a potential problem. The differential reference station cannot correct for multipath errors at the roving receiver(s). Antenna design and placement considerations, and receiver design characteristics remain the best solutions to date in the minimization of multipath effects.

DGPS provides the means to eliminate most GPS system errors. The remaining errors are related to receiver design and multipath. Not all GPS receivers and reference stations are created equal, some are distinctly better than others. The selection of the reference station and the roving receivers has a significant effect on the overall system accuracy.

COMPENSATING FOR RECEIVER ERROR

Figure 33:
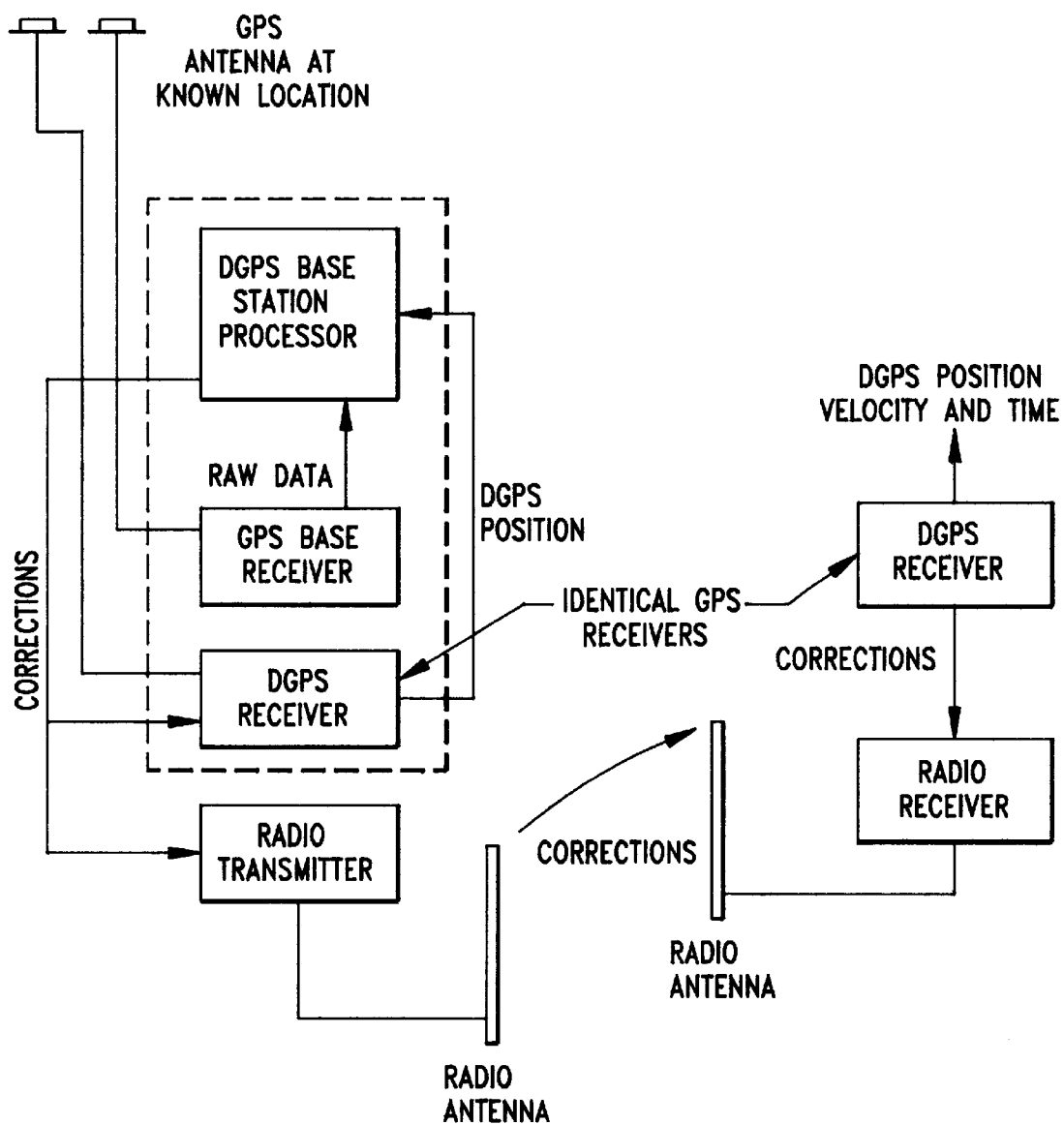
FIG. 33 depicts the closed loop differential GPS system diagram.
Figure 34:
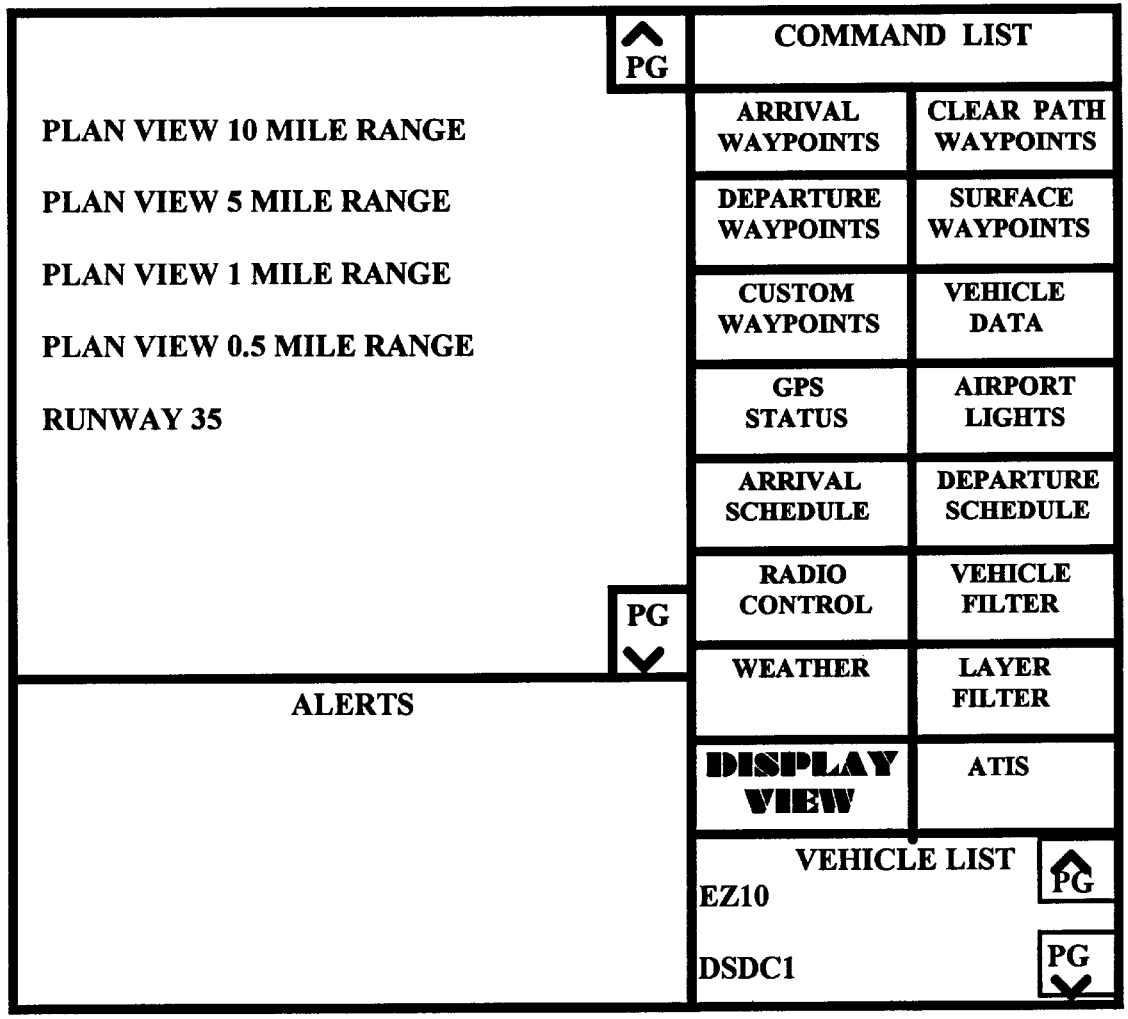
FIG. 34 depicts the computer human interface using a touch screen.

Receiver errors are not corrected using an 'open loop' differential correction method as described above. These errors may be reduced when a 'closed loop' differential technique is employed. FIG. 33 presents a high level block diagram of a 'closed loop' differential system. FIG. 33 has additional elements over the standard differential system configuration. A second GPS antenna is installed at a precisely surveyed antenna location and a stationary GPS receiver is co-located with the reference station. This receiver accepts differential correction inputs generated by the reference station. The stationary GPS receiver incorporates the pseudo range corrections in the normal manner and determines DGPS position and velocity. The corrected position and velocity are then compared to the stationary receivers known position and velocity (0,0,0). The ECEF delta position and velocity data are then used by the reference station processing to further refine the pseudo range and delta range corrections which are broadcast to the roving receivers. Processing software which minimizes the position and velocity errors is used. This technique requires that the roving receivers be identical to the stationary GPS receiver located at the reference station site. That is, the roving receivers must exhibit receiver errors similar to those on the stationary DGPS receiver.

INTEGRITY AND MULTI-SENSOR SYSTEMS

The issues of integrity and fault monitoring are a major concerns for any technology considered for the life critical application of air transport and air traffic control. The integration of GPS with other technologies provides a higher degree of fault detection capability, a potentially improved GPS navigational performance, and the potential of limited navigation support should a catastrophic GPS failure occur aboard the vehicle.

The integration of GPS with an inertial system can be used to improve the dynamic performance of the navigation solution. Dynamic sensors may provide jerk, acceleration and velocity information to aid in the navigation solution. Sole means inertial navigation may be used in conjunction with GPS. The integration of GPS with inertial systems usually require 12 (or higher) state Kalman filter solutions techniques.

The concept of Receiver Autonomous Integrity Monitoring (RAIM) is accepted as a potential integrity monitoring system. The RAIM concept requires that the GPS receiver and/or navigation system include the required "smarts" to diagnose its own health using additional satellites, redundant hardware and specialized internal software processing. RAIM standards are currently being developed for industry approval.

When combined with other sensors such as WAAS, inertial, baro altimeter and internal RAIM processing, GPS will have superior accuracy, fault tolerance and fault detection capability.

FAULT TOLERANCE AND HIGH AVAILABILITY

Any system which controls life critical operations at an airport must support fault tolerance and high availability. At the same time, the system must be cost effective and support technology insertion. High system availability may be achieved through a custom design process utilizing selected and screened components for high Mean Time Between Failure (MTBF). Alternatively, high availability may be achieved through system redundancy using components of non-custom, commercial-off-the-shelf design. The following paragraphs introduce a few of the concepts which are later utilized in the system design analysis.

AVAILABILITY: Availability is defined as the probability that a system will operate to specification at any point in time, when supported with a specific level of maintenance and spares.

MEAN TIME BETWEEN FAILURES (MTBF): The mean time a piece of equipment will remain operational before it is expected to fail.

RELIABILITY: The inherent probability that a piece of equipment or hardware will remain operational for a period of time (t). It is expressed as follows:

$$R(t) = e^{-(t/MBTF)}$$

TRAVEL TIME: The travel time is measured from the time of failure to the time the repair technician and required spare parts arrive at the failed equipment.

MEAN TIME TO RECONFIGURE (MTTC): The mean time a system is inoperable as measured from the time of failure to the time of full operation. Typically, reconfiguration time involves bringing on line redundant systems in an effort to provide continued services.

MEAN TIME TO REPAIR AND CERTIFY (MTTRC): The mean time of the actual repair and recertification activities as measured from the time of arrival of the failed equipment to the time which the equipment is on line, certified and declared operational.

MEAN TIME TO REPAIR (MTTR): MTTR is the sum of TRAVEL+MTTC+MTTRC. AVAILABILITY EXAMPLE The following analysis builds upon elements of the system composed of off the shelf components arranged in a redundant configuration. Commercial industrial single board computers are connected with other commercial elements in the manner as shown in the FIGS. 28, 29, 30. This approach provides cost effectiveness, COTS technology insertion, declining COTS life cycle costs and high availability. The analysis starts with no design redundancy FIG. 28, and ends describing a two controller station redundant architecture FIG. 30.

Figure 28:
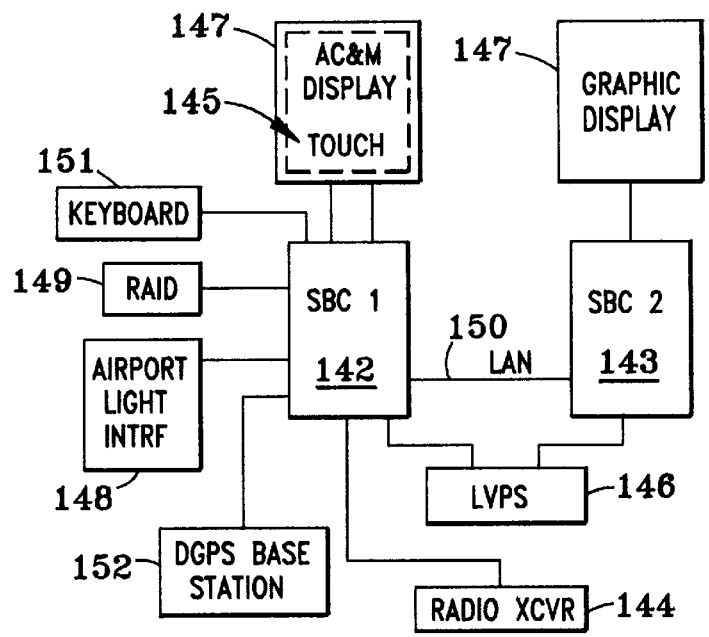
FIG. 28 depicts the airport system single controller station, non-redundant design.

This example will determine the overall reliability and availability of the architecture shown in FIG. 28. The requirement for system availability for this terminal area system comes from the FAA Advanced Automation Program (AAS). The AAS program defines the system yearly availability to be 0.99995 determined using a 2 hour travel time which is added to any other system down time. The major elements of the airport system shown in FIG. 28.

KEY OPERATIONAL PARAMETERS
AVAILABILITY*                        AVAIL = 0.99995
TRAVEL TIME(HRS)*                    TRAVEL = 2.0
  * = FROM FAA ADVANCED AUTOMATION SPECIFICATION
TIME TO AUTO CONFIGURE(HRS)   MTTC = .025 90 SECONDS
MEAN TIME TO REPAIR                  MTTRC = 25
AND CERTIFY(HRS)
         (TESTED SPARES, FAULT ISOLATED TO LRU)
              MEAN TIME TO REPAIR(MTTR)
              MTTR = MTTRC + MTTC + TRAVEL
                     MTTR = 2.275
              SPECIFIC COMPONENT PARAMETERS
         SINGLE BOARD COMPUTER 142, 143 MEAN
              TIME BETWEEN FAILURES(HRS)
                      SBC := 90000
                  SBC RELIABILITY(RSBC)

$$RSBC = e^{-\frac{YR}{SBC}} \qquad RSBC = 0.907254$$

DIGITAL RADIO TRANSCEIVER 144 MEAN TIME BETWEEN
              FAILURES(HRS)
               XCVR = 75000
   DIGITAL RADIO TRANSCEIVER RELIABILITY(RXMTR)

$$RXCVR = e^{-\frac{YR}{XCVR}} \qquad RXCVR = 0.889763$$

TOUCH SCREEN 145 MEAN TME BETWEEN
              FAILURES(HRS) TOUCH = 100000
          TOUCH SCREEN RELIABILITY(RTOUCH)

$$RTOUCH = e^{-\frac{YR}{TOUCH}} \qquad RTOUCH = 0.916127$$

LOW VOLTAGE DC POWER SUPPLY 146 MEAN TIME
                   BETWEEN FAILURES(HRS)
                       LVPS := 500000
         LOW VOLTAGE POWER SUPPLY RELIABILITY(RLVPS)

$$RLVPS: = e^{-\frac{YR}{LVPS}} \qquad RLVPS = 0.982633$$

FLAT SCREEN DISPLAY 147 MEAN TIME BETWEEN
                   FAILURES(HRS) DIS = 75000
              FLAT SCREEN DISPLAY RELIABILITY(RDIS)

$$RDIS: = e^{-\frac{YR}{DIS}} \qquad RDIS = 0.889763$$

AIRPORT LIGHTING UNIT 148 MEAN TIME BETWEEN
                       FAILURES(HRS)
         Interface only, no light bulbs or individual light switches
                          LITE = 150000
              AIRPORT LIGHTING UNIT RELIABILITY(RLITE)

$$RLITE: = e^{-\frac{YR}{LITE}} \qquad RLITE = 0.965567$$

REDUNDANT ARRAY of INEXPENSIVE DISKS(RAID
                       149 MTBF(HRS)
                       RAID = 150000

-continued $RRAID := e^{-\frac{YR}{RAID}}$      RRAID = 0.943273

LOCAL AREA NETWORK 150 MEAN TIME BETWEEN
FAILURES(HRS)
LAN = 87600
LOCAL AREA NETWORK RELIABILITY(RLAN)

$RLAN := e^{-\frac{YR}{LAN}}$      RLAN = 0,904837

KEYBOARD 151 MEAN TIME BETWEEN FAILURES(HRS)
KBD := 75000
KEYBOARD RELIABILITY(RKBD)

$RKBD = e^{-\frac{YR}{KBD}}$      RKBD = 0.889763

DIFFERENTIAL BASE STATION 152 MEAN TIME BETWEEN
FAILURES(HRS)
DIFF = 100000
DIFFERENTIAL BASE STATION RELIABILITY(RDIFF)

$RDIFF = e^{-\frac{YR}{DIFF}}$      RDIFF = 0.916127

This particular analysis is for a single controller station, multiple stations could be used simply by duplicating the design elements. The controller must have the following capabilities to perform his airport duties:

1. have full duplex voice and data communications
2. a controlling AC&M display and graphic display
3. a command touch screen capability or keyboard
4. differential GPS for all navigation
5. airport lighting interface (independent bulbs and switches may fail without loss of function)

The minimal set of controller actions require the following hardware and associated software to be operational.

1. radio transceiver (voice and data function)
2. AC&M display, SBC server, and RAID
3. Graphic display, SBC,
4. a low voltage power supply
5. a command and control touch screen or a keyboard
6. minimal configuration operational software
7. a LAN assembly
8. a different GPS base station
9. a airport lighting interface The hardware elements can be connected in a minimal hardware configuration and the overall availability can be compared to the specified value of 0.99995

INITIAL SERIES RELIABILITY
RINT=
 RSBC²·RXCVR·RTOUCH·RLVPS·RDIS²·RRAID
 RLAN·RDIFF·RLITERKBD
RINT=0.350629

The initial MTBF for the series string is determined below.

$MTBFINT := \frac{-(YR)}{\ln(RINT)}$   MTBFINT = 8358.56594

Figure 29:
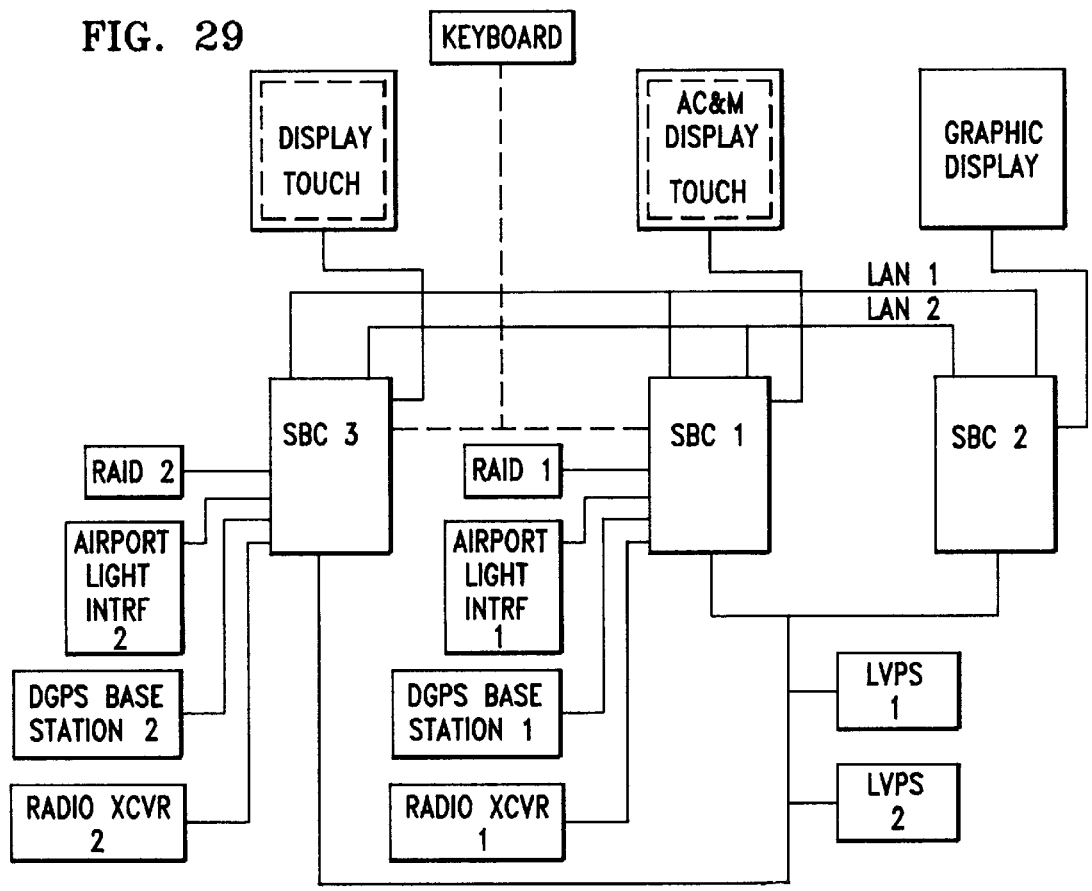
FIG. 29 depicts the airport system redundant single controller station.

Initial availability based upon series minimum configuration is $\frac{MTBFINT}{MTBFINT + MTTR} = 0.999728$ As expected availability does not meet the specification, system redundancy will be necessary to achieve the design goal. To meet the required availability a system MTBF of about 45,000 hours will be necessary with a 2.275 hour mean time to repair. A new architecture is shown in FIG. 29.

AIRPORT SYSTEM, SINGLE REDUNDANT CONTROLLER STATION

Redundant radio transceivers will be necessary since a single point failure is unacceptable in this component. Parallel radio transceiver reliability is determined below:
 RXCVRP=RXCVR+RXCVR−RXCVR·RXCVR
 RXCVRP=0.987848

Redundant LVPS are required for the same reason.
 RLVPSP RLVPS RLVPS (RLVPS·RLVPS) RLVPSP=
 0.999698

Redundant Local Area Networks are also required, since a single point failure can not be tolerated in communications between the AC&M SBC and Graphic SBC.
 RLANP=RLAN+RLAN−(RLAN·RLAN) RLANP=
 0.990944

Redundant Differential GPS are also required, since a_single point failure can not be tolerated in airport navigation functions.
 RDIFFP=RDIFF+RDIFF−(RDIFF·RDIFF) RDIFF=
 0.916127

Redundant airport lighting control interfaces are required.
 RLITEP=RLITE RLITE (RLITE·RLITE) RLITEP=
 0.998814

The keyboard and the touch screen provide the same capability, hence may be treated as a parallel redundant system element. The keyboard/touch screen combination is found below:
 RTOU_KBD=RKBD+RTOUCH−(RKBD·RTOUCH)
 TROU_KBD=0.990754

An extra display surface will be added to display information. This display capability will be used should a failure occur in an AC&M display or in a graphic situation display. A 2 of 3 display scenario is used for successful mission completion. Should a failure occur auto reconfiguration must occur within the specified time allocation. To determine exactly what the 2 out of 3 display process represents, a probability analysis is performed. The probability is determined from the series elements which make up the display function. One display channel may fail while the two others provide the necessary information. The third display is used to provide non mission critical information when acting as a hot spare.

SERIES DISPLAY CHANNEL ELEMENTS
 RSDIS=RDIS·RSBC·RRAID RSDIS=0.761448

In the 2 of 3 scenario the possible operating combinations must add to one; meaning the probability of all of the possible operating modes must add to 1. The operating combinations are identified below:

1. all 3 serial display channels are operational
2. one channel is down and the other two are operational
3. two channels are down and only one is operating
4. all channels are down UNRELIABILITY IS DEFINED AS:
 Q=1−RSDIS
THE PROBABILITY IS DEFINED BELOW:
 RTOTAL=RSDIS³+3·RSDIS²·Q+3·RSDIS·Q²+Q³

RTOTAL=1 All combinations to add to 1
TWO OF THREE OPERATIONAL RELIABILITY IS
R2OF3:=RSDIS$^3$+3·RSDIS$^2$·Q+0+0 R2OF3=0.856429
Now the overall system reliability and availability functions may be evaluated.

RFINAL=R2OF3·RXCVRP·RLVPSP·RTOU_KBD·RLANP·RDIFFP·RLITEP RFINAL=0.82354

$$MTBFFIN := \frac{-(YR)}{\ln(RFINAL)} \quad MTBFFIN = 45121.264957$$

$$FINALAV := \frac{MTBFFIN}{MTBFFIN + MTTR} \quad FINALAV = 0.99995$$

From a hardware perspective the systems meets requirements. The system software must be able to detect hard and soft failures and must be able to fault isolate the failed device. Parallel hardware redundancy and "smart" software provide the necessary fault monitoring, fault containment and fault identification to the LRU level. Operational software is tailored to the specific application, but the hardware is based upon COTS standards to allow for future technology insertion and cost effective replacement.

Figure 30:
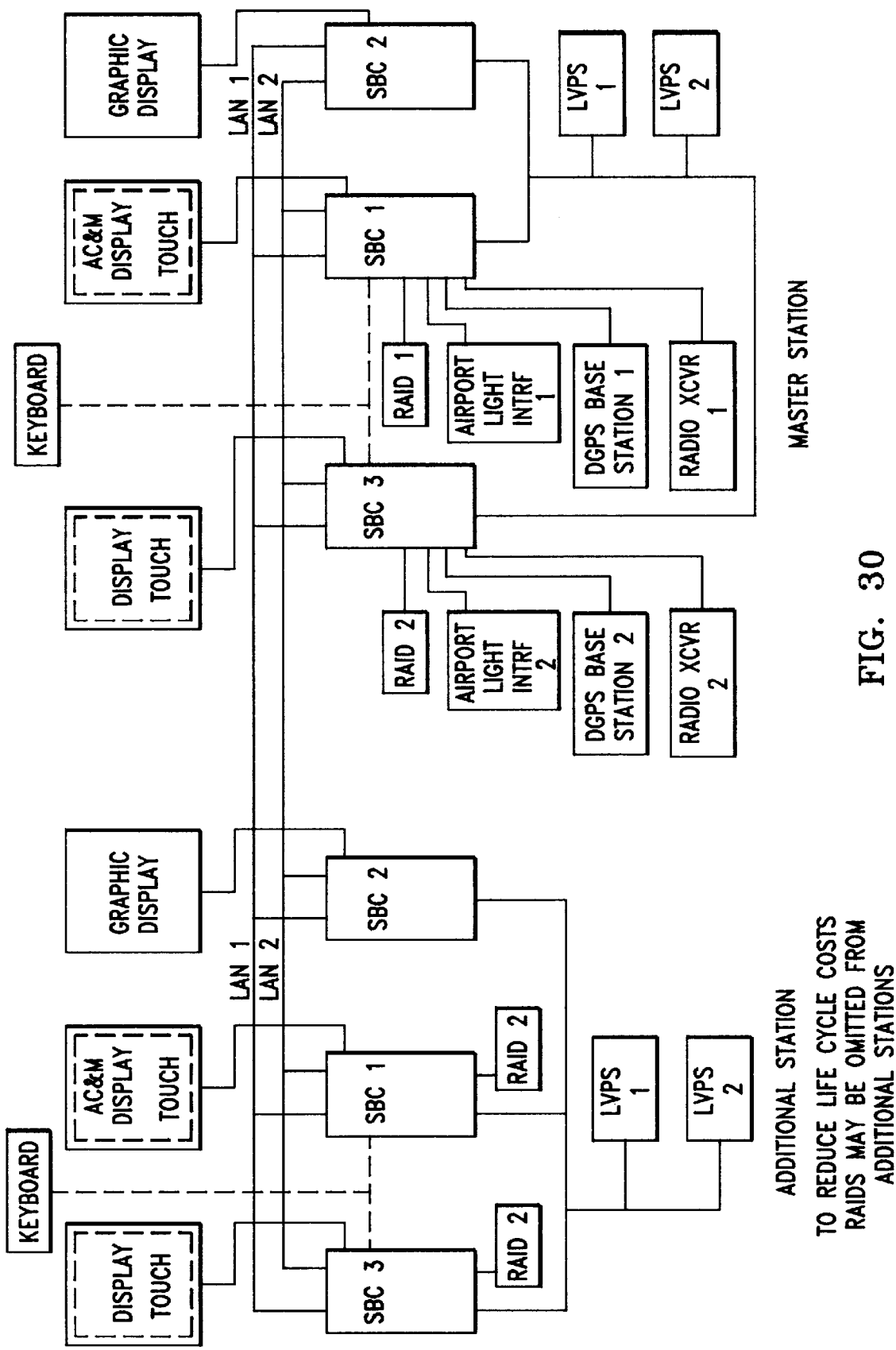
FIG. 30 depicts the airport system redundant dual controller station.

Multiple controller stations may be added to support larger airport systems. In this case a slightly different architecture is utilized. Common elements are shared by multiple stations. In the 2 station architecture shown parallel differential GPS base stations, parallel lighting control interfaces, parallel Local Area Networks and parallel transceivers are utilized. Since a redundant capability is provided with multiple controller stations consisting of 2 of 3 scenario increased availability is provided as shown in FIG. 30.

\*airport facilities—runways, taxiways, ramps, service roads, navigation aids, and buildings
\*airspace matters—existing and planned approach/missed approach/departure procedures, special use and controlled airspace, control zones and traffic patterns
\*obstructions to air and ground navigation
\*airport topography
\*precise airport monumentation If designed properly, the ALP should be suitable for use in airport master plan activities, emergency work, maintenance, navigation and ATC.

GPS COMPATIBLE MONUMENTATION

Airport ALP generation or mapping activities may use any number of map coordinate systems based on a number of earth datums or ellipsoid references. Standardization of the mapping techniques and references are key in the development of any successful multi-use mapping program. In addition to the selection of a standard reference system, the interface to the local area surrounding the airport must be addressed. Accurate cross referenced monumentation points are necessary to allow for a smooth transition between the local coordinate system and the one used in the airport maps or in the navigation system. In the U.S. local State Plane Coordinate Systems (SPCS) form the baseline for most local mapping activities. As such, the ALPs for all U.S. airports should be monumented with reference points to provide for accurate coordinate conversion between World Geodetic Survey of 1984 (WGS 84) Latitude—Longitude, Earth Centered Earth Fixed (ECEF) X, Y, Z and local SPCSs or Universal Transverse Mercator (UTM). GPS and conventional survey techniques are recommended for such monumentation.

---

THE RELIABILITY OF THE TWO CONTROLLER STATION IS FOUND BELOW

RSTAT: = R2O3 · RTOU_KBD · RLVPSP          RSTAT = 0.848255
    THE RELIABILITY OF THE SHARED ELEMENTS FOLLOWS

REXT: = RLVPSP · RXCVRP · RDIFFP · RLITEP · RLANP   REXT = 0.97057
    RELIABILITY OF THE TWO PARALLEL 2 OF 3 CONTROLLER STATIONS IS

RSTATP: = RSTAT + RSTAT − (RSTAT · RSTAT)      RSTATP = 0.976973
    RELIABILITY OF THE TWO CONTROLLER STATION AIRPORT SYSTEM IS

RTOT: = RSTATP · REXT                          RTOT = 0.948222
                    SYSTEM TOTAL MTBF IS $$MTBF := \frac{-(YR)}{\ln(RTOT)} \quad MTBF = 16763.651199$$

SYSTEM AVAILABILITY IS $$AVAIL := \frac{MTBF}{MTBF + MTTR} \quad AVAIL = 0.999986$$

---

Further availability improvements and cost reduction may be realized when configured with multiple controller stations. The 2 or 3 display channel operation may be reduced to 2 single display channels and RAIDS may be eliminated while still meeting availability goals when operating with multiple redundant reconfigurable controller stations.

AIRPORT LAYOUT PLAN

The U.S. FAA recommends the development of digitized Airport Layout Plans (ALPs). In an ALP, the existing and proposed land and facilities required in the operation and development of the airport are provided in a scaled drawing. Each ALP should include the following information:

The surveyed accuracy of the multi-use airport map is recommended to be better than 0.5 meters for the horizontal and 0.1 meter for elevation. Of particular interest are the Airport Runway Touch Down Marker Reference Points (the precise coordinates of the center of a runway's touch down marker) and the Airport Runway Reference Points (the precise coordinates along the centerline path of the runway). In addition, the precise locations of all turn outs and turn ins should be identified in the airport map database.

Earth reference systems used in these locations should be ECEF X,Y,X. North American Datum of 1983 (NAD 83) or WGS 84 latitude, longitude, MSL. These three models are compatible with GPS-based navigation. Should the positions not be in one of these coordinate reference systems, then local airport multi-coordinate reference monumentation should be used to support the required coordinate conversions.

Airport map latitude, longitude projections should be based upon the Transverse Mercator, Lambert Conformal Conic, or Hotine Oblique Mercator These projections are used in state plane coordinate systems. Additional information on reference systems and projections is available in North American Datum of 1983 (NAD 83), by Charles R. Schwartz.

The Manchester, N.H. (NH) airport map used in numerous test activities was initially in NH State Plane Coordinate System feet. The coordinate system was chosen for compatibility with existing maps and because its represented distances in linear feet rather than in degrees of latitude and longitude. The map was later converted to NH state plane meters and ECEF X,Y,Z representations. Manchester Airport was carefully surveyed and monumentation was performed at multiple sites around the airport. The monumented points were referenced to the ECEF Cartesian Coordinate System, NAD 83 Latitude, Longitude and Mean Sea Level (MSL), and the NH State Plane. Coordinate conversions were performed using the monumented points shown below.

| MULTI-REFERENCE MONUMENTATION | |
| --- | --- |
| FLAGPOLE | RUNWAY 35 END |
| MONUMENT SITE #1 | MONUMENT SITE #2 |
| NEW HAMPSHIRE STATE PLANE COORDINATES | |
| NH SPCS X = 1045137.57 FT E | NH SPCS X = 1048524.02 FT E |
| NH SPCS Y = 158006.05 FT N | NH SPCS Y = 154481.07 FTN |
| NH ALT = 225.04 FT | NH ALT = 215.73 FT |
| NH ALT = 68.59 | M NH ALT = 65.75 M |
| NAD83 LAT, LON, MSL | |
| LAT83 = 42.933325800 N | LAT83 = 42.923628275 N |
| LON83 = 71.439298894 W | LON83 = 71.426691202 W |
| MSL = 225.04 FT | MSL = 215.73 FT |
| MSL ALT = 68.59 M | MSL ALT = 65.75 M |
| ECEF X,Y,Z COORDINATES | |
| ECEFX = 1488741.9 M | ECEF X = 1489950.5 M |
| ECEFY = −4433764.7 M | ECEF Y = −4434130.5 M |
| ECEFZ = 4322109.2 M | ECEF Z = 4321318.4 M |
| GEOID HT = −28.24 M | GEOID HT = −28.24 M |
| WGS ALT = 40.35 M | WGS ALT = 37.51 M |

NAD 83 is a reference datum for the earth replacing the North American Datum of 1927 (NAD 27). It was developed over many years through international efforts of many people. It was the largest single project ever undertaken by the National Geodetic Survey (NGS), spanning 12 years.

The task involved 1,785,772 survey observations of 266,436 sites in North and Central America, Greenland and the Caribbean Islands. The observations were made with all types of survey and measurement equipment from satellites to tape measures. The ultimate task was to develop an earth model which satisfied a set of 1,785,722 simultaneous equations. The task was performed using a least squares approach and Helmert blocking. The purpose was to update NAD 27, calculate geoid heights at 193,241 control points and the deflections of vertical at the control points.

The NAD 83 reference uses the Geodetic Reference System of 1980 (GRS 80) ellipsoid based on the Naval Surface Center 9Z-2 (NSWC 9Z-2) doppler measurements. The ellipsoid is positioned to be geocentric and have cartesian coordinate orientation consistent with the definition of Bureau International de l'Heure (BIH) Terrestrial System of 1984.

NAD 83 data sheets contain information to update North American 1927 references. The data sheets contain new information which is relevant for precise surveys and users of GPS equipment. These include: precise latitude and longitude [DDD MM SS.sssss], latitude—longitude shift in seconds of degree from NAD 27 to NAD 83, elevation above the geoid with standard error, geoid height and standard error, state plane and Universal Transverse Mercator (UTM) coordinates.

These fundamental corrections and ellipsoid constants are the basic parameters used in many coordinate conversions and navigational programs and form the basis of modern survey measurements.

GRS 80 used by NAD 83 has the following fundamental parameters.

NAD 83 PARAMETERS

| PARAMETER | VALUE | UNITS |
| --- | --- | --- |
| Semimajor axis* | 6378137 | M |
| Angular velocity* | $7292115 \times 10^{-11}$ | RAD/SEC |
| Gravitational constant* | $3986005 \times 10^{8}$ | $M^3/SEC^2$ |
| Dynamic form factor unnormalized | $108263 \times 10^{-8}$ | |
| Semiminor axis* | 6356752.314 | M |
| Eccentricity squared | 0.00669438002290 | |
| Flattening | 0.00335281068118 | |
| Polar Radius of Curvature* | 6399593.625 | M |

(*Denotes values which are identical to WGS 84, underline denotes differences between NAD 83 and WGS 84)

(* Denotes values which are identical to WGS 84, underline denotes differences between NAD 83 and WGS 84)

WORLD GEODETIC SURVEY OF 1984

WGS 84 was developed by the U.S. Department of Defense. The reference system started with the same initial BIH conventions as NAD 83 but, over the development, some parameters changed slightly. The geocentric ECEF system is based on a cartesian coordinate system with its origin at the center of mass of the earth. The system defines the X and Y axis to be in the plane of the equator with the X axis anchored 0.554 arc seconds east of 0 longitude meridian and the Y axis rotated 90 degrees east of the X axis. The Z axis extends through the axis of rotation of the earth. The WGS 84 reference uses the GRS 80 ellipsoid as does NAD 83. WGS 84 includes slight changes to GRS 80 parameters which are identified below:

WGS 84 PARAMETERS

| PARAMETER | VALUE | UNITS |
| --- | --- | --- |
| Semimajor axis* | 6378137 | M |
| Angular velocity* | $7292115 \times 10^{-11}$ | RAD/SEC |
| Gravitational constant* | $3986005 \times 10^{8}$ | $M^3/SEC^2$ |
| Dynamic form factor normalized | $-484.16685 \times 10^{-6}$ | |
| Semiminor axis* | 6356752.314 | M |
| Eccentricity squared | 0.00669437999013 | |
| Flattening | 0.00335281066474 | |
| Polar Radius of Curvature* | 6399593.625 | M |

(*Denotes values which are identical to NAD 83, underline indicates where differences occur between NAD 83 and WGS 84)

COMPARISON OF NAD 83 AND WGS 84

The North American Datum of 1983 (NAD 83) and World Geodetic Survey of 1984 (WGS 84) attempt to describe the surface of the earth from two different perspectives. NAD 83 describes the surface of North America using the Geodetic Reference System of 1980 (GRS 80) ellipsoid and over 1.7 million actual measurements. A least squares Helmert blocking analysis was performed by National Geodetic Survey (NGS) on these measurements to determine the best fit solution to the actual measurements. NAD 83 uses monumented reference points across the country to precisely reference various coordinate systems such as the State Plane Coordinate Systems. WGS 84 incorporates positional references using GPS and local references. Position determination by GPS incorporates precise Keplerian orbital mechanics and radio positioning technology. Clearly, the two systems are describing the same thing, but the methods of determining a position are different.

Both NAD 83 and WGS 84 are based on BIH conventions. Though both are based on the GRS 80 ellipsoid, small changes have occurred between the two systems during their development. The basic difference in the dynamic form factor was attributed to GRS 80 using the unnormalized form while WGS 84 used a normalized form and rounded to eight significant figures. Since other parameters derived from the dynamic form factor differences usually appear after the eighth decimal place, most experts feel that the computational differences are of no significance.

Computations to determine the latitude and longitude from ECEF X,Y,Z coordinates highlight the small difference in the two reference systems. It has been shown that the maximum error between the two reference systems occurs at a latitude of 45 degrees. (Refer to North American Datum of 1983, Charles R. Scwartz) No error occurs between the two systems in the determination of longitude. The maximum error amounts to 0.000003 seconds of arc which amounts to a latitude shift of 0.0001 meters. For all practical purposes, the computational differences between the two systems are negligible. This is an important point for, if the two earth models differed in basic latitude and longitude computations, serious charting and navigational problems would occur and GPS navigation based on NAD 83 referenced maps would be seriously limited.

Both WGS 84 and NAD 83 have common points used as local reference points. The differences between the two systems may reach several meters in rare locations, but on the average the systems should be identical. Generally, measurement errors and equipment inaccuracies introduce more error than the differences in the two systems.

For airport mapping and GPS navigation we can assume that errors due to the differences between the NAD 83 and WGS 84 ellipsoid models are negligible. This implies that either system can be used in calculating navigational entities and performing precise mapping with GPS navigation. The monumented New Hampshire points established on NAD 83 near the airport are well within the measurement accuracy of the GPS survey and navigation equipment. The documented offsets between NAD 83 and WGS 84 for New Hampshire are 0.0 meters in the Y direction and −0.5 meters in the X direction.

PHOTOGRAMMETRY

Photogrammetry techniques incorporating ground reference point(s) are recommended for creating electronic ALP's. Various techniques may be employed to generate digital ALP's including aerial photogrammetry and ground based moving platforms with integrated video cameras and sensors. The collected image data may be post processed to produce a highly accurate 2 or 3-D digital map of the surrounding area.

A digital map of Manchester (NH) Airport was created to support early test activities. The digital map was based on aerial photogrammetry and GPS ground control using post-processing software. A Wild Heerbrugg aerial camera equipped with forward motion compensation was used to capture the photogrammetry. The 3-D digitalization was performed using a Zeiss stereoscopic digitizing table. During the digitalization process, numerous object oriented map layers were constructed to segregate various types of map information. The resulting 3-D digital map had a relative horizontal accuracy of better than 1.0 meter and a relative vertical accuracy of better than 0.1 meter across the airport.

3-D GRAPHICS FORMATS

Many digital map formats are in widespread use today. Translators are available to convert from one computer format to another. Maps may be in either raster format (such as those generated by image scanning) or vector format (those developed on CAD and digitizing equipment). The vector format provides a much more robust environment for developers of ATC and map display systems. Vector based drawings are represented by individual vectors which can be controlled and modified individually or collectively. This enables the developer to manage these entities at a high level rather than at the individual pixel level. The vectors may represent specific geographical features (entities) in the map which may be assigned to a particular map layer in a particular user defined color.

Since the map and ATC situation display are in a vector format, a convenient method of graphically identifying and manipulating information is available. The selection of a graphical symbol on the screen through the use of a pointing device can be used to access an entity-related database or initiate an entity-based processing function. With raster-based images, there is no simple way to segregate the various pieces of map or graphic information for high level management.

Raster formats represent a series of individual pixels, each pixel controlled as a function of a series of control bits. Typically a series of three (3) words are used to describe the Red, Green and Blue (RGB) intensity of each pixel. Each pixel of information represents the smallest piece of the image and has no information about the larger graphical entity that it is part of. From a management perspective, this introduces additional complications for even the simplest graphical manipulation tasks such as suppressing the display of a series of raster based topographical contour lines in the airport map.

A high level management capability is required for ALP graphical entity control. The current raster-based maps do not provide this functionality, hence additional processing is required each time the map is displayed or modified. For raster-based maps to provide this capability, the pixel elements must be functionally organized in some manner to support the higher level management functions described in this application. For this reason, raster scan map formats are not recommended for ALPs at this time.

Vector formats may be in ASCII or binary and may be constructed using different rules for their generation. The example below uses the AutoCAD™ DXF standard drawing format. (AutoCAD is a registered trademark of AUTODESK, Inc.) AutoCAD™ is one of the most popular Computer Aided Design (CAD) software packages in the world today and is typical of vector ALP formats. The DXF map format may be easily converted to almost any CAD drawing format.

AUTOCAD™ DXF ALP FORMAT

| NEW HAMPSHIRE STATE PLANE FEET | ECEF X, Y, Z METERS |
|---|---|
| 3D FACE | 3D FACE |
| 8 | 8 |
| BUILDING | BUILDING |
| 10 | 10 |
| 1046289.75 | 1489279.59 |
| 20 | 20 |
| 154935.219 | −4434265.78 |
| 30 | 30 |
| 256.499 | 4321428.53 |
| 11 | 11 |
| 1046289.75 | 1489277.26 |
| 21 | 21 |
| 154935.219 | −4434258.83 |
| 31 | 31 |
| 223.7 | 4321421.72 |
| 12 | 12 |
| 1046245.375 | 1489258.04 |
| 22 | 22 |
| 155032.25 | −4434243.98 |
| 32 | 32 |
| 223.7 | 4321443.43 |
| 13 | 13 |
| 1046245.375 | 1489260.37 |
| 23 | 23 |
| 155032.25 | −4434250.92 |
| 33 | 33 |
| 256.499 | 4321450.24 |
| 0 | 0 |

The two formats shown above represent the vertical side of a building which is, by AutoCAD™ convention, a 3-D face. Since the two coordinate systems are different, one must appropriately set the respective viewpoint for each display. This is accomplished in the initial ALP DXF configuration declarations. In a similar fashion, the drawing could be converted to other coordinate systems such as Universal Transverse Mercator (UTM) using a DXF coordinate conversion utility program such as TRALAINE™ (available from Mentor Software, Thornton, Colo.

The above example represents just one of the thousands of entities making up an ALP. Many commercial graphical libraries and commercial CAD software products are available today for the construction and use of ALPs and other 3-D graphic entities.

The use of modern digital Computer Aided Design (CAD) techniques is required for the development of electronic map databases. The use of GPS-based, ground referenced photogrammetry with post processing 2 or 3-D digitalization provides a cost effective, highly accurate and automated method of constructing the 2 or 3-D ALP.

An industry or international standard format for the construction and interchange of digital graphical information should be used. Numerous standards are established with readily available software translators for conversions between the various formats. Map file formats may be binary or ASCII characters.

3-D OBJECT ORIENTED MAP LAYERS

When stored in a digital format, the ALP should be arranged in object oriented map layers. Proper layering of information provides the capability to present only the information that is needed for a particular purpose. For example, navigational maps should not necessarily include all the digital layers of the ALP. A simplified version of the map showing only runways, taxiways, navigational references (landmarks) and gate areas should be used. The use of specific layers of interest provides the following advantages:

*minimizes possible confusion in presenting too much information to the pilot or controller

*decreases reaction times of controller and pilot by only presenting what is needed

*reduces computer memory requirements

*minimizes computer processing requirements

*provides faster display updates (fewer pixels to redraw)

3-DIGITAL MAP COORDINATE SYSTEMS

In order to integrate GPS navigational data with 2 or 3-D maps, the potential map formats must be evaluated for compatibility and ease of use with the navigational output and coordinate reference system. The table below lists twelve of the most likely combinations.

COMBINATIONS OF MAPS, NAVIGATIONAL PARAMETERS AND MATHEMATICAL COORDINATE REFERENCES

| DIGITAL # MAP FORMAT | MATHEMATICAL NAVIGATIONAL I/O FORMAT | COORDINATE REFERENCE |
|---|---|---|
| 1. LAT, LON, MSL | LAT, LON, MSL | LAT, LON, MSL |
| 2.*LAT, LON, MSL | LAT, LON, MSL | ECEF |
| 3. LAT, LON, MSL | STATE PLANE/UTM | ECEF |
| 4. LAT, LON, MSL | ECEF | ECEF |
| 5. STATE PLANE/UTM | STATE PLANE/UTM | STATE PLANE/UTM |
| 6. STATE PLANE/UTM | LAT, LON, MSL | LAT, LON, MSL |
| 7.*STATE PLANE/UTM | LAT, LON, MSL | ECEF |
| 8. STATE PLANE/UTM | ECEF | ECEF |
| 9. ECEF | ECEF | ECEF |
| 10.*ECEF | LAT, LON, MSL | ECEF |
| 11. ECEF | LAT, LON, MSL | LAT, LON MSL |
| 12. ECEF | STATE PLANE/UTM | STATE PLANE/UTM |

(UTM = Universal Transverse Mercator)

Other permutations are possible for the different combinations of coordinate systems, map references and navigational output formats. Other combinations can be "made to work", but based on arithmetic precision, map availability and software complexity, the combinations identified with an asterisk satisfy the evaluation criteria most effectively.

The table below presents a compliancy matrix, where each of the twelve combinations are evaluated against a set of criteria. The criteria used are described in greater detail following the table.

COMPLIANCY MATRIX

|  | 1 | 2 | 3 | 4 | 5 | 6 | 7* | 8 | 9 | 10* | 11 | 12 |
|---|---|---|---|---|---|---|---|---|---|---|---|---|
| MAPPING FORMAT: | | | | | | | | | | | | |
| EXISTING MAP DATA | Y | Y | Y | Y | Y | Y | Y | Y | N | N | N | N |
| RECOGNIZABLE MAP | Y | Y | Y | Y | Y | Y | Y | Y | N | N | N | N |
| CONV. SWE EXISTS | Y | Y | Y | Y | Y | Y | Y | Y | Y | Y | Y | Y |
| EASY 3D-2D CONV | Y | Y | Y | Y | Y | Y | Y | Y | N | N | N | N |
| MULTI-USE FORMAT | Y | Y | Y | Y | Y | Y | Y | Y | N | N | N | N |
| WORLD WIDE SYSTEM | Y | Y | Y | Y | N | N | N | N | Y | Y | Y | Y |
| LINEAR SYSTEM | N | N | N | N | Y | Y | Y | Y | Y | Y | Y | Y |
| GPS COMPATIBLE | Y | Y | Y | Y | N | N | N | N | Y | Y | Y | Y |
| SEAMLESS SYSTEM | N | N | N | N | N | N | N | N | Y | Y | Y | Y |
| NAV INPUT-OUTPUT: | | | | | | | | | | | | |
| RECOGNIZABLE | Y | Y | N | N | N | Y | Y | N | N | Y | Y | N |
| ACCEPTED STANDARD | Y | Y | N | N | N | Y | Y | N | N | Y | Y | N |
| WORLD WIDE USE | Y | Y | N | Y | N | Y | Y | Y | Y | Y | Y | N |
| GPS COMPATIBLE | Y | Y | N | Y | N | Y | Y | Y | Y | Y | Y | N |
| CHARTS AVAILABLE | Y | Y | N | N | Y | Y | Y | N | N | Y | Y | Y |
| COORD REFERENCE: | | | | | | | | | | | | |
| RECOGNIZABLE REF. | Y | N | N | N | Y | Y | N | N | N | N | Y | Y |
| WORLD WIDE USE | Y | Y | Y | Y | N | Y | Y | Y | Y | Y | Y | N |
| SIMPLE NAV. MATH. | N | Y | Y | Y | Y | N | Y | Y | Y | Y | N | Y |
| NAD83 & WGS84 REF | Y | Y | Y | Y | Y | Y | Y | Y | Y | Y | Y | Y |
| SINGLE 3D ORIGIN | N | Y | Y | Y | N | N | Y | Y | Y | Y | N | N |
| LINEAR SYSTEM | N | Y | Y | Y | Y | N | Y | Y | Y | Y | N | Y |
| UNITS OF DISTANCE | N | Y | Y | Y | Y | N | Y | Y | Y | Y | N | Y |
| TOTAL YES COUNT: | 15 | 18 | 13 | 15 | 12 | 14 | 17 | 14 | 13 | 16 | 13 | 11 |

*Suggested combinations

| MAPPING: | CRITERIA DEFINITIONS |
|---|---|
| COMPATIBILITY WITH EXISTING MAP DATA | Existing digital map data is available for the airport and surrounding area. |
| RECOGNIZABLE MAP | A map which is instantly recognizable, one which resembles the surface on which we live. The map should not need to be differentially corrected from the reference geoid. |
| CONVERSION SW EXISTS | Commercially available software exists to convert from one 3-D map reference system to the other |
| EASY 3D–2D CONVERSION | Digital map presentations can be easily converted from 3-D to 2-D by setting the altitude to zero without any additional mathematical conversions in the raw map data or in the 3-D graphical interface. |
| MULTI-USE FORMAT | The map data is in a standard format which can satisfy multi-use needs such as Master Plans, construction needs, ATC and general navigation. |
| WORLD WIDE SYSTEM | References in the map are with respect to world wide datums and accepted world wide mapping units. |
| LINEAR SYSTEM | The axes and units of the map are linear and represent distance. |
| GPS COMPATIBLE | Mapping units and presentations are directly compatible with existing GPS receiver output formats and calculation references. |
| SEAMLESS SYSTEM | Maps do not have mathematical/physical discontinuity the map format must be seamless on a world wide basis. For example UTM maps do not cover polar regions and map edges do not match on 6 degree boundaries when placed together. |

-continued

| MAPPING: | CRITERIA DEFINITIONS |
|---|---|
| NAVIGATIONAL OUTPUT: | |
| RECOGNIZABLE | The final navigational output should be instantly recognizable: i.e. if LAT, LON, MSL output is used, one can instantly visualize a location on the earth, while if ECEF outputs are given it is difficult to visually picture a point in space. |
| ACCEPTED STANDARD | Navigational format is an accepted standard: i.e. LAT, LON, MSL |
| WORLD WIDE USE | The navigational format is usable over the entire world. |
| GPS COMPATIBLE | Navigational format is compatible with existing GPS receiver outputs. |
| CHARTS AVAILABLE | Paper and digital charts are available. |
| COORDINATE REFERENCE: | |
| WORLD WIDE USE | The coordinate reference system is recognized throughout the world. |
| SIMPLE NAVIGATION MATHEMATICS | The coordinate system lends itself to simple linear navigational mathematics. |
| NAD83 AND WGS84 REF. | The reference system is compatible with North American Datum of 1983 and World Geodetic Survey of 1984. |
| SINGLE ORIGIN LINEAR SYSTEM | The system has one and only one origin. The system is a linear coordinate system. |
| UNITS OF DISTANCE | The coordinate system is based on units of distance rather than angle. |

Figure 12:
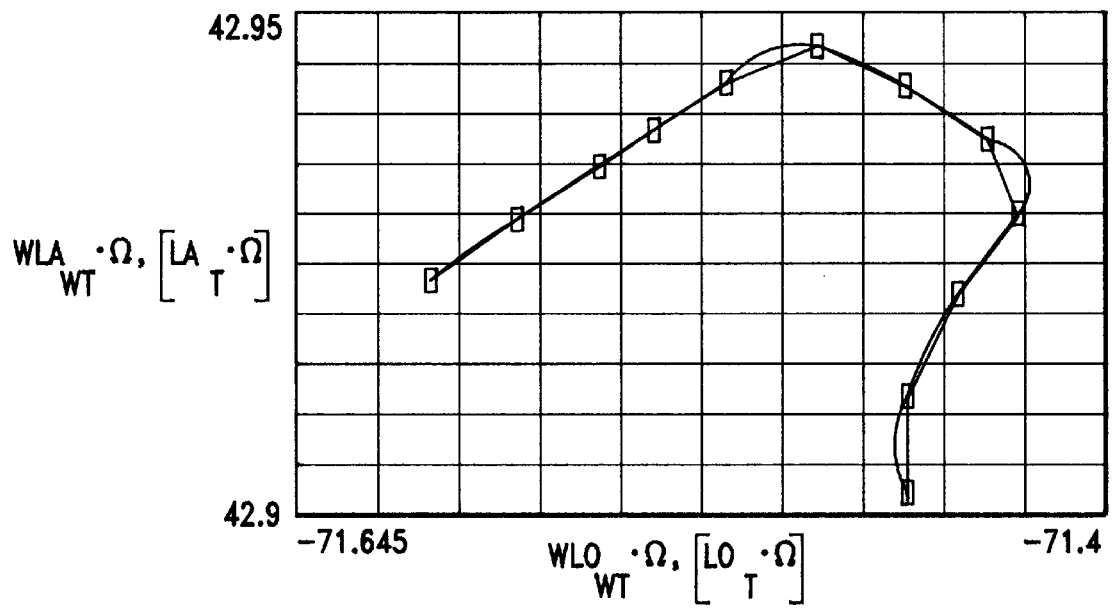
FIG. 12 graphs latitude, Longitude plot of a missed approach followed by a touch and go with waypoints indicated about every 20 seconds.
Figure 13:
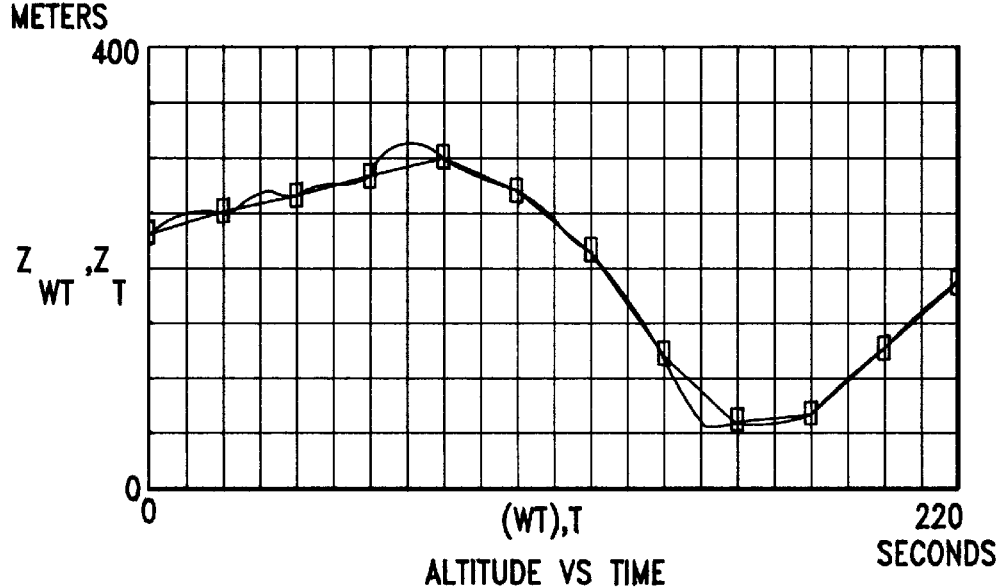
FIG. 13 graphs altitude vs. time for missed approach followed by touch and go, waypoints are indicated about every 20 seconds.

To illustrate the differences between GPS trajectories displayed in maps using different coordinate systems, the following plot examples are provided. FIG. 12 shows a plan view of latitude versus longitude. FIG. 14 shows the same trajectory in ECEF X and Y coordinates. FIG. 13 depicts the MSL Altitude versus Time while FIG. 15 shows the ECEF X values versus Time. Note the distortion between the latitude, longitude, MSL altitude and the ECEF X,Y, and Z coordinates. (The small rectangles on each plot represent waypoints along the trajectory path.)

Plotting points in the map database requires that the navigational computations provide output which is compatible with the map database coordinates. Combination #7 in the previous Table includes a map database which is in a State Plane Coordinate System and a navigational output in latitude, longitude and MSL. Additional conversions are required to convert the navigational data to state plane coordinates prior to plotting the points in the map database. A more convenient map, navigational and coordinate reference frame is required.

ALP SUMMARY AND RECOMMENDATIONS

Future airport maps or modifications to existing maps should make every attempt to utilize recent technological advances in their construction. The following items are guidelines for future map development.

Precise, 3-D airport maps (ALPs) should be created and maintained for all major and reliever airports.

ALPs should be constructed to satisfy multiple user requirements.

Electronic graphical design tools should be used in ALP construction. Computer Aided Design tools should be used wherever possible.

Standard graphical formats (either ASCII character or industry standard binary file formats) should be used.

The concept of electronic layers should be used to identify and isolate entities in the map database.

Airport Reference Points (ARPs) should be located at precisely monumented positions around the airport. ARPs should be referenced to the coordinate systems of interest (such as LAT,LON,MSL, ECEF X,Y,Z and the SPCS).

At least three (3) ARPs, located within the airport confines in areas which are not likely to be disturbed, are recommended. Where possible, these points should be placed in the far corners of the airport to form a triangle. These points should be surveyed with GPS based survey equipment and monumented physically on the ground and within the digital map database.

ARPs should be recomputed as necessary to assure accuracy of the navigation and ATC functions. Re-monumentation may be required as a part of airport construction and expansion. Natural phenomena such as plate tectonics, may force re-monumentation of the airport. When ARP positions change more than 0.5 meters horizontally and 0.1 meters vertically, re-monumentation is recommended.

Areas used by aircraft such as runways, taxiways, gate areas and ramps should be surveyed to a horizontal accuracy of 0.5 meters horizontally and elevation to 0.1 meters.

The use of photogrammetry is suggested as an efficient means of creating a digital database of an existing airport.

Earth reference systems used for the various map projections should be the NAD 83 or WGS 84. Older, previously accepted datums which do not correlate with GPS navigation or surveys should be avoided.

ALPs should be compatible with cockpit instrumentation and ATC databases.

GPS calibration areas should be located at all gates or areas where aircraft remain stationary. These areas should be identified in the airport digital map. The purpose of the calibration area is to allow the pilot to check the accuracy of the on board GPS equipment.

Cost effective and highly accurate mapping technology is available to allow for the generation of multi-use maps which should be compatible with a host of platforms and potential uses. The exploitation of these common use maps will enhance master planning, aviation and Air Traffic Control (ATC) capabilities. Maps developed to national standards will provide a cost effective navigational and ATC data base.

SUMMARY, RAMIFICATION AND SCOPE

The presented invention provides a valuable enhancement to the current airport environment. This enhancement will result in safer air travel and more efficient operation of our currently capacity limited airports. Human blunders in the cockpit and in the control tower have cost hundred of lives in the past. Seamless airport operations will result in lower air traffic controller and pilot workloads through the use of automation processing. Advanced situational awareness displays showing travel paths, and clearance compatible mirrored navigation automation processing will reduce the likelihood of human blunders in the control tower and in the cockpit resulting in a safer airport environment. The elimination of out dated single function navigation and surveillance systems will result in significant cost savings for the airport authority and the FAA. The cost effective nature of this GNSS based airport control and management system will allow deployment at smaller airports resulting in safer operations and better on time performance throughout the whole aviation system.

It is obvious that minor changes may be made in the form and construction of the invention without departing from the material spirit thereof. It is not, however, desired to confine the invention to the exact form herein shown and described, but is desired to include all such as properly come within the scope claimed.

What is claimed is:

1. An automated airport control and management system computer human interface method for the control and management of at least one of a plurality of vehicles operating at an airport said vehicles consisting of at least one vehicle selected from the group of aircraft and surface vehicles, using a computer with display and data entry capability for use by a controller, the computer using GNSS compatible processing, the computer human interface method comprising the steps of:

(a) using said computer to provide to the controller a displayed list of arrivals using said computer display;

(b) using said computer to select from said displayed list of arrivals, a specific vehicle arrival;

(c) using said computer to provide to the controller a displayed list of valid GNSS compatible travel paths for arrivals using said computer display;

(d) using said computer to select from said displayed list of valid GNSS compatible travel paths a specific arrival travel path for said selected vehicle, and (e) using a radio to transmit an arrival clearance to said selected vehicle to travel said selected arrival travel path, the controller thereby controlling the flow of said vehicles operating at an airport.

2. The automated airport control and management system computer human interface method of claim 1, further comprising clearance transmission management comprising the steps of:

(a) receiving said arrival clearance at said selected vehicle using a radio receiver located in said selected vehicle;

(b) transmitting from said selected vehicle using a radio transmitter a clearance acknowledgement when said arrival clearance is received correctly and understood;

(c) using a radio receiver at an Airport Control and Management System to receive said arrival clearance acknowledgement and (d) canceling a retransmission of said arrival clearance to said selected vehicle after said clearance acknowledgement is received.

3. The automated airport control and management system computer human interface method of claim 1, further comprising clearance transmission management comprising the steps of:

(a) measuring the time after said transmitting of said arrival clearance;

(b) using a radio receiver, waiting to receive a clearance acknowledgement from said selected vehicle and (c) re-transmitting said arrival clearance when said clearance acknowledgement is not received within a preset time.

4. The automated airport control and management system computer human interface method of claim 1, further comprising lighting control, said lighting control comprising the steps of:

(a) connecting said computer to an airport lighting interface;

(b) selecting for said selected arrival travel path at least one airport light selected from the group, comprised of landing lights and intersection lights and (c) using said computer and said airport lighting interface to control the state of said at least one airport light as a function of said arrival clearance.

5. The automated airport control and management system computer human interface method of claim 1, further comprising conformance monitoring, said conformance monitoring comprising the steps of:

(a) receiving said arrival clearance at said selected vehicle using a radio receiver located in said selected vehicle;

(b) using said received arrival clearance, said selected vehicle travels said selected arrival travel path;

(c) determining in said computer a position, being GNSS referenced of said selected vehicle indicative of the position while said selected vehicle attempts to travel said selected arrival travel path;

(d) determining using said computer a travel conformance status indicative of said vehicle's ability to travel said selected arrival travel path and (e) displaying said travel conformance status to the controller.

6. The automated airport control and management system computer human interface method of claim 1, further comprising incursion detection, comprising the steps of:

(a) establishing a GNSS compatible database of zones of non-permitted usage by said selected vehicle;

(b) determining using said computer when a position incurs a zone of non-permitted usage and (c) displaying an incursion alert when said position incurs said zone of non-permitted usage thereby alerting the controller to an incursion condition.

7. The automated airport control and management system computer human interface method of claim 4 further comprising the steps of:

(a) establishing a GNSS compatible database of runway zones non-permitted usage by said vehicle;

(b) determining using said computer when a position incurs a runway zone of non-permitted usage and (c) flashing runway lights selected from the group of runway lights comprising landing lights and take off lights.

8. An automated airport control and management system computer human interface method for the control and management of at least one of a plurality of vehicles operating at an airport said vehicles consisting of at least one vehicle selected from the group of aircraft and surface vehicles, using a computer with display and data entry capability for use by a controller, the computer using GNSS compatible processing, the computer human interface method comprising the steps of:

(a) using said computer to provide to the controller a displayed list of departures using said computer display;

(b) using said computer to select from said displayed list of departures, a specific vehicle departure;

(c) using said computer to provide to the controller a displayed list of valid GNSS compatible travel paths for departures using said computer display;

(d) using said computer to select from said displayed list of valid GNSS compatible travel paths a specific departure travel path for said selected vehicle, and (e) using a radio to transmit an departure clearance to said selected vehicle to travel said selected departure travel path, the controller thereby controlling the flow of said vehicles operating at an airport.

9. The automated airport control and management system computer human interface method of claim 8, further comprising clearance transmission management comprising the steps of:

(a) receiving said departure clearance at said selected vehicle using a radio receiver located in said selected vehicle;

(b) transmitting from said selected vehicle using a radio transmitter a clearance acknowledgement when said departure clearance is received correctly and understood;

(c) using a radio receive at an Airport Control and Management System to receive said departure clearance acknowledgement, and (d) canceling a retransmission of said departure clearance to said selected vehicle after said clearance acknowledgement is received.

10. The automated airport control and management system computer human interface method of claim 8, further comprising clearance transmission management comprising the steps of:

(a) measuring the time after said transmitting of said departure clearance;

(b) using a radio receiver, waiting to receive a clearance acknowledgement from said selected vehicle and (c) re-transmitting said departure clearance when said clearance acknowledgement is not received within a preset time.

11. The automated airport control and management system computer human interface method of claim 8, further comprising lighting control, said lighting control comprising the steps of:

(a) connecting said computer to an airport lighting interface;

(b) selecting for said selected departure travel path at least one airport light selected from the group, comprised of intersection lights and take off lights and;

(c) using said computer and said airport lighting interface to control the state of said at least one airport light as a function of said issued departure clearance.

12. The automated airport control and management system computer human interface method of claim 8, further comprising conformance monitoring, said conformance monitoring comprising the steps of:

(a) receiving said departure clearance at said selected vehicle using a radio receiver located in said selected vehicle;

(b) using said received departure clearance, said selected vehicle travels said selected departure travel path;

(c) determining in said computer a position, being GNSS referenced of said selected vehicle indicative of the position while said selected vehicle attempts to travel said selected departure travel path;

(d) determining using said computer a travel conformance status indicative of said vehicle's ability to follow said selected departure travel path and (e) displaying said travel conformance status to the controller.

13. The automated airport control and management system computer human interface method of claim 11 further comprising the steps of:

(a) establishing a GNSS compatible database of runway zones non-permitted usage by said vehicle;

(b) determining using said computer when a position incurs a runway zone of non-permitted usage and (c) flashing runway lights selected from the group of runway lights comprising landing lights and take off lights.

14. The automated airport control and management system computer human interface method of claim 8, further comprising incursion detection, comprising the steps of:

(a) establishing a GNSS compatible database of zones of non-permitted usage by said vehicle;

(b) determining using said computer when a position incurs a zone of non-permitted usage and (c) displaying an incursion alert when said position incurs said zone of non-permitted usage thereby alerting the controller to an incursion condition.

* * * * *